(12) United States Patent
Kolls

(10) Patent No.: US 7,464,867 B1
(45) Date of Patent: Dec. 16, 2008

(54) CASHLESS VENDING SYSTEM WITH TETHERED PAYMENT INTERFACE

(75) Inventor: H. Brock Kolls, Pottstown, PA (US)

(73) Assignee: USA Technologies, Inc., Malvern, PA (US)

( * ) Notice: Subject to any disclaimer, the term of this patent is extended or adjusted under 35 U.S.C. 154(b) by 432 days.

(21) Appl. No.: 11/348,744

(22) Filed: Feb. 7, 2006

Related U.S. Application Data

(60) Division of application No. 10/277,458, filed on Oct. 22, 2002, which is a continuation-in-part of application No. 10/263,515, filed on Oct. 3, 2002, which is a continuation-in-part of application No. 10/153,478, filed on May 22, 2002, which is a continuation-in-part of application No. 10/138,385, filed on May 3, 2002, now Pat. No. 7,131,575, which is a continuation-in-part of application No. 10/121,081, filed on Apr. 12, 2002, now Pat. No. 7,076,329, which is a continuation-in-part of application No. 10/118,123, filed on Apr. 8, 2002, which is a continuation-in-part of application No. 10/100,680, filed on Mar. 18, 2002, which is a continuation-in-part of application No. 10/083,032, filed on Feb. 26, 2002, application No. 10/277,458, and a continuation-in-part of application No. 10/051,594, filed on Jan. 18, 2002, which is a continuation-in-part of application No. 09/888,797, filed on Jun. 25, 2001, which is a continuation-in-part of application No. 09/884,755, filed on Jun. 19, 2001, now Pat. No. 6,505,095.

(60) Provisional application No. 60/278,599, filed on Mar. 26, 2001.

(51) Int. Cl.
*G06F 7/08* (2006.01)

(52) U.S. Cl. .................. 235/381; 235/449; 235/451

(58) Field of Classification Search ................ 235/381, 235/449, 451; 700/231, 232, 236, 237
See application file for complete search history.

(56) References Cited

U.S. PATENT DOCUMENTS 2,703,048 A    3/1955    Gandert et al.

(Continued)

FOREIGN PATENT DOCUMENTS

EP    0986033    3/2000

(Continued)

OTHER PUBLICATIONS

The European Vending Association Data Transfer Standard, European Vending Association, Jul. 1999, pp. .3-E.3, Version 5.0.

(Continued)

*Primary Examiner*—Michael G Lee
*Assistant Examiner*—Kristy A Haupt
(74) *Attorney, Agent, or Firm*—RatnerPrestia

(57) ABSTRACT

The present invention relates to a cashless vending system that utilizes a tethered payment interface. The tethered payment interface is mountable on the external surface of a vending machine while the payment module portion of the system resides inside the vending machine. An advantage of this system is that when a bill validator slot opening in the vending machine is available the tethered payment interface can be secured to an adapter plate and mounted in the available slot. However, when a slot opening in the vending machine is not available, then the tethered payment interface can be located and secured on the external surface of the vending machine. In addition, the tethered payment interface is configured to be user accessible, provide an informational display, accept magnetic cards (i.e. credit cards, employee badges, hotel room keys, others), and accept RFID device data (i.e. FOBS, touch, RFID credit cards, others).

17 Claims, 65 Drawing Sheets

U.S. PATENT DOCUMENTS

| | | |
|---|---|---|
| 4,366,481 A | 12/1982 | Main et al. |
| 4,485,300 A | 11/1984 | Peirce |
| 4,611,205 A | 9/1986 | Eglise |
| 4,727,757 A | 3/1988 | Hilzinger et al. |
| 4,737,967 A | 4/1988 | Cahalan |
| 4,780,806 A | 10/1988 | Wada et al. |
| 4,812,628 A | 3/1989 | Boston et al. |
| 4,999,672 A | 3/1991 | Rice et al. |
| 5,077,582 A | 12/1991 | Kravette |
| 5,091,713 A | 2/1992 | Horne |
| 5,132,915 A | 7/1992 | Goodman |
| 5,150,817 A | 9/1992 | Livingston |
| 5,206,488 A | 4/1993 | Teicher |
| 5,225,977 A | 7/1993 | Hooper |
| 5,273,183 A | 12/1993 | Tuttobene |
| 5,285,382 A | 2/1994 | Muehlberger et al. |
| 5,337,253 A | 8/1994 | Berkovsky |
| 5,440,108 A | 8/1995 | Tran |
| 5,442,568 A | 8/1995 | Ostendorf |
| 5,450,938 A * | 9/1995 | Rademacher ............... 235/381 |
| 5,464,087 A | 11/1995 | Bounds |
| 5,591,949 A | 1/1997 | Berstein |
| 5,596,501 A | 1/1997 | Comer et al. |
| 5,608,643 A | 3/1997 | Wichter et al. |
| 5,619,024 A | 4/1997 | Kolls |
| 5,628,351 A | 5/1997 | Ramsey, Jr. et al. |
| 5,710,887 A | 1/1998 | Chelliah |
| 5,728,999 A | 3/1998 | Teicher |
| 5,734,150 A * | 3/1998 | Brown et al. ................. 235/381 |
| 5,764,639 A | 6/1998 | Staples |
| 5,769,269 A | 6/1998 | Peters |
| 5,791,449 A | 8/1998 | Deaville et al. |
| 5,844,808 A | 12/1998 | Konsmo et al. |
| 5,850,442 A | 12/1998 | Muftic |
| 5,924,081 A | 7/1999 | Ostendorf |
| 5,930,771 A | 7/1999 | Stapp |
| 5,952,638 A | 9/1999 | Demers et al. |
| 5,955,718 A * | 9/1999 | Levasseur et al. ........... 235/381 |
| 5,959,869 A | 9/1999 | Miller et al. |
| 5,963,452 A | 10/1999 | Etoh |
| 5,983,200 A | 11/1999 | Slotznick |
| 5,988,346 A | 11/1999 | Tedesco et al. |
| 5,997,170 A | 12/1999 | Brodbeck |
| 6,000,522 A | 12/1999 | Johnson |
| 6,038,551 A | 3/2000 | Barlow et al. |
| 6,109,524 A | 8/2000 | Kanoh et al. |
| 6,115,649 A | 9/2000 | Sakata |
| 6,116,505 A | 9/2000 | Withrow |
| 6,119,053 A | 9/2000 | Taylor et al. |
| 6,123,223 A | 9/2000 | Watkins |
| 6,181,981 B1 | 1/2001 | Varga et al. |
| 6,234,389 B1 | 5/2001 | Valliani et al. |
| 6,250,452 B1 | 6/2001 | Partyka |
| 6,272,117 B1 | 8/2001 | Choi et al. |
| 6,272,395 B1 | 8/2001 | Brodbeck |
| 6,285,856 B1 | 9/2001 | Aguayo et al. |
| 6,295,482 B1 | 9/2001 | Tognazzini |
| 6,308,111 B1 | 10/2001 | Koga |
| 6,321,985 B1 | 11/2001 | Kolls |
| 6,339,731 B1 | 1/2002 | Morris et al. |
| 6,367,696 B1 | 4/2002 | Inamitsu |
| 6,390,269 B1 | 5/2002 | Billington |
| 6,397,126 B1 | 5/2002 | Nelson |
| 6,427,912 B1 | 8/2002 | Levasseur |
| 6,430,268 B1 | 8/2002 | Petite |
| 6,446,049 B1 | 9/2002 | Janning et al. |
| 6,457,038 B1 | 9/2002 | Defosse |
| 6,462,644 B1 | 10/2002 | Howell et al. |
| 6,473,283 B1 | 10/2002 | Melvin et al. |
| 6,487,540 B1 | 11/2002 | Smith et al. |
| 6,505,095 B1 | 1/2003 | Kolls |
| 6,571,150 B2 | 5/2003 | Arai |
| 6,574,603 B1 | 6/2003 | Dickson et al. |
| 6,595,416 B1 | 7/2003 | Newsome et al. |
| 6,757,585 B2 | 6/2004 | Ohtsuki |
| 6,771,981 B1 | 8/2004 | Zalewski et al. |
| 6,772,048 B1 | 8/2004 | Leibu |
| 6,804,252 B1 | 10/2004 | Johnson |
| 6,814,518 B2 | 11/2004 | Luciano et al. |
| 6,839,775 B1 | 1/2005 | Kao |
| 6,854,642 B2 | 2/2005 | Metcalf |
| 6,859,761 B2 | 2/2005 | Bensky et al. |
| 6,934,594 B2 | 8/2005 | Loring et al. |
| 6,945,457 B1 | 9/2005 | Barcelou |
| 7,013,337 B2 | 3/2006 | Defosse |
| 7,031,804 B2 * | 4/2006 | Brooke et al. ............... 700/232 |
| 7,032,038 B1 | 4/2006 | Squires |
| 7,053,773 B2 | 5/2006 | McGarry |
| 7,054,909 B1 | 5/2006 | Ohkubo |
| 7,058,603 B1 | 6/2006 | Rhiando |
| 7,076,329 B1 * | 7/2006 | Kolls .......................... 700/232 |
| 7,096,191 B2 | 8/2006 | Nakajima |
| 7,110,954 B2 | 9/2006 | Yung |
| 7,131,575 B1 * | 11/2006 | Kolls .......................... 235/379 |
| 7,203,486 B2 | 4/2007 | Patel |
| 2001/0025349 A1 | 9/2001 | Sharood et al. |
| 2001/0034566 A1 | 10/2001 | Offer |
| 2001/0042121 A1 | 11/2001 | Defosse |
| 2002/0072976 A1 | 6/2002 | Virtanen |
| 2002/0077724 A1 | 6/2002 | Paulucci |
| 2002/0084322 A1 | 7/2002 | Baric |
| 2002/0099608 A1 | 7/2002 | Pons |
| 2002/0107742 A1 | 8/2002 | Magill |
| 2002/0156727 A1 | 10/2002 | LeVake et al. |
| 2002/0165788 A1 | 11/2002 | Bates |
| 2002/0188378 A1 | 12/2002 | Sufer |
| 2003/0030539 A1 | 2/2003 | McGarry |
| 2003/0050841 A1 | 3/2003 | Preston et al. |
| 2003/0055735 A1 | 3/2003 | Cameron et al. |
| 2003/0149827 A1 | 8/2003 | Smolen |
| 2003/0158625 A1 | 8/2003 | Carstens |
| 2003/0178487 A1 | 9/2003 | Rogers |
| 2003/0204391 A1 | 10/2003 | May |
| 2005/0088279 A1 | 4/2005 | Denison |
| 2005/0285716 A1 | 12/2005 | Denison |

FOREIGN PATENT DOCUMENTS

| | | |
|---|---|---|
| EP | 1096408 | 5/2001 |
| GB | 2172720 | 9/1986 |
| JP | 02012394 | 1/1990 |
| JP | 03273468 | 12/1991 |
| JP | 04077892 | 3/1992 |
| JP | 04149796 | 5/1992 |
| JP | 05143843 | 6/1993 |
| WO | WO96/15505 | 5/1996 |
| WO | WO 96/18980 | 6/1996 |
| WO | WO97/10576 | 3/1997 |
| WO | WO97/45796 | 12/1997 |
| WO | WO99/50800 | 10/1999 |

OTHER PUBLICATIONS

Webster et al.; Controlling A Java Enabled Pepsi® Vending Machine Over The World Wide Web; Date: Nov. 29-Dec. 3, 1999; Industrial Electronics Society, 1999. IECON '99 Proceedings. The 25th Annual Conference of the IEEE; vol. 1, 29 pp. 86-90 vol. 1.

Kimura et al.; Ecological Improvement Of the Vending Machine Using LCA Method; Date: Dec. 11-15, 2001; Environmentally Conscious Design And Inverse Manufacturing, 2001. Proceedings EcoDesign 2001: Second International Symposium On pp. 341-346.

Newmarch et al.; Using The Web And Jini To Link Vending Machines And Enterprise Systems; Date: Oct. 30-Nov. 4, 2000; Technology of Object-Oriented Languages And Systems, 2000. TOOLS-Asia 2000. Proceedings. 36th International Conference on pp. 260-264.

Moon et al.; An Event Channel-Based Embedded Software Architecture For Developing Telemetric And Teleoperation Systems On The WWW; Date: Jun. 2-4, 1999; Real-Time Technology and Applications Symposium, 1999. Proceedings of the Fifth IEEE; pp. 224-233.

Hintz, Klaus; "Put it on my card please," CMA, Hamilton: Apr. 1998, vol. 72, Iss. 3, p. 18 (5 pages).

Savitch, Walter; Problem Solving with C++ . . . +, Reading: Addison-Wesley Longman Inc.: 1999, pp. 406-413, no month available.

Garneau, George; "Cashless Newsracks," Editor & Publisher, Jun. 12, 1993, vol. 126, Iss. 24, p. 62, 2 pages.

USA Technologies Takes Unique Swipe Card Device Off Shore, Business Wire, Aug. 31, 2000.

Multi-Drop Bus/Internal Communication Protocol (MDB/ICP) version 2.0 supported by National Automatic Merchandising Association (NAMA) dated Oct. 4, 2000.

* cited by examiner

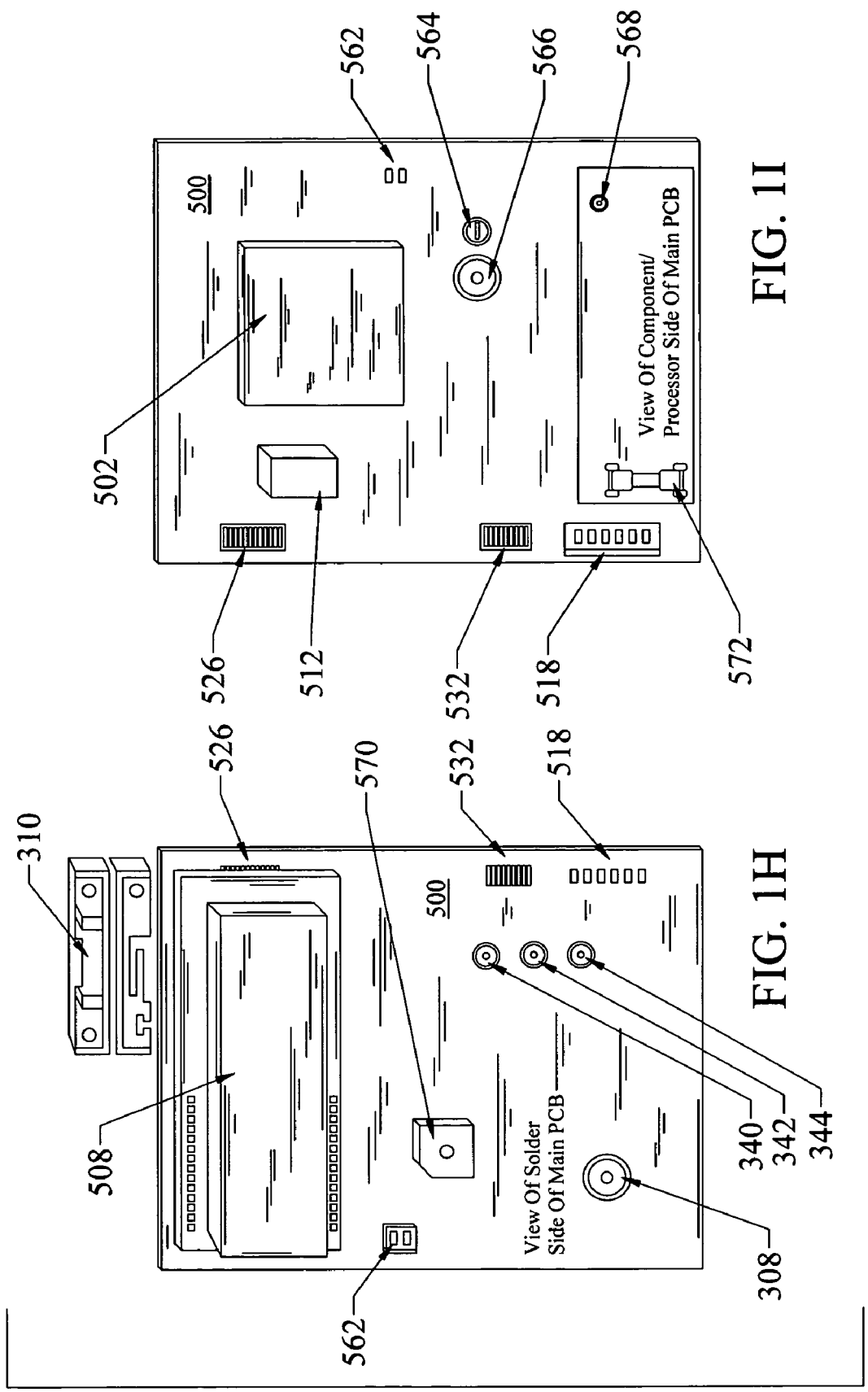

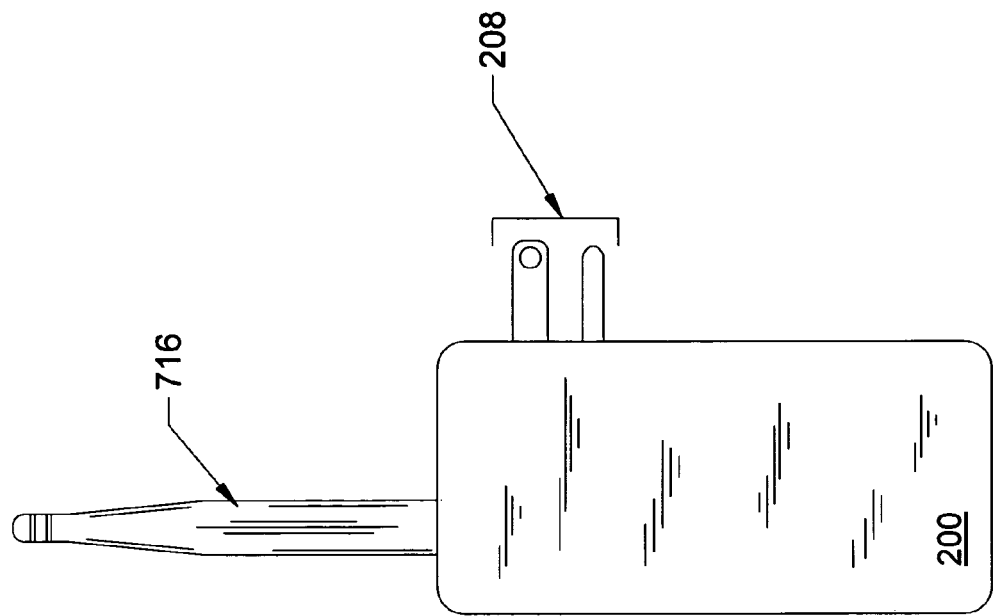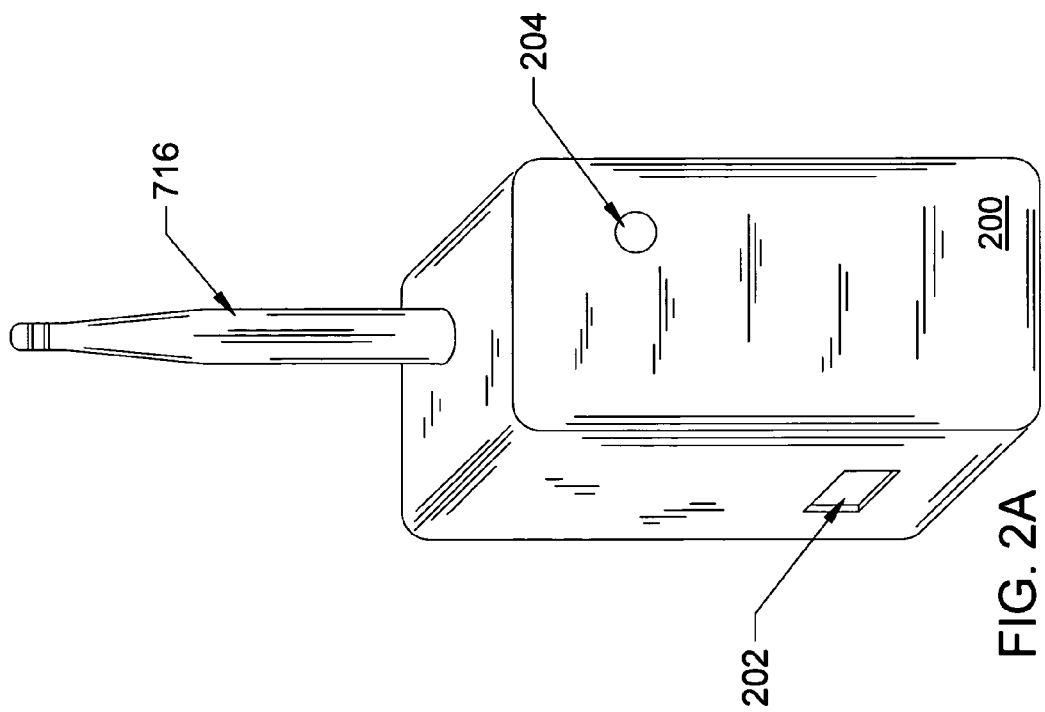

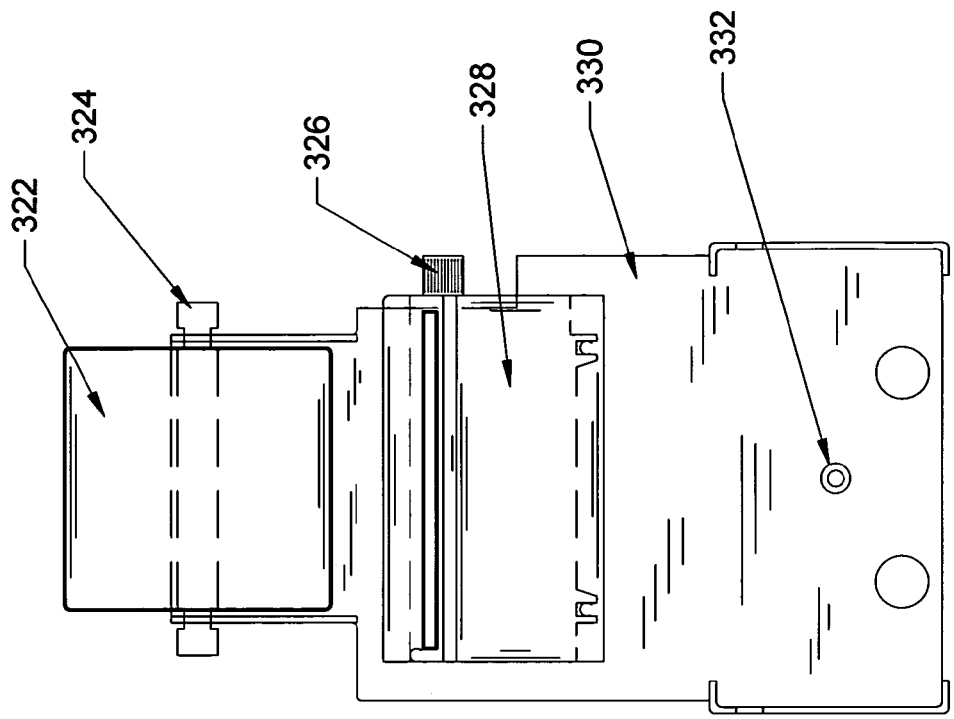
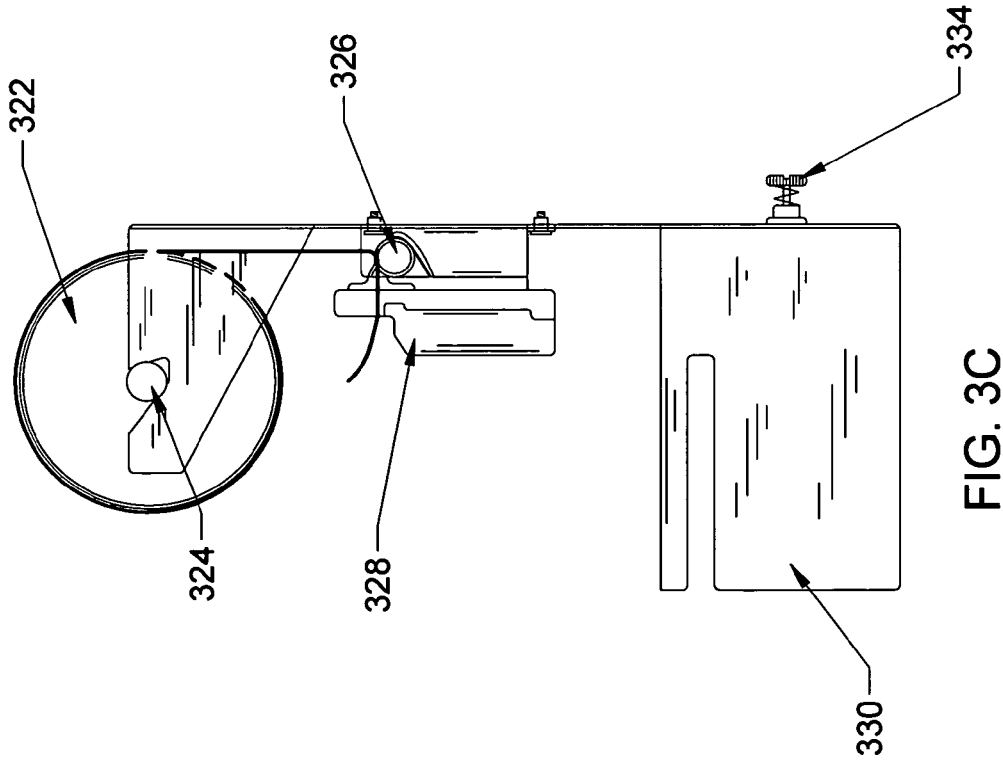

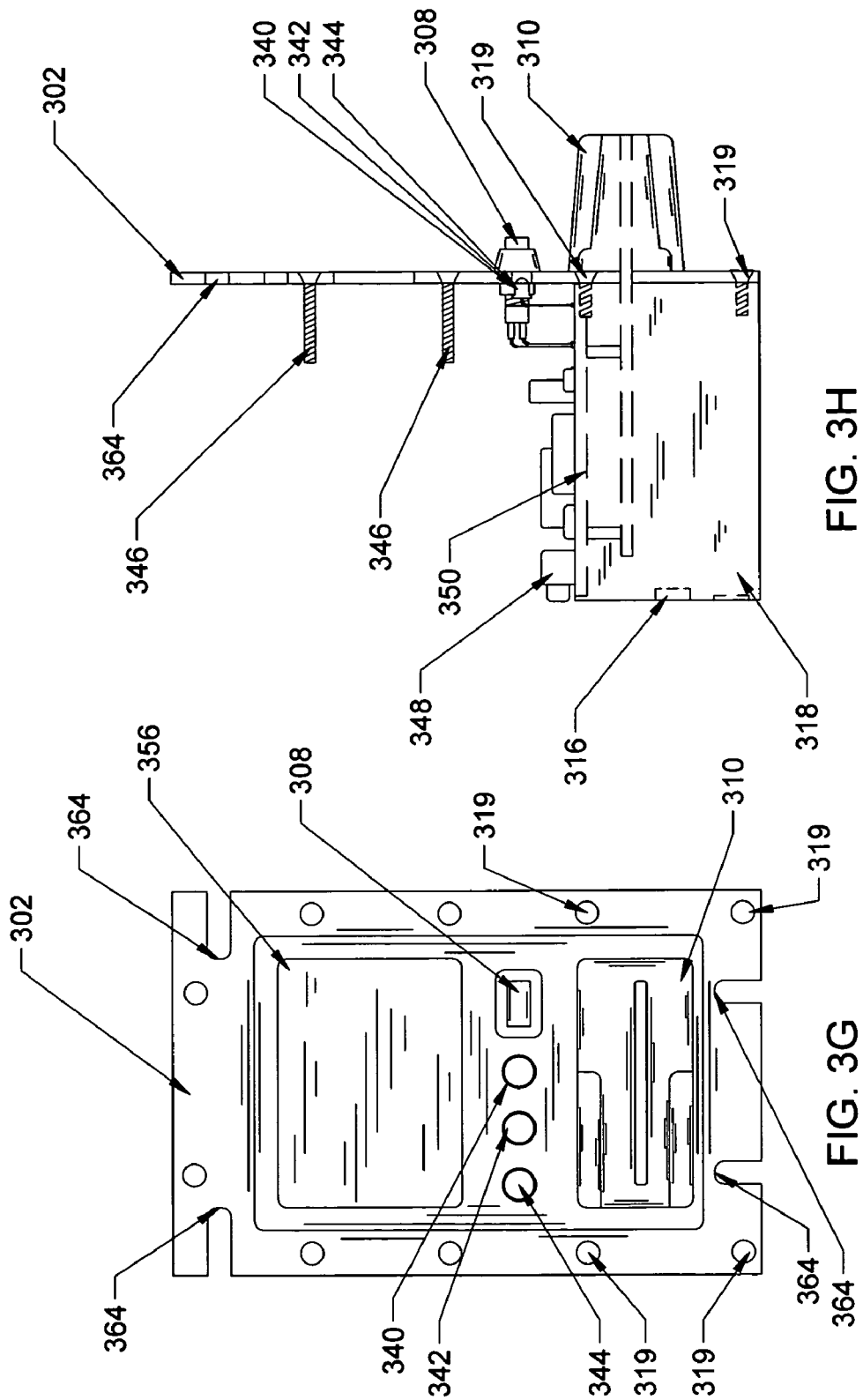

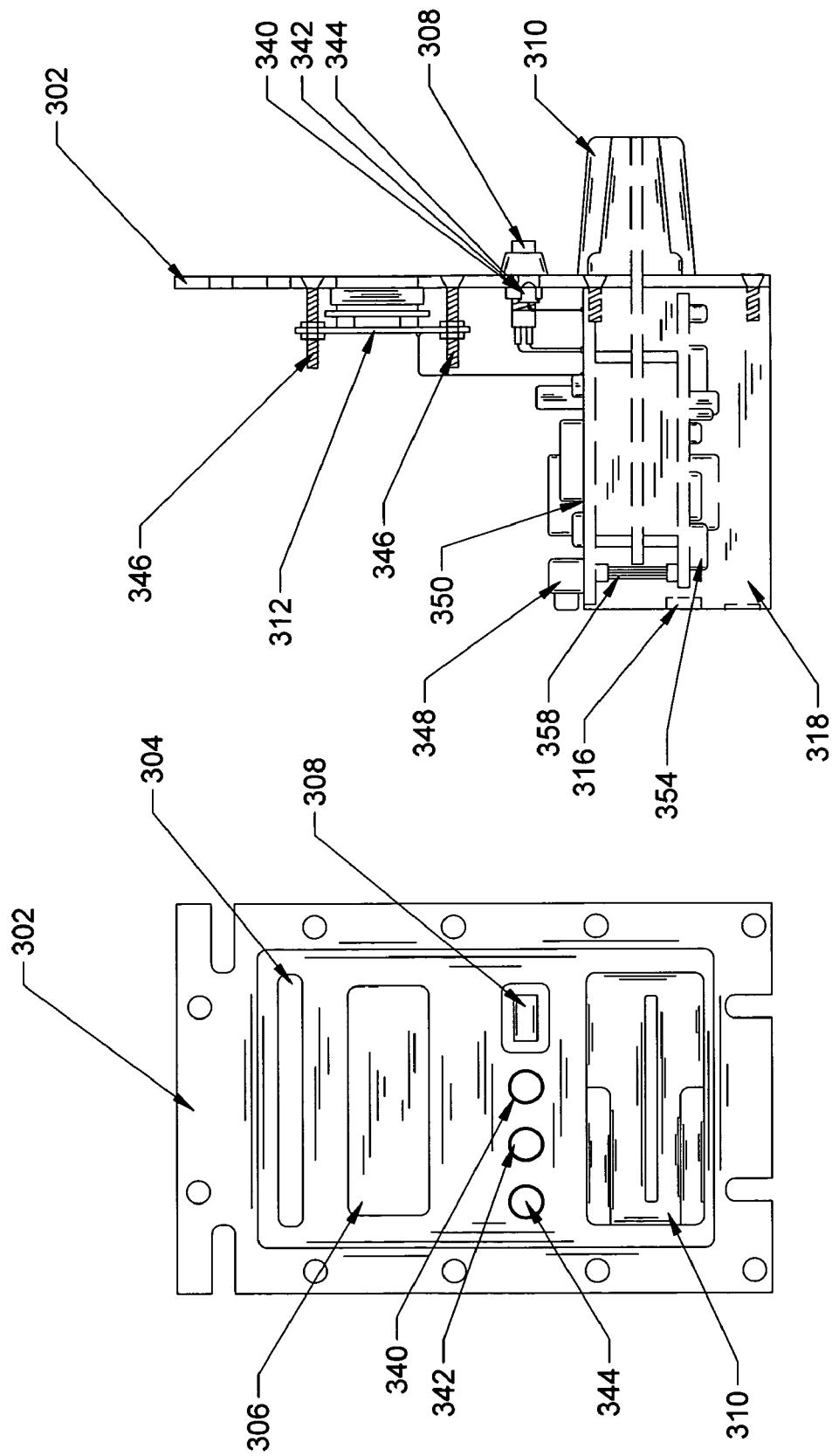

600

600

1000

1000

1100

1600

1800

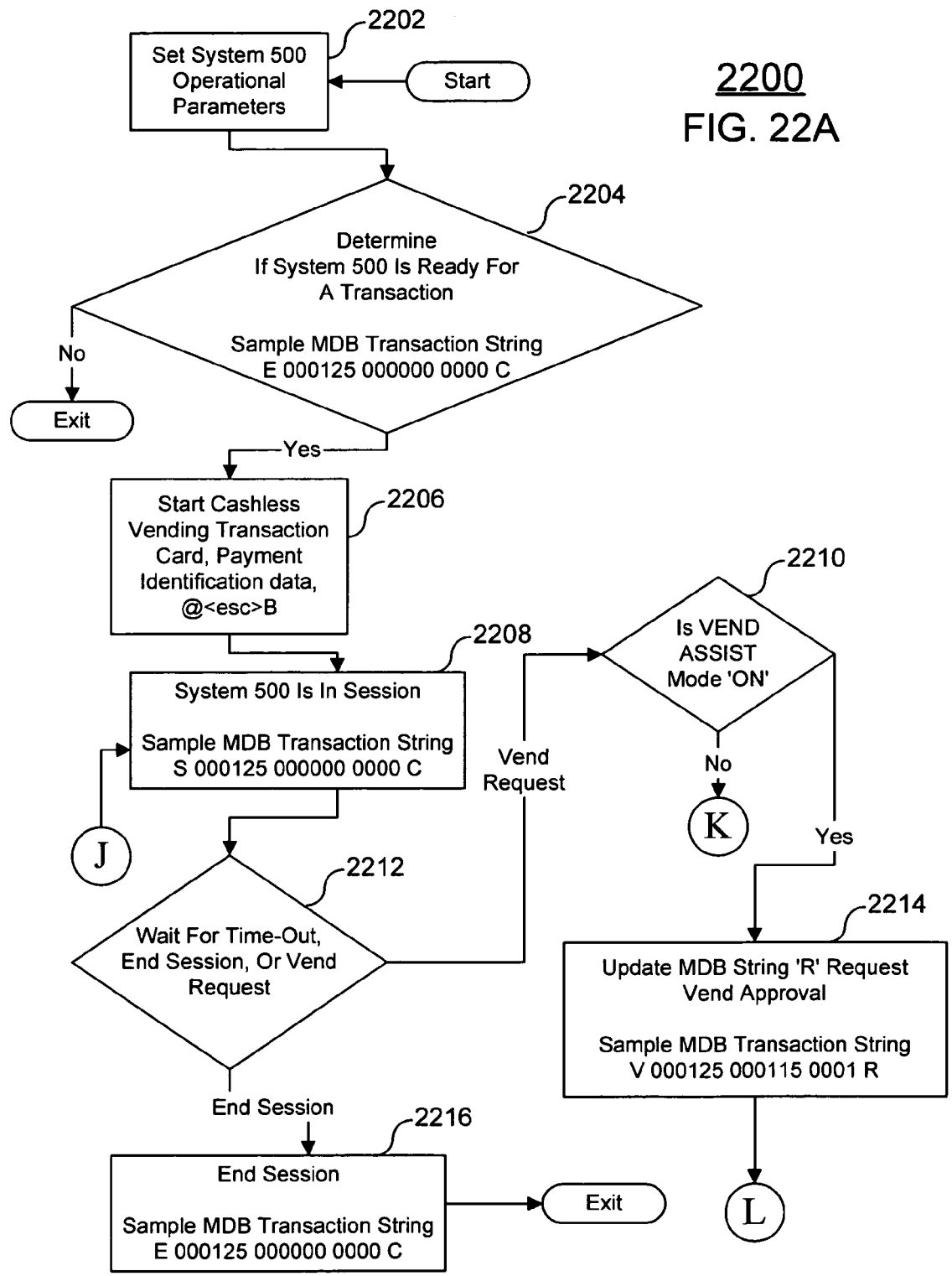

2900

3300

3500

US 7,464,867 B1

CASHLESS VENDING SYSTEM WITH TETHERED PAYMENT INTERFACE

RELATED APPLICATIONS

This U.S. non-provisional application is a divisional application that claims priority under 35 U.S.C. § 121 of a U.S. non-provisional application Ser. No. 10/277,458, inventor H. Brock Kolls et al., entitled CARD READER ASSEMBLY, filed Oct. 22, 2002;

U.S. non-provisional application Ser. No. 10/277,458, inventor H. Brock Kolls et al., entitled CARD READER ASSEMBLY, filed Oct. 22, 2002 is a continuation-in-part application that claims priority of a U.S. non-provisional application Ser. No. 10/263,515, inventor H. Brock Kolls, entitled DATA NETWORK TRANSPORT SYSTEM AND METHOD, filed Oct. 3, 2002;

which is a continuation-in-part application that claims priority of a U.S. non-provisional application Ser. No. 10/153,478, inventor H. Brock Kolls, entitled INTERACTIVE INTERFACE EFFECTUATED VENDING, filed May 22, 2002;

which is a continuation-in-part application that claims priority of a U.S. non-provisional application Ser. No. 10/138,385, inventor H. Brock Kolls, entitled MDB TRANSACTION STRING EFFECTUATED CASHLESS VENDING, filed May 3, 2002 now U.S. Pat. No. 7,131,575;

which is a continuation-in-part application that claims priority of a U.S. non-provisional application Ser. No. 10/121,081, inventor H. Brock Kolls, entitled CASHLESS VENDING TRANSACTION MANAGEMENT BY A VEND ASSIST MODE OF OPERATION, filed Apr. 12, 2002 now U.S. Pat. No. 7,076,329;

which is a continuation-in-part application that claims priority of a U.S. non-provisional application Ser. No. 10/118,123, inventor H. Brock Kolls, entitled SYSTEM AND METHOD FOR LOCALLY AUTHORIZING CASHLESS TRANSACTIONS AT POINT OF SALE, filed Apr. 8, 2002;

which is a continuation-in-part application that claims priority of a U.S. non-provisional application Ser. No. 10/100,680, inventor H. Brock Kolls, entitled CASHLESS TRANSACTION PAYMENT MODULE, filed Mar. 18, 2002;

which is a continuation-in-part application the claims priority of a U.S. non-provisional application Ser. No. 10/083,032, inventor H. Brock Kolls, entitled SEMICONDUCTOR WITH SELECTIVE INTEGRATED CASHLESS, CONNECTIVITY, AND DIGITAL CONTENT PRESENTATION CAPABILITIES, filed Feb. 26, 2002; and which is a continuation-in-part application that claims priority of a provisional application Ser. No. 60/278,599 inventor H. Brock Kolls, entitled VENDING MACHINE AUDIT AND CREDIT CONTROLLER, SYSTEM AND METHOD, filed Mar. 26, 2001.

In addition, U.S. non-provisional application Ser. No. 10/277,458, inventor H. Brock Kolls et al., entitled CARD READER ASSEMBLY, filed Oct. 22, 2002, for which this application is a division of, is a continuation-in-part application that claims priority of a U.S. non-provisional application Ser. No. 10/051,594, inventor H. Brock Kolls, entitled A WIRELESS SYSTEM FOR COMMUNICATING CASHLESS VENDING TRANSACTION DATA AND VENDING MACHINE AUDIT DATA TO REMOTE LOCATIONS, filed Jan. 18, 2002;

which is a continuation-in-part application that claims priority of a U.S. non-provisional application Ser. No. 09/888,797, inventor H. Brock Kolls, entitled A METHOD OF PROCESSING CASHLESS PAYMENT TRANSACTIONS WORLDWIDE, filed Jun. 25, 2001; and which is a continuation-in-part application that claims priority of a U.S. non-provisional application Ser. No. 09/884,755, inventor H. Brock Kolls, entitled SYSTEM FOR PROVIDING REMOTE AUDIT, CASHLESS PAYMENT, AND INTERACTIVE TRANSACTION CAPABILITIES IN A VENDING MACHINE, filed Jun. 19, 2001 now U.S. Pat. No. 6,505,095.

All of which are incorporated herein by reference.

TECHNICAL FIELD OF THE INVENTION

The present invention relates to a card reader assembly. The card reader assembly can be mounted in a variety of vending equipment, arcade game equipment, and other suitable equipment. Furthermore, the card reader assembly can be mounted in a standard size vending machine bill validator opening.

The card reader assembly can provide for the optional mounting of a card reader, a card reader interface circuit board, a payment module board, a communication board, and or a printer. The printer mechanism is mounted on a printer bracket. The printer bracket can be slid over the edges of and fastened to the support bracket. A paper exit slot can be provided in the card reader assembly faceplate to allow the printer paper to exit through the faceplate such that a user can receive the printer paper.

In addition, the printer mechanism, card reader, and or a pushbutton can be electrically connected to the card reader interface board. The card reader interface board can be electrically connected to a computing platform 802, vending interface unit (system 500), or other suitable data processing device. In addition, a plurality of light emitting diodes (LED) can be incorporated into the card reader assembly. The LED display can be viewable by a user of the card reader assembly.

In addition, the present invention relates to a system and method that is scalable and configurable to include interfaces for vending equipment monitoring and control capabilities, interfaces for a card reader device and other identification devices to obtain payment identification data to be used for payment of goods and or services vended, an interactive interface and protocol for interconnecting the system to a computing platform, and support for a plurality of communication options that include wired, point-to-point wireless, and wireless networking including LAN/WAN/WCDMA/CDMA/CDPD/2G/2.5G and 3G solutions.

Furthermore, the present invention also relates to a system and method of effectuating remote monitoring of host equipment by gathering audit data from the host equipment, and data communicating with a plurality of remote locations, wherein a plurality of remote locations can be a plurality of global network based data processing resources.

BACKGROUND OF THE INVENTION

Recent trends in the vending industry have been to offer higher priced items out of vending equipment at traditionally unattended vending locations. Higher priced item offers can result from the desire to vend larger portions of products such as the twenty-ounce soda bottle verse the twelve-ounce soda can. In other cases the higher priced items can be items that until recently my not have been considered for sale through vending equipment such phone cards, disposable cameras, and frozen food entrees to name a few.

The vending industry's desire to vend higher priced items has given rise to issues related to currency and inventory. For example, with the shift to vending twenty-ounce bottles, many of the vending sales now involve more that one currency note, as an example two one-dollar bills to make a purchase. As a result the bill validator can fill to capacity with currency notes before all the items in the vending equipment have been sold. With a bill acceptor filled to capacity the vending equipment may not be able to transact another vending sale and place itself out-of-service. As a result vending operators can typically find themselves restocking vending equipment that still has product available for sale but because of the inability to take additional currency notes the vending equipment could not sell the inventory.

In addition, with many beverage type vending machines the shift from the twelve-ounce can to the twenty-ounce bottle can create coin mechanism issues. In moving to the larger size beverage the average price can move from typically slightly less than a dollar where little change was required when a dollar note was used for payment to slightly more than a dollar where the better part of a dollar in change can be required when two one-dollar notes are used for payment for a vend. Resultant from this price move not only do the bill validators fill to capacity faster and stop working sooner, but the coin mechanism can be required to supply a customer with more change on each vend depleting a coin mechanism coin supply faster. Once the coin change supply is depleted the vending machine may be rendered out-of-service.

In addition to the new burden on bill acceptors and coin mechanisms resultant from the sale of higher priced items other issues related to the vending of higher priced items can arise. One such issue can be that a customer may not have enough money on-hand to effectuate the vending purchase. In the case of phone cards, cameras, and frozen foods vend prices may range from several dollars to forty dollars, fifty dollars, or more. In many cases the customer may have the desire to purchase the high priced item but simply lacks the amount of currency required to effectuate the purchase. In other cases the customer may be reluctant to trust the vend worthiness of the vending equipment with what the customer considers to be a significant amount of money.

As the proliferation of higher priced vend items continues to become more pervasive in today's society the vending industry has become increasingly concerned about tracking inventory and the operational status of the vending equipment remotely. It is considered a general belief within the vending industry that remotely monitoring vending equipment can optimize a route driver's daily activity and reduce operational costs associated with the sales and delivery of products to the vending equipment.

To date auditing devices have been designed to be placed inside the vending equipment or held in the hand of a route collector for the purpose of gathering vending equipment inventory and operational data which can later be downloaded to a computer. These devices however have been costly to manufacture, install, maintain, and operate. As such the total cost of the technology verse the savings on the operational costs associated with the sales and delivery of products to date have not made for a sound or compelling business model. As a result the vending industry has been slow to adopt 'audit' only technology.

The cost benefit model of the 'audit' hardware may not be the only issue hampering the proliferation of 'audit' only device. Data communication costs, the costs of getting the data back to a central computer center, can be a significant limitation on getting vending equipment remotely 'audit' capable or as it is commonly referred to in the vending industry as 'online'.

Such telecommunication costs can include the cost of running a telephone line to the vending equipment. In many cases the vending equipment may be in a location not conducive to having a dedicated phone line installed proximate to the vending equipment, such as in a concrete basement, on a golf course, in a shopping mall, or on a university campus to name a few. Once a telephone line is installed there can be monthly service charges incurred from the telecommunication company providing the service. These costs alone can in effect nullify the savings of having the vending equipment 'online'.

To avoid the high expense of running dedicated telephone lines to vending equipment the vending industry has pursued wireless wide area network (WAN) options. Implementing a wireless WAN has typically involved purchasing additional wireless hardware, and trying to integrate the wireless hardware with the 'audit' hardware. If the integration effort was successful the hardware, service, and maintenance costs of the combined solution were typically significantly increased compared to the 'audit' device only solution costs. In addition, the service and maintenance required for the combined wireless system is typically different then the non-wireless 'audit' device only solution.

In addition to the increased hardware costs for the wireless WAN solution, the wireless communication service fees paid to the wireless network provider can be more then those fees charged by the communication companies providing telephone line service. A technology solution and service fee structure that could effectively nullify the anticipated sales and delivery savings from having the vending equipment 'online'.

Industries other than the vending industry may also require the addition of cashless payment technology, equipment monitoring, network hosting of computing platforms, host equipment, embedded devices, applications, and data. In this regard, the ability to add point-of-sale functionality and network support to every day devices is a long felt need in many industries including vending. The desire to have an easy system and method for prototyping, development, and production that economically adds point-of-sale functionality and capability to everyday devices and computing platforms give rise to the present invention.

In part a long felt need exists for a solution related to a cost effective system and method for remotely auditing vending equipment, and for providing additional payment options at the point of sale for goods and services vended from vending equipment. This coupled with the industry's shortcoming in these areas and other areas, some of which were mentioned above give rise to the present invention.

SUMMARY OF THE INVENTION

The present invention relates to a card reader assembly. The card reader assembly can be mounted in a variety of vending equipment, arcade game equipment, and other suitable equipment. Furthermore, the card reader assembly can be mounted in a standard size vending machine bill validator opening.

The card reader assembly can provide for the optional mounting of a card reader, a card reader interface circuit board, a payment module board, a communication board, and or a printer. The printer mechanism is mounted on a printer bracket. The printer bracket can be slid over the edges of and fastened to the support bracket. A paper exit slot can be provided in the card reader assembly faceplate to allow the printer paper to exit through the faceplate such that a user can receive the printer paper.

In addition, the printer mechanism, card reader, and or a pushbutton can be electrically connected to the card reader interface board. The card reader interface board can be electrically connected to a computing platform 802, vending interface unit (system 500), or other suitable data processing device. In addition, a plurality of light emitting diodes (LED) can be incorporated into the card reader assembly. The LED display can be viewable by a user of the card reader assembly.

The present invention relates to a point of sale (POS) reference design system and method. The POS reference design 580 can be interconnected with a peripheral card 582 to comprise a development board. Furthermore, the development board can include a general-purpose microcontroller such that the development board can execute user application code for purposes that can include effectuating functional of the POS reference design 580.

The POS reference design is a system 500, which utilizes an interactive interface and protocol, and or other system 500 interfaces, to enable interfacing the POS reference design to other embedded systems, and computing platforms, such as computing platform 802.

The present invention relates to a system and method which effectuates an interactive interface and protocol for interfacing a payment module (system 500) to and data communicating with a computing platform (computing platform 802), wherein the computing platform can elect to control by way of the interactive interface and protocol a vending transaction cycle or alternatively elect to monitor the payment module by way of the interactive interface and protocol allowing the payment module to control a vending transaction cycle.

The present invention also relates to the implementation of a data network transport to move data between a payment module and a remote location through the use of a data device preferably handheld or portable in nature. Such data devices can include a PDA 372, wireless phone 368, pager 370, and or other suitable handheld or portable data devices.

The handheld or portable data device (referred to as a data device) can be utilized to data communicate with the payment module (system 500). In addition, the data device can data communicate with remote locations or with other data processing devices that have data communication access to remote locations. In this regard, the payment module can data communicate with remote locations by way of the data device serving as a data network transport between the payment module and the remote locations.

Though numerous data communication schemes can be employed, a preferable data communication scheme for communicating data between the payment module and the data device can be the vending industry DEX format. Such utilization of the DEX format can enable the payment module to data communicate DEX data from an interconnected vending machine controller and selectively insert or extract payment module data in the form of DEX records during the DEX data transfer with the data device. Since the DEX format is a preferred format for data exchange in the vending industry many data devices may already be programmed to data communicate is such a format and could readily accept and deliver payment module data. Once networked, network services can include cashless transaction processing, turnkey banking, inventory management, report generation, and other data services.

The present invention also relates to a system 500 implementing a MDB TRANSACTION STRING in memory to effectuate cashless vending. The MDB TRANSACTION STRING allows the system 500 and or computing platform 802 to manage cashless vending by monitoring data fields within the MDB TRANSACTION STRING.

The MDB TRANSACTION STRING is constructed and managed in system 500 memory. The MDB TRANSACTION STRING includes at least one of the following data fields: a VEND STATE field, a MAX VEND SALE field, a SALE PRICE field, a COLUMN field, or a VEND FLAG field.

In operation, the system 500 obtains data from a vending machine and constructs and manages an MDB TRANSACTION STRING in memory. Utilization of the MDB TRANSACTION STRING occurs when the system 500 application code and or a computing platform 802 interconnected with the system 500 reads the MDB TRANSACTION STRING to make certain determinations to effectuate cashless vending.

The present invention relates to a cashless transaction processing system implementing a VEND ASSIST mode of operation to effectuate a cashless vending transaction. The VEND ASSIST mode allows a computing platform 802 to oversee, control, and authorize by way of a system 500 the vend selection and sale price of a user selected vend item prior to fulfilling the user's request.

The cashless transaction processing system includes a system 500 and a computing platform 802. The system 500 initiates a vending session when certain commands from an interconnected computing platform 802 are received or in response to presentation, by a user, of valid payment identification data.

Computing platform 802 communicates a VEND APPROVE or VEND DENY in response to system 500 initiating a REQUEST VEND APPROVE. A vend cycle is then initiated or preempted as appropriate.

The present invention also relates to a system and method that is scalable and configurable to include interfaces for vending equipment monitoring and control capabilities, interfaces for a card reader device and other identification devices as payment for items vended, an interactive interface and protocol for interconnecting the system to a computing platform, and support for a plurality of communication options that include wired, point-to-point wireless, and wireless networking including LAN (local area network), WAN (wide area network), GSM, WCDMA (wideband code division multiple access), CDMA-TDMA (code-time division multiple access), CDPD, 2G-2.5G (second generation networks), 3G (third generation networks), and other wired and wireless network solutions. In an exemplary embodiment the system can be embodied in a semiconductor package or module package.

The present invention also relates to a system and method of effectuating a payment device for accepting card ID data, authorizing the validity of the card ID data, facilitating a vending transaction, settling the transaction to effect payment for the vended goods and services, gathering DEX and MDB audit data from the vending equipment, and data communicating with a plurality of remote locations, where a remote location can be a global network based data processing resource.

The present invention also relates to a system having a plurality of configurable communication options for data communicating to a plurality of remote locations. Such communication options include local area network connection, telephone line, wireless point-to-point where the system data communicates wirelessly to a local transceiver base unit which has access to a telephone line thereby giving the system wireless access to a telephone line, and wireless network data communication access, wherein a data modem connects the system to a WAN for data communication access to a plurality of remote locations.

The present invention also relates to a system and method for implementing an MDB protocol gateway for the purpose of supporting a plurality of peripheral devices each of which may be implementing a different version of MDB protocol then the vending equipment's vending machine controller (VMC).

The present invention also relates to a system and method for authorizing and settling card transactions with a processing bureau where the authorization process can be performed by the system locally eliminating the need for data communication with a remote processing bureau, and for processing international card transactions from a single country, wherein international currency conversion processing fees are minimized.

The present invention also relates to a store and forward data network system and method, wherein data gathered at a central server from a plurality of remote systems installed in a plurality of vending equipment is converted as required and made available to a plurality of other servers for the purpose of using the data to manage a vending business and or supplying data to a backend management system.

The present invention also relates to the system 500 being packaged in a semiconductor or module creating a single chip or single module system 500 solution. The single chip or single module system 500 solution can be referred to as a semiconductor 500. The functionality of semiconductor 500 can include at least one of the following: cashless payment functionality, network connectivity functionality, or digital content presentation functionality.

BRIEF DESCRIPTION OF FIGURES

The present invention is best understood from the following detailed description when read in connection with the accompanying drawings. Included in the drawings are the following Figures:

FIGS. 1H and 1I there is shown a system 500 printed circuit card;

FIGS. 2A-2B there is shown a transceiver and modem base unit 200;

FIG. 3C there is shown a right side view of a printer assembly;

FIG. 3D there is shown a front view of a printer assembly;

FIG. 3G there is shown a front view of a payment module;

FIG. 3H there is shown a left side view of a payment module;

FIG. 3I there is shown a front view of a payment module with receipt printer slot;

FIG. 3J there is shown a left side view of a payment module with display and communications board included;

FIGS. 22A-B there is shown a system 500 initiated vending session routine 2200;

FIG. 23I there is shown MDB TRANSACTION STRING messaging when a system 500 initiates a cashless vend while in the VEND ACTIVE mode 'ON' routine 3100;

DETAILED DESCRIPTION OF THE INVENTION

A cashless transaction processing system can include a system 500 and a plurality of data processing resources external to system 500. Such plurality of data processing resources can be global network based data processing resources.

In an exemplary embodiment a cashless transaction processing system accepts a plurality of payment identification data presented by a user, wherein the plurality of payment identification data presented by the user is intended to be utilized to effectuate payment for goods and services vended from vending equipment. The payment identification means can be locally authorized at the system 500 or remotely authorized at a remote data processing resource. Locally authorizing user presented payment identification data can include utilizing locally stored databases and other authorization criteria or rules to validate or approve the user to vend goods and service from the associated vending equipment and subsequently pay for such items vended upon completion of the vending transaction. A payment module can be referred to as a system 500, an audit-credit-interactive device, card reader assembly, card reader, VIU 100, a semiconductor 500, or module 500. The terms payment module, audit-credit-interactive, VIU 100, semiconductor 500, card reader, and module 500 can be referred to as a system 500.

Figure 1A:
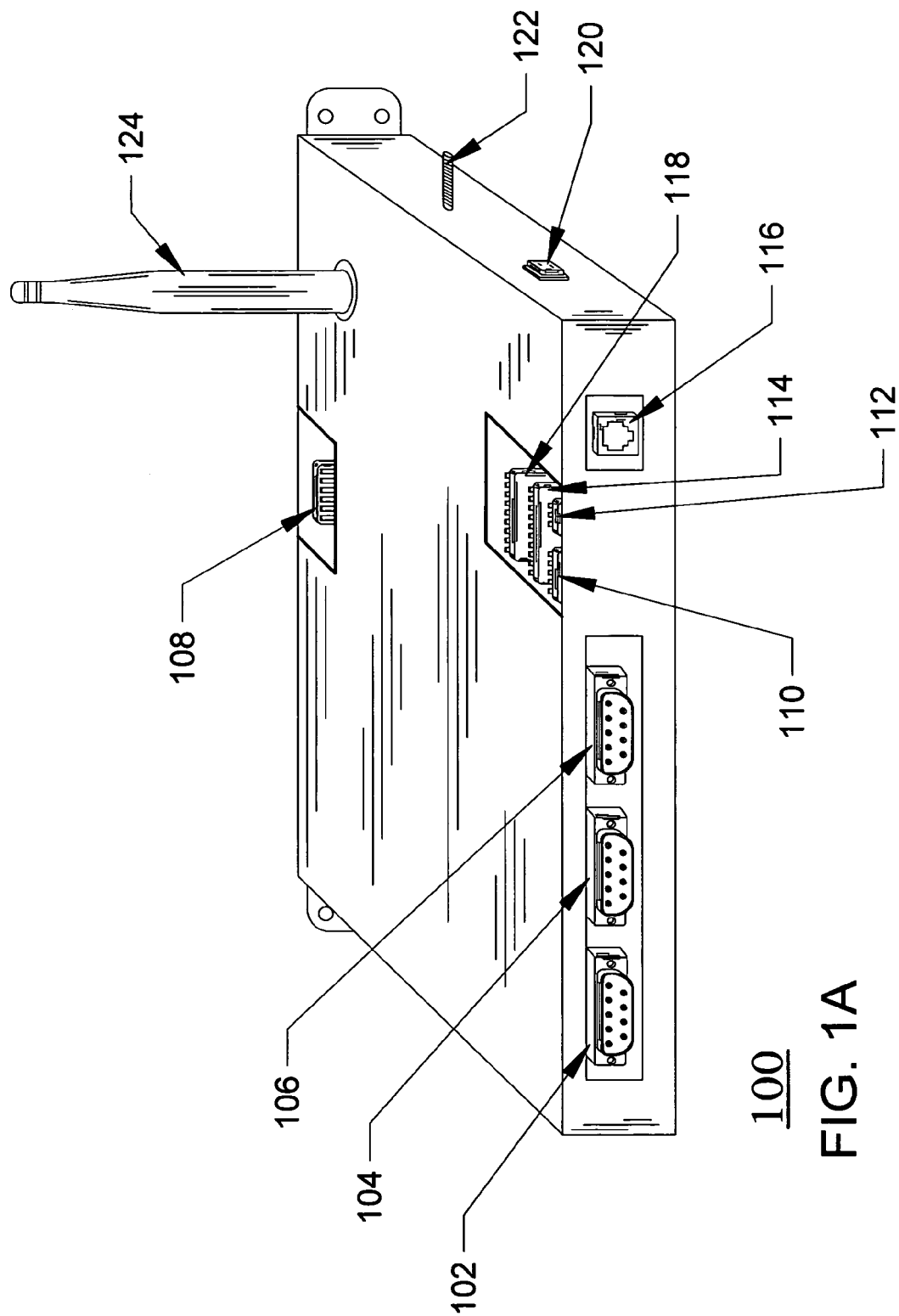
FIGS. 1A-1C there is shown a vending machine interface unit 100.
Figure 1B:
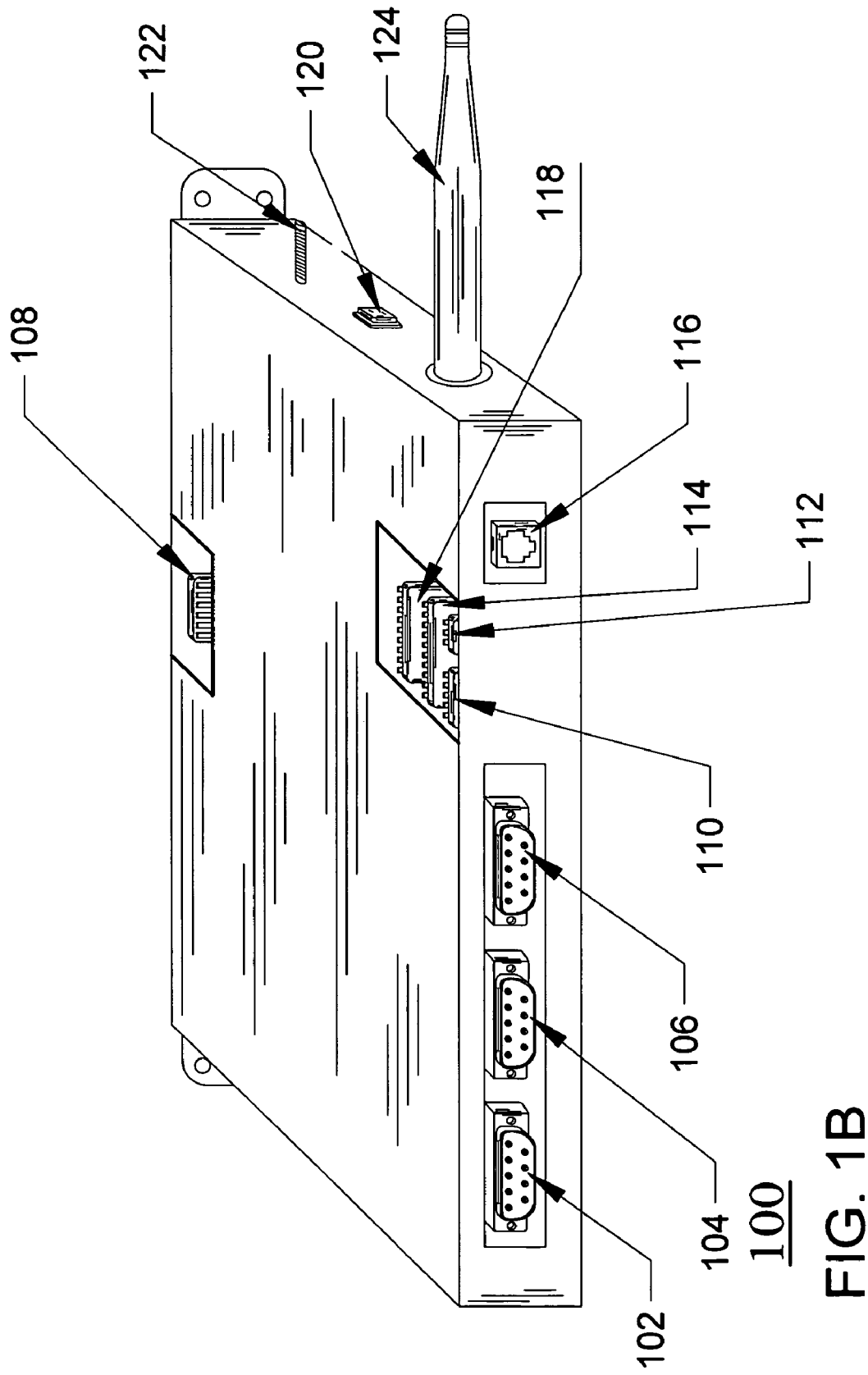
Figure 1C:
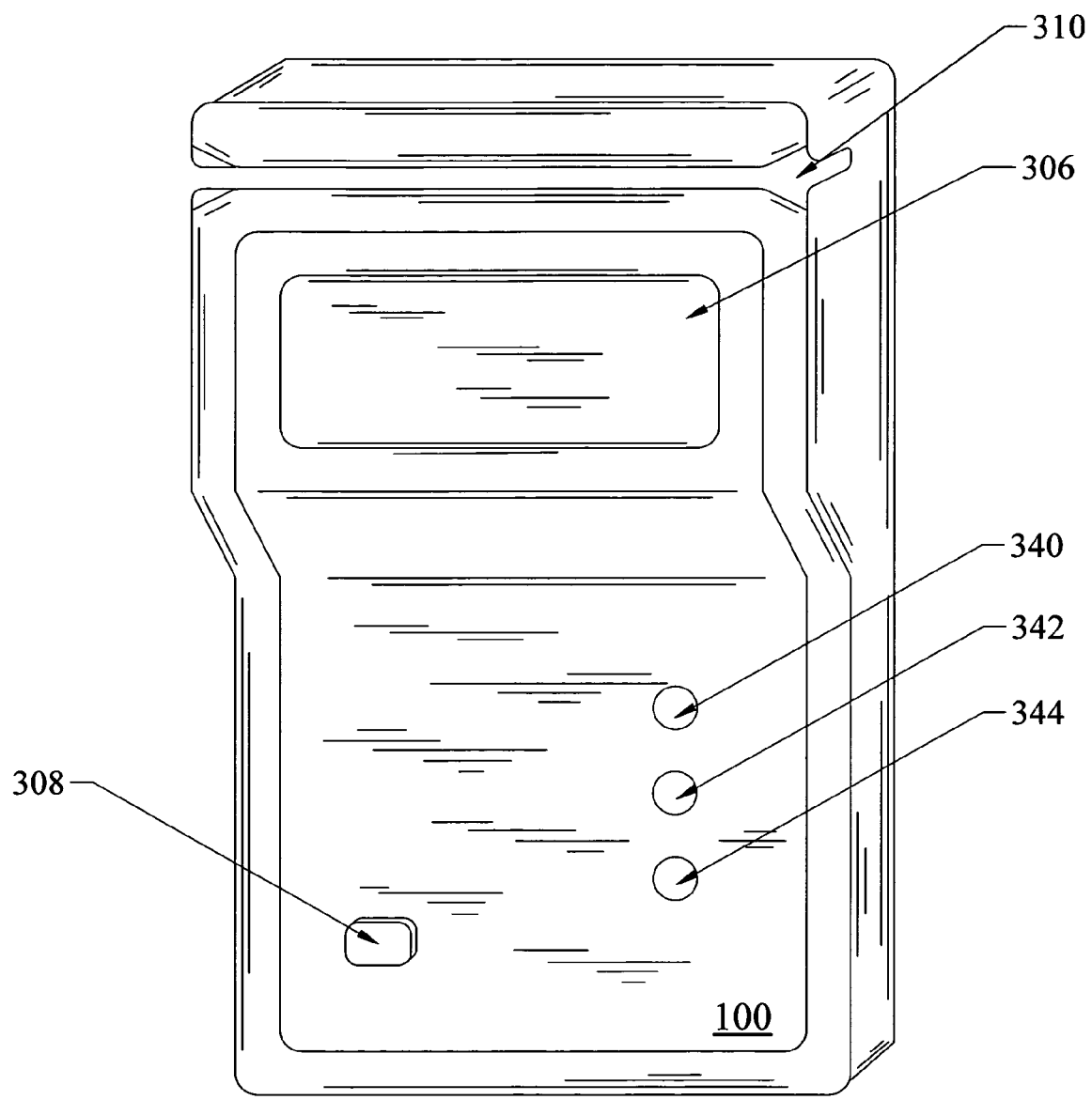

Referring to FIGS. 1A, 1B and 1C there is shown a vending machine interface unit (VIU) 100. FIG. 1A shows an antenna 124 mounted perpendicular to the enclosures main body. FIG. 1B shows the antenna 124 mounted parallel to the enclosure main body. FIG. 1C is shown without an external antenna; however the enclosure could be outfitted with an antenna. In an exemplary embodiment, antenna 124 is included in embodiments making use of the wireless VIU 100 connectivity and excluded in embodiments not requiring wireless VIU 100 connectivity.

The VIU 100 is a control system that interfaces to a plurality of different kinds of vending machines by way of a plurality of different interface ports. One such interface port can be the NATIONAL AUTOMATED MERCHANDISING ASSOCIATION (NAMA) vending industry MULTI-DROP-BUS (MDB) interface. Other MDB interfaces can include derivative MDB bus specifications, where a derivative MDB bus specification can be one that support less than all the NAMA standard, or augments the NAMA standard with additional protocol commands and or features. A second such interface port can be the EUROPEAN VENDING ASSOCIATION'S (EVA) vending industry DATA EXCHANGE INTERFACE (DEX) interface. Additional interface ports include serial and pulse style bill validators, and coin mechanism interfaces.

Vending machine types suitable for interconnection to and operation with the VIU 100 include vending beverage and snack machines, value adding equipment, and dispensing equipment that operates in connection with or makes available a MDB bus interface, or DEX interface, or a bill acceptor interface, or a coin mechanism interface. Such vending machines include for example and not limitation those manufactured by or for COKE-A-COLA, PEPSI, DR. PEPPER, MARS, VENDO, ROYAL, DIXIE NARCO, GPL, CRANE NATIONAL, AUTOMATED PRODUCTS, CAVALIER, MARCONI or other similar vending machines. Such value adding equipment and dispensing equipment can include for example and not limitation those manufactured by or for ACT, XCP, MARS, SCCHLUMBERGH, DAYNL, DEBITEK, GILBARCO, MARCONI, COPICO, PRE-PAID EXPRESS, or other similar value adding equipment and dispensing equipment.

For purposes of disclosure the term vending machine, value adding machine, coin changer, and value dispensing machine can be referred to as a vending machine, vending equipment, and or vender. Other vending machine can include beverage style vending machines, snack style vending machines, specialty style vending machines, copiers, fax machines, personal computers (PC), data ports, office equipment, and or other types of vending, retail, office products, or business center types of equipment. Specialty style vending machines include for example and not limitation ice cream vending machines, amusement and arcade games, amusement ride games commonly found in store fronts and shopping malls, fresh produce machines, french fry vending machines, coffee machines, novelty product vending machines, consumer goods style vending machines, and or services type vending machine (such as name tag making, card making, polishing machines, and other service types of vending machines).

Audit-credit-interactive system 500 electronics are included within the VIU 100. For purposes of disclosure a system 500 can be referred to as a vending machine interface unit, VIU 100, point-of-sale reference design, or audit-credit-interactive system 500. Many of the electrical interfaces, ports, and connectors shown in FIGS. 1A, 1B, and 1C are actually electrical connections to the audit-credit-interactive system 500 (system 500).

In FIGS. 1A and 1B, the vending machine interface unit (VIU) 100 includes an interactive interface port 102. The enclosure shown in FIG. 1C has an electrical cable 356 (shown in FIGS. 1F and 1G) that exits the back of the enclosure. Electrical cable 356 includes electrical connections for, but is not limited to power, interactive interface connections, MDB interface connections, DEX interface connections, communication interface connections, and other types and kind of electrical connections. The interactive interface port 102 provides an electrical connection to the interactive interface 532. In an exemplary embodiment the interactive interface port 102 enables other computing platforms to interface to and operational work with the vending machine interface unit 100. A computing platform is a microprocessor based system and can include the card reader interface processor board 312, the card reader and user interface system 600, or personal computer (PC) based systems. In addition a computing platform can include INTEL, MOTOROLA, MICROCHIP, AMD, UBICOM, ZILOG, IBM brand or other similar microprocessor based systems. A computing platform can operate on a plurality of operating systems including, assembler based, proprietary systems, MICROSOFT, LINUX, QNX, WIND RIVER, J9, BLACK DOWN, and other JAVA VIRTUAL MACHINE (JVM) based or other similar or suitable operating system.

VIU 100 also includes auxiliary interface port 104 and 106. Though general purpose in nature in an exemplary embodiment Ports 104, and 106 provide electrical connections to printer interface 532, and external modem interface 528 respectively. The Ports 104, and 106 can be RS232, RS484, or other desirable type of communication interface port. Furthermore ports 104, and 106 can be configured for use as required by the desired application. In an exemplary embodiment auxiliary interface port 104 can be used for interfacing to a serial style printer and port 106 can be used to interface to external communication equipment such as data modem, CDMA modems, CDPD modem, wireless transceivers, wireless systems, or other types of communication devices. In an exemplary embodiment an AES wireless transceiver or other private radio network can be used to provide data communication to and from the VIU 100 as well as serve as a repeater to receive and re-transmit data communication to and from other VIU 100 types of devices in the geographic area.

The VIU 100 includes a MULTI-DROP-BUS (MDB) interface port 108, and a DATA EXCHANGE INTERFACE (DEX) 112. MDB port 108 and the DEX port 112 provide electrical connections to the MDB interface 518, and the DEX interface 520 respectively. The electrical characteristics and operation of the MDB port 108 are detailed in the NATIONAL AUTOMATED MERCHANDISING ASSOCIATIONS industry specification entitled MDB/ICP INTERFACE PROTOCOL version 1.0 and version 2.0. The electrical characteristics and operation of the DEX port 112 are detailed in the EUROPEAN VENDING ASSOCIATIONS EVA-DTS specification version 4.0, and 5.0. MDB interface 518, DEX interface 520, bill and coin interface 506, mimic MDB interface 516, and office products interface 534 can be referred to as peripheral device interfaces.

The MDB interfaces allow the VIU 100 by way of the MDB interface 518 and MDB port 108, to be original equipment manufactured (OEM) into or retrofitted into vending, valuing, and dispensing equipment that provide an MDB bus interface. Furthermore, the VIU 100 by way of the DEX interface 520 and the DEX port 112, can be original equipment manufactured (OEM) into or retrofitted into vending, valuing, and dispensing equipment that provide a DEX interface.

VIU 100 includes card reader interface ports 110, and 114. The card reader ports 110, and 114 provide electrical connection to the card reader interface 526. Card reader interface ports interface to industry standard bit strobe, and serial style track 1, 2, and 3 card readers. Such card readers include for example and not limitation those manufactured for or by XICO, NEURON, MAGTEK, as well as compatible card readers manufactured by other companies.

The VIU 100 also includes an RJ11 jack 116. The RJ11 jack provides electrical connections to the modem 522. In an exemplary embodiment the RJ11 jack 116 interconnects the VIU 100 to a telecommunication line, wherein data communication can occur between the VIU 100 and a plurality of remote hosts networks and locations.

VIU 100 also includes a general-purpose input-output interface 118. The general-purpose input-output interface provides electrical connections to the bill and coin interface 506. In an exemplary embodiment the VIU 100 can be interconnected with vending, valuing, and dispensing equipment by way of the host equipment's bill acceptor or coin interface port. This allows the VIU 100 by way of the bill and coin interface 506 and interface 118 to be original equipment manufactured (OEM) into or retrofitted to vending, valuing, and dispensing equipment that utilize a serial or pulse style bill acceptor, or a coin mechanism interface. Serial and pulse style bill acceptors include for example and not limitation those manufactured for or by MARS, COINCO, CONLUX, ARDAK, or other similar bill acceptor and manufacturers of bill acceptors.

The VIU 100 includes a service button 120 and a ground terminal 122. The service button provides one of a plurality of electrical connection to the keypad and button inputs 510. The ground terminal 122 provides, as may be required, electrical connection to the VIU 100 enclosure.

Antenna 124 can pass through the VIU 100 enclosure or be mounted to the VIU 100 enclosure. The antenna 124 provides an antenna electrical connection to the transceiver 524, data modem 514, or optionally an antenna electrical connection to an external modem interconnected with auxiliary interface port 106.

Referring to FIG. 1C the VIU 100 has a system 500 enclosed. The enclosure shown is designed to be mounted either on the outer surface of the vending machine 402 (shown in FIG. 1G), or onto an adaptor plate 358 (shown in FIGS. 1D, 1E, and 1F). The adapter plate 358 can be fastened into a vending industry standard bill acceptor slot opening. The VIU 100 shown in FIG. 1C can then be fasten to the adaptor plate 358. In this regard, the VIU 100 of FIG. 1C can be mounted to a vending machine without damaging, or cutting the vending machine 402. The VIU 100 of FIG. 1C also includes a display slot 306, a system 500 (inside the enclosure) a card reader 310 interconnected to a system 500 card reader interface 526, a pushbutton 308, LEDs 340, 342, 344. Display slot 306 can also provide visual access to an infrared communication device (IRDA) and or interface, such as IRDA interface 550.

Figure 1D:
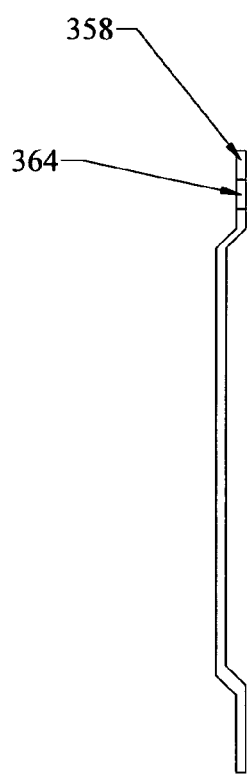
FIGS. 1D-1E there is shown a side and front view of an adaptor plate.
Figure 1E:
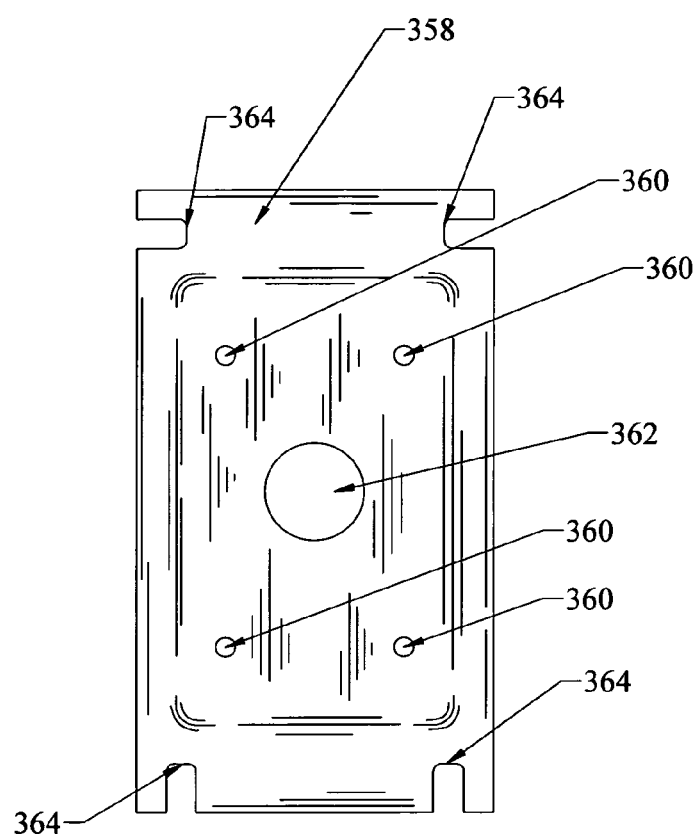

Referring to FIGS. 1D and 1E there is shown an adapter plate 358. Adapter plate 358 can include mounting slots 364.

Mounting slots 364 are shown orientated horizontally; however in an exemplary embodiment mounting slots can be orientated horizontally (slots opening on the sides) or vertically (slots opening on top and bottom). In many vending machines 402 two mounting slots 364 need to be orientated horizontally and the other two mounting slots 364 need to be orientated vertically.

Adapter plate 358 also has mounting holes 360, wherein the VIU 100 of FIG. 1C can be mounted to and through mounting holes 360. In addition, adapter plate 358 can include a cable hole 362 for passing the electrical cable 356 through.

Figure 1F:
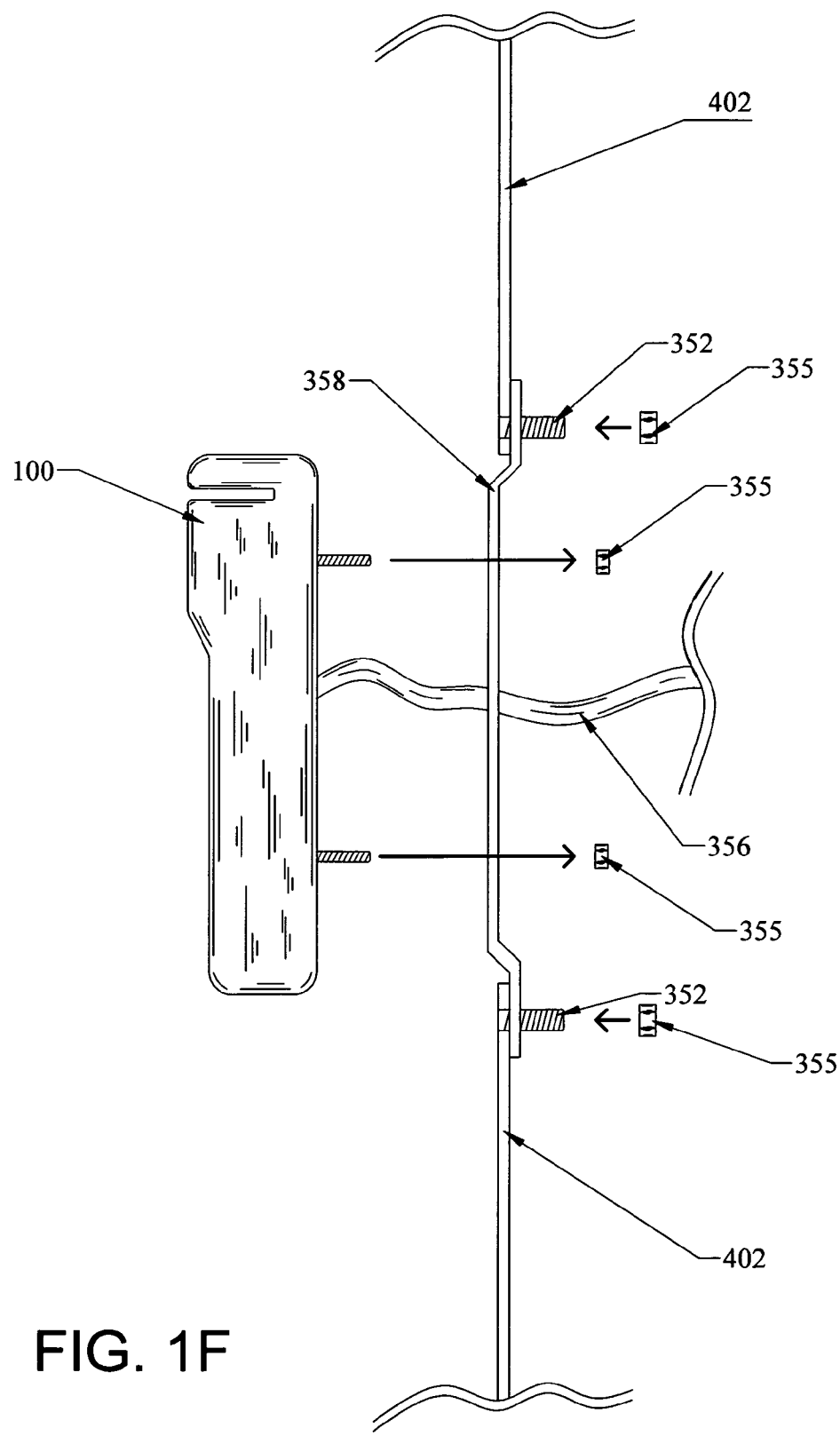
FIG. 1F there is shown a vending machine interface unit 100 with vending machine mounting plate mounted.
Figure 1G:
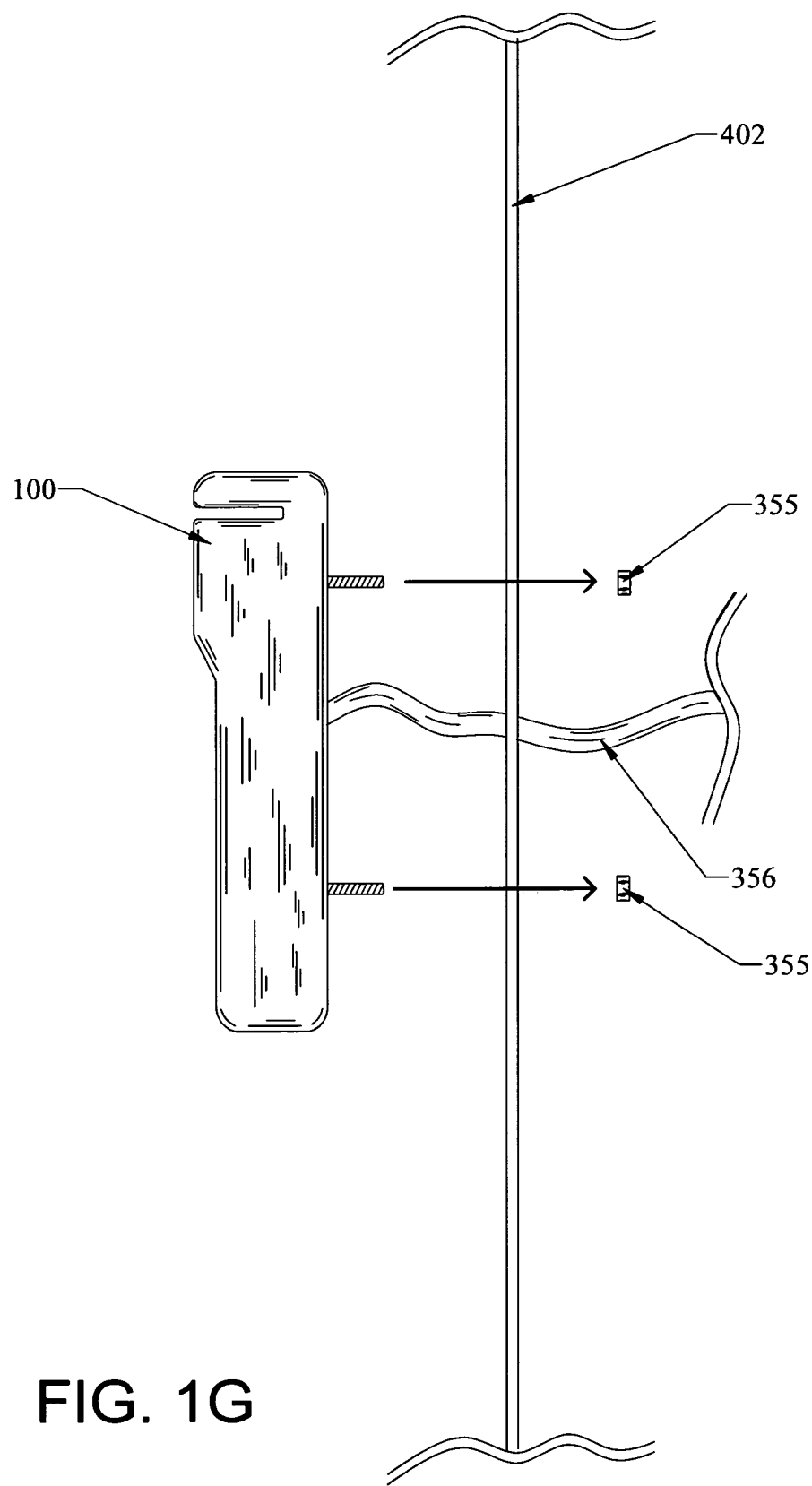
FIG. 1G there is shown a vending machine interface unit 100 with vending machine.

Referring to FIGS. 1F and 1G there is shown a VIU 100 (enclosure style of FIG. 1C) to adapter plate 358. In an exemplary embodiment adapter plate 358 is first fastened to vending machine 402. The adapter plate 358 can be fastened with a nut 355 and stud 352 (typically stud 352 has previously been inserted into the vending machine 402 at the time of manufacture). Adapter plate typically is mounted into a dollar bill validator opening in the vending machine. The dollar bill opening in the vending machine 402 is some time referred to as a knockout or slot. Though an easier installation of the VIU 100 (also referred to as the card reader, system 500, and or payment module) is to utilize an existing knockout, an additional knockout can always be cut into the vending machine 402 and the adapter plate 358 and VIU 100 mounted in the newly cut knockout opening.

Referring to FIG. 1G there is shown a VIU 100 (the VIU of FIG. 1C) being mounted directly to the surface of a vending machine 402. In this regard the vending machine 402 may require holes be cut into the surface of the vending machine. Such holes could include mounting holes 360, and cable hole 362.

Referring to FIGS. 1H and 1I there shown a system 500 printed circuit board assembly. FIG. 1H shows a solder side view of the main printed circuit board (PCB) and FIG. 1I shows a component or processor side view of the main PCB. Shown in FIG. 1H is display interface 508, card reader 310, card reader interface 526, beeper 570, interactive interface 532, MDB interface 518, LEDs 340 342 and 344, a push button 308, and LCD backlight power.

Shown in FIG. 1I is fuse 572, MDB interface 518, interactive interface 532, memory 512, card reader interface 526, microcontroller 502, LCD backlight power interface 562, LCD brightness adjust 564, service button 566, and power indicator 568.

In an exemplary embodiment, the PCB shown in FIG. 1H and 1I can be enclosed in the VIU 100 enclosure shown in FIG. 1C. As an example and not a limitation, the display shown in FIG. 1H interconnected with display interface 508 can be a liquid crystal display (LCD) or vacuum florescent display (VFD), or other suitable types, or kinds of displays. Beeper 570 can be utilized for audible alerts, LEDs 340 342 and 344 can be colored and operated to provide for a ready green LED when the terminal is 'IN' service, or in a transaction), a busy yellow LED during authorization and at other appropriate times), and a RED inactive or fail LED when the system 500 is in the inactive state or a cashless transaction authorization has been rejected). Card reader 310 can be interconnected with card reader interface 526. Push button 308 can be used as a 'END' button to terminate a transaction. Service button 566 can be used to enter a service mode where certain features and parameters of the system 500 terminal operations can be changed, configured or viewed. Interactive interface 532 can be interconnected with other system 500s, computing platform 802, communication devices, and or other embedded systems and or data processing devices.

Brightness adjust 564 can be utilized to adjust the brightness of the LCD display interconnected with display interface 508. LCD backlight power interface 562 can be utilized to provide power to the backlight of the LCD display. Power indicator 568 can be 'blinked' at a periodic rate by microcontroller 502 to indicate certain operational status or states of the system 500. System 500 configuration, transactional data, and other types of data can be stored in nonvolatile memory 512.

Referring to FIGS. 2A and 2B there is shown a transceiver and modem base unit 200. Transceiver and modem base unit 200 includes transceiver unit 700 built in. The transceiver unit 200 with transceiver unit 700 data communicates wirelessly with the VIU 100 and by way of a modem data communicates with a remote location. In an exemplary embodiment the VIU 100 with system 500 and transceiver unit 200 with transceiver unit 700 form a wireless data link, which has access to a modem for data communicating with a remote location. In this regard the reliance on having a telecommunication line in proximity to the VIU 100 or more generally in proximity to the vending equipment the VIU 100 is installed in is greatly reduced.

A remote location can be an Internet based resource, or Internet based data communication. Internet based connections and resources can be referred to as a global network based data processing resource. For purposes of disclosure a remote location can be referred to as an Internet connection, or a global network based data processing resource. A global network based data processing resource is a remote location.

The transceiver unit 200 has incorporated into it a system 700 control system. FIG. 2 shows a telecommunication access port 202 in the side of the transceiver unit 200. The telecommunication access port 202 provides access by way of a plurality of electrical connections to the modem 704. A telecommunication access port 202 can be an RJ11 style, or similar telecommunication connector.

Attached to the transceiver unit 200 is an antenna 716. The antenna 716 provides an antenna electrical connection to the transceiver 708. The antenna 716 can be an antenna manufactured by the ANTENNA FACTOR, or other similar or suitable antenna.

An indicator lamp is also viewable through an indicator port 204 in the transceiver unit 200 enclosure. An indicator lamp can be part of the transceiver system 700. Such an indicator lamp being viewable through indicator port 204 can be utilized to inform a user of correct operation of the transceiver unit 700.

The transceiver system 700 located inside the transceiver unit 200 enclosure can obtain power for operation from an electrical connection by way of AC connection 208. In an exemplary embodiment the AC connection 208 can be plugged into a standard 115VAC wall outlet.

Figures 3A, 3B:
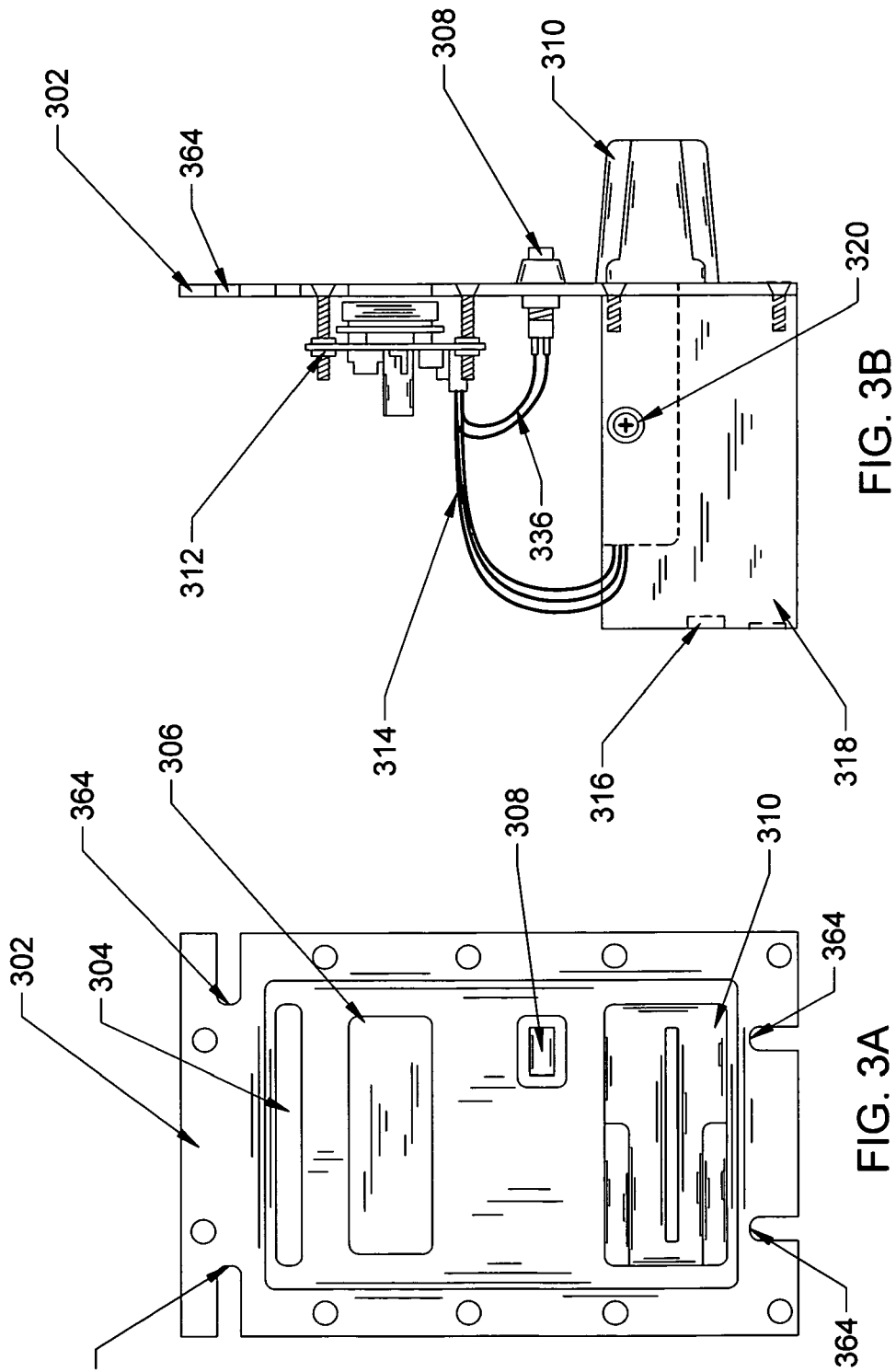
FIG. 3A there is shown a front view of a card reader assembly.
FIG. 3B there is shown a left side view of a card reader assembly.

Referring to FIGS. 3A and 3B there is shown a card reader assembly. FIG. 3A shows a front view of the card reader assembly. FIG. 3B shows a left side view of the card reader assembly. In an exemplary embodiment the card reader assembly can be installed in a vending machine. A user having access to the front of the card reader assembly can insert cards, view display information, use a push button to provide system input and if equipped with a printer assembly obtain a receipt, coupon, or other print information dispensed to the user.

A faceplate 302 is shown fastened to a support bracket 318. The faceplate 302 can be sized to fit and fasten into the vending industry standard bill validator opening, which can be found on most brands and models of vending equipment. The vending industry standard bill validator opening is approximately 3.375 inches in width and 4.25 inches in height. In an exemplary embodiment, the faceplate can be mounted in a vending machine by allowing studs mounted in the vending machine proximate to the edges of the bill validator opening to pass through a plurality of mounting slots 364 in the faceplate 302. Bolts can then be placed on the plurality of mounting studs to secure the faceplate 302 in the bill validator opening.

The faceplate 302 has a plurality of mounting slots 364 to effectuate fastening of the card reader assembly into the vending equipment, arcade equipment, or other suitable equipment. In a preferred embodiment the plurality of faceplate mounting slots 364 can include at least two of the plurality of faceplate mounting slots 364 penetrating the bottom perimeter edge of the faceplate. In addition, at least one of the plurality of faceplate mounting slots can be orientated to penetrate the left edge of the faceplate. Furthermore, at least one of the plurality of faceplate mounting slots can be orientated to penetrate the right edge of the faceplate Faceplate 302 also has a paper exit slot 304 to allow receipt printer 328 to dispense a printed receipt to a user of the system. In a suitable embodiment the paper exit slot can be horizontally orientated in proximity to the top edge of the faceplate. In a preferable embodiment the paper exit slot 304 can be horizontally orientated with the lower edge of the paper exit slot 304 being located approximately 1 inch for the top edge of the faceplate. In an exemplary embodiment the paper exit slot 304 can be approximately 0.25 inches in width and 2.125 inches in length.

Faceplate 302 also has a display slot 306 which allows display 606 mounted on the card reader interface board 312 to be viewable from its mounting location behind the front surface of faceplate 302. Faceplate 302 also contains a plurality of threaded studs for mounting the card reader interface processor board 312. In addition a paper guide 313 (shown in FIG. 3F) can be secured in place by way of the plurality of threaded studs. Paper guide 313 can serve as a paper path transport to guide the paper from the exit of the printer mechanism 328 to and through the paper exit slot 304. In a suitable embodiment the display slot can be horizontally orientated in proximity to the top edge of the faceplate. In a preferable embodiment the display slot can be horizontally orientated with the lower edge of the display slot being located approximately 2.25 inch for the top edge of the faceplate. In an exemplary embodiment the display slot can be approximately 0.625 inches in width and 2.5 inches in length.

In addition, faceplate 302 can be fastened to a bracket 318 by way of fastening to a plurality of threaded inserts 319. The faceplate 302 also has a card reader slot through which card reader 310 passes through, and mounts to the support bracket 318. Support bracket 318 has a plurality of threaded inserts 320 for fastening a card reader 310 to the card reader assembly. In an exemplary embodiment card reader 310 can mount to support bracket 318 by way of a plurality of threaded inserts, or other suitable means. Alternatively, a plurality of card reader mounting slots in the support bracket 318 can allow for a fastener to pass through the plurality of card reader mounting slots to secure card reader 310 to the support bracket.

In a suitable embodiment the card reader slot through which card reader 310 is inserted can be horizontally orientated in proximity to the bottom edge of the faceplate in proximity to the lower edge of the display slot 306. In a preferable embodiment the card reader slot can be horizontally orientated with the lower edge of the card reader slot being located approximately 0.75 inch for the bottom edge of the faceplate. In an exemplary embodiment the card reader slot can be approximately 1.1875 inches in width and 2.125 inches in length.

In an exemplary embodiment, the card reader 310 can be electrically connected to the card reader interface 526. The bracket 318 also has a threaded insert 316 located in the rear of the bracket 318. Threaded insert 316 can receive thumbscrew 334 in order to facilitate the fastening of the printer assembly bracket 330 to the card reader assembly.

A push button switch 308 can be fastened to the faceplate 302 and electrically connected to the card reader interface board 312 by way of cable assembly 336. In addition, card reader 310 can be electrically connected to the card reader interface board 312 by way of cable assembly 314.

Referring to FIGS. 3C and 3D there is shown a printer assembly. FIG. 3C shows a right side view of the printer assembly. FIG. 3D shows the front view of the printer assembly. In an exemplary embodiment the printer assembly can be slid onto the card reader assembly (see FIG. 3F) and secured to the card reader assembly by way of the thumbscrew 334. A card reader assembly having been equipped with a printer assembly can now print receipts, coupons and other print information for a user of the system.

At the top of printer bracket 330 there is a cutout for receiving a paper holder rod 324. The paper holder rod 324 is typically inserted through a roll of paper, such as paper roll 322. Printer bracket 330 also has a plurality of mounting holes to secure the printer mechanism 328 to the printer bracket 330. Printer bracket 330 has a threaded thumbscrew 334 secured to the bracket 330.

The printer mechanism 328 has a paper advance knob 326. The paper advance knob 326 can be used to position the paper.

Figure 3E:
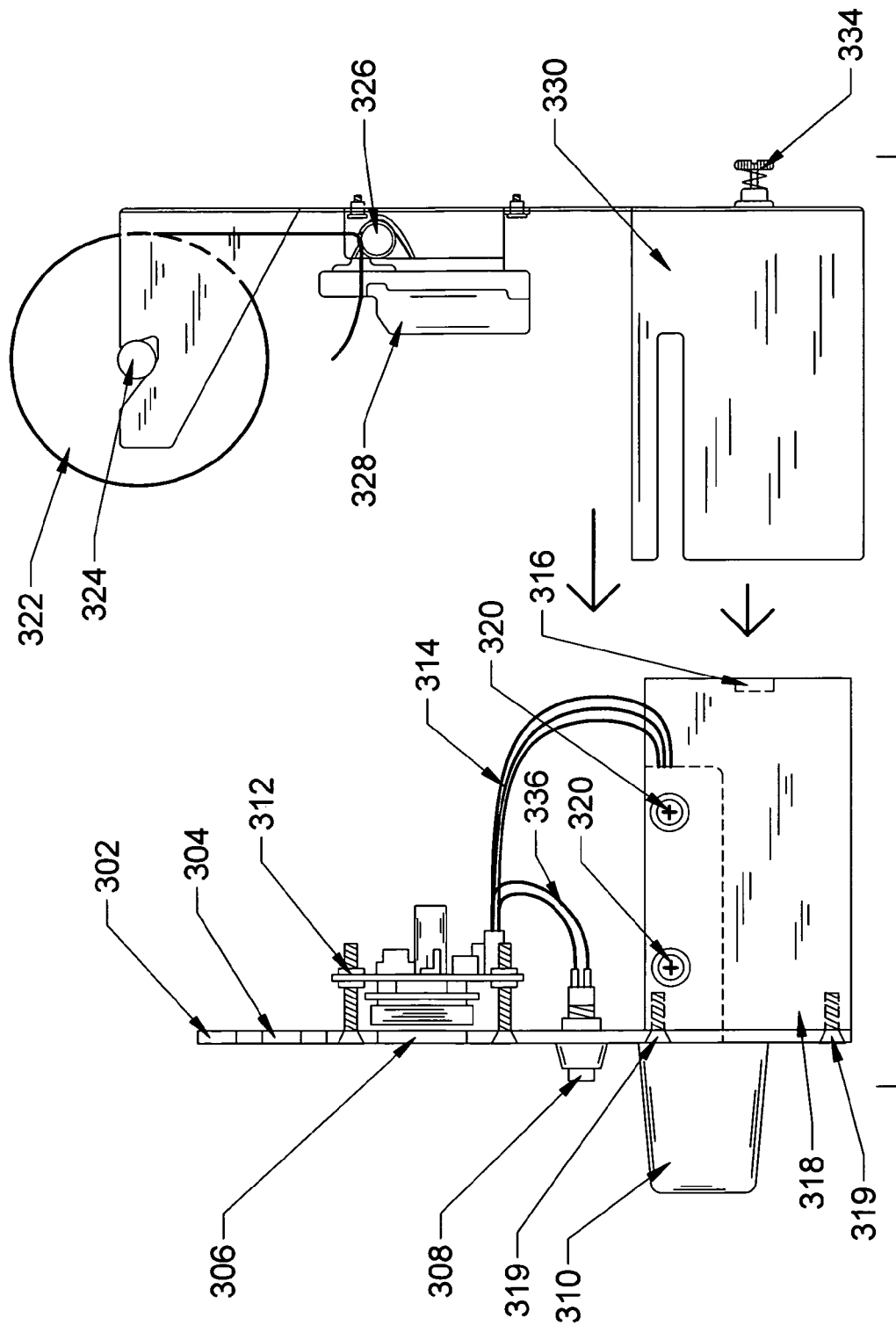
FIG. 3E there is shown a right side view of a card reader assembly and a right side view of a printer assembly being aligned for assembly together.

Referring to FIG. 3E there is shown a right side view of a card reader assembly and a right side view of a printer assembly being aligned for assembly together. In an exemplary embodiment a user of the card reader assembly can choose to add the ability to print receipts, coupons, and other print information by sliding the printer assembly onto the card reader assembly and making the appropriate electrical connections. Furthermore, the printer assembly can be securely fastened to the card reader assembly by way of thumbscrew 334.

Figure 3F:
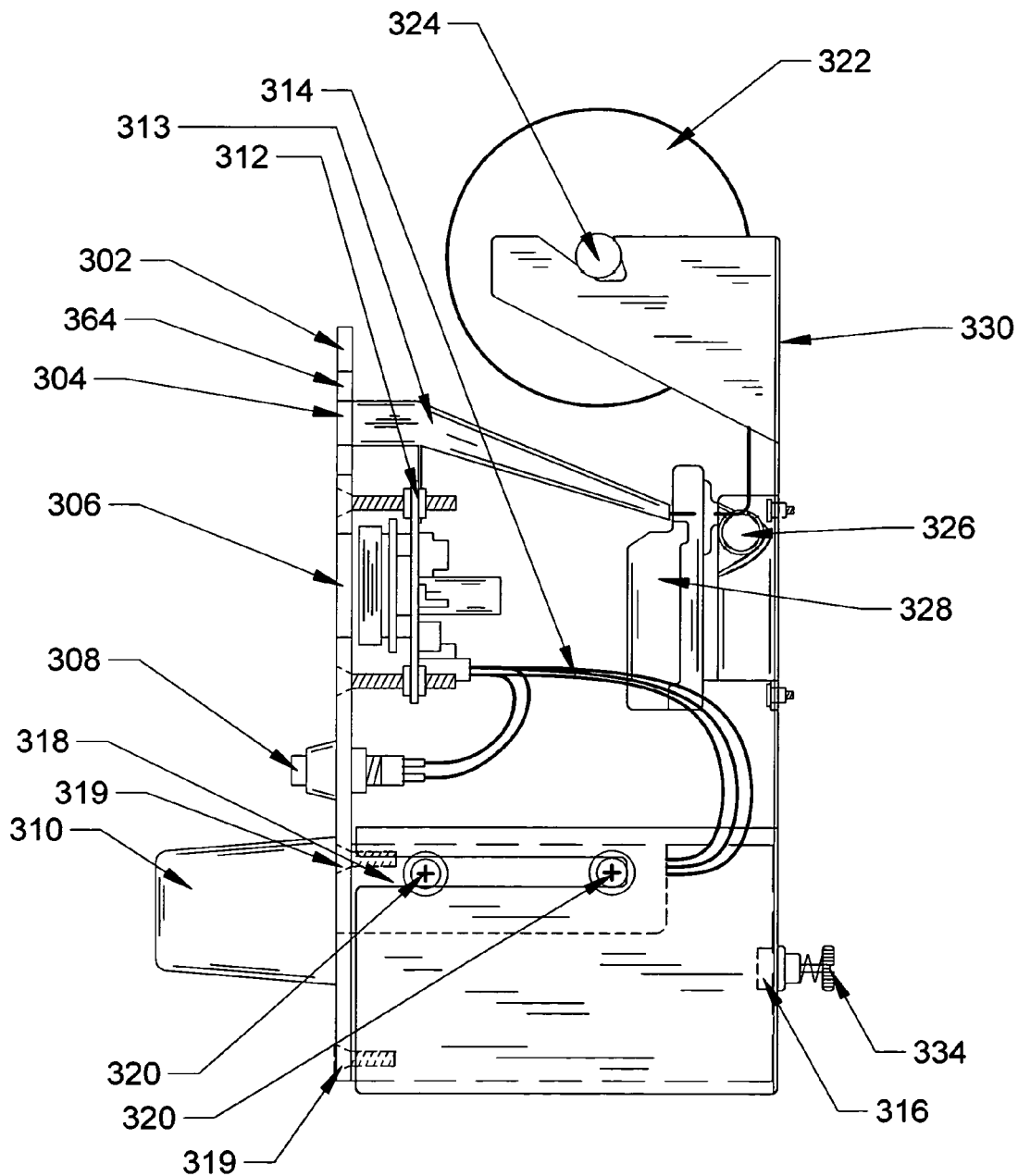
FIG. 3F there is shown a right side view of the assembled card reader and printer assembly.

Referring to FIG. 3F there is shown a right side view of the assembled card reader and printer assembly.

Referring to FIGS. 3G and 3H there is shown a payment module (system 500). The payment module can be organized to provide scaled functionality. In general system 500 can be broken into modules of functionality and then combined as required by the application. In an exemplary embodiment a base level payment module may only implement the portion of system 500 dedicated to the functionality of accepting a form of payment, interfacing to a vending machine, and interfacing to an external computing platform. A base level payment module may also make use of an LED display such as LEDs 340, 342, and 344 in lieu of a LCD type display to minimize cost. In addition, a base level payment module may not support remote location communications options. Instead the base level payment module may make use of communications available by way of the computing platform the base payment module is interfaced with. This feature may further reduce the payment modules manufacturing costs. In other exemplary embodiments a display module and a communications module can be added to the base level payment module to offer enhanced display and communications capabilities. The payment module in general and both the display module and communication module are a subset of electrical functionality of the overall system 500 design.

Referring to FIGS. 3G-3H there is shown a payment module assembly. In an exemplary embodiment the payment module assembly can be installed in a vending machine's dollar bill validator slot. In another exemplary embodiment FIG. 3L shows the payment module in an enclosure mountable on the outside surface of the vending machine. In this regard the dollar bill validator slot is not occupied and left available for other purposes. A user having access to the front of the payment module assembly can among other things insert cards, view transaction status information via the three LED display (340, 342, 344), and use a push button 308 to provide system input. A faceplate 302 is shown fastened to a support bracket 318. The faceplate 302 is sized to fit the industry standard bill validator opening, which can be found on most brands and models of vending equipment. The faceplate 302 has a plurality of holes to allow fastening of the card reader assembly into the vending equipment. A graphical instruction overlay 356 can be attached to the faceplate 302. Faceplate 302 also contains a plurality of threaded studs 346 for mounting the card reader LCD display board (not shown). An LED display assembly comprising LED 340, 342, and 344 are viewable to a user. The LED display communicates status information related to the state of the vending machine or state of the card reader, as well as the status of a current transaction. In an exemplary embodiment the function of the LED display and color of the LEDs can be selected and defined in accordance with EVA cashless payment guidelines for LED displays.

An interface connection 348 on the payment module board 350 provides an electrical interface to external data processing equipment and or other computing platforms. Such external data processing equipment and or computing equipment can include communication devices, display devices, telemetry devices, VIU's, interactive media devices, PC based platforms, and other types of computing platforms. Interface 348 can be an external peripheral interface 536, a network interface 542, an interactive interface 532, or other type of interface.

In addition, faceplate 302 can be fastened to a bracket 318. Bracket 318 has a plurality of bracket fasteners for fastening a card reader 310 to the card reader assembly. The bracket 318 also has a threaded insert 316 located in the rear of the bracket 318. Threaded insert 316 can receive a thumbscrew in order to facilitate the fastening of the printer assembly bracket (not shown) to the card reader assembly.

A push button switch 308 can be fastened to the faceplate 302 and electrically connected to the payment module board 350 by way of cable assembly or as a PCB mountable component. LED display 340, 342, and 344 can be electrically connected to the payment module board 350 by way of cable assembly or as a PCB mountable component. In addition, card reader 310 can be electrically connected to the payment module board 350 by way of cable assembly or as a PCB mountable component.

In an exemplary embodiment the firmware embedded in the base level payment module could support base level functionality as well as other payment module functionality available with an expansion daughter board (i.e. display, communication, and other function modules). Such base level functionality could include: the MDB Controller/G4 E-PORT/E-PORT (System 500) Interface Protocol And Specification, certified credit bureau protocol and transaction processing directly with credit bureau when communication options allow, local authorization card processing option, a self managing local databases for use during local authorization processing, setup mode to configure MDB bus interface options and other card reader parameters and hardware options, DEX interface polling and data passing to USALIVE remote location and other remote locations when certain hardware options are available, communication support for modem, point-to-point, and external data modem when certain hardware options are available, active and passive modes of operation to support dial-a-vend, and other VIU initiated transactions, and or full transaction management which includes the steps of: 1) accept identification (for example a credit card, magnetic card, hotel room key card, wireless phone initiated, RFID, PDA initiated, dial-a-vend communication, smart card, wireless device initiated, bio-metric, etc.) for cashless payment; 2) check identification data local or remote authorization (remote authorization via external communications means); 3) conduct transaction (remotely manageable single or multi vend options, max vend item limits, time-out limits, max authorization amount limits, accrue sale amounts, time stamp transactions, save in non-volatile memory transaction records); and 4) post process transaction (record inventory dispensed, and payment detail in transaction record, data communicate transaction information upon request to external communication platform).

To allow functionality expansion of the base payment module, which could include printing capabilities, communication capabilities, control of an electronic lock, and other vending machine interface options and or capabilities (such as DEX, MDB, MDB mimic, etc.) a daughter board could be added to the base payment module. More specifically, additional payment module functionality through the use of one or more daughter cards could include: support for optional DEX interface and capabilities, MDB interface and capabilities, MDB mimic interface and capabilities, support for optional 16 character by 2 line LCD display or other types and styles of LCD or vacuum florescent displays, support for optional printer circuit card; and support for optional communication card (communication card could support point-to-point, modem, and external modem interfaces). Such daughter boards can be electrically connected to the payment module board by way of connection means 358. The daughter boards can be referred to as daughter cards. The payment module board can also be referred to as the base level payment module. Connection means 358 (shown in FIG. 3J) can include wired and wireless methods of electrically connecting to and data communicating between the payment module board and the daughter board.

Printing capabilities can include printing receipts, printing coupons, printing reports, and other types of printing, and printing capabilities.

Referring to FIGS. 3I and 3J there is shown how a payment module with communications daughter board, and optional LCD display could be incorporated into the base level payment module. Referring to FIGS. 3I and 3J there is shown a payment module assembly. In an exemplary embodiment the payment module assembly can be installed in a vending machine's dollar bill validator slot. A user having access to the front of the payment module assembly can insert cards, view transaction status information via the LCD display or the three LED display (340, 342, 344), and use a push button 308 to provide system input.

A faceplate 302 is shown fastened to a support bracket 318. The faceplate 302 is sized to fit the industry standard bill validator opening, which can be found on most brands and models of vending equipment. The faceplate 302 has a plurality of holes to allow fastening of the card reader assembly into the vending equipment.

Faceplate 302 also has a paper exit slot 304 to allow a receipt printer (not shown) to dispense a printed receipt to a user of the system. Faceplate 302 also has a display slot 306 which allows the LCD display mounted on the threaded studs 346 to be viewable from its mounting location behind the front surface of faceplate 302. An LED display assembly comprising LED 340, 342, and 344 are viewable to a user. The LED display communicates status information related to the state of the vending machine or state of the card reader, as well as the status of a current transaction. The function of the LED display and color of the LED can be selected or defined in accordance with EVA cashless payment guidelines for LED displays.

An interface connection 348 on the payment module board 350 provides an electrical interface to external data processing equipment and or other computing platforms. Such external data processing equipment and or computing equipment can include communication devices, display devices, telemetry devices, VIU's, interactive media devices, PC based platforms, and other types of computing platforms. Interface 348 can be an external peripheral interface 536, a network interface 542, an interactive interface 532, or other type of interface.

A connection means 358 effectuates the connectivity of daughter boards to the payment module board. The daughter boards can be referred to as daughter cards. The payment module board can also be referred to as the base level payment module. Connection means 358 can include wired and wireless methods of electrically connecting to and data communicating between the payment module board and the daughter board.

In addition, faceplate 302 can be fastened to a bracket 318. Bracket 318 has a plurality of bracket fasteners for fastening a card reader 310 to the card reader assembly. The bracket 318 also has a threaded insert 316 located in the rear of the bracket 318. Threaded insert 316 can receive thumbscrew 332 in order to facilitate the fastening of the printer assembly bracket (not shown) to the card reader assembly. An expansion board 354 can be mounted to the bracket 318 and electrically interconnected to the base level payment module board 350 by way of cable assembly 356 or as a PCB mountable component.

A push button switch 308 can be fastened to the faceplate 302 and electrically connected to the payment module board 350 by way of cable assembly or as a PCB mountable component. LED display 340, 342, and 344 can be electrically connected to the payment module board 350 by way of cable assembly or as a PCB mountable component. In addition, card reader 310 can be electrically connected to the payment module board 350 by way of cable assembly or as a PCB mountable component.

Figure 3K:
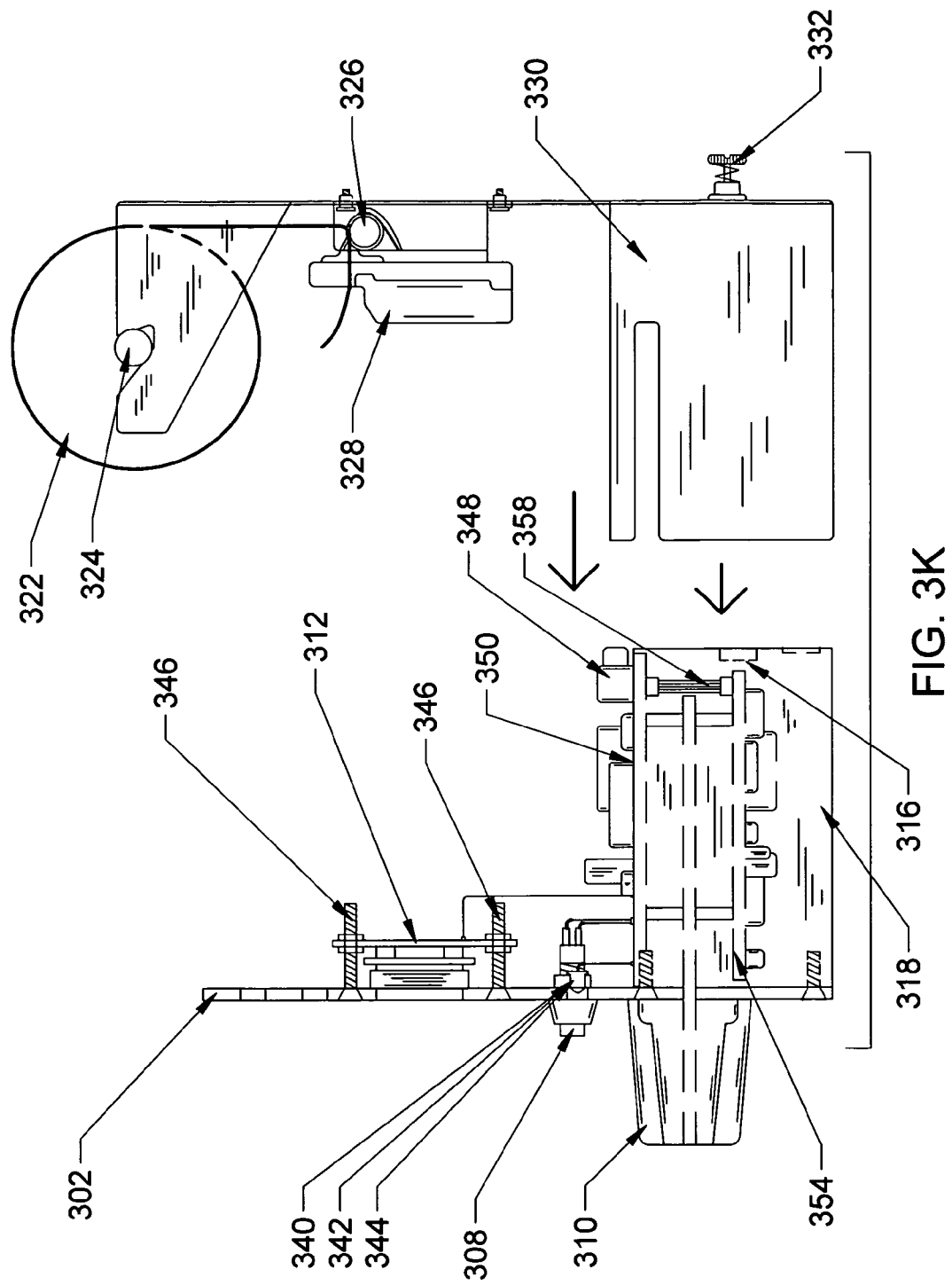
FIG. 3K there is shown a right side view of the payment module assembly and a right side view of a printer assembly being aligned for assembly together.
Figure 3L:
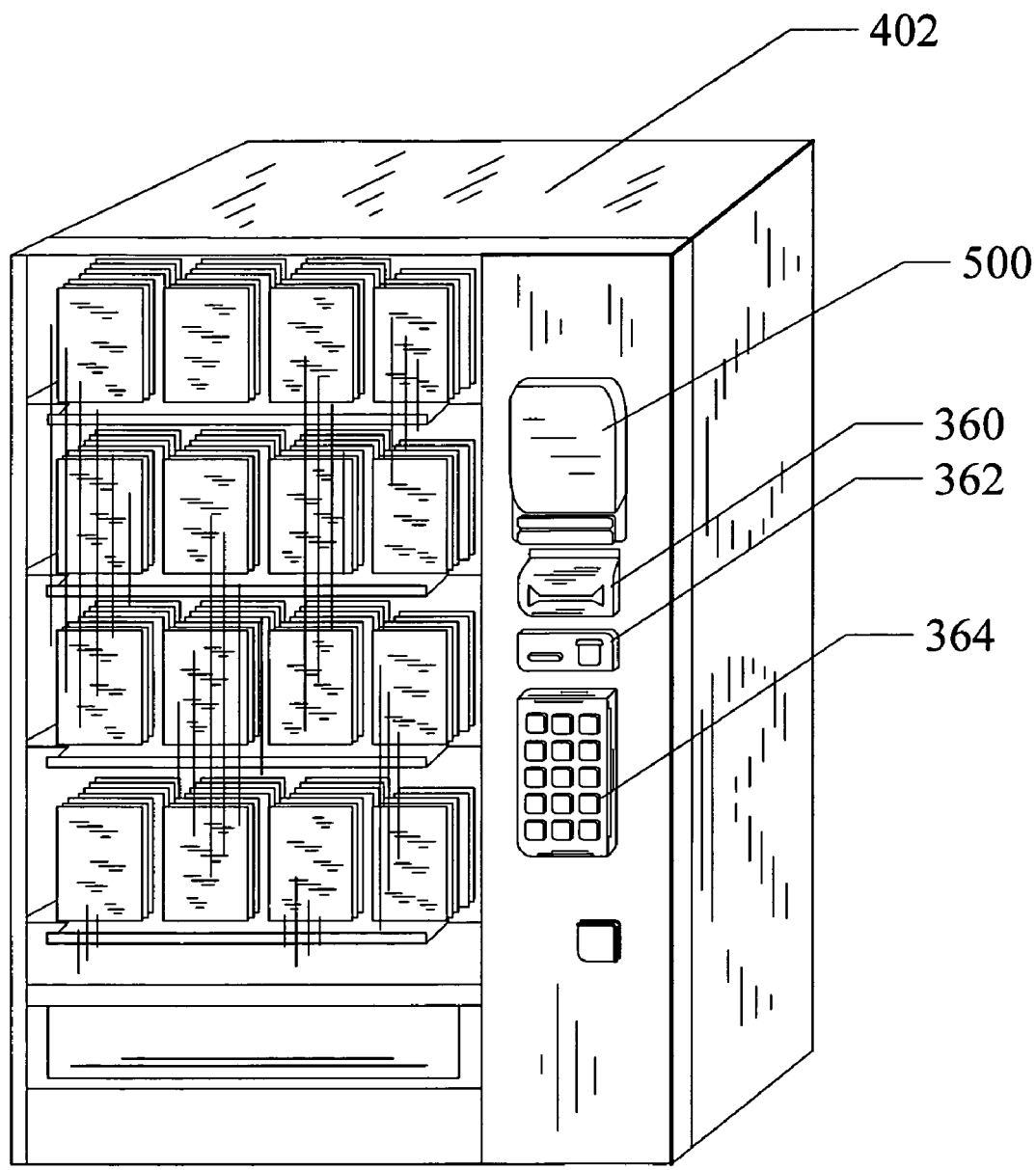
FIG. 3L there is shown an external surface mountable payment module assembly.

Referring to FIG. 3K there is shown a payment module and printer assembly being aligned for assembly together. In an exemplary embodiment support for a printer option can be accomplished with the addition of a daughter card or interconnection of a printer mechanism with the base level card reader board 350, and the addition of the printer assembly. Shown in FIG. 3K is a printer assembly plate 330, interconnected with a paper roll holder 324, a printer mechanism 328, and a thumbscrew fastener 332. Also shown is a paper roll 322 being held by the paper roll holder 324 and a paper feed adjuster 326, which is part of printer mechanism 328.

In an exemplary embodiment a user of the payment module assembly can choose to add the ability to print receipts, coupons, and other print information by sliding the printer assembly onto the card reader assembly and making the appropriate electrical connections to the daughter board 226 or card reader card 350. Furthermore, the printer assembly can be securely fastened to the card reader assembly by way of thumbscrew 332.

A connection means 358 effectuates the connectivity of daughter boards to the payment module board. The daughter boards can be referred to as daughter cards. The payment module board can also be referred to as the base level payment module. Connection means 358 can include wired and wireless methods of electrically connecting to and data communicating between the payment module board and the daughter board.

Referring to FIG. 3L there is shown a vending snack style machine 402 with a system 500. A vending machine 402 can be a system 500. A vending machine 402 can be operationally related to a system 500. Alternatively, a vending machine 402 can be integrated with, but separate from a system 500 for retrofit purposes. A bill acceptor 360, a coin acceptor 362, and a user keypad 364 can be optionally interconnected with and operationally related to the vending machine 402. Suitable vending machine 402 can include those manufactured by or for COKE, PEPSICO, CRANE NATIONAL VENDORS, KRH, AP, AMS, DIXIE NARCO, CAVALIER, ROYAL, MARS, VENDO, or other vending snack style machine 402 manufacturers or suppliers.

In an exemplary embodiment a system 500 can be embodied in an enclosure resident on the outside surface of the vending machine. In this regard, fastening to the vending machine can occur without the system 500 device requiring or occupying the vending machine dollar bill validator hole. This can enable the coexistence of a dollar bill validator and a system 500 attached to the same vending without requiring additional cutting of the vending machine and or encountering form or fit problems in vending equipment with restrictive front door areas to support both devices.

Figure 3M:
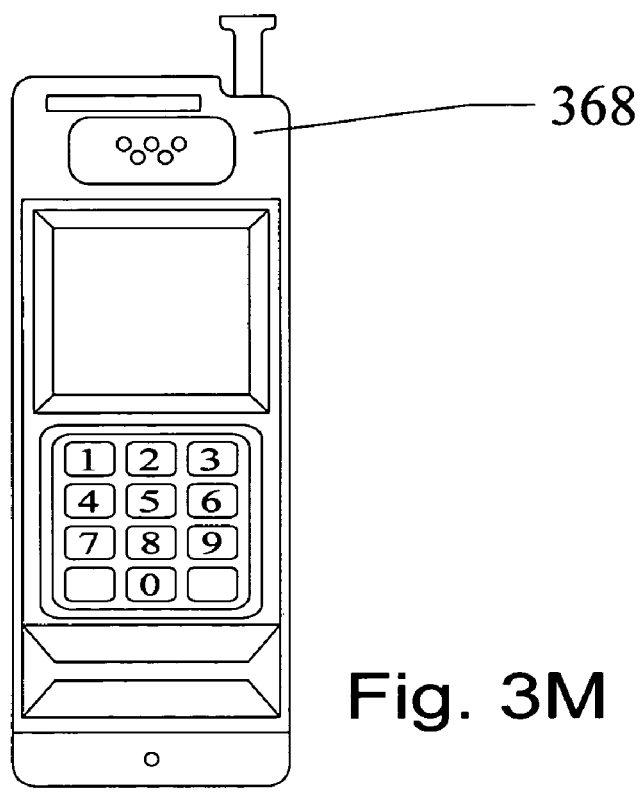
FIGS. 3M-3N and 3O there is shown a plurality of data processing devices embodiments.
Figure 3N:
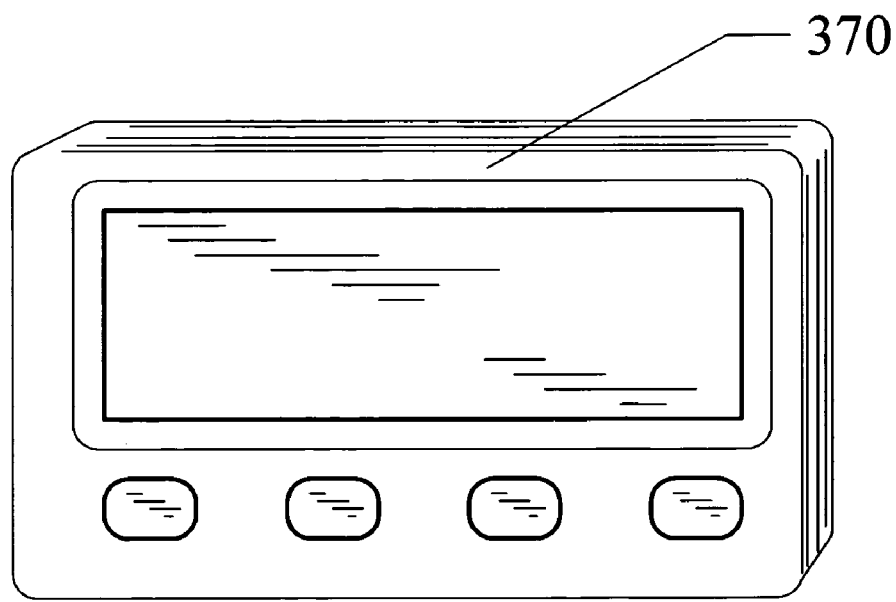
Figure 3O:
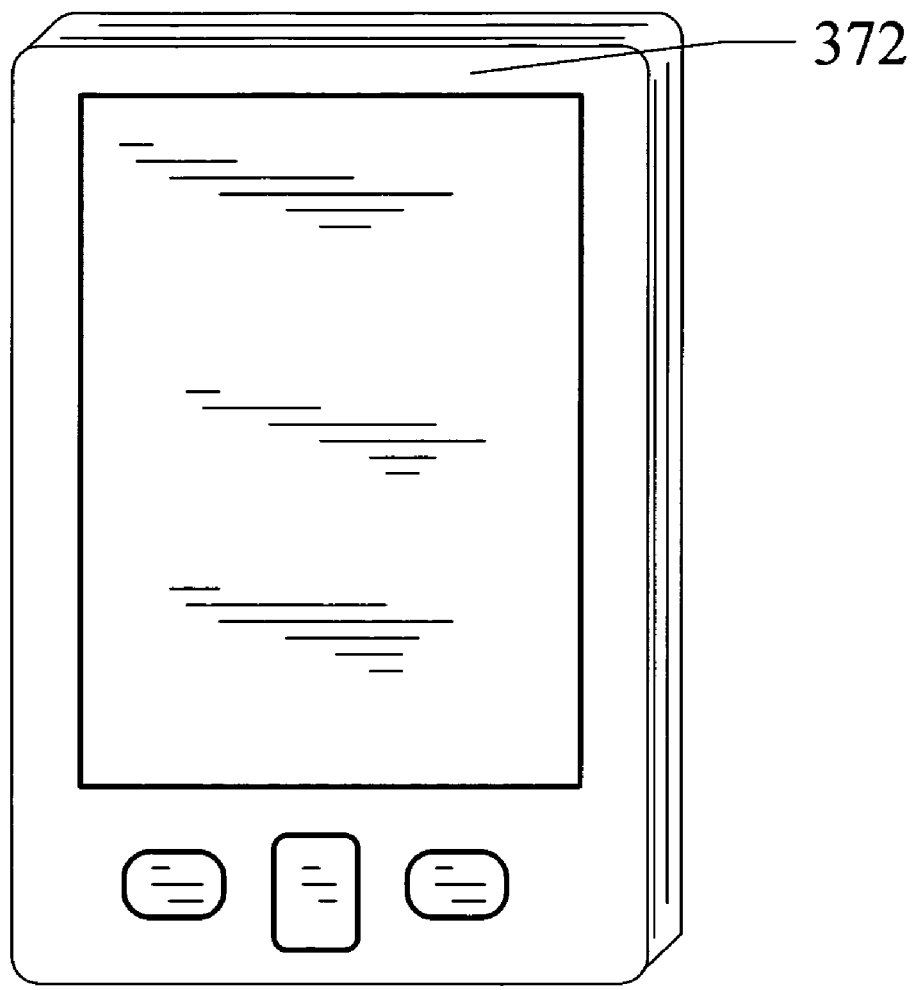

Referring to FIGS. 3M-3N and 3O there is shown a plurality of data processing devices embodiments.

In FIG. 3M there is shown a wireless phone 368. A wireless phone 368 can be a data processing device and can be referred to as a data device. Furthermore, A wireless phone 368 can be operationally related to a system 500. Alternatively, a wireless phone 368 can be integrated with, but separate from a system 500 wherein data can be transferred, data communicated and or physically transported between the vending machine having a system 500 and a plurality of remote location including a plurality of global network based data processing resources. Suitable wireless phone 368 can include those manufactured by GENERAL ELECTRIC, AT&T, NYNEX, SPRINT, MCI, BELL TELEPHONE (BELL SOUTH, BELL ATLANTIC, ETC.), SONY, AUDIOVOX, QUALCOM, NOKIA, ERICKSON, MOTOROLA, 3COM, SHARP, PANASONIC, TEXAS INSTRUMENTS, CABLE AND WIRELESS, LDI, or other wireless telephone manufacturers or suppliers. In an exemplary embodiment a wireless phone 368 can hardwire to or wirelessly data communicate with a system 500.

In an exemplary embodiment, for example and not limitation a wireless phone 368 can be utilized to data communicate with a system 500 wired or wirelessly. Such data communication can include configuration data, transaction data, and other data. Wireless phone 368 can then be physically carried to a remote location for further data communication. Such further data communication can include wireless phone 368 at the remote location data communicating with a data processing device. Such data communication can include data communicating the configuration data, transaction data, and other data obtained in part from the system 500. The data processing device can further process and or data communicate with additional data processing device, and or remote locations. In this regard, a wireless network can be effectuated between the system 500 and the remote location, wherein the wireless component of the network is the use of wireless phone 368 as a data carrier coupled with the wireless phone 368 being physically carrier to a remote location.

One advantage in an exemplary embodiment can be in reducing or eliminating the need to provide a wide area network connection or other dedicated communication access to the system 500 for the purpose of processing transaction and communicating system 500 configuration data with a remote location in real time. As an example, local authorization routines 1300 and 1900 can be utilized to authorization a cashless transaction—no real time remote location access required to authorize the validity of the cashless ID (magnetic card, RFID, biometric ID, etc.). The vending session can be completed and at some later date preferably upon the arrival of vending equipment service personnel the transaction data can be downloaded into wireless phone 368. In addition, optionally system 500 configuration data can be uploaded to the system 500. The vending equipment service person can then physically care the wireless phone 368 to a remote location where the transaction data and other data can be downloaded into a data processing device. Such a data processing device can be a PC, or a global network based data processing resource. The transaction data can then be data communicated to a second remote location as required or processed locally. Such processing can include authorizing the locally authorized transaction with a credit bureau or other bureau and or settling the transaction to effect payment to the merchant.

Referring to FIG. 3N there is shown a pager 370. A pager 370 can be a data processing device and can be referred to as a data device. Furthermore, A pager 370 can be operationally related to a system 500. Alternatively, a pager 370 can be integrated with, but separate from a system 500 wherein data can be transferred, data communicated and or physically transported between the vending machine having a system 500 and a plurality of remote locations including a plurality of global network based data processing resources. A pager 370 can be a SKYTEL, MOTOROLA, or other similar brand of pager 370. In an exemplary embodiment a pager 370 can be hardwired to or wirelessly data communicate with a system 500.

In an exemplary embodiment, for example and not limitation a pager 370 can be utilized to data communicate with a system 500 wired or wirelessly. Such data communication can include configuration data, transaction data, and other data. Pager 370 can then be physically carried to a remote location for further data communication. Such further data communication can include pager 370 at the remote location data communicating with a data processing device. Such data communication can include data communicating the configuration data, transaction data, and other data obtained in part from the system 500. The data processing device can further process and or data communicate with additional data processing device, and or remote locations. In this regard a wireless network for can be effectuated between the system 500 and the remote location, wherein the wireless component of the network is the use of pager 370 as a data carrier coupled with the pager 370 being physically carrier to a remote location.

One advantage in an exemplary embodiment can be in reducing or eliminating the need to provide a wide area network connection or other dedicated communication access to the system 500 for the purpose of processing transactions and communicating system 500 configuration data with a remote location in real time. As an example, local authorization routines 1300 and 1900 can be utilized to authorize a cashless transaction—no real time remote location access required to authorize the validity of the cashless ID (magnetic card, RFID, biometric ID, etc.). The vending session can be completed and at some later date preferably upon the arrival of vending equipment service personnel the transaction data can be downloaded into pager 370. In addition, optionally system 500 configuration data can be uploaded to the system 500. The vending equipment service person can then physically carry the pager 370 to a remote location where the transaction data and other data can be downloaded into a data processing device. Such a data processing device can be a PC, or a global network based data processing resource. The transaction data can then be data communicated to a second remote location as required or processed locally. Such processing can include authorizing the locally authorized transaction with a credit bureau or other bureau and or settling the transaction to effect payment to the merchant.

Referring to FIG. 3O there is shown a personal data assistant (PDA) 372. A PDA 372 can be a data processing device and can be referred to as a data device. Furthermore, A PDA 372 can be operationally related to a system 500. Alternatively, a PDA 372 can be integrated with, but separate from a system 500 wherein data can be transferred, data communicated and or physically transported between the vending machine having a system 500 and a plurality of remote locations including a plurality of global network based data processing resources. A PDA 372 can be a CASIO, HEWLETT PACKARD, POCKET PC BRAND, 3COM, EPSON, SEIKO, PANASONIC, IBM, SHARP, MOTOROLA, or other similar brand or PDA 372. In addition a PALM PILOT brand manufactured by 3COM can be a PDA 372. PDA 372 can be referred to as a portable digital device. In an exemplary embodiment a PDA 372 can be hardwired to or wirelessly data communicate with a system 500.

In an exemplary embodiment, for example and not limitation a PDA 372 can be utilized to data communicate with a system 500 wired or wirelessly. Such data communication can include configuration data, transaction data, and other data. PDA 372 can then be physically carried to a remote location for further data communication. Such further data communication can include PDA 372 at the remote location data communicating with a data processing device. Such data communication can include data communicating the configuration data, transaction data, and other data obtained in part from the system 500. The data processing device can further process and or data communicate with additional data processing device, and or remote locations. In this regard a wireless network for can be effectuated between the system 500 and the remote location, wherein the wireless component of the network is the use of PDA 372 as a data carrier coupled with the PDA 372 being physically carrier to a remote location.

One advantage in an exemplary embodiment can be in reducing or eliminating the need to provide a wide area network connection or other dedicated communication access to the system 500 for the purpose of processing transaction and communicating system 500 configuration data with a remote location in real time. As an example, local authorization routines 1300 and 1900 can be utilized to authorize a cashless transaction—no real time remote location access required to authorize the validity of the cashless ID (magnetic card, RFID, biometric ID, etc.). The vending session can be completed and at some later date preferably upon the arrival of vending equipment service personnel the transaction data can be downloaded into PDA 372. In addition, optionally system 500 configuration data can be uploaded to the system 500. The vending equipment service person can then physically carry the PDA 372 to a remote location where the transaction data and other data can be downloaded into a data processing device. Such a data processing device can be a PC, or a global network based data processing resource. The transaction data can then be data communicated to a second remote location as required or processed locally. Such processing can include authorizing the locally authorized transaction with a credit bureau or other bureau and or settling the transaction to effect payment to the merchant.

Figure 4:
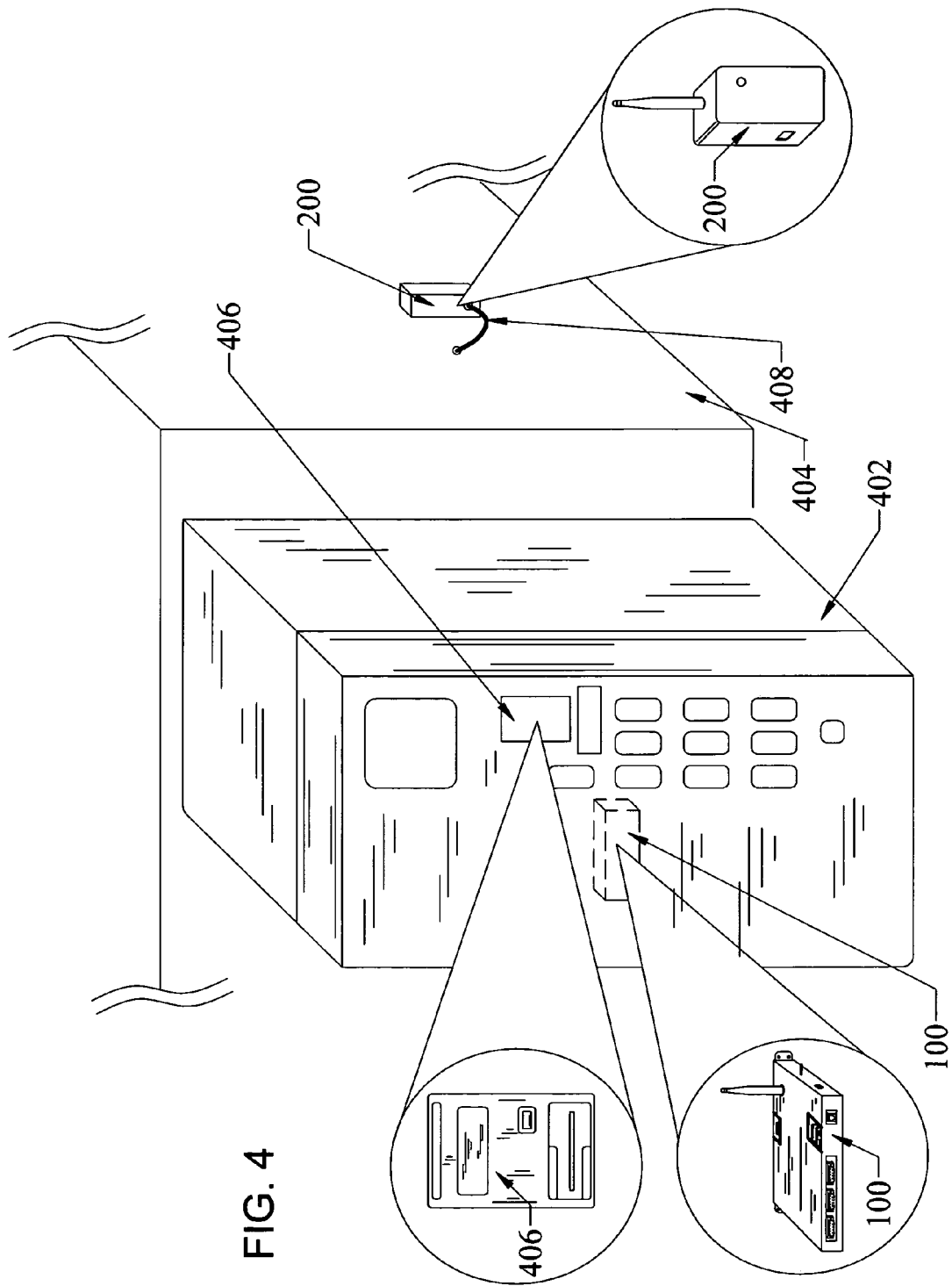
FIG. 4 there is shown a vending machine, vending machine interface unit, card reader and printer assembly, and transceiver and modem base unit.

Referring to FIG. 4 there is shown a vending machine 402, vending machine interface unit 100, card reader with optional printer assembly 406, and transceiver and modem base unit 200.

In an exemplary embodiment a VIU 100 can be located inside the vending equipment, such as vending equipment 402. In addition the card reader assembly with optional printer assembly can be mounted inside the vending equipment in such a way that a user has access to the card reader assembly. During operation a communication line can be interconnected directly with the VIU 100. Alternatively the VIU 100 can wireless data communicate with a transceiver base unit 200. There is shown in FIG. 4 a transceiver unit 200 plugged into an electrical outlet on wall 202. Also shown is a telecommunication line 408 interconnect with transceiver unit 200.

Figure 5:
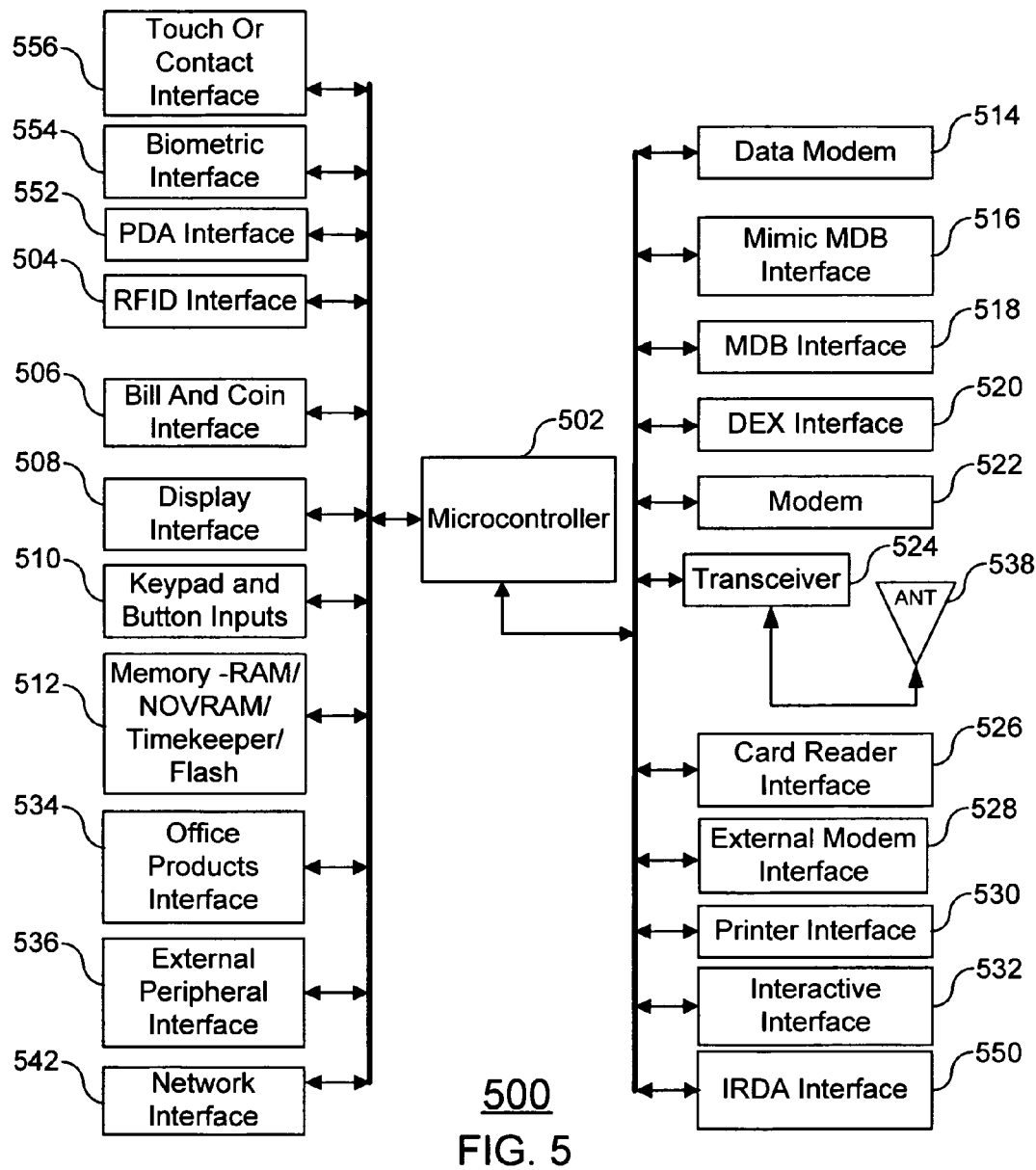
FIG. 5 there is shown an audit-credit-interactive system 500.

Referring to FIG. 5 there is shown an audit-credit-interactive system 500. In an exemplary embodiment the audit-credit-interactive system 500 electronics can be located in the VIU 100 enclosure and in general be referred to as a system 500 or VIU 100. In addition, a VIU 100 having an audit-credit-interactive system 500 can be referred to as a MDB controller, a computing platform, a USA TECHNOLOGIES E-PORT, or a USA TECHNOLOGIES G4 E-PORT or payment module.

The audit-credit-interactive system 500 provides three major components of functionality. As an audit device the audit-credit-interactive system 500 can audit inventory, sales, operational and other vending machine performance by way of the MDB and DEX interfaces. This gathering and forwarding to a plurality of remote locations of the DEX and or MDB data can be referred to as vending equipment telemetry, or as telemetry data.

When the card reader assembly is added to the system the audit-credit-interactive system 500 provides audit and card processing functionality. The card processing functionality allows cashless vending transactions to occur. Cashless vending transactions are effectuated by allowing various forms of identification (ID), and payment medium to be accepted as or for payment at the vending equipment. Other forms of ID can include, for example and not limitation, smart and magnet cards, radio frequency (RF) ID devices (RFID), user personal identification numbers (PIN) numbers or accounts, or wireless data communication access by way of wireless phone, Bluetooth, 802.11, 802.11B, as well as other suitable protocols or devices. For purposes of disclosure cashless vending refers to non-coin and non-cash transactions.

The audit-credit-interactive system 500 includes numerous mutually exclusive interfaces and control means. In a plurality of customer specifications and where customer cost considerations demand, there may arise a situation where an audit-credit-interactive system 500 maybe manufactured in such a way as to not contain or require the use of certain features, functions, interfaces, and or control means. Accordingly, an audit-credit-interactive system 500 can easily be manufactured to include or exclude a specific combination of features, functions, interfaces, and or control means to produce the desired system performance at a desirable cost to a customer. For example and not limitation, a customer may desire to operate an audit-credit-interactive system 500 without an RFID interface 504. In such a case, an audit-credit-interactive system 500 could be manufactured with the omission of the RFID interface 504. In any combination, the same inclusion or exclusion of features, functions, interfaces and or control means can be applied to other audit-credit-interactive system 500 features, functions, interfaces, and or control means.

Interconnected with microcontroller 502 can be an RFID interface 504. The RFID interface 502 can data communicate with wired or wireless devices that are proximate to the RFID interface 504. In an exemplary embodiment these wired and wireless device include, for example and not limitation, touch devices from DALLAS SEMICONDUCTOR, and wireless devices such as the MOBIL SPEED PASS, or other similar or suitable wired or wireless RFID devices. Microcontroller 502 can be any suitable microcontroller, or microprocessor. In an exemplary embodiment a microcontroller 502 can be a ZILOG Z8038220FSC, ZILOG eZ80 type, INTEL, MICROCHIP, MOTOROLA, AMD, UBICOM, or other similar brand or type of microcontroller. RFID interface 504 can be referred to as a payment interface, wherein a user can present a plurality of payment identification data to effectuate the use of the system 500. In addition, the payment identification data can be utilized to authorize the use of and payment for goods and services vended from vending equipment interconnected with system 500. Such payment identification data can be locally authorized at the system 500, and or remotely authorized at a remote data processing resource or other remote locations. In addition, the payment identification data may be retained at the system 500 and utilized in the local authorization databases to authorize a user presenting the same payment identification data for subsequent cashless transactions.

Interconnected with microcontroller 502 can be bill acceptor and coin mechanism interface 506. The bill acceptor and coin mechanism interface 506 emulate industry standard bill acceptor and coin mechanism interfaces. In this regard the audit-credit-interactive system 500 can be interconnected to vending equipment by way of the interface 506. The audit-credit-interactive system 500 mimicking industry standard bill acceptor and coin mechanism electrical control system and signal timing can then operate the vending equipment. Industry standard bill acceptors include serial and pulse style. Serial style bill acceptors typically utilize INTERRUPT, SEND, ACCEPT ENABLE, and DATA control signal lines. Pulse style bill acceptor and coin mechanisms send electrical pulses to an attached control system to indicated the receipt of coin and currency. Serial and pulse style bill acceptors and coin mechanisms can include for example and not limitation MARS, COINCO, CONLUX, or other similar bill acceptors and or coin mechanisms.

Interconnected with microcontroller 502 can be a display interface 508. A display interface 508 can be a liquid crystal display (LCD), a vacuum florescent display, an RS232 connection, and or an electrical interface for driving a display. In an exemplary embodiment display interface 508 can be, for example and not limitation, an RS232 serial connection. Such a serial connection can be utilized to data communicate display data as well as other types of data to a card reader interface board 312.

Interconnected with microcontroller 502 can be a plurality of keypad and button inputs 510. Keypad and button inputs 510 can be referred to as a payment interface, wherein a user can present a plurality of payment identification data to effectuate the use of the system 500. In addition, the payment identification data can be utilized to authorize the use of and payment for goods and services vended from vending equipment interconnected with system 500. Such payment identification data can be locally authorized at the system 500, and or remotely authorized at a remote data processing resource or other remote locations. In addition, the payment identification data may be retained at the system 500 and utilized in the local authorization databases to authorize a user presenting the same payment identification data for subsequent cashless transactions.

Interconnected with microcontroller 502 can be memory 512. Memory 512 can be a plurality of different types of memory. In an exemplary embodiment memory 512 can comprise non-volatile random access memory (NOVRAM), random access memory (RAM), flash memory, and serial flash memory. In addition, the RAM/NOVRAM can include a timekeeper function for maintaining date and time. RAM/NOVRAM can be a DALLAS SEMICONDUCTOR DS1644, DS1646, or DS1647, or other similar or suitable RAM. Flash memory can be an ATMEL or STS brand AT29E010 or other similar style, different size, other brand, or suitable substitute. The serial flash memory can be an ATMEL brand AT45D081, a MICROCHIP 93LC66, or other similar style, different size, other brand, or suitable substitute.

In an exemplary embodiment the timekeeper feature can be effectuated to time and date stamp the transactions as they occur. From the vending equipment's MDB interface CASH VEND transactions, if supported by the VMC, as well as cashless vend transactions can be monitored and recorded. Adding a time and date time stamp to the each transaction as they occur can result in a detailed inventory utilization record showing the date and time the products were vended.

Interconnected with microcontroller 502 can be an office product interface 534. An office product interface 534 can include, for example and not limitation, an optoisolator for counting pulses generated by a fax machines, copy machine, and other office product equipment. In addition, office product interface 534 can include, for example and not limitation, a DTMF decoder for decoding telephone touch-tones and subsequently billing for the use of a telephone line. DTMF decoding can be used in connection with a fax machine to bill for usage based in part on local, long distance, and international dialed locations.

In an exemplary embodiment, in addition to monitoring and billing for use of office products, office products interface 534 can be referred to as a payment interface, wherein a user can present a plurality of payment identification data to effectuate the use of the system 500. In addition, the payment identification data can be utilized to authorize the use of and payment for goods and service vended from vending equipment interconnected with system 500. Such payment identification data can be locally authorized at the system 500, and or remotely authorized at a remote data processing resource or other remote locations. In addition, the payment identification data may be retained at the system 500 and utilized in the local authorization databases to authorize a user presenting the same payment identification data for subsequent cashless transactions.

Interconnected with microcontroller 502 can be an external peripheral interface 536. The external peripheral interface 536 includes a plurality of configurable input and output lines for interfacing to external peripheral devices. External peripheral interface 536 can support serial peripheral interfaces (SPI), serial communication interfaces such as RS232, RS485, I²C, and other types of peripheral interfaces and communication protocols and standards.

In an exemplary embodiment, in addition to interfacing to external peripheral devices, external peripheral interface 536 can be referred to as a payment interface, wherein a user can present a plurality of payment identification data to effectuate the use of the system 500. In addition, the payment identification data can be utilized to authorize the use of and payment for goods and services vended from vending equipment interconnected with system 500. Such payment identification data can be locally authorized at the system 500, and or remotely authorized at a remote data processing resource or other remote locations. In addition, the payment identification data may be retained at the system 500 and utilized in the local authorization databases to authorize a user presenting the same payment identification data for subsequent cashless transactions.

Interconnected with microcontroller 502 can be a network interface 542. A network interface 542 can be a local area network connection, a wide area network connection, an Ethernet, token ring, FIREWIRE, or other similar or suitable type of network interface.

In an exemplary embodiment, in addition to providing network connectivity, network interface 542 can be referred to as a payment interface, wherein a user can present a plurality of payment identification data to effectuate the use of the system 500. In addition, the payment identification data can be utilized to authorize the use of and payment for goods and service vended from vending equipment interconnected with system 500. Such payment identification data can be locally authorized at the system 500, and or remotely authorized at a remote data processing resource or other remote locations. In addition, the payment identification data may be retained at the system 500 and utilized in the local authorization databases to authorize a user presenting the same payment identification data for subsequent cashless transactions.

A data modem 514 can be interconnected with microcontroller 502. A data modem 514 can effectuate wired and wireless data communications with a plurality of remote locations. Wireless data modems include, for example and not limitation, MOTOROLA, ERICKSON, QUALCOM, and NOKIA brands of data modems, as well as SPRINT PCS, CDMA, CDPD, 2G type wireless device, 2.5G type wireless devices, 3G type wireless devices, research in motion (RIM) type wireless device, or other similar or suitable brands or types of wireless data modem.

In an exemplary embodiment, in addition to effectuating wired and wireless data communications with a plurality of remote locations, data modem 514 can be referred to as a payment interface, wherein a user can present a plurality of payment identification data to effectuate the use of the system 500. In addition, the payment identification data can be utilized to authorize the use of and payment for goods and service vended from vending equipment interconnected with system 500. Such payment identification data can be locally authorized at the system 500, and or remotely authorized at a remote data processing resource or other remote locations. In addition, the payment identification data may be retained at the system 500 and utilized in the local authorization databases to authorize a user presenting the same payment identification data for subsequent cashless transactions.

A multi-drop-bus (MDB) interface 518 is interconnected with microcontroller 502. In an exemplary embodiment an MDB interface 518 electrically interconnects with the vending equipment's MDB bus. An MDB interface 518 can be implemented with a universal asynchronous receiver transmitter (UART). In addition an MDB interface 518 can include a buffer circuit to handle the physical interface requirement to connect the system 500 to the MDB bus. A suitable buffer circuit can be an opto-isolated circuit or other suitable buffer circuit interface.

In an exemplary embodiment the UART can be configured to operate with eight data bit and one address bit in addition to start and stops bits (nine bit serial). In this regard in accordance with NAMA MDB specifications the MDB interface 518 can operate in and support the multi mode—multi processor addressing requirements. In operation the UART under control of the microcontroller 502 detects a valid address byte being data communicated from the VMC. The valid address byte indicates to the system 500 that the data following from the VMC should be captured and stored, parsed, responded to and or in general the system 500 should data communicate with the VMC as appropriate.

In an exemplary embodiment, to handle MDB communications an MDB message routine can be implemented in firmware under the control of the microcontroller 502. In this regard a series of interrupt routines can be utilized to first detect the message and then trigger a routine to parse and respond to the received message. A UART receive routine can be effectuated to capture and store data being communicated from the VMC. Upon detection of data and or MDB message data a one-shot MDB MESSAGE RESPONSE timer can be initiated. The one-shot MDB MESSAGE RESPONSE timer timeout period is the amount of time after receiving an MDB message from the VMC the system 500 will wait before sending a MDB message response. When the MDB MESSAGE RESPONSE timer times out an interrupt can be initiated to start an MDB message parsing and response routine. The MDB message parsing and response routine decodes the message sent from the VMC and takes the appropriate action and sends the appropriate response to the VMC.

In accordance with NAMA and other derivative MDB specifications the MDB interface 518 operates in the slave mode being responsive to the vending machine controller (VMC). The VMC typically resides in the vending equipment and operates as the vending equipment's control system. Interconnection with the MDB bus in combination with NAMA and other derivative MDB standards data communications allows the VIU 100 audit-credit-interactive system 500 to reside as a peripheral device to the vending equipment's control system in an auditing and payment device mode of operation.

In an exemplary embodiment a VMC can include peripheral device interface support for MDB interface 518, DEX interface 520, bill and coin interface 506, and office products interface 534.

In an exemplary embodiment the audit-credit-interactive system 500 is implemented as a cashless reader device on the MDB bus. As a cashless reader the system 500 can audit and transact cashless vending transactions.

A mimic MDB interface 516 can be interconnected with microcontroller 502. Mimic MDB interface 516 unlike MDB interface 518 can operate in both the master and slave modes of operation in accordance with the NAMA and other derivative MDB specifications. The mimic MDB interface 516 can support peripheral devices. A mimic MDB interface 516 can be implemented with a universal asynchronous receiver transmitter (UART). In addition a mimic MDB interface 516 can include a buffer circuit to handle the physical interface requirement to connect the system 500 to the MDB bus. A suitable buffer circuit can be an opto-isolated circuit or other suitable buffer circuit interface.

In an exemplary embodiment the UART can be configured to operate with eight data bit and one address bit in addition to start and stops bits. In this regard in accordance with NAMA MDB specifications the mimic MDB interface 516 can operate in and support the multi mode-multi processor addressing requirements. In operation the UART under control of the microcontroller 502 detects a valid address byte being data communicated from the VMC. The valid address byte indicates to the system 500 that the data following from the VMC should be captured and stored, parsed, responded to and or in general the system 500 should data communicate with the VMC as appropriate.

In an exemplary embodiment, to handle MDB communications an MDB message routine can be implemented in firmware under the control of the microcontroller 502. In this regard a series of interrupt routines can be utilized to first detect the message and then trigger a routine to parse and respond to the received message. A UART receive routine can be effectuated to capture and store data being communicated from the VMC. Upon detection of data and or MDB message data a one-shot MDB MESSAGE RESPONSE timer can be initiated. The one-shot MDB MESSAGE RESPONSE timer timeout period is the amount of time after receiving an MDB message from the VMC the system 500 will wait before sending a MDB message response. When the MDB MESSAGE RESPONSE timer times out an interrupt can be initiated to start an MDB message parsing and response routine. The MDB message parsing and response routine decodes the message sent from the VMC and takes the appropriate action and sends the appropriate response to the VMC.

One advantage of this dual mode of operation is that the mimic MDB interface 516 can support proprietary or different versions of MDB protocol and appear to a peripheral device as a VMC. In this regard peripheral devices that are not compatible with the vending equipment's VMC control system can be interconnected with system 500's mimic MDB bus 516. Through software resident on the system 500 the peripheral device by way of the mimic MDB interface 516 can data communicate with the system 500 and or through the system 500's (with protocol interpolation) MDB interface 518, over the vending equipment's MDB bus to the vending equipment's VMC control system.

A second advantage of the dual mode of operation of the mimic MDB interface 516 is that features supported by a peripheral resultant from the implementation of a derivative MDB specification can be utilized by data communication first to the system 500 by way of the mimic MDB interface 516. If the MDB protocol command is a command supported by the vending equipment's VMC controller the system 500 can then relay the message received from the peripheral device to the VMC control system by way of the system 500's MDB interface 518. In this regard the system 500 essentially acts as a MDB interface gateway sending and receiving non-VMC support portions of a peripheral's implement MDB specifications. In addition, the MDB gateway implemented by the system 500 can allow the peripheral device data communication access to the VMC controller for portions of the peripheral implemented MDB specification supported by the vending equipment's VMC controller.

In an exemplary embodiment, mimic MDB interface 516 can be referred to as a payment interface, wherein a user can present a plurality of payment identification data to effectuate the use of the system 500. In addition, the payment identification data can be utilized to authorize the use of and payment for goods and service vended from vending equipment interconnected with system 500. Such payment identification data can be locally authorized at the system 500, and or remotely authorized at a remote data processing resource or other remote locations. In addition, the payment identification data may be retained at the system 500 and utilized in the local authorization databases to authorize a user presenting the same payment identification data for subsequent cashless transactions.

A data exchange (DEX) interface 520 is interconnected with microcontroller 502. The DEX interface 520 is a serial connection interface for interfacing the system 500 to the VMC control system. In an exemplary embodiment the DEX interface conforms to the EVA-DTS version 4.0 and version 5.0 specifications. In this regard the system 500 can 'DEX' vending equipment and obtain marketing, sales, and operational data as well as other types of data related to the vending equipment operation and performance. In addition, the DEX interface 520 can be utilized to program the VMC control system. VMC programming can include setting prices and parameters, setting operational data, clearing error codes or messages, and programming the VMC firmware.

In an exemplary embodiment DEX interface 520 can be configured as a transistor-to-transistor level (TTL) or RS232 style serial connection. Furthermore, the transmit line from the system 500 can be independently signal level configurable such that during non-data communication idle time the signal level of the system 500 DEX transmit line can be set to a high impedance state or a low signal level state as opposed to the tradition idle high signal level state. The advantage can be that most VMC equipment is configure to detect the insertion of a plug into the DEX port. The insertion of the plug places a high signal level from the DEX port transmit line onto the VMC receive line. This can invoke the VMC to begin a DEX session with the device plugged into the DEX port. The ability to selectively configure the non-communication idle state signal level of the system 500 DEX transmit line to a high impedance state or low signal level state allows the system 500 DEX connection to be made with the VMC DEX port without the DEX port detecting the connection has been established. In this regard the system 500 only needs to change the state of the system 500 DEX transmit line to trigger a DEX session with the VMC controller. In addition a DEX interface 520 can include a buffer circuit to handle the physical interface requirement to connect the system 500 to the DEX bus. A suitable buffer circuit can be an opto-isolated circuit, TTL-RS232 converter, or other suitable buffer circuit interface.

In an exemplary embodiment, DEX interface 520 can be referred to as a payment interface, wherein a user can present a plurality of payment identification data to effectuate the use of the system 500. In addition, the payment identification data can be utilized to authorize the use of and payment for goods and service vended from vending equipment interconnected with system 500. Such payment identification data can be locally authorized at the system 500, and or remotely authorized at a remote data processing resource or other remote locations. In addition, the payment identification data may be retained at the system 500 and utilized in the local authorization databases to authorize a user presenting the same payment identification data for subsequent cashless transactions.

A modem 522 can be interconnected with microcontroller 502. Modem 522 can be utilized to data communicate to a plurality of remote locations. Modem 522 can include CERMETEK, XECOM, ZILOG, or other similar brands and types of modems and modem chip sets.

A transceiver 524 can be interconnected with microcontroller 502. In an exemplary embodiment transceiver 502 can effectuate wireless data communication between system 500 and a plurality of remote locations by way of transceiver unit's 200 system 700. A transceiver 524 can be a LINX, or MAX STREAM 430 Mhz, 800 Mhz, 900 MHZ, 2.4 Ghz, single frequency or spread spectrum RF module, and or other similar or suitable types of transceiver modules.

Additionally, transceiver 524 can be interconnected with antenna 538. Antenna 538 can be any suitable antenna configured to perform optimally with the selected transceiver and frequency. Antenna 538 can be an ANTENNA FACTOR brand antenna or similar or suitable antenna.

Interconnected with microcontroller 502 can be a card reader interface 526. Card reader interface 526 can support a variety of card reader interfaces and protocols including for example and not limitation bit strobe type of card readers. Bit strobe type of card readers read predefined tracks of data from a magnetic card. To read track data the card reader can incorporate a plurality of DATA-IN lines and DATA CLOCK lines to transfer magnetic card data. Card reader interface 526 can also support serial communication style card readers. Serial communication style card readers can incorporate TRANSMIT, RECEIVE, CLEAR TO SEND, and REQUEST TO SEND control lines to transfer card data to system 500. Such magnetic card readers can include those manufactured for or by XICO, MAGTEK, NEURON, or other similar or suitable card reader.

In addition to accepting magnet cards card reader interface 526 can implement a smart card reader interface, credit cards, a hotel room card reader. In this regard system 500 by way of card reader interface 526 can read, write, and execute embedded applications on a plurality of types and brands of smart cards.

In an exemplary embodiment, magnetic card reader interface 526 can be referred to as a payment interface, wherein a user can present a plurality of payment identification data to effectuate the use of the system 500. In addition, the payment identification data can be utilized to authorize the use of and payment for goods and service vended from vending equipment interconnected with system 500. Such payment identification data can be locally authorized at the system 500, and or remotely authorized at a remote data processing resource or other remote locations. In addition, the payment identification data may be retained at the system 500 and utilized in the local authorization databases to authorize a user presenting the same payment identification data for subsequent cashless transactions.

An external modem interface 528 can be interconnected with microcontroller 502. In an exemplary embodiment an external modem interface 528 can be an RS232 serial communication interface for interfacing to a plurality data modems, transceivers, and other communication type peripherals. Such data modems, transceivers, and other communication type peripherals can include for example and not limitation MOTOROLA, QUALCOM, ERICKSON, NOKIA, SPRINT, AT&T, LINX, MAX STREAM, or other similar or suitable data communication devices.

In an exemplary embodiment, external modem interface 528 can be referred to as a payment interface, wherein a user can present a plurality of payment identification data to effectuate the use of the system 500. In addition, the payment identification data can be utilized to authorize the use of and payment for goods and service vended from vending equipment interconnected with system 500. Such payment identification data can be locally authorized at the system 500, and or remotely authorized at a remote data processing resource or other remote locations. In addition, the payment identification data may be retained at the system 500 and utilized in the local authorization databases to authorize a user presenting the same payment identification data for subsequent cashless transactions.

A printer interface 530 can be interconnected with microcontroller 502. A printer interface 530 can be a serial communication style or Centronic style interface. In an exemplary embodiment printer interface 530 can be utilized to print receipts, coupons, and other print data.

An infrared communication interface (IRDA) 550 can be interconnected with microcontroller 502. IRDA interface 550 can support BLUETOOTH, and other optical wireless standards and protocols.

In an exemplary embodiment, IRDA interface 550 can be referred to as a payment interface, wherein a user can present a plurality of payment identification data to effectuate the use of the system 500. In addition, the payment identification data can be utilized to authorize the use of and payment for goods and service vended from vending equipment interconnected with system 500. Such payment identification data can be locally authorized at the system 500, and or remotely authorized at a remote data processing resource or other remote locations. In addition, the payment identification data may be retained at the system 500 and utilized in the local authorization databases to authorize a user presenting the same payment identification data for subsequent cashless transactions.

A personal data assistant interface (PDA) 552 can be interconnected with microcontroller 502. In this regard, PAD interface 552 can enable a PDA device, such as PDA 372 to data communicate with system 500. In addition pager 370, and wireless phone 368 can data communicate by way of PDA interface 552 to system 500.

In an exemplary embodiment PDA interface 552 can be an IRDA interface, or a radio frequency (RF) interface. Such interface types can include BLUETOOTH, WAP, 802.11, 802.11B, wireless LAN, wireless WAN, 2G type or compliant communications, 2.5G type or compliant communications, 3G type or compliant communications, or other suitable type or compliant communications.

In an exemplary embodiment, PDA interface 552 can be referred to as a payment interface, wherein a user can present a plurality of payment identification data to effectuate the use of the system 500. In addition, the payment identification data can be utilized to authorize the use of and payment for goods and service vended from vending equipment interconnected with system 500. Such payment identification data can be locally authorized at the system 500, and or remotely authorized at a remote data processing resource or other remote locations. In addition, the payment identification data may be retained at the system 500 and utilized in the local authorization databases to authorize a user presenting the same payment identification data for subsequent cashless transactions.

A biometric interface 554 can be interconnected with microcontroller 502. In this regard, biometric data such as iris scans, finger prints, voice data, and other biometric data can be data communicated to system 500.

In an exemplary embodiment, biometric interface 554 can be referred to as a payment interface, wherein a user can present a plurality of payment identification data to effectuate the use of the system 500. In addition, the payment identification data can be utilized to authorize the use of and payment for goods and services vended from vending equipment interconnected with system 500. Such payment identification data can be locally authorized at the system 500, and or remotely authorized at a remote data processing resource or other remote locations. In addition, the payment identification data may be retained at the system 500 and utilized in the local authorization databases to authorize a user presenting the same payment identification data for subsequent cashless transactions.

A touch or contact interface 556 can be interconnected with microcontroller 502. Such a touch or contact interface 556 can accept proximity devices, such as IBUTTONS and other touch or contact related identification devices. Touch or contact devices that interface to touch or contact interface 556 can be referred to as touch devices.

In an exemplary embodiment, touch or contact interface 556 can be referred to as a payment interface, wherein a user can present a plurality of payment identification data to effectuate the use of the system 500. In addition, the payment identification data can be utilized to authorize the use of and payment for goods and services vended from vending equipment interconnected with system 500. Such payment identification data can be locally authorized at the system 500, and or remotely authorized at a remote data processing resource or other remote locations. In addition, the payment identification data may be retained at the system 500 and utilized in the local authorization databases to authorize a user presenting the same payment identification data for subsequent cashless transactions.

An interactive interface 532 can be interconnected to microcontroller 502. The interactive interface 532 can be utilized in combination with the interactive interface communication protocol shown in the table below to interconnect the system 500 to a computing platform. The card reader assembly having a card reader interface board 312, which is implementing a card reader user interface system 600, can be referred to as a computing platform. In addition, PC based devices, handheld devices, and other microprocessor-based devices are also computing platforms.

In an exemplary embodiment, interactive interface 532 can be referred to as a payment interface, wherein a user can present a plurality of payment identification data to effectuate the use of the system 500. In addition, the payment identification data can be utilized to authorize the use of and payment for goods and services vended from vending equipment interconnected with system 500. Such payment identification data can be locally authorized at the system 500, and or remotely authorized at a remote data processing resource or other remote locations. In addition, the payment identification data may be retained at the system 500 and utilized in the local authorization databases to authorize a user presenting the same payment identification data for subsequent cashless transactions.

In an exemplary embodiment for example and not limitation a computing device can be interfaced to a system 500 by way of the interactive interface 532. In this regard the two interconnected devices can data communicate by way of an interactive device interface protocol. This protocol can be implement in and exemplary embodiment as disclosed below as an example and not limitation where a system 500 can be referred to as a point-of-sale reference design, a MDB controller or G4, and host network center 808 can be referred to as USALIVE:

MDB Controller/G4 E-Port/E-Port/Payment Module/Audit-Credit-Interactive Device (All Referred to as System 500)

Interactive Interface Communication Protocol Interface And Specification

MDB Controller/G4:

The MDB controller is the microcontroller-based system, which can interfaces to the vending machines MDB interface and to a computing platform. Such computing platforms include E-PORT. Certain versions of the E-PORT may incorporate the MDB controller and computing platform into a single board solution. In such a case serial communications between the computing platform and the MDB microcontroller occur over the devices serial peripheral interface (SPI), serial communication interface or other similar or suitable communication interface.

The G4 (system 500) version of E-PORT can utilize a single microcontroller to serve as an MDB controller or a semiconductor module as well as a cashless payment system platform. The G4 device incorporates an RS232 serial communication interface by which other computing platforms can interface to and control the functionality of the G4 and associated vending equipment. The G4 version can operate in two modes of operation. In a first mode of operation the G4 provides all the MDB interface control, audit/cashless payment support, and network connectivity. In this mode a computing platform can interact with the G4 in a hybrid role to monitor a string of user text prompts (see DISPLAY PROTOCOL) as well as execute commands (see below).

In a second mode of operation the G4 can be configured and serve as an MDB controller (system 500) only. In this mode both the MDB-CONTROL and NON-MDB-CONTROL commands can be executed. While in this mode of operation the computing platform operates as a master device controlling the operation and process flow of the system and the G4 serves as a slave device interfacing to the vending machine and managing the control of the MDB interface. COMMUNICATION INTERFACE details the electrical interconnections required to allow the G4 to data communicate with a computing platform.

Communication Parameters:

The MDB controller/G4 communicate to a computing platform by way of serial communications or other similar or suitable method of communication. In this regard a set of commands issued from the computing platform implement a level of control via the MDB controller/G4 and the MDB/ICP protocol to transact a cashless transaction, obtain DEX data information, and other vending machine related data. The communication protocol implemented between the system 500 (also referred to as the G4, G4 eport, or MDB controller) and the computing platform can be referred to as the Interactive Interface Communication Protocol.

Serial communications between the computing platform and the MDB controller/G4 are set at 9600 baud, 8 data bits, No Parity, and 2 Stop bits. Required serial port communications lines include transmit (Txd), Receive (Rxd) and Ground (Gnd).

System 500 Command Protocol

Protocol Exchange:

The "master" computing platform can initiate any '@', '#', 'AAA'; or 'BBB' command listed in the command disclosure below. Commands are case sensitive. In response to a complete command the MDB controller/G4 will process and return the result string. The result string shall start with a start character (STX) hex $02, and conclude with an ETX character hex $03. A LRC check byte will immediately follow the ETX character.

| Protocol Exchange Characters | |
|---|---|
| STX | hex $02 |
| ETX | hex $03 |
| <esc> | ESCAPE character hex $1B |
| LRC | all bytes XORed excluding the STX character and including the ETX character. |

It is recommended that the '@' or '#' commands be executed by inserting a leading space prior to the '@' or '#'. For example sending ' @<esc>H' instead of '@<esc>H' the difference being a leading space. The leading space will decrease command communication errors by allowing the MDB Controller/G4 to sync on the leading space.

Command Description:

@<esc>T—REQUEST FOR CARD READER DATA.

If no card reader data is available then the result string will return:
   STX+[CARD–NOCARDDATA]+ETX+LRC Else the result string will return:
   STX+[CARD–][UPTO 37 BYTES MAX OF CARD DATA]+ETX+LRC Example of valid card data
   STX+[CARD–41324199913243132=9182999937463764372]+ETX+LRC @<esc>Z—CLEAR CREDIT CARD DATA. The credit card buffer will be cleared and The result NOCARDDATA will be inserted in the buffer and returned in response to the @<esc>T command. The result string will return.
   STX+[OK–Z]+ETX+LRC @<esc>V—REQUEST FOR MDB TRANSACTION STRING DATA. Referring to FIG. 9D there is shown a MDB TRANSACTION STRING with system 500 and vending equipment interface.

In an exemplary embodiment the MDB TRANSACTION STRING is constructed and managed in memory accessible by microcontroller 502. The MDB TRANSACTION STRING includes at least one of the following data fields: a VEND STATE field, a MAX VEND SALE field, a SALE PRICE field, a COLUMN field, or a VEND FLAG field.

The VEND STATE field is a one-character field that indicates the current state of the vending equipment. Valid VEND STATE can include 'I' for inactive state, 'D' for disable state, 'E' for enable state, 'S' for in session state, or 'V' for vend state, as well as other vend states.

The MAX VEND SALE is the value of the highest priced item in the vending machine as reported by the vending machine to the system 500 during the MDB setup sequence. The MAX VEND SALE value is typically part of the MDB 11 00 (as defined in the NAMA MDB specification) setup command but can be set by the system 500 or data communicated to the system 500 in other ways.

The SALE PRICE is the vend sale price of the vend item selected from the vending machine as reported by the vending machine during an MDB VEND REQUEST message transaction with system 500. Typically the SALE PRICE is part of the MDB VEND REQUEST command 13 00 (as defined in the NAMA MDB specification) but can be set by the system 500 or data communicated to the system 500 in other ways. The VEND REQUEST command is typically sent from the VMC to the system 500 when a user selects an item from the vending machine. In general, the vending machine reports the SALE PRICE and the COLUMN information while in a vend session and does not dispense products or services until the vend approved message sent by the system 500 is received by the vending machine (received by the vending machine's VMC).

The COLUMN field is the column identification (the column the vended item is residing in within the vending machine typically used to track inventory) of the vend item selected from the vending machine as reported by the vending machine during an MDB VEND REQUEST message transaction with the system 500.

The VEND FLAG field is a one-character field that indicates the status of a vend cycle. The VEND FLAG field can include: 'C' for clear flag, '$' for currency vend flag, 'P' for vend pending flag, 'A' for vend approved flag, 'D' for vend declined flag, 'V' for cashless vend occurrence flag, 'U' for user selected amount, 'R' request for vend approve, 'F' for vend fail flag, as well as other vend flags.

In an exemplary embodiment, during execution of firmware by microcontroller 502 a mutually exclusive routine 512C (mutually exclusive routine operating independently of other routines, procedures, applications, 512B application code, or systems) can be utilized to manage and report on the state and operation of the VMC with respect to the MDB peripheral device interface and system 500 is interconnected with. In this regard, a wide variety of application code (running on microcontroller 502 or other system and or microcontrollers) and computing platforms 802 can manage and monitor the vending machine state and operation characteristics with respect to the vend process.

In operation a data communication connection between a vending machine 402 and system 500 includes a connection between the vending machine 402 and at least one of the vending equipment interfaces (516, 518, and 536 are shown). Data communication in the way of MDB initialization, setup, polling, session, as well as other types of data communication occur between the vending machine 402 and the system 500. Microcontroller 502 having data communication access to memory 512A constructs and manages the MDB TRANSACTION STRING in memory. As data is exchanged between the vending machine 402 and the system 500, microcontroller 502 updates the MDB TRANSACTION STRING as required.

Utilization of the MDB TRANSACTION STRING occurs when application code running in memory 512B, and or computing platform 802 interconnected with system 500 by way of the interactive interface 532 read the MDB TRANSACTION STRING to make certain determinations. For example and not limitation, an application running in memory 512B can read the MDB string VEND STATE FLAG field and determine the current state is MDB VEND STATE 'D' for disable. This can cause the application code to display a message by way of display interface 508 that the vending machine is DISABLED and can not transact a vend. Upon the vending machine 402 data communicating with the system 500 by way of the various vending equipment interfaces the vending machine 402 may communicate the MDB reader enable 14 01 (as defined in the NAMA MDB specification) command. The microcontroller 502 would then update the MDB TRANSACTION STRING with the 'E' for enable. The application code running in memory 512B upon reading the MDB VEND STATE field would now determine the vending machine is MDB VEND STATE 'E' for enabled and could display a message by way of display interface 508 that the vending machine is ENABLED and ready for vending.

In another exemplary embodiment a computing platform 802 can monitor the MDB TRANSACTION STRING to determine the current state and condition of the vending machine 402. In addition, the computing platform 802 can data communicate by way of the interactive interface 532 commands to be executed by microcontroller 502. Such commands are referred to as the '@', '#', AAA, and BBB commands disclosed herein.

As an example and not limitation, computing platform 802 can monitor and control vending machine 402 by way of interactive interface 532 by utilizing the @<esc>I, @<esc>V, @<esc>T, and or the @<esc>H. commands to monitor the presence of card data and the current MDB TRANSACTION STRING setting. One advantage of invoking the @<esc>I interrupt command is that once invoked, any time the MDB TRANSACTION STRING or card reader buffer change the MDB TRANSACTION STRING and or card reader buffer will be data communicated from the system 500 to the computing platform 802. In this configuration the computing platform 802 does not need to poll to determine whether card data or MDB TRANSACTION STRING status has changed—the data will be sent to the computing platform 802 when it does.

The computing platform 802 can determine from the MDB TRANSACTION STRING that the vending machine is MDB VEND STATE 'E' enabled and ready for a vend cycle. The computing platform can then data communicate to the system 500 one of the @<esc>S, @<esc>B, or one of the @<esc>A (session commands) commands. These commands instruct the system 500 to take certain actions that can include having the system 500 by way of the vending equipment interfaces data communicated to vending machine 402 the MDB BEGIN SESSION (as defined in the NAMA MDB specification) command. The vending machine will responds by starting a session. The microcontroller 502 will update the MDB TRANSACTION STRING to reflect that the vending machine 402 is in MDB VEND STATE FLAG 'S' session.

When a user presses a button on the vending machine 402, the vending machine 402 data communicates an MDB VEND REQUEST 13 05 (as defined in the NAMA MDB specification) with SALE PRICE and COLUMN detail information attached. System 500 upon receipt of the command can update the MDB TRANSACTION STRING to reflect the SALE PRICE, COLUMN, and VEND FLAG 'R' vend request (VEND ASSIST mode 'ON'). The computing platform can either read the MDB TRANSACTION STRING (non interrupt mode) or the MDB TRANSACTION STRING will be data communicated upon change to the computing platform 802 (interrupt mode). In the VEND ASSIST ON mode the computing platform 802 will have to send the #<esc>Q command to deny the vend request or the #<esc>R with sales detail to approve the vend request. The system 500 will respond to the computing platform 802 #<esc>Q and #<esc>R command by updating the MDB TRANSACTION STRING accordingly and sending the VEND DENIED 06 (as defined in the NAMA MDB specification) command to the vending machine 402, or the VEND APPROVED 05 (as defined in the NAMA MDB specification) to the vending machine 402 respectively.

In the VEND ASSIST OFF mode the VEND APPROVED 05 (as defined in the NAMA MDB specification) may be automatically generated and sent to the vending machine 402 by the system 500 in response to the VEND REQUEST message from the vending machine 402.

In the event of the VEND APPROVED being sent to the vending machine 402 the MDB TRANSACTION STRING will be updated to MDB VEND FLAG 'P' for vend pending while the vending machine is dispensing the goods and or services. An MDB VEND FLAG 'V' for vended or 'F' for vend failed will indicate the conclusion of a vending cycle. The computing platform 802 can read the MDB TRANSACTION STRING and take the appropriate actions including sending the @<esc>C command to clear the MDB TRANSACTION STRING to prepare for the next vend cycle.

Figure 21:
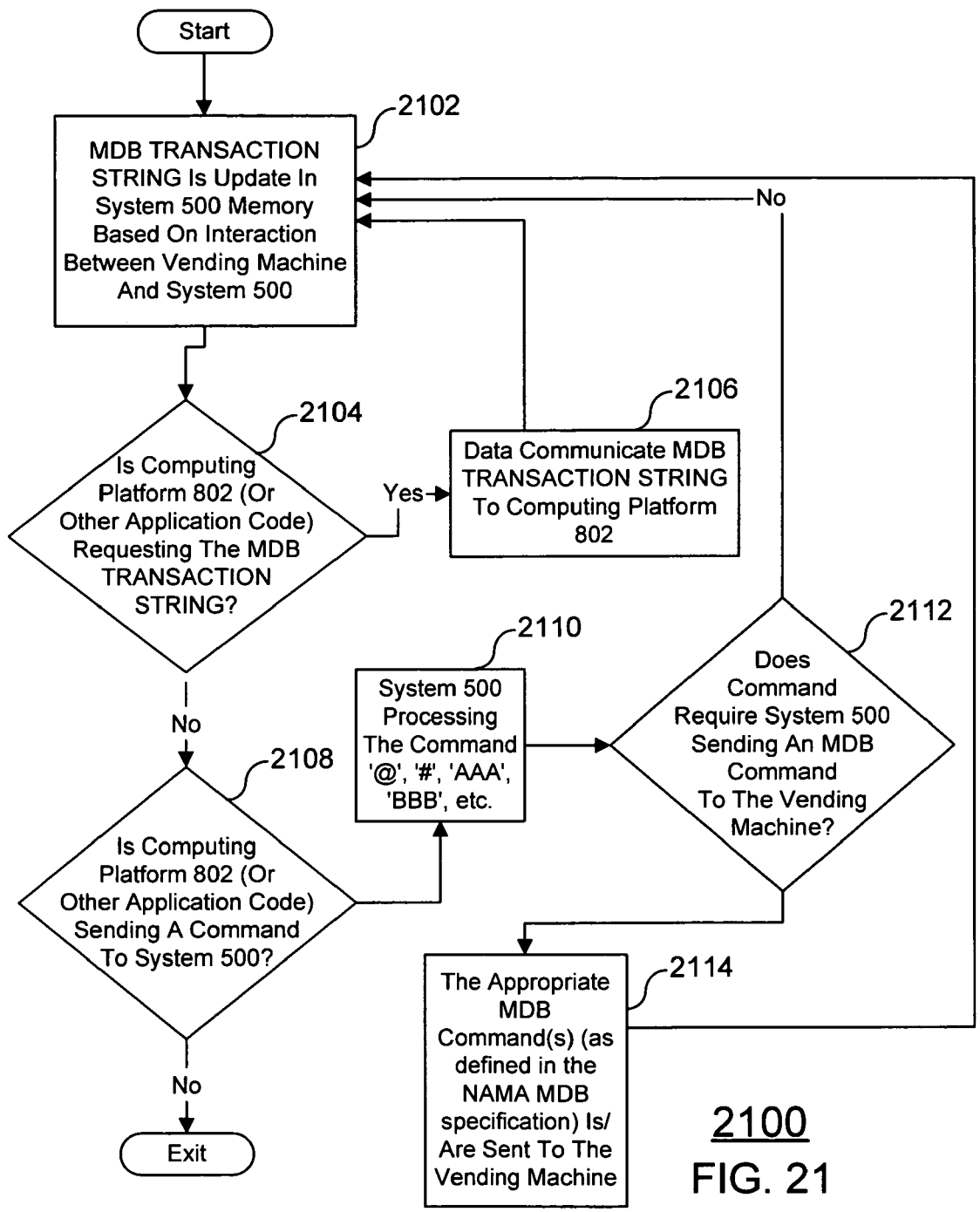
FIG. 21 there is shown a MDB TRANSACTION STRING updating routine 2100.

Referring to FIG. 21 there is shown a MDB TRANSACTION STRING updating routine 2100. Processing begins in block 2102.

In block 2102 the MDB TRANSACTION string is updated in system 500 memory. As previously described the updating occurs based in part on data communications between the system 500 and the vending machine 402, wherein the vending machine 402 is interconnected to the system 500 by way of the vending machine 402 VMC and the vending equipment interfaces 506, 516, 518, and or 520. Processing then moves to decision block 2104.

In decision block 2104 a determination is made at the system 500 as to whether computing platform 802 or application code running on microcontroller 502 is requesting the MDB TRANSACTION STRING be data communicated to the requesting destination. If the resultant is in the affirmative that is the computing platform 802 or application code running on microcontroller 502 is requesting the MDB TRANSACTION STRING, processing moves to block 2106. If the resultant is in the negative that is the computing platform 802 or application code running on microcontroller 502 is not requesting the MDB TRANSACTION STRING then processing moves to block 2108.

In block 2106 the command received from the computing platform 802 or the application code is received and the MDB TRANSACTION STRING is data communicated to the requesting destination. Processing moves back to block 2102.

In block 2110 the system 500 parses the received command. The various commands can include the '@', '#', 'AAA', and 'BBB' detailed herein. Processing then moves to decision block 2112.

In decision block 2112 a determination is made as to whether the command the system 500 received required an MDB command be data communicated to the vending machine 402. If the resultant is in the affirmative that is the command received requires an MDB command be data communicated to the vending machine then processing moves block 2114. If the resultant is in the negative that is the command received does not require an MDB command be data communicated to the vending machine then processing moves back to block 2102.

In block 2114 the appropriate MDB command or command sequence (as defined in the NAMA MDB specification) is data communicated between the system 500 and the vending machine 402. Processing moves back to block 2102.

In an exemplary embodiment when the MDB TRANSACTION STRING is data communicated. The result string will return:

STX+[S]+[xxxxxx Field #1 6 bytes]+[xxxxxx Field #2 6 bytes]+[xxxx Field #3 4 bytes]+[F]+ETX+LRC Where 'xxx . . . ' denotes fixed length fields. These fields should be right justified and have leading zeros added to fix the length of each field. For example $1.50 should be represented as 000150.

The 'S' field is the state current MDB VEND STATE field. Valid states include:

| Valid Vending States | |
| State | Description |
| --- | --- |
| I | Inactive |
| D | Disable |
| E | Enabled |
| S | In Session |
| V | Vend |

Field #1 is the MAX VEND PRICE as reported by the vending machine controller (VMC) during the MDB initialization process. The MAX VEND PRICE is the value of the highest priced item in the vending machine as reported by the vending equipment during an MDB initialization process. This can be a 6 byte field.

Field #2 is the SALE PRICE. The SALE PRICE is determined in the MDB protocol for the VEND—Request Command (See. Multi Drop Bus (MDB)/Internal Protocol Version 1.0 and 2.0 specification). The SALE PRICE is the vend sale price of the vend item as reported by the vending equipment during an MDB vend request transaction.

Field #3 is the COLUMN information. The COLUMN information is determined in the MDB protocol for the VEND—Request Command (See. Multi Drop Bus (MDB)/Internal Protocol Version 1.0 and 2.0 specification). The column identification of the vend item as reported by the vending equipment during an MDB vend request transaction.

The 'F' field is the MDB TRANSACTION CONDITION FLAG or VEND FLAG field. Valid flag states include:

| MDB TRANSACTION CONDITION FLAG; or VEND FLAG field | |
| State | Description |
| --- | --- |
| C | Clear |
| $ | Currency vend has occurred |
| P | Vend Pending |
| A | Vend Approved |
| D | Vend Declined |
| V | Cashless vend has occurred |
| U | USER SELECTED AMOUNT |
| R | REQUEST VEND APPROVE |
| F | Vend fail |

The 'C' flag is set when the MDB TRANSACTION STRING is cleared. The '$' flag is set when a VEND CASH MDB transaction occurs. The 'P' flag is set when a VEND—APPROVED MDB command is issued and remains valid until the VEND SUCCESSFUL or VEND FAIL MDB command is issued. The 'F' flag is set when a VEND FAILS.

The 'A', 'D' and 'R' state flags are only valid when the G4 (system500) is in the VEND ASSIST MODE (VEND ASSIST MODE='ON' (TRUE)). In the VEND ASSIST MODE='OFF' (FALSE) the VEND APPROVED response will automatically be issued to the VMC upon receiving the VEND REQUEST MDB command. When the G4 is in the VEND ACTIVE MODE='ON' (TRUE) and the VEND ASSIST MODE='OFF' (FALSE) the 'A', 'D', and 'R' state flags will not appear and are not valid state conditions.

The 'R' flag state will appear when the VEND ASSIST MODE='ON'. In this regard, when the MDB VEND REQUEST command is received (MDB interface applications) or the transaction is approved (BILL PULSE and BILL SERIAL applications) the MDB flag state will be changed to 'R' REQUEST VEND APPROVE. To complete the transaction the @<esc>A+STX+SALE command must be sent. Sale amount can range from $0.00 to $99.99 and are formatted as five numeric characters with no decimal point. For example $99.99 is sent as '09999'.

Examples of MDB Transaction Strings:

STX + [E0001500000000000C] + ETX + LRC  -> Enabled, MAX Vend price $1.50, transaction string in cleared state -continued

| | |
|---|---|
| STX + [S0001500000000000C] + ETX + LRC | -> In session, MAX Vend price $1.50, transaction string in cleared state |
| STX + [V0001500001000002P] + ETX + LRC | -> Vend state, MAX Vend price $1.50, sale price $1.00, vend from column 2, vend pending |
| STX + [E0001500001000002V] + ETX + LRC | -> Enable state, MAX Vend price $1.50, sale price $1.00, vend from column 2, vend complete |
| STX + [E0001500001250003$] + ETX + LRC | -> Enable state, MAX Vend price $1.50, sale price $1.25, vend from column 3, currency vend |

NOTE: (If you are not using an MDB interface this may not apply) The MDB microcontroller/G4 MDB interface will continuously manage the changes to the MDB TRANSACTION STRING. For example, as the MDB state changes the MDB state field will automatically be updated. There are however two scenarios that require the execution of the @<esc>C—CLEAR MDB TRANSACTION STRING DATA command. These two scenarios include when a currency vend has occurred and the 'F' field has been set to '$', and when a cashless vend has occurred and the 'F' field has been set to 'V' or 'F.'. In both these cases the @<esc>C command will have to be executed to clear the MDB TRANSACTION STRING before a new cash transaction can be tracked or a new cashless vending session can be started.

If the G4 is used in the VEND ACTIVE 'ON' mode the above does not apply in that the G4 will clear the MDB TRANSACTION string as appropriate. If the G4 is used in the G4 VEND ACTIVE 'OFF' mode the above will apply.

@<esc>C—CLEAR MDB TRANSACTION STRING DATA. The MDB controller/G4 will clear the SALE PRICE field, COLUMN information field, and the transaction condition flag is set to 'C'. The result string will return:
STX+[OK-C]+ETX+LRC @<esc>H—HYBRID COMMAND FOR SEND CARD DATA AND MDB STRING. The MDB controller/G4 will send both the card reader data (see @<esc>T above) followed by the MDB string (see @<esc>V). The result string will return:
STX+[@<esc>T response]+ETX_LRC+STX+[@<esc>V RESPONSE]+ETX+LRC @<esc>S—BEGIN A SESSION COMMAND. The MDB controller/G4 will begin an MDB session (see NAMA MDB specification V1.0, V2.0 for BEGIN SESSION command). The result string will return:
STX+[OK-S]+ETX+LRC The G4 must have the MDB state set to 'E' for ENABLED in order to start a session. If a session cannot be started the result string will return:
STX+[UNABLE-S]+ETX+LRC @<esc>X—END A SESSION COMMAND. The MDB controller/G4 will END an MDB session (see NAMA MDB specification V1.0, V2.0 for SESSION CANCEL command). The result string will return:
STX+[OK-X]+ETX+LRC @<esc>F—SET MDB CONTROLLER STATE TO INACTIVE. The MDB controller/G4 will set the MDB state to INACTIVE. The result sting will return:
STX+[OK-F]+ETX+LRC @<esc>D—SET MDB CONTROLLER STATE TO DISABLE. The MDB controller/G4 will set the MDB state to DISABLE. The result sting will return:
STX+[OK-D]+ETX+LRC @<esc>E—SET MDB CONTROLLER STATE TO ENABLE. The MDB controller/G4 will set the MDB state to ENABLE. The result sting will return:
STX+[OK-E]+ETX+LRC @<esc>K—PERFORM A HARDWARE MDB CONTROLLER RESET. The MDB controller/G4 will return the result string and then go through a hardware reset. The result sting will return:
STX+[OK-K]+ETX+LRC @<esc>I—TOGGLE MDB INTERRUPT MODE. The MDB controller/G4 will return the result string below toggling between 'ON' and 'OFF' of the interrupt mode.

| | |
|---|---|
| STX + [ON-I] + ETX + LRC | -> When toggling into the interrupt mode |
| STX + [OFF-I] + ETX + LRC | -> When toggling out of the interrupt mode |
| @<esc>I - turns mode 'ON' | |
| STX + [ON-I] + ETX + LRC | -> When toggling into the interrupt mode |
| @<esc>i - turns mode 'OFF' | |
| STX + [OFF-I] ETX + LRC | -> When toggling out of the interrupt mode |

While in the interrupt mode the MDB controller/G4 will send the result string for the @<esc>T and the @<esc>V commands shown above each time the respective data fields change.

For example, while in the interrupt mode the MDB controller/G4 will send the @<esc>T result string on the successful read of a magnetic card.

In addition, while in the interrupt mode the MDB controller/G4 will send the @<esc>V result string each time any field in the MDB TRANSACTION STRING changes.

@<esc>1—TOGGLE MDB CODE CAPTURE MODE. The MDB controller/G4 will return the result string below toggling between 'ON' and 'OFF' of the MDB CODE CAPTURE mode. This command is for diagnostic purposes only and should not be used during normal G4 operation. The intended purpose for this command is to diagnosis MDB related transaction issues during development and or testing.

| | |
|---|---|
| STX + [ON – 1] + ETX + LRC | -> When toggling into the MDB code capture mode. |
| STX + [OFF – 1] + ETX + LRC | -> When toggling out of the MDB code capture mode |

When the MDB code capture mode is switched to the 'ON' mode the following sequence of events begins:

The RAM/NOVRAM memory dedicated to the storage of vending transactions is cleared. All data (transactions) currently being stored will be erased to make room for the MDB bus codes.

The G4 will begin recording both the received MDB codes from the vending machine controller (VMC) and the sent MDB codes from the G4. There is RAM room for approximately 15 seconds of recording time.

When the MDB code capture mode is switched to the 'OFF' mode the G4 will stop recording the MDB bus codes. A buffer dump of the MDB codes exchanged between the G4 and the VMC can be viewed by executing @<esc>2 the MDB CAPTURED CODE BUFFER DUMP command.

NOTE: When you are ready to return the G4 system to the normal operation mode you should 1) insure that the MDB CODE CAPTURE mode is 'OFF' and 2) Execute the @<esc>J CLEAR MAIN MEMORY command to clear and reset the G4 main memory. The CLEAR MAIN MEMORY command is important in that the MDB codes captured are stored in the RAM/NOVRAM area and may interfere with the G4 normal record management procedures.

In addition, when the MDB capture mode is switched to 'ON' the G4 will stay in this state until either 1) the buffer area for MDB codes is filled (about 15 seconds) or 2) the MDB capture mode is switched to 'OFF'. Even if the G4 is powered 'OFF' or the <esc>K HARDWARE RESET command is issued the MDB capture mode state will not change. The reason for this is to allow the MDB capture mode to be turned "ON" and remain 'ON' capturing MDB transaction codes between the vending machine and the G4 while the vending machine and or G4 go through a power up or reset procedure.

If the G4 is in a vending transaction the TOGGLE MDB CODE CAPTURE MODE command cannot be executed to turn 'ON' the MDB capture feature. If the TOGGLE MDB CODE CAPTURE MODE command is executed during a vending session the MDB capture mode will be turned 'OFF' and result string will return:

STX+[OFF–1]+ETX+LRC

@<esc>2—MDB CAPTURE MODE BUFFER DUMP. The MDB controller/G4 will return the result string below dumping the MDB codes passed between the G4 and the vending machine controller (VMC). The output will be formatted to indicate which codes were transmitted by the VMC and which codes were transmitted by the G4. This command is for diagnostic purposes only and should not be used during normal G4 operation. The intended purpose for this command is to diagnosis MDB related transaction issues during development and or testing.

| | |
|---|---|
| STX + [MDB] + | -> Header |
| [VMC –] + VMC transmitted data | -> Data transmitted by the VMC |
| [G4 –] + G4 transmitted data | -> Data transmitted by the G4 |
| ... | |
| ETX + LRC | |

@<esc>Y—TOGGLE G4 VEND ACTIVE MODE ON/OFF. The G4 can operate in two modes of operation. In the VEND ACTIVE 'ON' mode of operation the G4 provides all the MDB interface control, audit/cashless payment support, and network connectivity. In this mode a computing platform can interact with the G4 in a hybrid role to monitor a string of user text prompts (see DISPLAY PROTOCOL) as well as execute the NON-MDB-CONTROL and some MDB-CONTROL commands.

In the VEND ACTIVE 'OFF' mode of operation the G4 can be configured and serve as an MDB controller only. In this mode both the MDB-CONTROL and NON-MDB-CONTROL commands can be executed. While in this mode of operation the computing platform operates as a master device controlling the operation and process flow of the system, and the G4 serves as a slave device interfacing to the vending machine and managing the control of the MDB interface. The result sting will return:

| | |
|---|---|
| STX + [ON – R] + ETX + LRC | -> When toggling into the VEND ACTIVE mode. |
| STX + [OFF – R] + ETX + LRC | -> When toggling out of the VEND ACTIVE mode |
| @<esc>Y - turns mode 'ON' | |
| STX + [ON – R] + ETX + LRC | -> When toggling into the VEND ACTIVE mode. |
| @<esc>y - turns mode 'OFF' | |
| STX + [OFF – R] + ETX + LRC | ->When toggling out of the VEND ACTIVE mode |

<esc>R—TOGGLE G4 VEND ASSIST MODE ON/OFF. The G4 can operate in two vending modes of operation (while the VEND ACTIVE mode is 'OFF'). In the VEND ASSIST 'ON' mode of operation the G4 will set the 'R' VEND REQUEST state flag in the MDB TRANSACTION STRING—VEND FLAG field when the G4 receives the VEND REQUEST MDB command from the vending machine's VMC. It is then the responsibility of the attached computing platform to issue either the @<esc>A+SALE-[xxxxx] command to approve the vend and provide the sale amount, or the #<esc>Q command to DECLINE the vend, referred to as VEND DENY the vend. The MDB TRANSACTION STRING should be monitored to determine when the 'R' VEND REQUEST state is set. After the determination that the VEND REQUEST state is set the VEND APPROVED or VEND DECLINED command should be executed.

In the VEND ASSIST 'OFF' mode of operation the G4 will automatically provide the VEND APPROVED response to the vending machine's VMC when the VEND REQUEST command is received from the VMC. The result sting will return:

| | |
|---|---|
| STX + [ON – R] + ETX + LRC | -> When toggling into the VEND ASSIST mode. |
| STX + [OFF – R] + ETX + LRC | -> When toggling out of the VEND ASSIST mode |
| #<esc>R - turns mode 'ON' | |
| STX + [ON – R] + ETX + LRC | -> When toggling into the VEND ASSIST mode. |
| #<esc>r - turns mode 'OFF' | |
| STX + [OFF – R] + ETX + LRC | -> When toggling out of the VEND ASSIST mode |

Default: The default condition on microcontroller reset is 'OFF'

@<esc>$—SIMULATE CASH VEND TRANSACTION. The G4 will simulate a CASH VEND transaction (see MDB spec V1.0 for CASH VEND command). The result sting will return:

STX+[OK–$]+ETX+LRC

To simulate the CASH VEND the MDB TRANSACTION STRING will be set to the following:

STX+[E0005000001250001$]+ETX+LRC

If the G4 is in a vending transaction a SIMULATE CASH VEND transaction cannot be executed. If a SIMULATE CASH VEND transaction cannot be executed the result string will return:

STX+[UNABLE–$]+ETX+LRC

@<esc>#—SIMULATE CASHLESS VEND TRANSACTION. The G4 will simulate a CURRENCY VEND transaction (see NAMA MDB spec V1.0 and V2.0 for VEND REQUEST and VEND APPROVED commands). The result sting will return:

STX+[OK-#]+ETX+LRC

To simulate the CASHLESS VEND the MDB TRANSACTION STRING will be set to the following:

STX+[E0005000001250001V]+ETX+LRC

If the G4 is in not in a vending transaction a SIMULATE CASHLESS VEND transaction cannot be executed. If a SIMULATE CASHLESS VEND transaction cannot be executed the result string will return:

STX+[UNABLE-#]+ETX+LRC

@<esc>M—TOGGLE MODEM COMMUNICATION ACCESS. The G4 will switch the serial communication ports being utilized by the computing platform to the MDB controller/G4 communication port. In this regard, the computing platform can utilize the communication port (modem and or wireless) of the MDB controller/G4. The result sting will return:

| | |
|---|---|
| STX + [ON – M] + ETX + LRC | -> When toggling into the communication mode - allowing the computing platform to use the MDB controller/G4 communication port. A communication hardware reset will also be invoked in the G4 to prepare the communication device to receive data. |
| STX + [OFF – M] + ETX + LRC | -> When toggling out of the communication mode |

NOTE: The communication parameters between the G4 are outlined above as 9600, no parity, 8 data bits, and 2 stop bits. Upon executing the @<esc>M command 'ON' the G4 switches direct access to the communication device. If for example, a 2400 baud modem is being used the device issuing the @<esc>M command will have to first change its baud rate to 2400 before the G4 modem can respond to the requests. Furthermore, upon the conclusion of a communication session before the @<esc>M command can be issued and interrupted by the G4 to switch the communications 'OFF' the baud rate of the device issuing the @<esc>M command should change its baud rate back to 9600 N, 8, 2.

@<esc>Q—SEND CURRENT TRANSACTION RECORD. The G4 will return the current transaction record. The current transaction record is a fixed length record. The parsed fields are listed below. The result sting will return:

STX+[RECORD NUMBER-TRANSACTION RECORD]+ETX+LRC
and
STX+[OK-Q]+ETX+LRC

If the G4 is not in a vending transaction a SEND CURRENT TRANSACTION RECORD transaction cannot be executed. If a SEND CURRENT TRANSACTION RECORD transaction cannot be executed the result string will return:

STX+[UNABLE-Q]+ETX+LRC

Where the parsed [record number-transaction record] fields are as follows:

| Transaction Record Format | | |
|---|---|---|
| RECORD TYPE | BYTES | DESCRIPTION |
| RECORD NUMBER | 4 bytes | Current transaction record number |
| SEPARATOR | 1 byte | Field separator '-' |
| CARD DATA/ID DATA | 37 bytes | Card data or Dial-A-Vend data |
| MERCHANT ID REFERENCE | 1 byte | Merchant ID Prefix (G4 specific typically set to '1') |
| SALE AMOUNT | 5 bytes | Transaction sale amount |
| APPROVAL CODE | 8 bytes | Transaction approval code (typically starts with AP) |
| CAPTURE ID FLAG | 1 byte | Transaction Capture Flag Transaction ID<br>0 = DO NOT CAPTURE TRANSACTION<br>1 = CREDIT CARD TRANSACTION<br>2 = SETTLEMENT DATA<br>3 = ERROR RECORD<br>4 = SETTLED CREDIT CARD TRANSACTION<br>5 = PRIVATE SYSTEM TRANSACTIONS<br>6 = NOT USED<br>7 = EMAIL TRANSACTION |
| START TIME | 8 bytes | Transaction Start Date and Time (MMDDHHMM) |
| COUNT 1 | 4 bytes | Event counter #1 i.e. copy or print count (XXXX) |
| STOP TIME | 8 bytes | Transaction Stop Date and Time (MMDDHHMM) |
| COUNT 2 | 4 bytes | Event counter #2 i.e. copy or print count (XXXX) |
| INVENTORY TOTAL | 2 bytes | Total vended inventory count |
| ITEM COLUMN 1 | 2 bytes | Vended item #1 column data |
| ITEM COLUMN 2 | 2 bytes | Vended item #2 column data |
| ITEM COLUMN 3 | 2 bytes | Vended item #3 column data |
| ITEM COLUMN 4 | 2 bytes | Vended item #4 column data |
| ITEM COLUMN 5 | 2 bytes | Vended item #5 column data |
| ITEM COLUMN 6 | 2 bytes | Vended item #6 column data |
| ITEM COLUMN 7 | 2 bytes | Vended item #7 column data |
| ITEM COLUMN 8 | 2 bytes | Vended item #8 column data |
| ITEM COLUMN 9 | 2 bytes | Vended item #9 column data |
| ITEM COLUMN 10 | 2 bytes | Vended item #10 column data |
| SPARE DATA | 2 bytes | Not Implemented |
| LRC CHECK BYTE | 1 byte | LRC check byte |

@<esc>W—SEND ALL TRANSACTION RECORD. The MDB controller/G4 will return all the transaction records beginning with 0000. The G4 will return the message 'DONE' when complete. The transaction records are a fixed length record and follow the format shown above in the @<esc>Q command. The result sting will return:

STX + [0000-TRANSACTION RECORD] + ETX + LRC
...
...
...
STX + [xxxx-TRANSACTION RECORD] + ETX + LRC
DONE Where '0000' is the first transaction record and 'xxxx' is the last transaction record.

If the G4 is in a vending transaction a SEND ALL TRANSACTION RECORD transaction cannot be executed. If a SEND ALL TRANSACTION RECORD transaction cannot be executed the result string will return:

STX+[UNABLE-W]+ETX+LRC

@<esc>R—TOGGLE VERBOSE TEXT PROMPTS ON/OFF. The G4 will switch between providing a stream of text prompts (see DISPLAY PROTOCOL) when the VERBOSE mode is turned 'ON' and disabling the transmission of the text prompts when the VERBOSE mode is 'OFF'. The result sting will return:

| | |
|---|---|
| STX + [ON – R] + ETX + LRC | -> When toggling into the VERBOSE mode. |
| STX + [OFF – R] + ETX + LRC | -> When toggling out of the VERBOSE mode |
| @<esc>R - turns mode 'ON' | |
| STX + [ON – R] + ETX + LRC | -> When toggling into the VERBOSE mode. |
| @<esc>r - turns mode 'OFF' | |
| STX + [OFF – R] + ETX + LRC | -> When toggling out of the VERBOSE mode |

@<esc>U—RETURN TO DEFAULT CONDITIONS. The G4 will return all settings to the power on/system reset default condition. The result sting will return:
    STX+[OK–U]+ETX+LRC Reset Default Conditions Include:
    INTERRUPT MODE='OFF'
    VERBOSE MODE='ON'
    VEND ACTIVE MODE='ON'
    VEND ASSIST MODE='OFF'

@<esc>P—RETURN G4 TIME AND DATE STAMP. The G4 will return the current time and date. The time and date are set by the USALIVE (host network center 808) server each time the G4 communicates with the network servers. The result sting will return:
    STX+[TIME–HHMMSS–MMDDYY]+ETX+LRC Where 'HHMMSS' is the current hour, minute, and seconds, and 'MMDDYY' is the current month, day, and year.

@<esc>G—PRINT A TEST RECEIPT FOR CURRENT TRANSACTION. The G4 will internally call the print receipt routine to print a test receipt. The result sting will return:
    STX+[OK–G]+ETX+LRC @<esc>J—CLEAR MAIN MEMORY TRANSACTIONS. The G4 main memory will be cleared. The result sting will return:
    STX+[OK–J]+ETX+LRC @<esc>N—FIND A BLANK RECORD. The G4 finds and sets active the next available blank transaction record. The result sting will return:
    STX+[OK–N]+ETX+LRC The G4 must have the MDB state set to 'E' for ENABLED in order to find a blank record. A new record cannot be started while in a vending transaction. If a FIND BLANK RECORD command cannot execute the result string will return:
    STX+[UNABLE–N]+ETX+LRC @<esc>B—START A VEND SESSION. Provided the G4 VEND ACTIVE 'ON' mode is set, the G4 will start a vend session. The sequence to starting a vend session include:
    G4 finds the next available blank transaction record
    G4 loads the default data into the transaction record
    G4 loads as the CARD DATA/ID DATA->'G4-VEND'
    G4 issues the BEGIN SESSION command to the MDB interface.

The result sting will return:
    STX+[OK–B]+ETX+LRC

The G4 must have the MDB state set to 'E' for ENABLED in order to start a session. If a session cannot be started the result string will return:
    STX+[UNABLE–B]+ETX+LRC @<esc>A+STX+DIAL–+[ID DATA Up to 30 bytes]+ETX+LRC—START A DIAL-A-VEND SESSION. Provided the G4 VEND ACTIVE 'ON' mode is set, the G4 will start a vend session. The sequence to starting a vend session include:
1. G4 finds the next available blank transaction record
2. G4 loads the default data into the transaction record
3. G4 loads as the CARD DATA/ID DATA the '[DV-DIAL-]+[ID DATA Up to 30 bytes]' sent as part of the command.
4. G4 issues the BEGIN SESSION command to the MDB interface.

The result sting will return:
    STX+[OK–A]+ETX+LRC

The G4 must have the MDB state set to 'E' for ENABLED in order to start a dial-a-vend vending transaction. A new vending transaction cannot be started while in a vending transaction. If a dial-a-vend command cannot be executed the result string will return:
    STX+[UNABLE–A]+ETX+LRC If the LRC character does not match, or the correct ETX+LRC combination does not occur at all or in a timely fashion the result string will return:
    STX+[NAK–A]+ETX+LRC @<esc>A+STX+CARD–+[UP TO 37 BYTE TRACK 2 DATA]+ETX+LRC—START A CASHLESS TRANSACTION OR CREDIT CARD TRANSACTION. Provided the G4 VEND ACTIVE 'ON' mode is set, the G4 will start a vend session. The sequence to starting a vend session include:
1. G4 finds the next available blank transaction record
2. G4 loads the default data into the transaction record
3. G4 loads as the CARD DATA/ID DATA the '[CREDIT CARD DATA Up to 37 bytes]' sent as part of the command.
4. Upon credit card APPROVAL the G4 issues the BEGIN SESSION command to the MDB interface.

The result sting will return:
    STX+[OK–A]+ETX+LRC

The G4 must have the MDB state set to 'E' for ENABLED in order to start a vending transaction. A new vending transaction cannot be started while in a vending transaction. If a credit card command cannot be executed the result string will return:
    STX+[UNABLE–A]+ETX+LRC If the LRC character does not match, or the correct ETX+LRC combination does not occur at all or in a timely fashion the result string will return:
    STX+[NAK-A]+ETX+LRC @<esc>A+STX+SALE–+[5 BYTES OF DATA]+ETX+LRC—The VEND APPROVED command has two modes of operation. If the vender interface is set to MDB INTERFACE only the 'R' REQUEST VEND APPROVAL mode is supported. That is the G4 is connected to vending equipment by way of the MDB INTERFACE connector and the firmware select is the MDB INTERFACE and the VEND ASSIST MODE='ON'.

If the vending interface is set to the BILL PULSE INTERFACE or the BILL SERIAL INTERFACE the 'R' REQUEST VEND MODE and the 'U' USER SELECTED AMOUNT MODES are supported. That is the G4 is not connected to vending equipment by way of the MDB INTERFACE connector and the firmware select is set to either the BILL SERIAL INTERFACE or the BILL PULSE INTERFACE then the VEND APPROVED command operates as described above when the VEND ASSIST MODE='ON'.

'R'—REQUEST VEND MODE—The VEND APPROVE response should be sent in response to the MDB TRANSACTION STRING indicating the 'R' VEND REQUEST flag state. The 'R' VEND REQUEST flag state is set when the VMC sends the G4 the VEND REQUEST MDB command and the VEND ASSIST MODE='ON'. The 5 data bytes should be in the form '00000' and should be the desired amount for the G4 to charge for the vended item. The VMC will report by way of the MDB TRANSACTION STRING the price and column of the vended item requested, in accordance with the MDB transactions formatting. The price reported would be the value of the item as set in the vending machine. If a charge equal to the vending machines reported price is desired, for example '00125' for $1.25, then the correct VEND APPROVED response should be as follows:

@<esc>A+STX+SALE–00125+ETX+LRC

If a different price is to be charged for the item the VEND APPROVED response can be altered. For example:

@<esc>A+STX+SALE–00000+ETX+LRC—For a free vend $0.00

@<esc>A+STX+SALE–00300+ETX+LRC—For a $3.00

@<esc>A+STX+SALE–09999+ETX+LRC—For a $99.99

NOTE: In lieu of having to send the @<esc>A+STX+SALE command as a VEND APPROVE response, a NON-RESPONSE format can also be implemented. In a NON-RESPONSE format not responding to a system 500 REQUEST VEND APPROVE within a preset time period can be interpreted as VEND APPROVE with a sale amount of the MDB TRANSACTION STRING—SALE PRICE amount. In this regard, the MDB TRANSACTION STRING—SALE PRICE amount is typically the sale price reported by the vending equipment when a user makes a selection and a MDB VEND REQUEST is generated.

'U'—USER SELECTED AMOUNT—To start a vending session in the BILL SERIAL INTERFACE or BILL PULSE INTERFACE configurations the VEND APPROVED command can be used to select a USER amount (The amount to charge the user. Successive VEND APPROVED commands can be issued to change the USER SELECTED AMOUNT. In this regard, the MDB TRANSACTION STRING will reflect the VEND SALE AMOUNT and the VEND FLAG field state will be set to 'U'. This indicates that a transaction amount has been selected. Provided the INHIBIT pin is enabled (LOW STATE) the G4 will now accept a card for payment. If or when the card is approved the 'U' VEND FLAG field state will change to 'R' REQUEST VEND APPROVAL if the VEND ASSIST MODE='ON'. If the VEND ASSIST MODE="OFF" then upon transaction approval the vend will be completed.

If the G4 terminal is connected to a BILL SERIAL INTERFACE or BILL PULSE INTERFACE upon card approval and or REQUEST FOR VEND APPROVAL the users select amount will be transferred via the bill interface or vending equipment interface and the sale amount of the transaction adjusted accordingly. If the G4 is configured such that no connection is made to the BILL interface connector then consideration should be given to either providing a control signal to the INHIBIT line to enable and disable the terminal accordingly or jumping GND to INHIBIT to enable the G4 terminal.

The range of the sale amount can be from $0.00 formatted as '00000' to $99.99 formatted as '09999'. Other sales ranges can be implemented.

The G4 will issue the VEND APPROVED MDB command to the VMC and the MDB TRANSACTION STRING will be updated as appropriate. The G4 will return the result string:

STX+[OK–A]+ETX+LRC

View Range of Memory

<esc>A+STX+VIEW–+['M' 1 BYTE MEMORY CODE]+['xx' 2 CHARACTERS FOR EEROM, 'xxxx' 4 CHARACTERS FOR MAIN MEMORY REPRESENTING # OF BYTES TO RETURN (HEX)]+ ['xxxxxx' UP TO 6 DIGIT MEMORY LOCATION (HEX)]+ETX+LRC The MEMORY VIEW command provides a means for requesting and obtaining current memory values from the G4 terminal. The 1 byte MEMORY CODE selects the memory device to return the value from. Valid MEMORY CODES are shown in the table below. The up to four-bytes (2 bytes for EEROM, 4 bytes for MAIN MEMORY) of data representing the # OF BYTES TO RETURN is a HEX number of the number of bytes that will be returned starting with the MEMORY LOCATION specified. The up to six-byte hexadecimal value that represents the MEMORY LOCATION is the physical address in memory to be viewed. The MEMORY VALUE returned in the result code in the value currently stored in the MEMORY LOCATION.

The table below indicates the valid MEMORY CODES and a description of which device each code accesses.

FIG. 12 Memory device table

| MEMORY CODE | Memory device description |
| --- | --- |
| A | A = Display in ASCII EEROM upper word byte |
| B | B = Display in HEX EEROM upper word byte |
| C | C = Display in ASCII main memory |
| D | D = Display in HEX main memory |

G4-e-Port™ main memory is segmented as follows:

| | |
| --- | --- |
| $000000-$01FFFF | G4 Flash (Application Code) |
| $800000-$807FFF | G4 and G5 NovRAM |

G5-Payment Module main memory is segmented as follows:

| | |
| --- | --- |
| $000000-$03FFFF | G5/Payment Module Flash (Application Code) |
| $800000-$807FFF | G4 and G5 NovRAM |

For Example:

View of EEROM 'A' or 'B'

@<esc>A+STX+VIEW–A0100+ETX+LRC

@<esc>A+STX+VIEW–B0100+ETX+LRC will return the 1 word (2 bytes) stored in the EEROM address $00.

The G4 will return the result string as follows:
STX+[OK−A]+[1 WORD (16 BIT) MEMORY VALUE]+ETX+LRC View of main memory 'C' or 'D'
@<esc>A+STX+VIEW−C0003080000+ETX+LRC
@<esc>A+STX+VIEW−D0003080000+ETX+LRC
will return the 3 bytes stored in the MAIN MEMORY address $080000.
The G4 will return the result string as follows:
STX+[OK−A]+[3 BYTES OF MEMORY]+ETX+LRC Save Range of Memory
@<esc>A+STX+SAVE−+['M' 1 BYTE MEMORY CODE]+['xx' 2 CHARACTERS FOR EEROM, 'xxxxxx' 6 CHARACTERS FOR MAIN MEMORY]+['x, . . . x' UP TO 50 BYTES OF DATA]+ETX+LRC—The MEMORY SAVE command provides a means for writing data into the G4 memory. The 1 byte MEMORY CODE selects the memory device to write the DATA. Valid MEMORY CODES are shown in the table above. The two to six byte hexadecimal value that represents the MEMORY LOCATION is the physical address in memory to be written. The up to 50 BYTES OF DATA will be written into the selected memory device starting at the MEMORY LOCATION specified. 'XX' can be inserted for any data byte pair. The presence of the 'XX' will cause the data currently in a specified memory location to remain unchanged.

For Example:

Write to EEROM:
<esc>A+STX+SAVE−AC1XXFF+ETX+LRC
Will leave the EEROM high byte of memory location $C1 unchanged ('XX') and write the hex value $FF to the EEROM lower byte address location $C1.
The G4 will return the result string as follows:
STX+[OK−A]+ETX+LRC Write to Main Memory:
@<esc>A+STX+SAVE−C080000XXFF552A+ETX+LRC
Will leave the MAIN MEMORY first byte of memory location at $080000 unchanged ('XX'), location $080001 will be written with the hex value $FF, the third byte at $080002 will be written with a $55, and the fourth byte at $080003 will be written with a $2A.
The G4 will return the result string as follows:
STX+[OK−A]+ETX+LRC Send Data to the Payment Module Display
@<esc>A+STX+DISP−+[1 BYTE LCD LINE ('1' or '2')]+[UP TO 'xxxxxxxxxxxxxxxx' 16 BYTES OF DATA]+ETX+LRC—The display command allows data to be written to the G4 auxiliary display board, such as card reader interface processor board 312. Electrically a card reader assembly having a card reader, display board and optional printer can be plugged into the G4-eport auxiliary printer port, such a board can be card reader interface processor board 312. In this regard when the display command is executed data is sent out the printer port to the attached card reader assembly. In addition to providing 2 lines of 16 character alphanumeric text a series of card reader assembly control codes are available. The card reader assembly (card reader interface processor board 312) control codes (shown below) enable control of the LED on the face of the card reader and transaction button, beep the beeper, clear the screen, and control print functionality, among other things.

Table of Card Reader Control Codes

| CARD READER CONTROL CODES (hex) | |
|---|---|
| $0E + $0E + $0E | Beep Beeper |
| $0D + $0D + $0D | Indicates print data is to follow (start print data) |
| $0C + $0C + $0C | Indicates print data is concluded (end print data) |
| $0B + $0B + $0B | Turn 'ON' - blink transaction button LED |
| $0A + $0A + $0A | Turn 'OFF' transaction button LED |
| $09 + $09 + $09 | Clear LCD display screen |
| $08 + $08 + $08 | Turn 'ON' card reader LED |
| $07 + $07 + $07 | Turn 'OFF' card reader LED |

To issue a control command to the card reader assembly the appropriate code must be sent successive at least three character in a row. For example to beep the beeper the following display command can be issued:
@<esc>A+STX+DISP−1+$0E+$0E+$0E+ETX+LRC To display 'Sample Message 1' text of line 1 of the LCD display the following display command can be issued:
@<esc>A+STX+DISP−1+Sample Message 1+ETX+LRC To display 'Message Line 2' text of line 2 of the LCD display the following display command can be issued:
@<esc>A+STX+DISP−2+Message Line 2+ETX+LRC In each case the result string will return:
STX+[OK−A]+ETX+LRC NOTE: When the card reader assembly is first powered up the current version of software running on the display card will appear on the LCD display. The LCD will not display and text until a display line of text is written to line 1. More specifically the display board is initialized upon receipt of the $80 character that is part of the line 1 formatting. Until the $80 character is received the card reader display codes will operate but no text writes to LCD line 2 will be displayed. Consideration should be given to writing a line of text (or blank spaces) to LCD line 1 with the DISP-1 display command to initialize the display board after power-up.

@<esc>L—REQUEST USALIVE SETTING DATA. The G4 will return a string of USALIVE setting data. USALIVE setting data can be referred to as system 500 terminal management data. USALIVE can be referred to as the host network center 808. The USALIVE setting data includes terminal configuration, setting, and parameter data maintained on the USALIVE network and passed to the terminal each time the terminal communicates to the USALIVE network. USALIVE setting data can include transaction data. Changes to the data are managed on the server. The result sting will return:
STX+[START−]+[USALIVE SETTING DATA]+[−END]+ETX+LRC @<esc>3—DEX CODE CAPTURE MODE (FULL FORMAT). The DEX controller/G4 will return the result string below toggling between 'ON' and 'OFF' of the DEX CODE CAPTURE mode. This command is for diagnostic purposes only and should not be used during normal G4 operation. The intended purpose for this command is to diagnosis DEX related transaction issues during development and or testing. The @<esc>3 command obtains DEX data in a free format capturing the handshake and protocol exchanges (ACK, NAK, DLE, etc.) in addition to the DEX data. At the conclusion of the DEX data transfer the DEX CAPTURE MODE is automatically toggled 'OFF'. In most cases there will be no need to execute a second @<esc>3 command to toggle the DEX mode 'OFF'.

| | |
|---|---|
| STX + [ON – 3] + ETX + LRC | -> When toggling into the DEX code capture mode |
| STX + [OFF – 3] + ETX + LRC | -> When toggling out of the DEX code capture mode |

When the DEX code capture mode is switched to the 'ON' mode the following sequence of events begins:

The RAM/NOVRAM memory dedicated to the storage of DEX data is cleared.

The G4 will begin recording both the received DEX codes from the vending machine controller (VMC) and the sent DEX codes from the G4. There is RAM room for approximately 6K bytes of recorded DEX data.

When the DEX code capture mode is switched to the 'OFF' mode or automatically switches to the 'OFF' mode at the end of the DEX transfer the G4 will stop recording the DEX bus codes. A buffer dump of the DEX codes exchanged between the G4 and the VMC can be viewed by executing the @<esc>5 the DEX CAPTURED CODE BUFFER DUMP command.

@<esc>4—DEX CODE CAPTURE MODE (PARSED FORMAT). The DEX controller/G4 will return the result string below toggling between 'ON' and 'OFF' of the DEX CODE CAPTURE mode. This command is for diagnostic purposes only and should not be used during normal G4 operation. The intended purpose for this command is to diagnosis DEX related transaction issues during development and or testing. The @<esc>4 command obtains DEX data in a parsed, pure format (free from all handshake and protocol exchanges (ACK, NAK, DLE, etc.)). At the conclusion of the DEX data transfer the DEX CAPTURE MODE is automatically toggled 'OFF'. In most cases there will be no need to execute a second @<esc>4 command to toggle the DEX mode 'OFF'.

| | |
|---|---|
| STX + [ON – 4] + ETX + LRC | -> When toggling into the DEX code capture mode |
| STX + [OFF – 4] + ETX + LRC | -> When toggling out of the DEX code capture mode |

When the DEX code capture mode is switched to the 'ON' mode the following sequence of events begins:

The RAM/NOVRAM memory dedicated to the storage of DEX data is cleared.

The G4 will begin recording both the received DEX codes from the vending machine controller (VMC) and the sent DEX codes from the G4. There is RAM room for approximately 6K bytes of recorded DEX data.

When the DEX code capture mode is switched to the 'OFF' mode or automatically switches to the 'OFF' mode at the end of the DEX transfer the G4 will stop recording the DEX bus codes. A buffer dump of the DEX codes exchanged between the G4 and the VMC can be viewed by executing the @<esc>5 the DEX CAPTURED CODE BUFFER DUMP command.

@<esc>5—DEX CAPTURE MODE BUFFER DUMP. The DEX controller/G4 will return the result string below dumping the DEX codes passed between the G4 and the vending machine controller (VMC). The output will be formatted to indicate the codes transmitted by the VMC and the G4. This command is for diagnostic purposes only and should not be used during normal G4 operation. The intended purpose for this command is to diagnosis DEX related transaction issues during development and or testing.

| | |
|---|---|
| STX + [DEX] + | -> Header |
| [VMC –] + VMC transmitted data | -> Data transmitted by the VMC |
| [G4 –] + G4 transmitted data | -> Data transmitted by the G4 |
| . . . | |
| ETX + LRC | |

If DEX data is obtained with the @<esc>4 command the DEX data will be parsed to remove all handshake data and VMC/G4 protocol passing. The DEX data will be pure and presented in ASCII format. If the DEX data is obtained with the @<esc>3 command the DEX data will include all the handshaking data and VMC/G4 protocol passes (ACK, NAK, DLE, etc.).

<esc>C—ENTER SERVICE MODE ROUTINE—The G4 will return the following result string and then enter the service mode.

STX+[OK–C]+ETX+LRC

<esc>D—SYSTEM INITIALIZATION COMMAND—The G4 will return the following result string and then perform a system initialization sequence.

STX+[OK–D]+ETX+LRC

The system initialize sequence will clear memory and reload initial condition registers. The USALIVE default phone number will be loaded into memory and the G4 will be placed in the CALL HOME mode. Before correct terminal operation can be restored the G4 will require communication with the USALIVE servers.

<esc>E—DISPLAY SERIAL NUMBER AND FIRMWARE VERSION—The G4 will return the following result string showing the G4 serial number and firmware version number.

STX+[OK–E]+ETX+LRC

Followed by the G4 serial number and firmware version number.

<esc>F—SET CALL HOME FLAG TRUE—INITIATE CALL HOME—The G4 CALL HOME flag will be set directing the terminal to begin a timer. The timer is a USALIVE setting that delays the call in process after the CALL HOME flag is set. The result code returned will be as follows:

STX+[OK–F]+ETX+LRC

The G4 will then in time attempt a communication to the USALIVE server.

<esc>G—RETURN CURRENT STATE OF CALL HOME FLAG—The G4 will return the following result code indicating the current state of the CALL HOME flag. The states can be either TRUE or FALSE. TRUE indicating the G4 is preparing to place a call to the USALIVE servers.

STX+[TRUE-F]+ETX+LRC
or . . .
STX+[FALSE-F]+ETX+LRC

<esc>H—CLEAR THE CALL HOME FLAG—SET TO FALSE—The G4 will reset the CALL HOME flag to FALSE. The following result code will be returned.
STX+[OK–H]+ETX+LRC
If the G4 terminal is experiencing a situation that under normal circumstance would trigger the G4 terminal to CALL HOME to the USALIVE servers, such as a DEX alarm condition is detected, or the G4 has a full memory of transaction the CALL HOME flag will automatically be set back to TRUE.

<esc>I—RETURNS THE CURRENT SERVICE STATE OF THE TERMINAL—The G4 will return the following result codes indicating the terminal is either IN or OUT of service at the present moment.
STX+[IN-I]+ETX+LRC
or . . .
STX+[OUT-I]+ETX+LRC

<esc>J—TOGGLES THE CURRENT SERVICE STATE (IN/OUT)—The G4 will toggle the current service state from either IN to OUT or from OUT to IN. The result string returned will be as follows.
STX+[IN-J]+ETX+LRC
or . . .
STX+[OUT-J]+ETX+LRC

<esc>K—SEND CURRENT LOCAL AUTHORIZATION RECORDS—The G4 will return the result string that includes the record number, last six digits of each card, and the 'A' or 'D' suffix indicating APPROVAL or DECLINED record data as follows:
STX+[OK–K]+ETX+LRC
and
STX+[xxxx-LAST SIX DIGITS OF CARD NUMBER-A or D]+ETX+LRC
Where 'xxxx' is the current record number.

<esc>L—SEND COMPLETE LOCAL AUTHORIZATION DATABASE—The G4 will return the result string that includes the record number, last six digits of each card, and the 'A' suffix indicating APPROVAL record data as follows:

---

STX + [OK – K] + ETX + LRC
and
STX + [xxxx-LAST SIX DIGITS OF CARD NUMBER-A or D] + ETX + LRC
. . .
. . .
. . .
STX + [yyyy-LAST SIX DIGITS OF CARD NUMBER-A or D] + ETX + LRC
DONE

---

Where 'xxxx' is the first record number and 'yyyy' is the last record number.

<esc>M—CLEAR DECLINED CARD PORTION OF LOCAL AUTHORIZATION DATABASE—The G4 terminal will clear the DECLINED card records in the LOCAL AUTHORIZATION DATABASE and return the following result code:
STX+[OK–M]+ETX+LRC

<esc>N—CLEAR APPROVAL CARD PORTION OF LOCAL AUTHORIZATION DATABASE—The G4 terminal will clear the APPROVAL card records in the LOCAL AUTHORIZATION DATABASE and return the following result code:
STX+[OK–N]+ETX+LRC

<esc>0 O—INITIATE A DEX QUERY MODE INQUIRY—The G4 will issue the DEX QUERY MODE string to the attached VMC. See the EVA-DTS DEX protocol standard for details on the DEX QUERY MODE of operation. The G4 will react to the returned DEX QUERY MODE result from the VMC and issue the following result string:
STX+[OK–O]+ETX+LRC

<esc>P—CLEAR G4 CALL-IN FLAGS—This command clears the G4 CALL-IN flags associated with having the terminal initiate a call to USALIVE. The G4 will issue the following result string:
STX+[OK–P]+ETX+LRC

<esc>Q—VEND DENY—This command is issued to instruct the G4 to VEND DENY declining the vend request that has been received from the vending machine VMC. See the MDB TRANSACTION STRING 'R' state above. The G4 will issue the following result string:
STX+[OK–Q]+ETX+LRC

<esc>S—SEND BUTTON STATUS—This command will send the current button status for the 'AAA' BUTTON 1 and 'BBB' BUTTON 2. If a button has not been pressed (since cleared with the #<esc>T) a 'F'alse indication will be sent. If the button has been pressed a 'T' rue indication will be sent. The G4 will issue the following result string:
STX+[BUTTON–]+['T' or 'F' for the AAA BUTTON 1 STATUS]+['T' or 'F' for the BBB BUTTON 2 STATUS]+ETX+LRC For example:
STX+BUTTON–TF+ETX+LRC
Indicates that BUTTON 1 has been pressed and that BUTTON 2 has not been pressed.

<esc>T—CLEAR BUTTON STATUS—This command will clear the button status for the 'AAA' BUTTON 1 and 'BBB' BUTTON 2. Clear the buttons will set the status flags to 'F'alse. The G4 will issue the following result string:
STX+[OK–T]+ETX+LRC AAA—END SESSION AND PRINT RECEIPT. A session started when the G4 is in the VEND ACTIVE 'ON' mode is terminated and a receipt optionally printed by sending a string of 'AAA . . . '. The correct use of this command should be to send a string of at least six 'A' characters. Though the G4 is only looking for a combination of three consecutive 'A's sending more is preferred. This command can also be used in the service mode to select menus and menu items.

BBB—BUTTON 2 PRESS. While in the service mode sending a string of 'BBB . . . ' has the same effect as inserting a card in the card reader to advance a menu selection or setting. The correct use of this command should be to send a string of at least three 'B' characters.

G4 Text Display Prompts

Text Display Overview:
When the G4 is in the VERBOSE 'ON' mode the G4 (system 500) will send text messages out of the serial port to a display device. The display device can be the computing platform. The text messages correspond to the activity of the G4. For example, when the G4 is ready to accept cards a text prompt message of 'Please Swipe', 'A Valid Card' may be displayed.

To simplify the interface and functionality requirements of the computing platform the text prompts from the G4 can be captured and displayed on the computing platform display. Doing so alleviates the need for the computing platform to ascertain and or determine what message should be displayed to the user. In addition, allowing the G4 to manage the vending transaction, MDB interface, and text prompts removes the need for the computing platform to get involved in the vending transaction.

The text format display protocol below illustrates how the G4 sends text prompts. The selection of the control characters is consistent with the operating functionality of many text LCD displays.

Communication Interface:

Shown in FIGS. 1A and 1B are external views of the G4. The display port/interactive interface port provides the interconnectivity to external devices and computing platforms for the purpose of control as outlined above and for display control as outlined in this section and its subsections.

The display port/interactive interface is a DB-9 pin male connector. As shown below the port is a hybrid serial port with power tap for low current external devices.

Connector Pin Out

| PIN # | PIN ID | DESCRIPTION |
| --- | --- | --- |
| Pin 1 | Not Used | |
| Pin 2 | Rxd | Receive Input To G4 |
| Pin 3 | Txd | Transmit Output From G4 |
| Pin 4 | Not Used | |
| Pin 5 | GND | |
| Pin 6 | +5 VDC | Power 300 ma Max. |
| Pin 7 | CTS | Clear To Send Input To G4 |
| Pin 8 | RTS | Request To Send Output From G4 |
| Pin 9 | Optional + Vprinter | With Additional Power Supply |

The communication pins Rxd, Txd, CTS, and RTS conform to RS232 standards. A minimum of Rxd, Txd, and GND are required to implement serial communication between the G4 and a computing platform. The RTS and CTS lines only come into play from a flow control prospective when receipt-data is being sent from the G4. CTS and RTS are implemented in such a way as to allow a receipt printer that has little to no printer buffer to control the flow of data. CTS and RTS have no other purpose in non-print data communications and can be ignored or left unimplemented.

Display and Control Codes:

The G4 will send a series of display and control codes to indicate when screen initializing and formating could occur. In interpreting the display and control codes the computing device will know when to blank the display area and as appropriate when and where to locate cursor positions.

The display and control codes are sent from the G4 as a string of hex characters. The table of display control codes is as follows:

Table of Display Control Codes

| DISPLAY CONTROL CODES | DESCRIPTION |
| --- | --- |
| $FE + $FE + $FE | Beep Beeper |
| $FD + $FD + $FD | Indicates print data is to follow (start print data) |
| $FC + $FC + $FC | Indicates print data is concluded (end print data) |
| $FB + $FB + $FB | Indicates a transaction is active - used to start a LED or set a status indicator to reflect a transaction is active. This command can be used to indicate to a user to press an 'END' button to end vend session. |
| $FA + $FA + $FA | Indicates a transaction is NOT active. If a LED or status indicator is 'ON' resultant from the above $FB command this command should be interrupted as negating the $FB command. |
| $F9 + $F9 + $F9 | Clear display area. If a text LCD is being used this command could indicate when a display initialization process could be started. Such a process has the effect of initializing the LCD and clearing the display area. |
| $F7 + $F7 + $F7 | Indicates a transaction is ready to be started. Such is the case when the MDB interface indicates the G4 is ENABLED to conduct a vend, and the G4 is ready to start a transaction. This command can be used to indicate to a user by way of LED or status indicator that the G4 is ready to accept command and or magnetic card to start a vending transaction. |
| $F6 + $F6 + $F6 | Indicates the G4 is not ready to start a vending transaction. If a LED or status indicator is 'ON' resultant from the above $F7 command this command should be interrupted as negating the $F7 command. |

Text Prompt Format:

The G4 supplies text prompts in a fixed format. The format supports two lines of text each line being a maximum of 16 characters. The format includes a leading character, which indicates the line (line 1 or 2) the text should be displayed on, up to 16 characters of text to be displayed, and a trailing character to indicate the end of the text message. When possible the text message should be formatted to contain 16 bytes. Leading spaces and trailing spaces can be used to position the text message and format the text string to 16 bytes.

The leading character conforms to the format supported by many text LCD display modules. The leading character will be a hex $80 to indicate the text message should be displayed on line 1 of the display area. A hex $C0 will indicate the text message should be displayed on line 2 of the display area.

The trailing character will be a hex $F8. The trailing character indicates the end of the text message.

Text message format:

| | |
| --- | --- |
| Lead Character = | $80 – Line 1 |
| | $C0 – Line 2 |
| Trailing Character = | $F8 |
| [Lead Character] + [Up to 16 bytes of text message] + [Trailing Character] | |

-continued

| Example: | $80 + [ Swipe A Valid ] + $F8 |
| | $C0 + [ Credit Card ] + $F8 |

The above will display 'Swipe a Valid' on line 1 of the display area, and 'Credit Card' on line 2 of the display area.

Cursor Display Codes

The G4 uses a series of display codes to locate the position of the cursor. There are a maximum of 32 cursor positions—two rows of 16 characters. In addition there are cursor display codes to turn 'ON' a flashing cursor, turn 'ON' an underline cursor (show cursor), and to turn 'OFF' the cursor (hide cursor). The codes are similar to those used for typical text LCD displays.

To locate the cursor in the display area the table below illustrates the hex code and corresponding cursor location.

| | Column 1 ← | | | | | | | | | | | | | | → Column 16 |
|---|---|---|---|---|---|---|---|---|---|---|---|---|---|---|---|
| Row 1 | $80 | $81 | $82 | $83 | $84 | $85 | $86 | $87 | $88 | $89 | $8A | $8B | $8C | $8D | $8E | $8F |
| Row 2 | $C0 | $C1 | $C2 | $C3 | $C4 | $C5 | $C6 | $C7 | $C8 | $C9 | $CA | $CB | $CC | $CD | $CE | $CF |

As an example, if a hex $82 is received from the G4 this would indicate the cursor location is on ROW 1, COLUMN 3.

This 'ON'/'OFF' control corresponds to the view ability and style of the cursor. An 'ON' setting makes the cursor viewable, an 'OFF' setting makes the cursor invisible. The table below shows the various cursor control codes.

Cursor Control Codes

| CURSOR TYPE | CONTROL | HEX CODE |
|---|---|---|
| Show Cursor | ON | Hex $0E |
| Hide Cursor | OFF | Hex $0C |
| Cursor Flash | ON | Hex $0D |

Figure 6A:
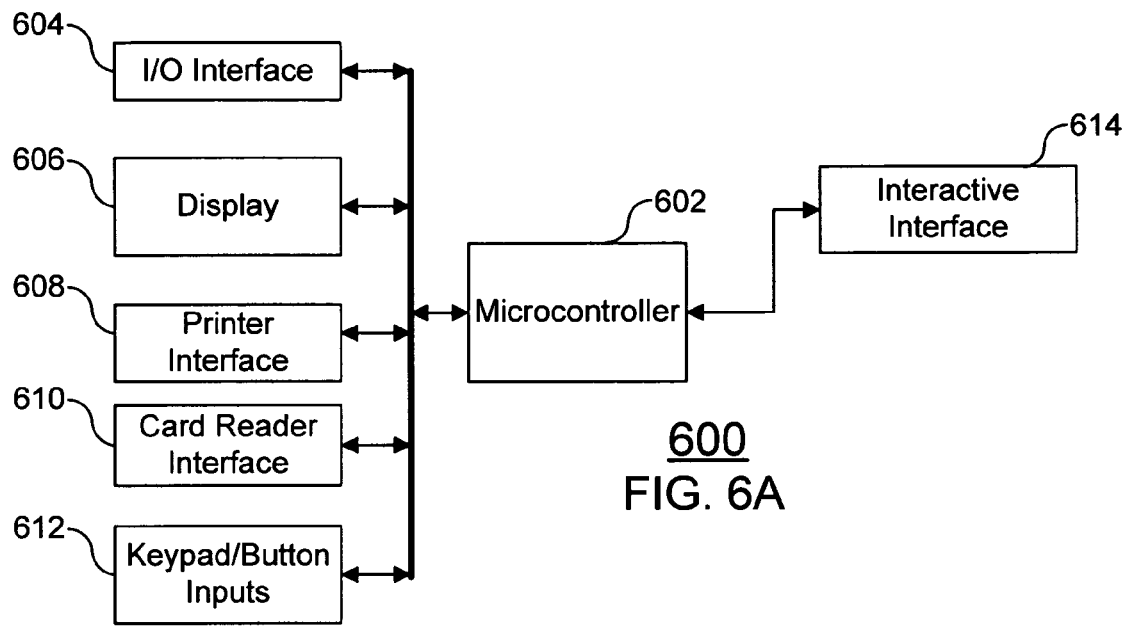
FIG. 6A there is shown card reader and user interface system 600.

Referring to FIG. 6A there is shown a card reader and user interface system 600. The card reader and user interface system 600 can be manufactured into a card reader processor interface board 312 and as shown in FIG. 3B fastened to the card reader assembly. In an exemplary embodiment system 600 is a computing platform that interconnects with system 500's interactive interface 532. In this regard the credit card and user interface 600 provide a user with user interface and display means for transacting a cashless transaction.

Interconnected with microcontroller 602 can be an input and output (I/O) interface 604. I/O interface 604 can be a plurality of data communication lines and or a plurality of communication ports such as RS232, RS485, or other similar I/O interfacing configurations. In an exemplary embodiment I/O interface 604 can be used to implement electrical interface connections to other peripheral devices. Microcontroller 602 can be any suitable microcontroller, or microprocessor. In an exemplary embodiment a microcontroller 602 can be a MICROCHIP PIC16F876-20/SP, PIC16C76-20/SP, ZILOG, MOTOROLA, UBICOM, INTEL or other similar microcontroller or microprocessor.

Interconnected with microcontroller 602 can be a display 606. Display 606 can provide message prompts and other visual information to a user. Display 606 can be any suitable display, LCD display, or flat panel display. In an exemplary embodiment a display 606 can be an OPTREX DMC-1 6202-NY-LY or a 16×2 line LCD character display.

A printer interface 608 can be interconnected with microcontroller 602. A printer interface 608 can be a serial communication style or Centronic style interface. In an exemplary embodiment printer interface 608 can be utilized to print receipts, coupons, and other print data.

Interconnected with microcontroller 602 can be a card reader interface 610. Card reader interface 610 can support a variety of card reader interfaces and protocols including for example and not limitation bit strobe type of card readers. Bit strobe type of card readers read predefined tracks of data from a magnetic card. To read track data the card reader can incorporate a plurality of DATA lines and DATA CLOCK lines to transfer magnetic card data. Card reader interface 610 can also support serial communications style card readers. Serial communication style card reader can incorporate TRANSMIT, RECEIVE, CLEAR TO SEND, REQUEST TO SEND control lines to transfer card data to system 500 via data communication between the interactive interfaces 532 and 614. Such magnetic card readers can include those manufactured for or by XICO, MAGTEK, NEURON, or other similar or suitable card reader.

Interconnected with microcontroller 602 can be a plurality of keypad and button inputs 612. Push button switch 308 can be electrically interconnected with button inputs 612.

An interactive interface 614 can be interconnected to microcontroller 602. The interactive interface 614 operates in similar form and function to interactive interface 532.

Figure 6B:
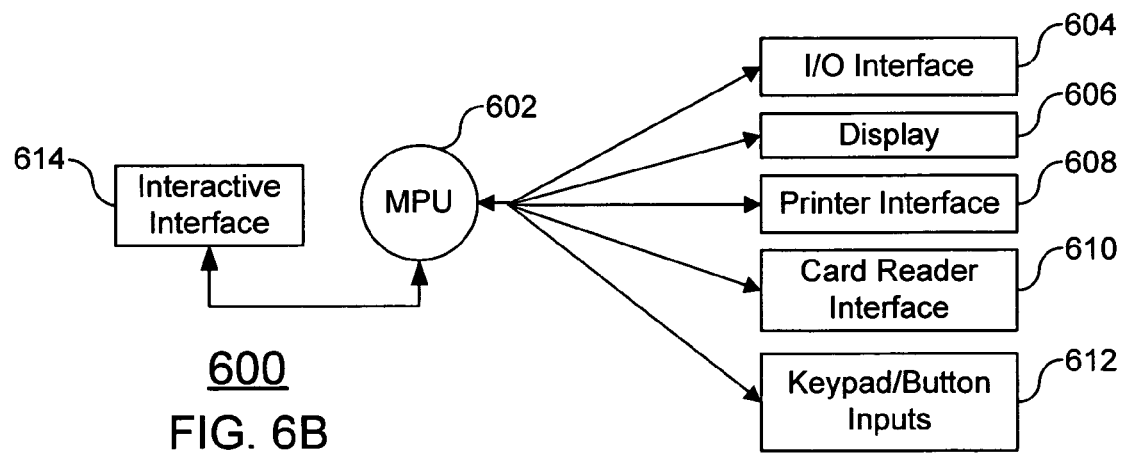
FIG. 6B there is shown a card reader and user interface system 600 data communication routing switch.

Referring to FIG. 6B there is shown a card reader and user interface system 600 data communication routing switch. In an exemplary embodiment system 600 is manufactured onto the card reader and user interface board 312. Furthermore, system 500 is manufactured into VIU 100. The card reader assembly and optional printer assembly are then installed into vending equipment in such a way as to allow user access to the front faceplate 302 of the card reader assembly. Since in many cases there is little room in the vending equipment door area it is more convenient to mount the VIU 100 assembly in a different location within the vending equipment. In order to facilitate correct operation of the card reader assembly it must be electrically connected to the VIU 100. To minimize the number of electrical connection to a single cable connected between the systems 500 and 600 a cable connection between interactive interfaces 532 and 614 can be implemented.

To utilize a single data communication line (transmit line and receive line) a plurality of different types of data need to be combined into a single data stream. To effectuate the combination of data into a single data stream the interactive interface communication protocol shown in the table above can be employed. To decode the data stream and route the data to its correct destination device the data communication routing switch in FIG. 6B can be implemented.

Referring to FIG. 6B there is shown an interactive interface 614 interconnected with microcontroller 602. Microcontroller 602 receives the data communication stream from the system 500's interactive interface 532 and by way of the interactive interface protocol shown in the table above decodes and routes the data to the appropriate peripheral devices. Peripheral devices shown include I/O interface 604, display 606, printer interface 608, card reader interface 610, and keypad and button inputs 612.

For example and not limitation print data can be packaged with the format and control codes outlined in the interactive interface protocol and specification shown in the table above. Upon the data arriving at microcontroller 602, microcontroller 602 can decode the data as print data, remove any protocol formatting characters to obtain pure print data, and then pass or forward the data to the printer interface 608. Similar processes can occur for the other peripheral devices including I/O interface 604, display 606, and card reader interface 610, and keypad and button inputs 612. Data can also be obtained from each of the peripheral devices and combined into a single data string. The data string can be sent to the system 500 where processing can occur based in part on the data string received.

Figure 7:
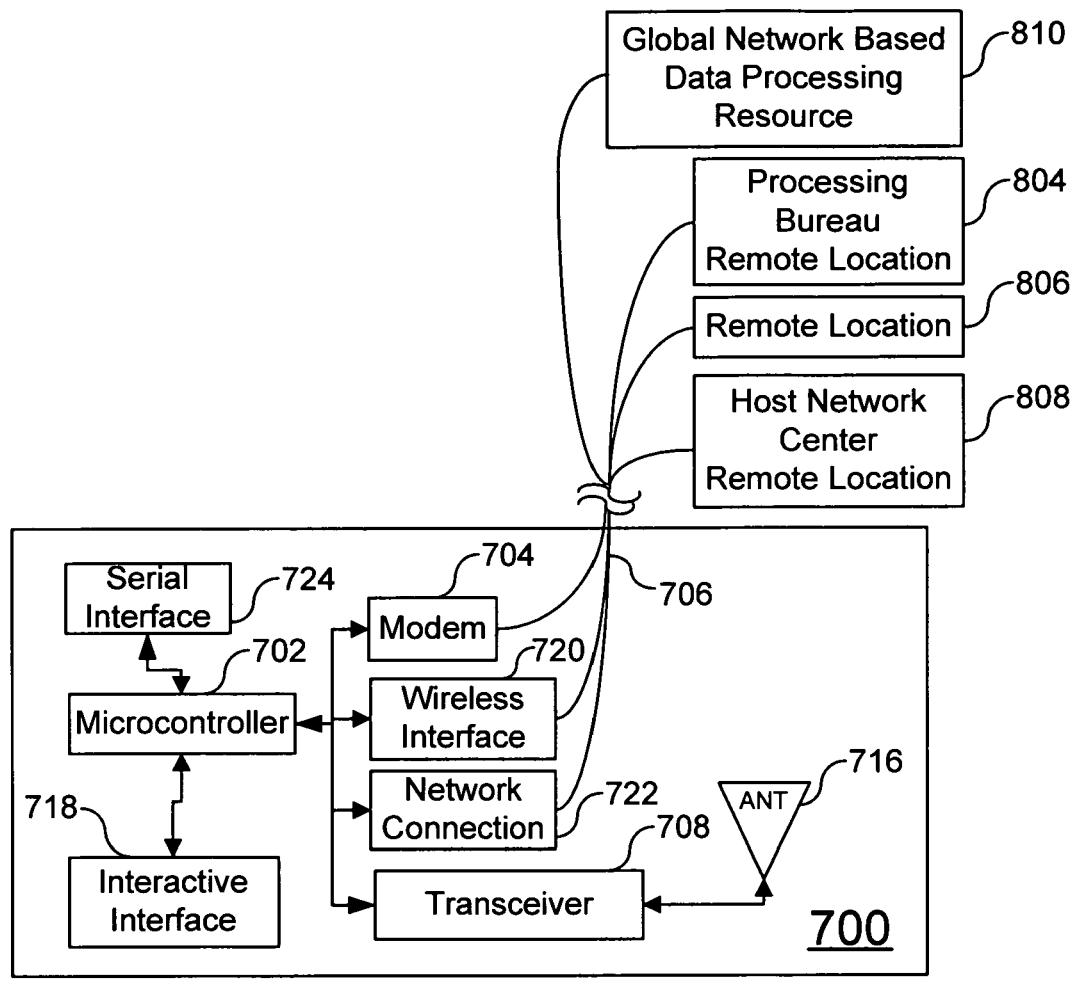
FIG. 7 there is shown a transceiver and modem base unit system 700 and a plurality of remote locations.

Referring to FIG. 7 there is shown a transceiver and modem base unit system 700 and a plurality of remote locations 804, 806, 808, 810 including a plurality of global network based data processing resources. Remote locations 804, 806, 808, and 810 can be Internet based, accessible by the Internet, or be a global network based data processing resource. In general Internet based and Internet accessible resources can be referred to as global network based data processing resources. For purposes of disclosure remote location can be referred to as remote location 804, 806, 808, and 810 and can also be referred to as global network based data processing resources.

One aspect of equipping vending equipment with a VIU 100 and or a card reader assembly and optional printer assembly is that the VIU 100 device requires a data communication connection with a plurality of remote locations. In many vending equipment locations it can be difficult to connect the VIU 100 to a physical communication line. When connecting the VIU 100 to a physical communication line is difficult or undesirable the use of the transceiver and modem base unit 700 (also referred to as base unit 700) can be a more preferred data communication option. A transceiver and modem base unit 700 can be referred to as a transceiver unit 700. Transceiver unit 700 in incorporated into transceiver and modem base unit 200.

In an exemplary embodiment the transceiver unit 700 forms a wireless data link with a VIU 100 having a system 500 incorporated within. In this regard the requirement of physically connecting the VIU 100 to a communication line can be eliminated. To create a wireless data line the VIU 100 equipped with an audit-credit-interactive system 500 utilizes transceiver 524 to data communicate with transceiver unit 700's transceiver 708. Transceiver 708 is interconnected with microcontroller 702. An antenna 716 is interconnected with transceiver 708. Antenna 716 can be of similar form and function to antenna 538. Transceiver 708 can be similar in form and function to transceiver 524.

Microcontroller 702 receives and decodes data packet information. Data packets can include command data for configuring the transceiver unit 700 and or data intended to be passed or forwarded to a plurality of remote locations by way of modem 704. Microcontroller 702 can be interconnected with modem 704. Modem 704 can be similar in form and function to modem 522.

Also interconnected with microcontroller 702 can be at least one of the following: a wireless interface 720, a network connection 722, an interactive interface 718, or a serial interface 724. Wireless interface 720, network connection 722, and interactive interface 718 can be referred to as a communication interface or base unit 700 communication interface. Wireless interface 720 can be similar in form and function to external modem interface 528 and or data modem 514. Network connection 722 can be similar in form and function to network interface 542. Interactive interface 718 can be similar in form and function to interactive interface 532. Serial interface 724 can be similar in form and function to interactive interface 532.

A plurality of remote locations can include credit bureaus such as processing bureau 804, host network centers such a host network center 808, other remote location such as remote location 806, and global network based data processing resource 810. Processing bureau 804, host network center 808, and remote location 806 can be referred to as a plurality of remote locations or remote locations. Processing bureau 804 can be a credit card processing bureau. Remote location 810 can be an Internet based data processing device or resource, or a device or resource accessible by way of the Internet thus referred to as a global network based data processing resource.

Microcontroller 702 can be any suitable microcontroller, or microprocessor. In an exemplary embodiment a microcontroller 702 can be a MICROCHIP PIC16F876-20/SP, PIC16C76-20/SP, ZILOG, MOTOROLA, INTEL, UBICOM, or AMD.

Figure 8:
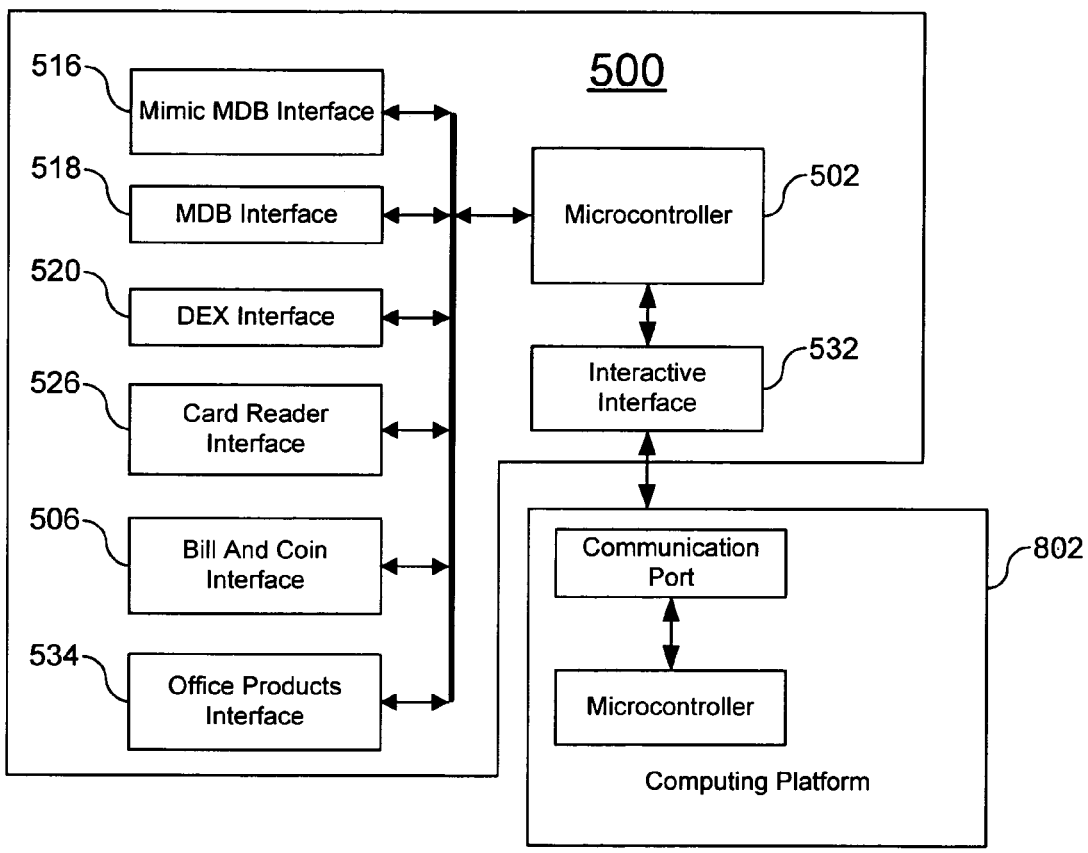
FIG. 8 there is shown an audit-credit-interactive system 500 interfaced to a computing platform.

Referring to FIG. 8 there is shown an audit-credit-interactive system 500 interfaced to a computing platform. FIG. 8 illustrates how a audit-credit-interactive system 500 can be data communication connected to a computing platform 802 by way of system 500's interactive interface 532 and computing platform 802 interactive interface. In similar form and function as the interactive interface solution between system 500 and system 600 described above, system 500 and computing platform 802 can interconnect and data communicate as described with the communication specification and protocol shown in the table above.

There can be at least two methods of interconnecting a system 500's interactive interface 532 to a computing platform 802. In the first method the system 500 and the computing platform 802 can be mutually exclusive devices that share a data cable connection between the interactive interfaces. In this regard, the system 500 could be manufactured separate from the computing platform 802 and later during installation interconnected together with a data cable connection between the interactive interface ports.

This method allows maximum flexibility in the selection of the computing platform 802's form and functional features as well as allowing maximum flexibility in the selection of the system 500's form and functional features.

A second method of interconnecting a system 500's interactive interface 532 to a computing platform 802's interactive interface can be to integrate the system 500 and computing platform 802 into a single circuit design, preferably manufactured into a single circuit board device, semiconductor chip, or module. In this regard the VIU 100 could comprise an integrated system 500 and computing platform 802 combined. This method of interconnectivity can be desirable, for example and not limitation, when mass-produced VIU 100's with a computing platform option is required, and where cost, unit size, and or ease of installation and service are considerations.

Figure 9A:
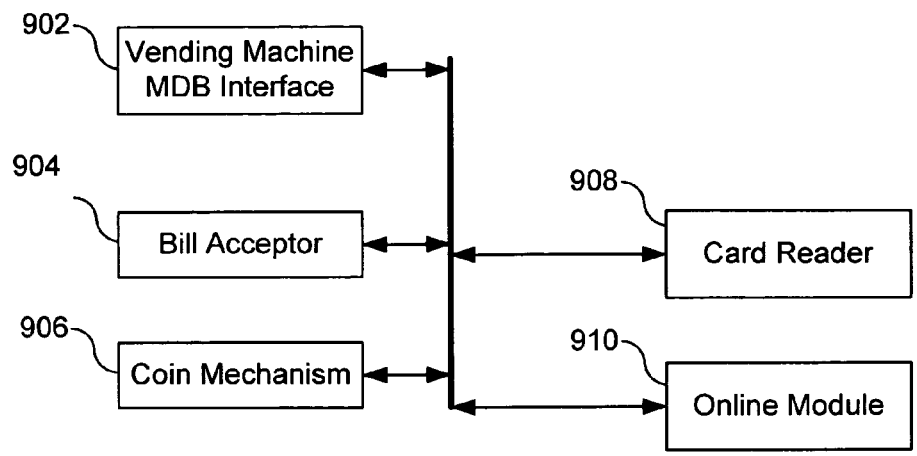
FIG. 9A there is shown a vending machine MDB interface with a plurality of peripheral devices.

Referring to FIG. 9A there is shown a vending machine MULTI-DROP-BUS interface with a plurality of peripheral devices interconnected thereto. Typical vending equipment that operate with a VMC have a vending machine interface 902. Vending machine interface 902 can support multi-drop-bus (MDB) interfacing and communications, data exchange format (DEX) interfacing and communications, coin device interfacing and communications, bill device interfacing and communications, and or vending machine controller (VMC) interfacing and communications. In addition to other types of peripheral devices, peripheral devices that support the NAMA MDB specification and or the EVA DEX specification can be interconnected to the vending equipment interface 902.

In an exemplary embodiment, once the peripherals are connected to the VMC, the VMC typically operates as the master device and each of the peripheral devices are designated as slave peripheral devices. Such slave peripheral devices can include bill acceptor 904, coin mechanism 906, card reader 908, and online module 910.

Bill acceptor 904 and coin mechanism 906 can be of a type for example and not limitation manufactured for or by MARS, COINCO, CONLUX, or other similar bill acceptor and coin mechanism type or manufacturer. Card reader 908 can be of a type for example and not limitation manufactured by or for USA TECHNOLOGIES, MARS, MARCONI, DEBITEK, SCHLUMBERGH, ACT, COINCO, EVEND, WIRCA, US WIRELESS or other similar card reader type. Online module can be of a type for example and not limitation manufacture for or by USA TECHNOLOGIES, MARCONI, MARS, COINCO, WIRCA, US WIRELESS, EVENDor other similar online module type.

A limitation on peripheral devices can be that they must support a compatible version of the MDB protocol specification to operate correctly. This requirement of having to support the version of MDB protocol the VMC supports can limit the selection of compatible peripheral devices as well as limit the range of functionality of the peripheral devices.

For example and not limitation if the VMC MDB protocol version does not support obtaining audit information from a peripheral device the audit information contained within the peripheral device will go unutilized. If in another example the bill acceptor is able to report it's functional operation information and the VMC does not support a MDB protocol version to obtain this information the data in the bill acceptor will not be retrieved and the benefits of having such informational data will not be realized.

Figure 9B:
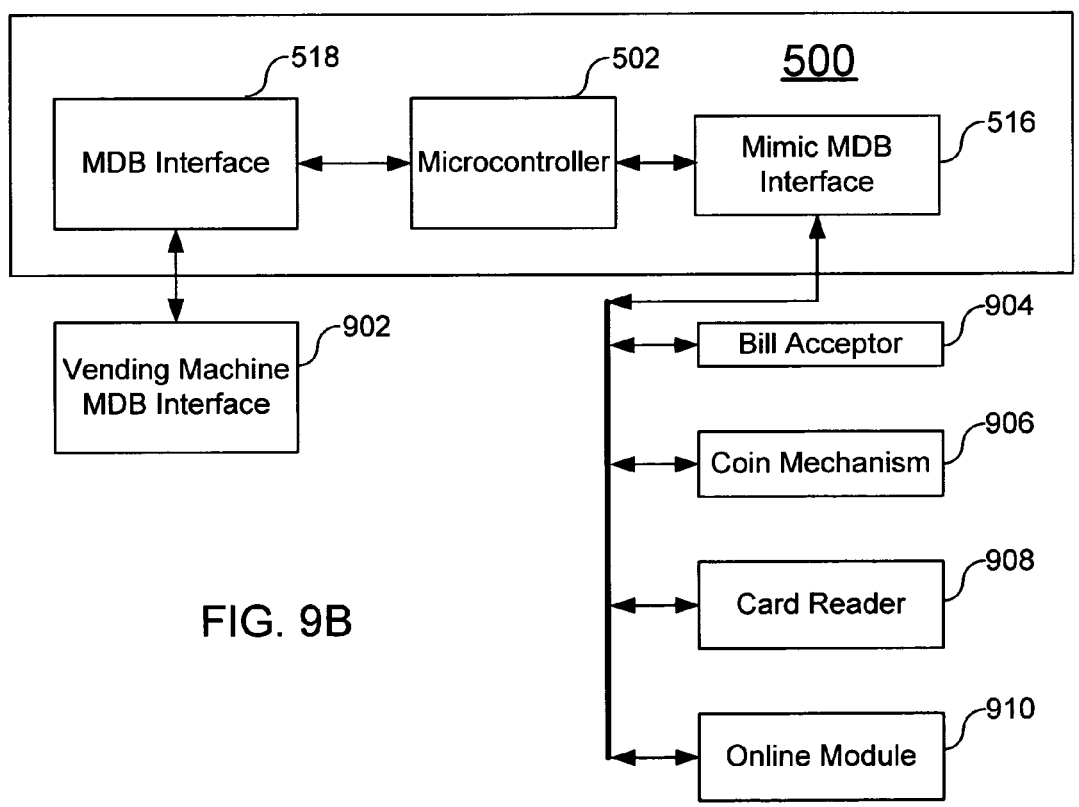
FIG. 9B there is shown an audit-credit-interactive system 500 interfacing to a vending machine MDB bus and interfacing to a plurality of peripheral devices by way of a system 500 mimic MDB bus.

FIG. 9B illustrates how an audit-credit-interactive system 500 can be configured in series with the vending machine interface 902. In this regard, the peripheral devices can be supported by the system 500's mimic MDB interface 516. The advantage off this network configuration is that the system 500 can support multiple versions and derivative versions of the NAMA MDB protocol specification. Furthermore, the system 500 can provide peripheral message emulation and message passing to effectuate the VMC's ability to data communicate to each peripheral by way of the system 500's MDB interface 518 and mimic MDB interface 516.

In an exemplary embodiment the VMC can data communicate with each peripheral device at the MDB version level of the VMC. In addition, system 500 can data communicate with the VMC and each peripheral device at the VMC version level and each peripheral MDB version or derivative version level. In this regard features supported by a peripheral device's MDB version or derivative MDB version can be utilized. In addition, data communication between the system 500 and each peripheral device effectuates the ability to remotely monitor and manage each peripheral. In this type of peripheral support system 500 servers as a data communication gateway for each peripheral device. System 500 ability to data communicate with a plurality of remote locations and with each peripheral device effectuates the ability of each peripheral device to data communicate with a plurality of remote locations.

Referring to FIG. 9B there is shown a system 500's MDB interface 518 interconnected with the VMC vending machine interface 902. In this relationship the system 500 can support the version of MDB protocol that the VMC firmware supports. Each of the peripheral devices including bill acceptor 904, coin mechanism 906, card reader 908, and online module 910 can then be interconnected with the system 500's mimic MDB interface 516. In this regard the system 500 can support any number of NAMA MDB protocol versions and or derivative versions of the NAMA MDB protocol.

For example and not limitation if the VMC supports NAMA MDB version 1.0 and an online module 910 supports a derivative version of the NAMA MDB protocol called advanced version 3.0 both the VMC and the online module 910 can be interconnect to a system 500 and operate correctly. In this relationship system 500 by way of MDB interface 518 and mimic MDB interface 516 data communicates with both the VMC and online module 910. The system 500 interrupts and emulates the correct device protocols as to allow the VMC to data communicate with the online module 910.

In addition, the system 500 can data communicate with the online module for the purpose of effectuating MDB command messages not supported by the VMC's MDB version. The system 500 can then selectively data communicate, to a plurality of remote locations, data related to the peripheral devices including the online module 910. Furthermore, by way of system 500 the peripheral devices interconnected with the system 500's mimic MDB bus 516 can data communicate with a plurality of remote locations.

Figure 9C:
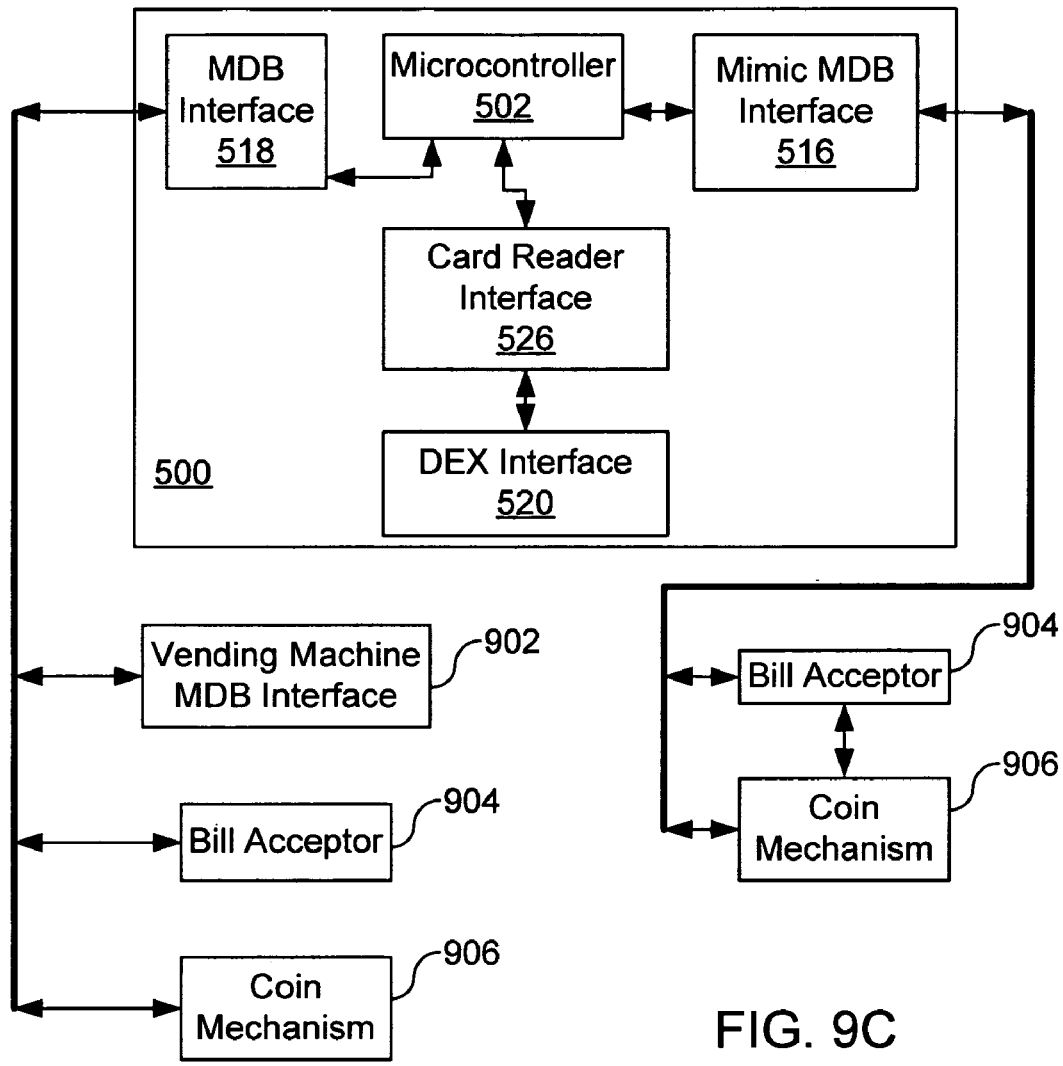
FIG. 9C there is shown an audit-credit-interactive system 500 with card reader and audit functionality embodiment interfacing to a vending machine MDB bus and interfacing to a plurality of peripheral devices by way of a system 500 mimic MDB bus.
Figure 9D:
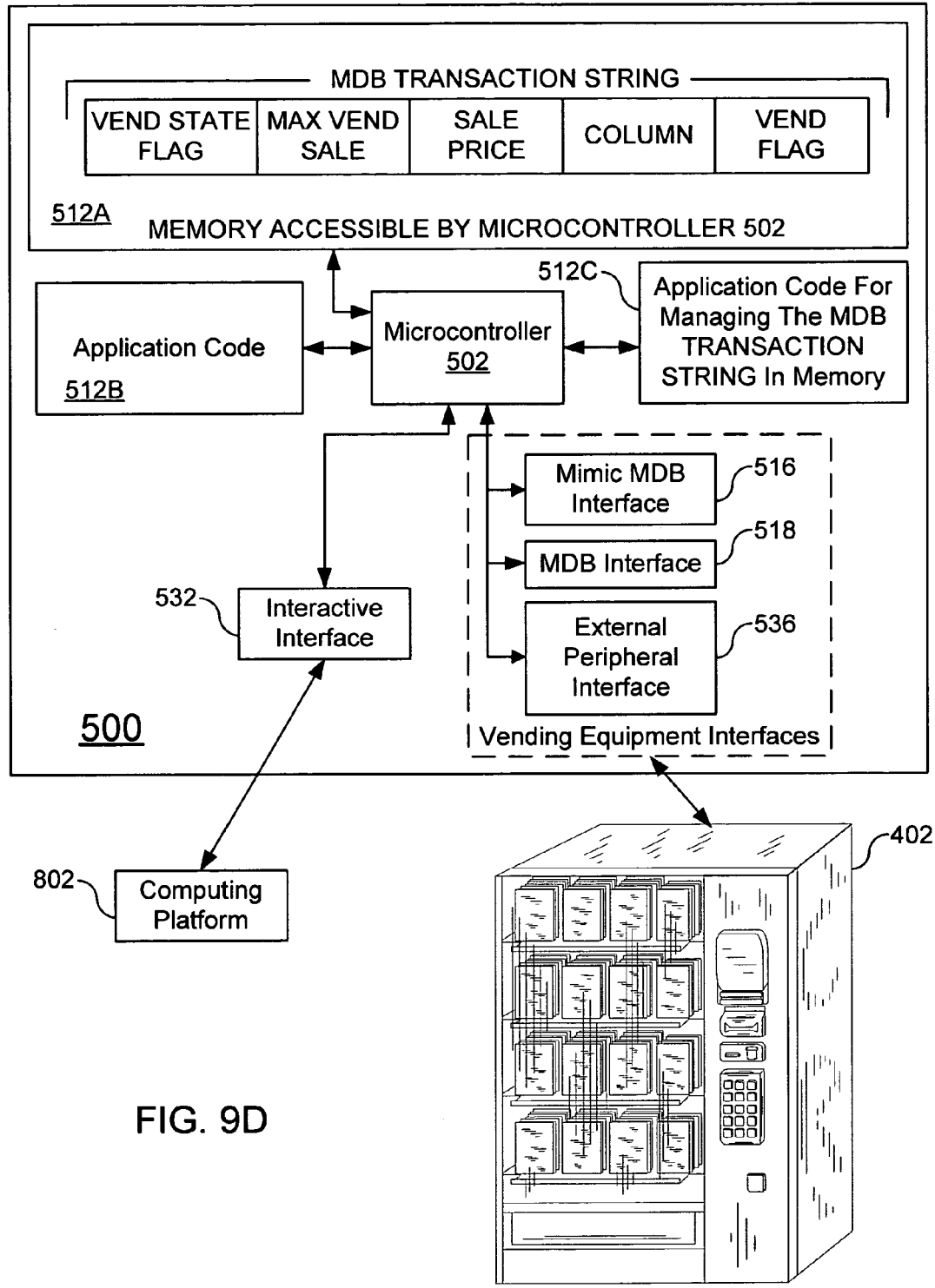
FIG. 9D there is shown a MDB TRANSACTION STRING with system 500 and vending equipment interface.

Referring to FIG. 9C there is shown a audit-credit-interactive system 500 with card reader and audit functionality embodiment interfacing to a vending machine MDB bus and interfacing to a plurality of peripheral devices by way of a audit-credit-interactive system 500 mimic MDB bus. In an exemplary embodiment system 500 combines the functionality of the card reader peripheral and audit or as it is commonly referred to as the online module or telemetry function thus eliminating the need for additional peripheral devices to provide these functions. In addition, the mimic MDB interface 516 can optionally support peripheral devices that are not compatible with the vending equipment's VMC.

FIG. 9C illustrates that with a system 500 interconnected with the vending equipment interface 902 there is created two alternative bus configurations for the peripheral devices. For example and not limitation the bill acceptor 904, coin mechanism 906, as well as other types of peripheral devices can, based in part on MDB version compatibility, reside on either the vending equipment interface 902, or the system 500's mimic MDB interface 516.

Figure 10A:
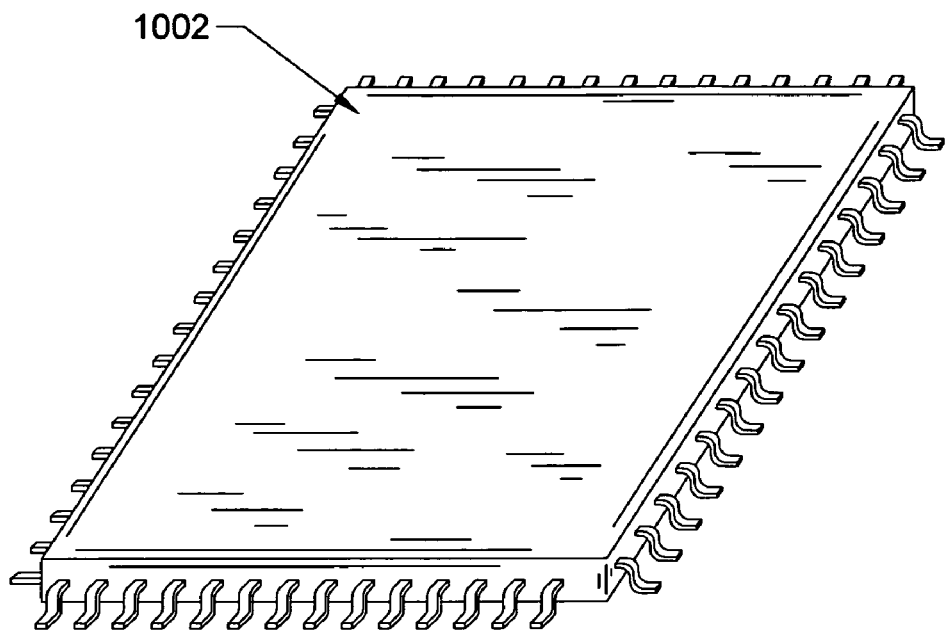
FIGS. 10A-10B there is shown a system 500 semiconductor package, and a system 500 module package.
Figure 10B:
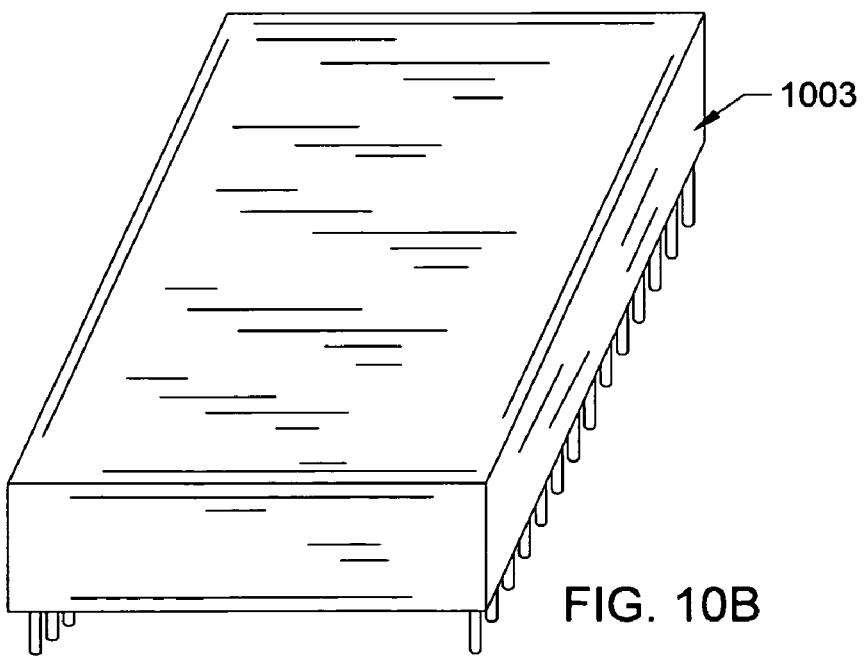

Referring to FIGS. 10A and 10B there is shown a system 500 semiconductor package 1002, and an alternative system 500 module package 1003. In an exemplary embodiment a system 500 can be manufactured into a semiconductor package or module package. For purposes of disclosure the module package can be referred to as a semiconductor package. Such semiconductor packages can include industry standard through hole and surface mount technologies. A system 500 can also be packaged in a module for through hole or surface mount installation. The system 500 module can include a plurality of discrete and or semiconductors to implement a complete system 500 solution.

In an exemplary embodiment a system 500 semiconductor or system 500 module can be mounted in a socket to enable the system 500 to be inserted into or removed from a design as required.

Figure 10C:
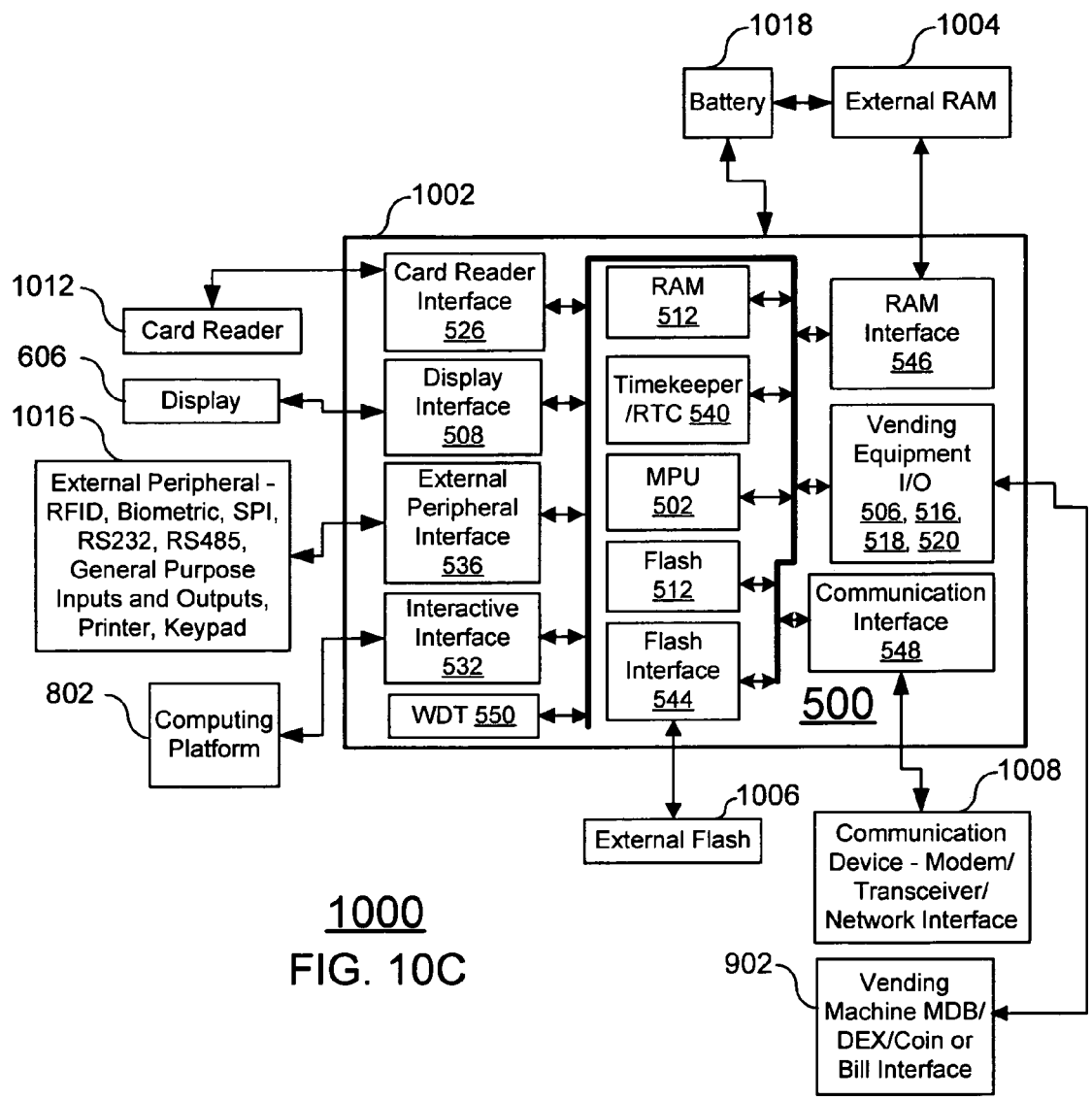
FIGS. 10C-10D there is shown an audit-credit-interactive system 500 embodied in a semiconductor package.

Referring to FIG. 10C there is shown an audit-credit-interactive system 500 embodied in a semiconductor package 1002. In an exemplary embodiment a system 500 can be manufactured into a semiconductor, or into a module to support additional components and or connectivity options. This type of manufacture can have the advantage of small size and low cost. In addition, such a semiconductor version of an audit-credit-interactive system 500 can be advantageous when integration of system 500's functionality into other electronic devices is desirable.

For example and not limitation a bill acceptor, a coin mechanism, or other type of electronic device can have a system 500 embedded into semiconductor 1002 designed into the peripheral device circuitry. In addition to providing system 500 functionality semiconductor 1002 can be soldered or mounted into the peripheral circuit board eliminating the need for additional manufacture and packaging of a system 500.

Figure 10D:
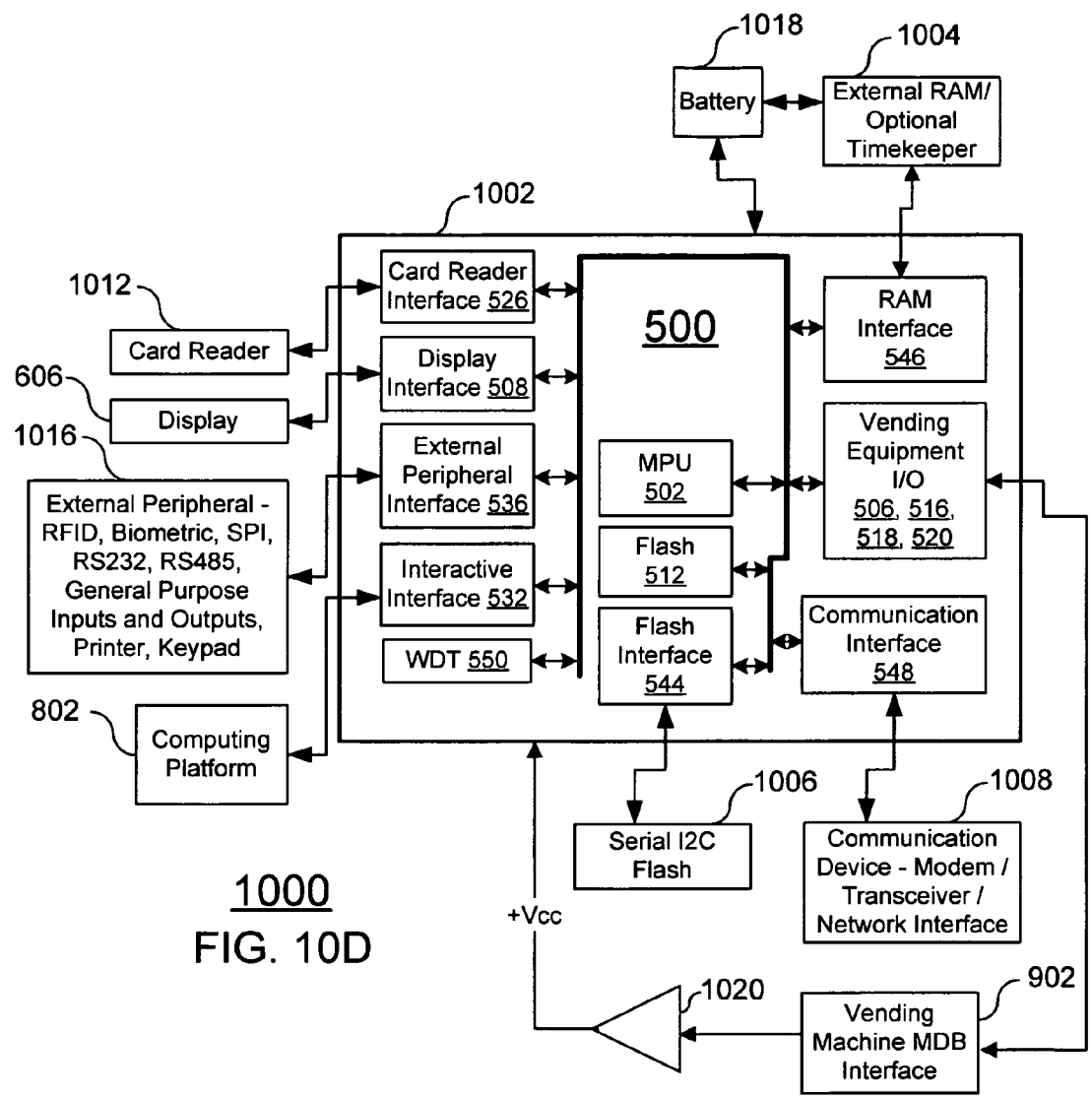

FIGS. 10C-10D show a system 500 integrated into semiconductor packaging 1002. Semiconductor 1002 packaging can include for example and not limitation quad flat pack style (QFP), as well as other integrated circuit industry standard package styles such as DIP, PLCC, BGA, SOP, TSOP or other suitable package style. Semiconductor package 1002 can also be a module comprising a plurality of electrical components to implement a system 500. Semiconductor package 1002 can be referred to as module 1003.

Referring to FIG. 10C the system 500 shown includes microcontroller 502 interconnected with card reader interface 526, display interface 508, external peripheral interface 536, interactive interface 532, RAM/NOVRAM memory 512, timekeeper 540, flash memory 512, flash memory interface 544, RAM/NOVRAM interface 546, communication interface 548, and vending equipment interfaces 506, 516, 518, and 520. Other system 500 features can be included as may be required by the application. In addition, system 500 features shown within semiconductor package 1002 can be eliminated as may be required or desirable based on the application.

Timekeeper 540 can be a real time clock (RTC) for keeping track of date and time functions. Flash interface 544 can be an interface to serial and or I²C electrical erasable read only memory (EEROM), a DATA FLASH such as ATMEL DATA FLASH, serial flash memory devices, flash memory device having at least an address bus and data bus connections, or other flash memory types of devices. RAM/NOVRAM interface 546 can be a data connection to an external non-volatile read only memory device such as RAM/NOVRAM 1004. RAM/NOVRAM 1004 can be of similar form and function as RAM/NOVRAM 512.

External interconnections to semiconductor 1002 can include card reader 1012, display 606, external peripheral 1016, computing platform 802, external flash 1006, communication device 1008, interface to vending equipment 1010, and RAM/NOVRAM 1004.

Card reader 1012 can be an industry standard bit strobe, and serial style track 1, 2, and 3 card reader. Such card readers include for example and not limitation those manufactured for or by XICO, NEURON, and MAGTEK.

External peripheral 1016 can include RFID readers and writers, biometric devices, common communication ports such as RS232 and RS485, general purpose I/O, keypad, and or other types of peripheral device. External memory 1006 and external memory 1004 can be similar in form and function as memory 512. External communication device 1008 can include a modem, transceiver, network interface, or other type of communication device. Communication device 1008 and communication interface 548 can be similar in form and function to modem 522, transceiver 524, data modem 514, and or network interface 542.

In an exemplary embodiment where possible software executing within semiconductor 1002 can emulate certain system 500 functionality to further reduce the dependence of physical hardware. For example and not limitation the card reader interface may be implemented in software where general purpose I/O lines could be configured to capture card data received from a card reader such as card reader 1012.

Referring to FIG. 10D the system 500 is embedded within semiconductor package 1002. In this embodiment the system 500 relies on software executing in microcontroller 502 to implement and emulate the system 500's functionality. In this embodiment software configures general purpose I/O lines to implement card reader interface 526, display interface 508, external peripheral interface 536, interactive interface 532, RAM/NOVRAM interface 546, vending equipment I/O 506, 516, 518, and or 520, and communication interface 548.

One advantage of implementing system 500 in software can be that the system 500 software solution can be implemented in mass producible generally available microcontroller devices. Such microcontroller devices can include for example and not limitation UBICOM's line of microcontrollers, MOTOROLA, INTEL, MICROCHIP, ZILOG, and other similar or suitable microcontroller or microprocessor devices.

A second advantage of implementing system 500 in software can be that the proprietary nature of the software and its functional capabilities can more easily be concealed and protected when resident and secured within a microcontroller. In addition to the secure ability of the system 500 solutions, implementing a system 500 in a microcontroller brand or series that other design engineers are familiar with can be advantageous in easing the integration of the system 500 semiconductor package 1002 into electrical designs.

Further ease of integration can be achieved by implementing power converter 1020. Power converter 1020 converts input voltage obtained from the vending equipment's MDB bus via the vending machine interface 902. The output voltage from power converter can be referred to a +VCC and can power the system 500 semiconductor 1002.

One advantage of allowing power convert 1020 to supply power to semiconductor 1002 can be that the semiconductor can be resident on an adapter card and retrofit to existing VMC's by connection to the VMC's vending equipment interface 902. Through this single connection point the adapter card comprising the semiconductor 1002 can power itself and data communicate with the VMC by way of the VMC vending equipment interface 902.

Furthermore, the semiconductor 1002 can be integrated into the VMC controller electronics and electrically connected on the circuit board to the VMC vending equipment interface 902. Simplifying the data and power connections between semiconductor 1002 and the VMC can save time and effort in the integration of the combined VMC/system 500 solution. In addition, the fact that the system 500 can operate mutually exclusive from the VMC can be advantageous in the design of the overall combined VMC/system 500 solution.

Besides combining the system 500 on a chip with a VMC control system the system 500 packaged in semiconductor 1002 can be integrated into a computing platform 802. In this regard the semiconductor 1002 can be integrated into the computing platform 802 electronics and electrically connected by way of external peripheral interface 536. In addition, the fact that system 500 can operate mutually exclusive from the computing platform 802 can be advantageous in the design of the overall combined computing platform 802/system 500 solution.

Figure 10E:
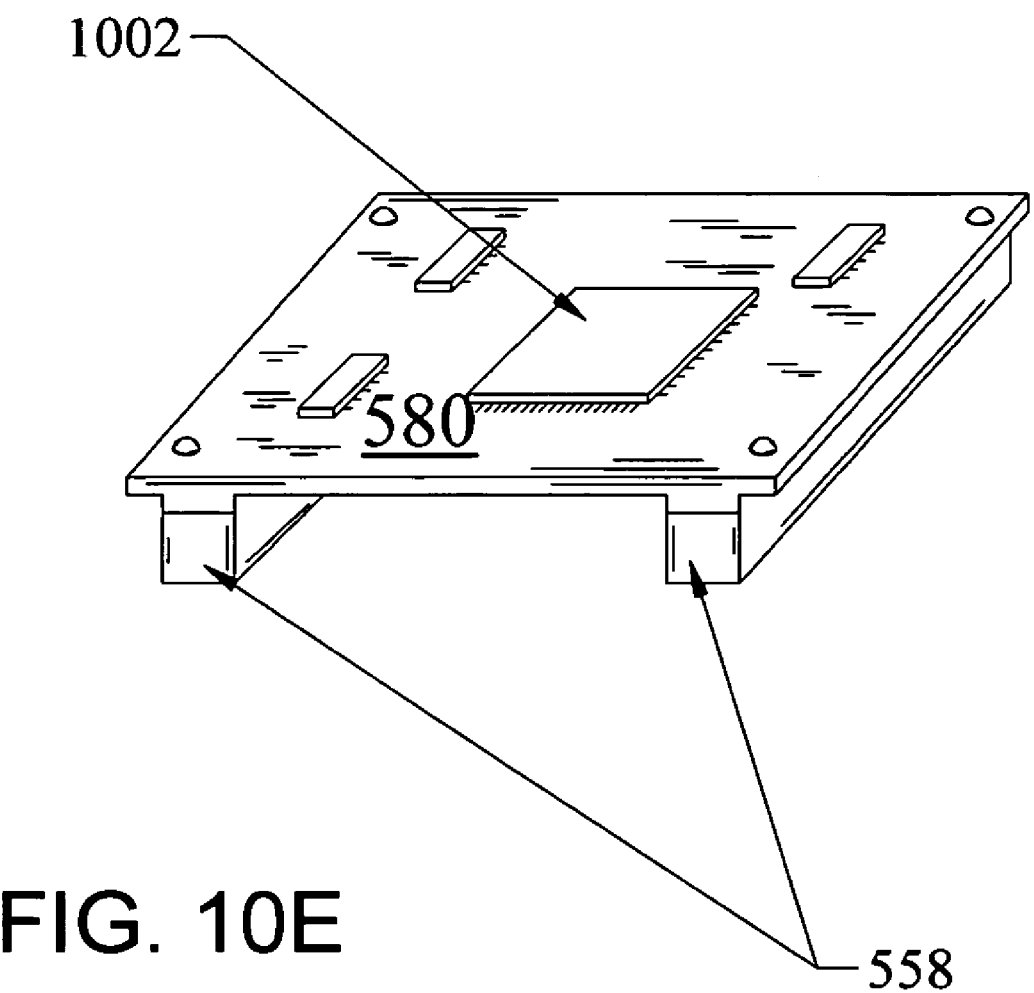
FIG. 10E there is shown a point of sale reference design 580.

Referring to FIG. 10E there shown a processing module 580. Processing module 580 can be referred to as the point-of-sale reference design, a system 500, or a processing core. Processing module 580 can include a semiconductor 1002 (system 500 embodiment) and processing module interface 558.

In an exemplary embodiment processing module 580 includes, as needed, certain of system 500 features and elements. For example and not limitation, processing module 580 can include microprocessor 502, memory 512, and or other elements of a system 500 as may be required or desired. In this regard, processing module 580 remains a small computing core capable of being electrically connected to other devices. Other devices can include peripheral cards, such as peripheral card 582 and computing platforms, such as computing platform 802. Once processing module 580 is interconnected with these platforms and devices, these platforms and devices can invoke processing module 580 point-of-sale cashless and currency monitoring and processing capabilities by utilizing the interactive interface specification and protocol to enable the interconnected platforms, systems, and devices to be responsive to, except, and utilize system 500 cashless processing technologies, interfacing technologies, communication technologies, remote networking technologies, and other system 500 features and functionality.

In an exemplary embodiment processing module 580 executes embedded application code which, implements an interactive interface protocol, enables the receiving of a plurality of payment identification data at said microcontroller, effectuates cashless transactions as well as implementing other features, processes, and methods.

Effectuating cashless transaction processing can include authorization of payment identification data locally (at the system 500 by way of local authorization application code) or remotely via data communications to a remote location, such as remote locations 804, 806, 808 and or 810. In addition, processing module 580 when integrated into other platforms, systems, and devices can enable these platforms, systems, and devices to effectuate point-of-sale capabilities and functionality by way of the processing module 580.

Payment identification data can be communicated to the processing module 580 and or the microcontroller a 502, which is part of the processing module 580. Such payment identification data can be communicated from, but not be limited to, Card reader interface 526, touch contact interface 556, biometric interface 554, PDA interface 552, IRDA interface 550, wireless phone interface utilizing data modem interface 514, RFID interface 504, bill and coin interface 506, keypad interface 510 button input interface 510, and other system 500 interfaces is be required or desired.

These point-of-sale capabilities and functionality can include networking the computing platforms, embedded systems, and devices to remote locations, such as remote locations 804, 806, 808, and 810. Furthermore, processing module 580 by being interconnected with such platforms, embedded systems, and other devices can enable these devices to data communicate with remote locations such as 804, 806, 808, and 810. In this regard, these interconnected devices by way of processing module 580 can move data between the remote location where such data can be downloaded, stored, viewed, and otherwise processed. Such locations can include global network based data processing resources and other remote networks, processing bureaus, and host and network centers.

Processing module interface 558 can include electrical connections for other system 500 interfaces, such as touch or contact interface 556, biometric interface 554, PDA interface 552, RFID interface 504, bill and coin interface 506, display interface 508, keypad and button input interface 510, memory 512, office products interface 534, external peripheral interface 536, network interface 542, data modem interface 514, mimic MDB interface 516, MDB interface 518, DEX interface 520, modem 522, transceiver 524, card reader interface 526, external modem interface 528, printer interface 530, interactive interface 532, IRDA interface 550, and other system 500 interfaces.

Figure 10F:
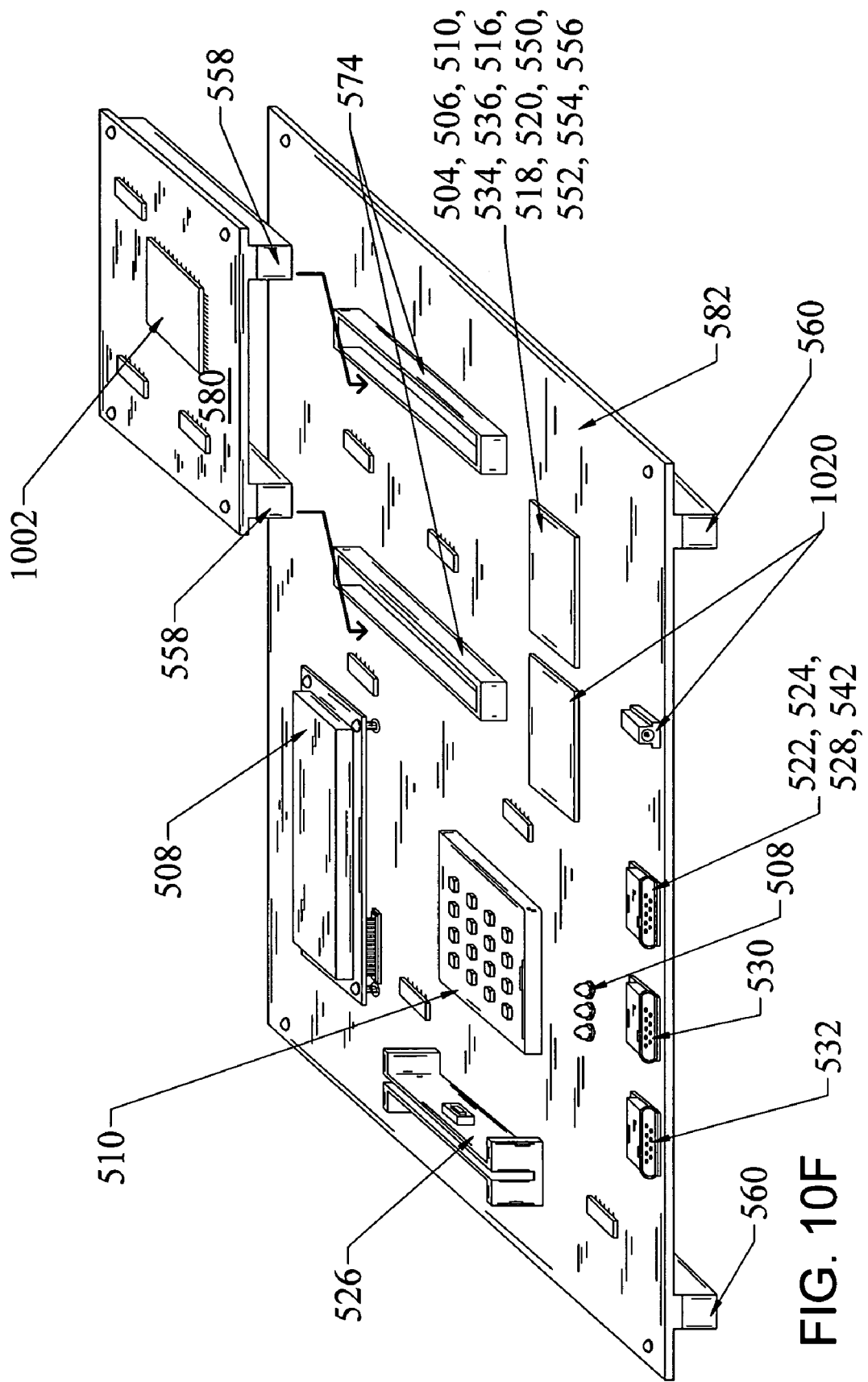
FIG. 10F there is shown a point of sale development board (a point of sale reference design 580 interconnected with a peripheral card 582)

Referring to FIG. 10F there is shown a processing module 580 being interconnected with a peripheral card 582. The combination of a point of sale reference design 580 and a peripheral card 582 can be referred to as a point of sale development board. In an exemplary embodiment processing module 580 is interconnected with a peripheral card 582 to provide to the processing module 580 the necessary interfaces to implement a point of sale peripheral card 582 that can have a number of different features and interfaces as may be required or desired by particular applications. In this regard, the combination of the processing module 580 and the peripheral card 582 can be referred as the point-of-sale development board.

Shown in the figure is a peripheral card 582 with a card reader interface 526 (shown with card reader 310), keypad and button input interface 510, display interface 508, interactive interface 532 connector, and a printer interface 530 connector. In addition, peripheral card 582 also is shown to include a communication connector that can be utilized for a modem interface 522, transceiver 524, external modem interface 528, or network interface 542. The peripheral card 582 also includes an external power and conditioning circuit 1020 and a computing platform interface 560. Also shown in the figure are interfaces and connectors for other system 500 functionality including RFID interface 504, bill and coin interface 506, keypad and button input interface 510, office products interface 534, external peripheral interface 536, mimic MDB interface 516, MDB interface 518, DEX interface 520, IRDA interface 550, PDA interface 552, biometric interface 554, and touch or contact interface 556. Other system 500 functionality and interfaces can be included or excluded as desired or required by the individual application.

In an exemplary embodiment processing module 580 can be interconnected with peripheral card 582 by way of processing module interface 558 and processing module receptacle connectors 574. In this regard, electrical signals including power to the processing module 580 can be communicated between the processing module 580 and peripheral card 582. In addition, by way of the various connectors and interfaces on the peripheral card 582 electrical signals from processing module 580 and peripheral card 582 can be communicated to other computing platforms such as computing platform 802, embedded systems, and other devices.

In an exemplary embodiment the combined processing module 580 and peripheral card 582 can be interfaced to a computing platform 802, embedded system, or other device including a personal computer (PC) by way of computing platform interface 560, or interactive interface 532 connector.

Figure 10G:
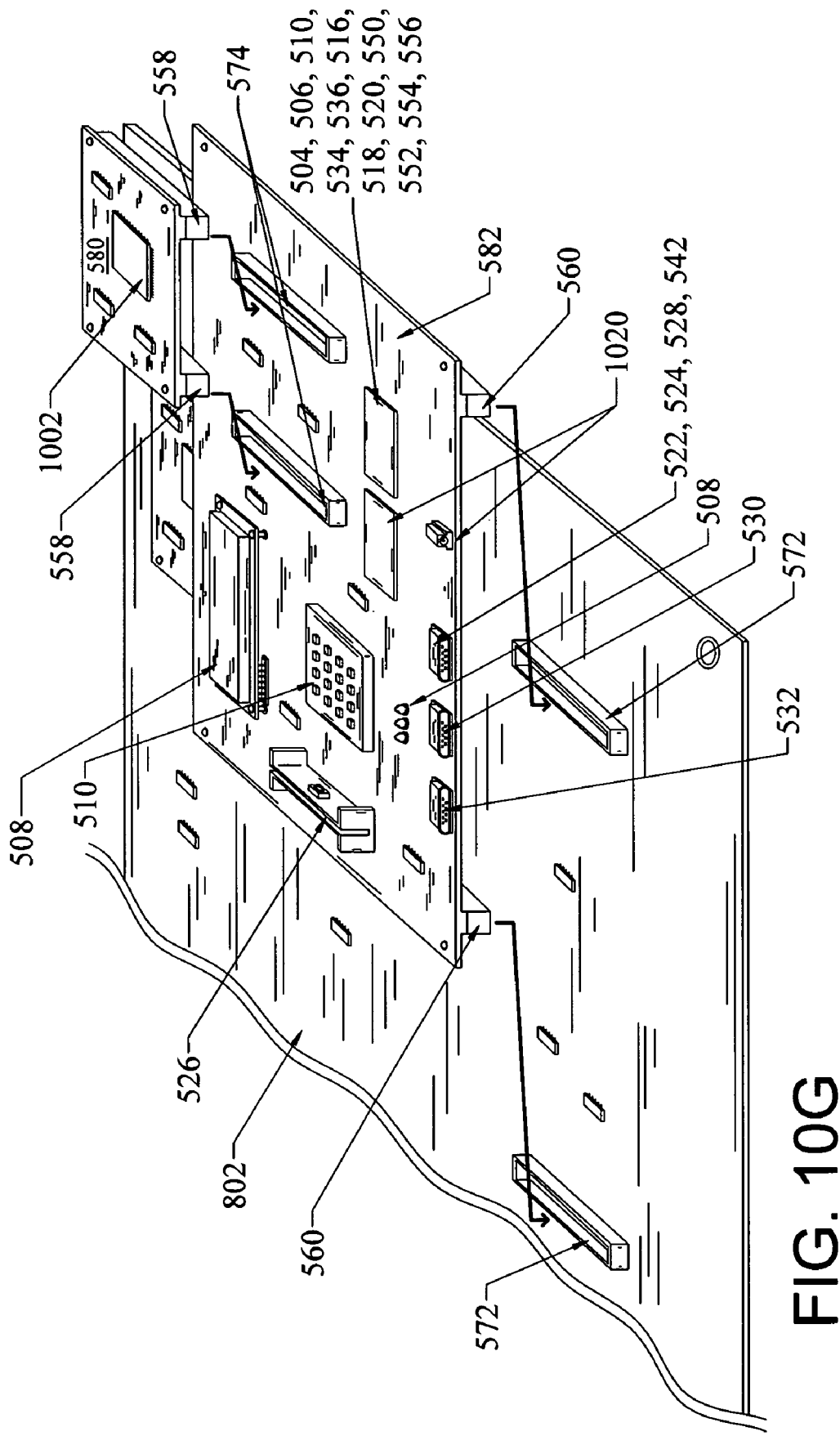
FIG. 10G there is shown a point of sale reference design 580 interconnected with a peripheral card 582, and further interconnected with a computing platform 802.

Referring to FIG. 10G there is shown the combined processing module 580 and peripheral card 582—referred to as the point of sale development board—being interconnected with the computing platform 802. A computing platform can be referred to as an embedded system, embedded device, or personal computer (PC). The computing platform 802 shown in the figure includes peripheral card receptacle connector 572. In this regard, in an exemplary embodiment the peripheral card 582 can be interconnected with computing platform data to by way of computing platform interface 560 and peripheral card receptacle connectors 572. Computing platform 802 can also be interconnected with peripheral card 582 by other means as may be appropriate or desired as disclosed herein.

Figure 10H:
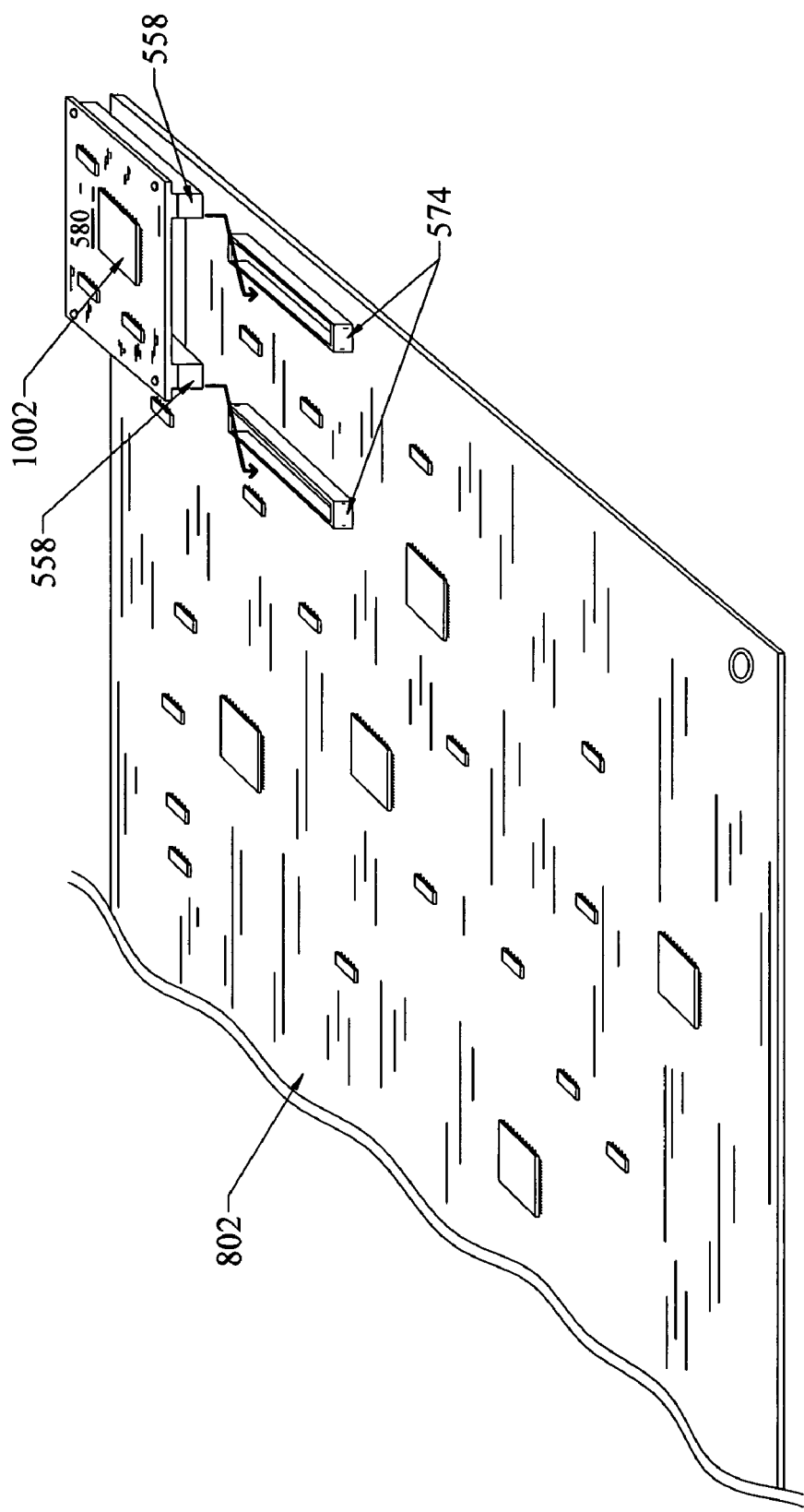
FIG. 10H there is shown a point of sale reference design 580 interconnected with a computing platform 802.

Referring to FIG. 10H there shown a point of sale reference design 580, also referred to as a processing module 580 or as the point of sale reference design, being interconnected with the computing platform 802. In an exemplary embodiment the processing module 580 containing system 500 application code and functionality can be directly connected to a computing platform 802 by way of processing module interface 580 and processing module receptacle connector 574. In this regard, a system 500 can be integrated into a computing platform, an embedded system, or other device.

Figure 10I:
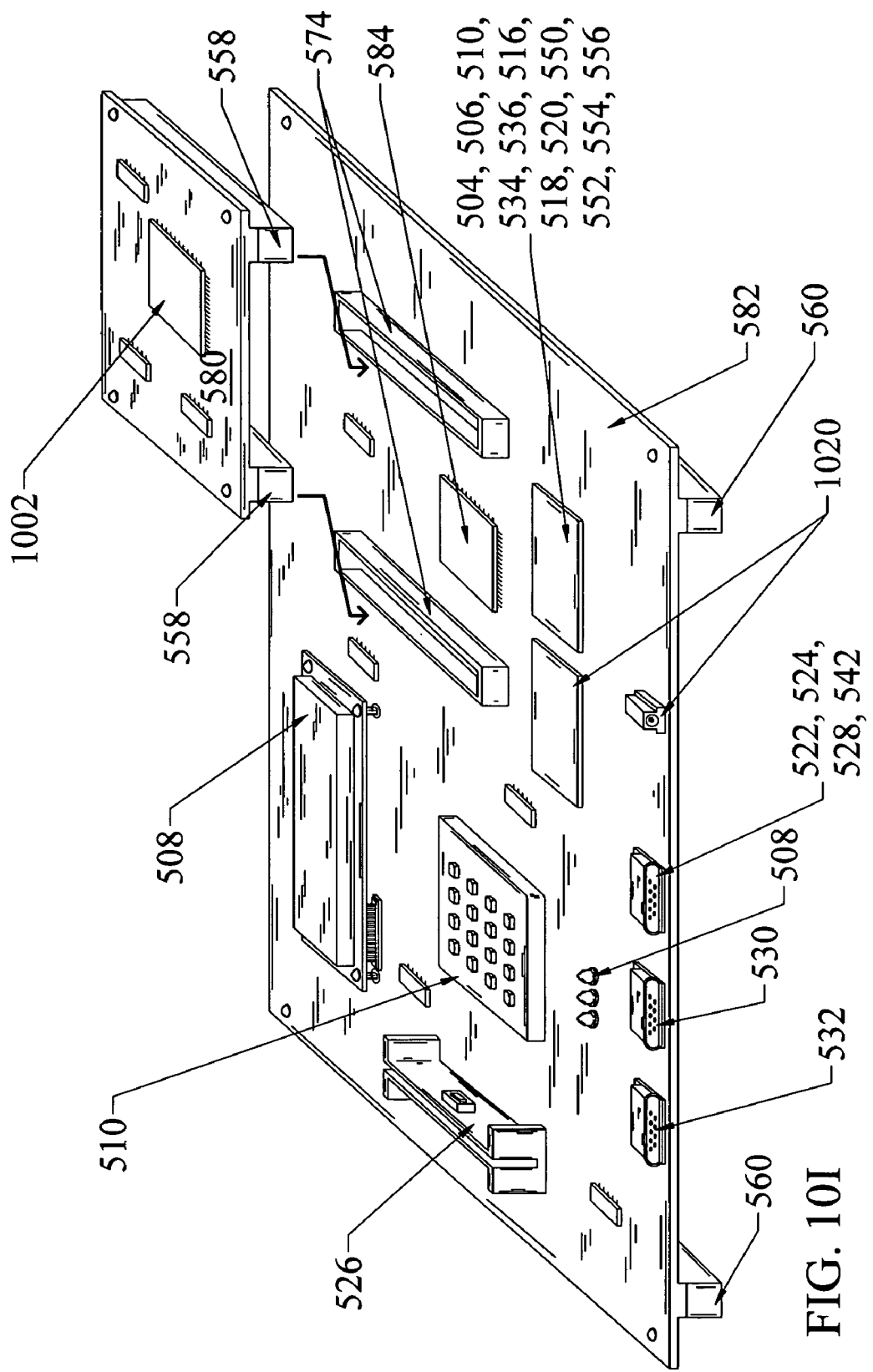
FIG. 10I there is shown a point of sale development board (580 and 582 combined) with user-microcontroller on the peripheral board 582.

Referring to FIG. 10I there is shown a point of sale development board, which includes a point of sale reference design 580 and a peripheral card 582. In an exemplary embodiment the peripheral card 582 can have a user-microcontroller 584 included in the design. In this regard, a user can develop code (firmware) that can be executed by the user-microcontroller, which can interact with the point of sale reference design 580 and selectively with connectors and peripherals on the peripheral board 582. Alternatively the user-microcontroller can be included on the point of sale reference design 580, or on a separate board having data communication access to the point of sale development board (point of sale reference design 580 in combination with the peripheral card 582). A user-microcontroller 584 can be a MOTOROLA, MOTOROLA 68HC series, MICROCHIP, ZILOG, ZILOG eZ80 family, ZILOG Z382 family, ZILOG Z80 family, AMD, INTEL, or other similar or suitable microcontroller or microprocessor.

Inclusion of a user-microcontroller 584 that can be programmed customized, and or otherwise implement user application code can allow the development board (combined point of sale reference design 580 and peripheral card 582) to implement and execute user applications. In this regard, embedded point of sale applications can be developed on the point of sale development board (combined 580 and 582) without the need of external data processing equipment and or other embedded devices. In addition, the ability to develop, download, and execute applications can enable a user to customize the point of sale development board and utilize the board in other embedded system applications.

The user-microcontroller 584 can also include any additional components or system devices that may be required. For example and not limitation, the user-microcontroller may also include either internal to the microcontroller or as external components flash memory, other memory, support or interfacing components, connectors, peripheral devices, or other similar, suitable, or desired specifications or requirements.

Figure 11:
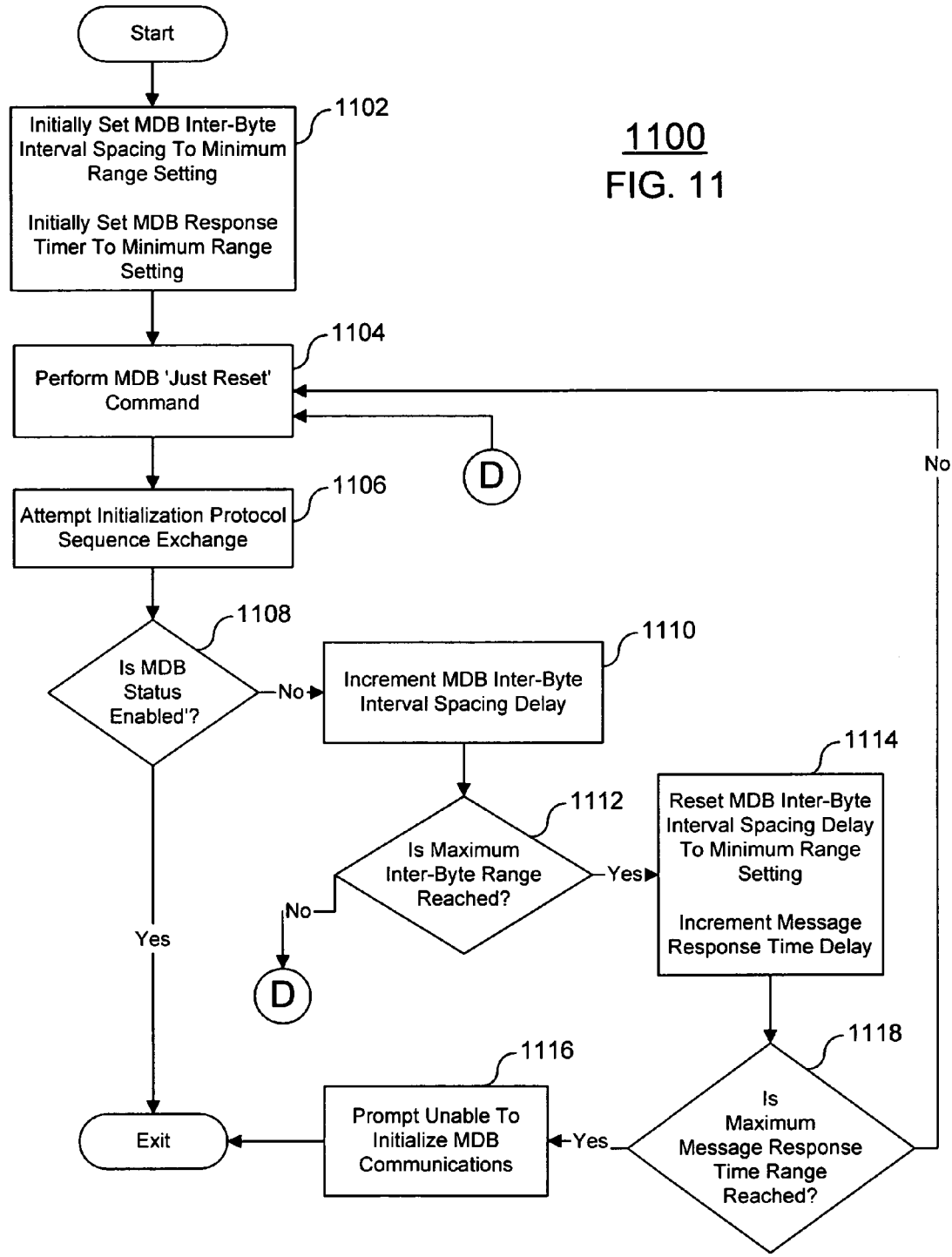
FIG. 11 there is shown an MDB initialization tuning routine 1100.

Referring to FIG. 11 there is shown an MDB initialization tuning routine 1100. With the proliferation of different kinds and styles for vending equipment VMC controllers the NAMA MDB and NAMA derivative MDB protocol implementation can vary from VMC to VMC. In addition the processing capabilities, UART implementations and lack of UART implementations can cause a variation in VMC microcontroller performances. These performance variations in VMC microcontrollers can cause the serial communications between VMC to vary in the devices ability and speed by which data bytes can be consecutively data communicated to the VMC controller. In addition to data communication speed and response timing another variation between VMC's can be interpretation of protocol command functionality, usage, and message formatting.

Another source of VMC MDB protocol implementation variations can occur as a result of the VMC computing power and or microprocessor speed or (millions of instructions per second) MIPS capability. Microprocessor speed can influence MDB protocol implementation and message transaction speed in several ways. One such way can be in the MDB interface to the microprocessor.

MDB message transactions are a string of serial bytes. As such bytes must arrive one at a time to the VMC microprocessor. Once a byte arrives it must be fetched from the VMC microprocessor receive buffer and processed. The time required to fetch a byte can vary from VMC to VMC. As such the MDB INTER-BYTE TIME SPACING, which is the amount of time delay inserted between sent bytes could be a critical variable. If for example and not limitation a string of bytes arrive to close together, or in other words the MDB INTER-BYTE TIME SPACING is too short the VMC may not be able to process the bytes and as a result the system 500 could fail to initialize and operate correctly. If for example and not limitation a string of bytes arrive to far apart, or in other words the MDB INTER-BYTE TIME SPACING is too long the VMC may time-out and fail to process the MDB message. As a result the system 500 could fail to initialize and operate correctly.

The MDB protocol involves a master-slave relationship between the master vending equipment's VMC and the slave peripheral devices. In implementing the MDB protocol the master VMC initiates an MDB message command to a slave peripheral device. The slave peripheral device then has a finite amount of time to respond the VMC command message with a message response. As such the amount of time allotted for the peripheral device to respond with a MDB message response can vary from VMC to VMC. If for example and not limitation the peripheral device responds too quickly with a message response the VMC's microprocessor may not be ready and miss the return message. As a result the system 500 could fail to initialize and operate correctly. If for example and not limitation the peripheral device takes too much time to respond to the message the VMC may time-out waiting for the peripherals response message. As a result the system 500 could fail to initialize and operate correctly. An MDB MESSAGE RESPONSE timer is utilized to implement a pause from the time a MDB message is received from the VMC to the time an MDB message response from the system 500 is sent to the VMC.

The MDB initialization tuning routine 1100 determines through successive iterations of the MDB initialization sequence the optimum MDB INTER-BYTE TIME SPACING and MDB MESSAGE RESPONSE timing. Processing begins in block 1102.

In block 1102 the MDB INTER-BYTE INTERVAL SPACING and the MDB MESSAGE RESPONSE timers are set to a minimum range setting. Processing then moves to block 1104. Appropriate MDB MESSAGE RESPONSE time can range from a minimum range of a few microseconds to a maximum range of several milliseconds. Appropriate MDB MESSAGE RESPONSE time can range from a minimum range of less than one millisecond to a maximum range of five to ten milliseconds. Preferable a range can be from 0.5 milliseconds to 7 milliseconds and be changeable by a user and or under software control.

In block 1104 the system 500 waits for the VMC to initiate the POLL command. In response to the POLL command the system 500 sends the JUST RESET command. Processing then moves to block 1106.

In block 1106 the system 500 responds to VMC MDB transaction messages with message responses in an attempt to initialize the system 500. Processing then moves to decision block 1108. Initialization of the system 500 occurs by a series of successful VMC and system 500 MDB transaction message exchanges. The system 500 can be considered successfully initialized when the VMC and the system 500 have exchanged configuration messages and the VMC has issued to the system 500 the MDB ENABLE message.

In decision block 1108 a determination is made as to whether the system 500 received the MDB ENABLE command from the VMC and if the system 500's operation state is now ENABLED. If the resultant is in the affirmative that is the system 500's operation is now ENABLED then the routine is exited. If the resultant is in the negative that is the system 500's operational state is not ENABLED then processing moves to block 1110.

In block 1110 the MDB INTER-BYTE TIME SPACING is incrementally increased and processing moves to decision block 1112. The incrementing of the MDB INTER-BYTE TIME SPACING can be either automatic in system 500 software or manually changed by service personnel.

In decision block 1112 a determination is made as to whether the MDB INTER-BYTE TIME SPACING maximum range has been reached. If the resultant is in the affirmative that is the MDB INTER-BYTE TIME SPACING maximum range has been reached then processing moves to block 1114. If the resultant is in the negative that is the MDB INTER-BYTE TIME SPACING maximum range has not been reached then processing returns to block 1104.

In block 1114 the MDB INTER-BYTE TIME SPACING is set to the initial minimum range setting. In addition, the MDB MESSAGE RESPONSE time is incremented. The incrementing of the MDB MESSAGE RESPONSE timer can be either automatic in system 500 software or manually changed by service personnel. Processing then moves to decision block 1118.

In decision block 1118 a determination is made as to whether the MDB MESSAGE RESPONSE time maximum range has been reached. If the resultant is in the affirmative that is the maximum MDB MESSAGE RESPONSE time range has been reached then processing moves to block 1116. If the resultant is in the negative that is the maximum MDB MESSAGE RESPONSE range has not been reached then processing moves back to block 1104.

In block 1116 a prompt is provided that the MDB communications between the system 500 and the VMC could not be established. The routine is then exited.

Figure 12A:
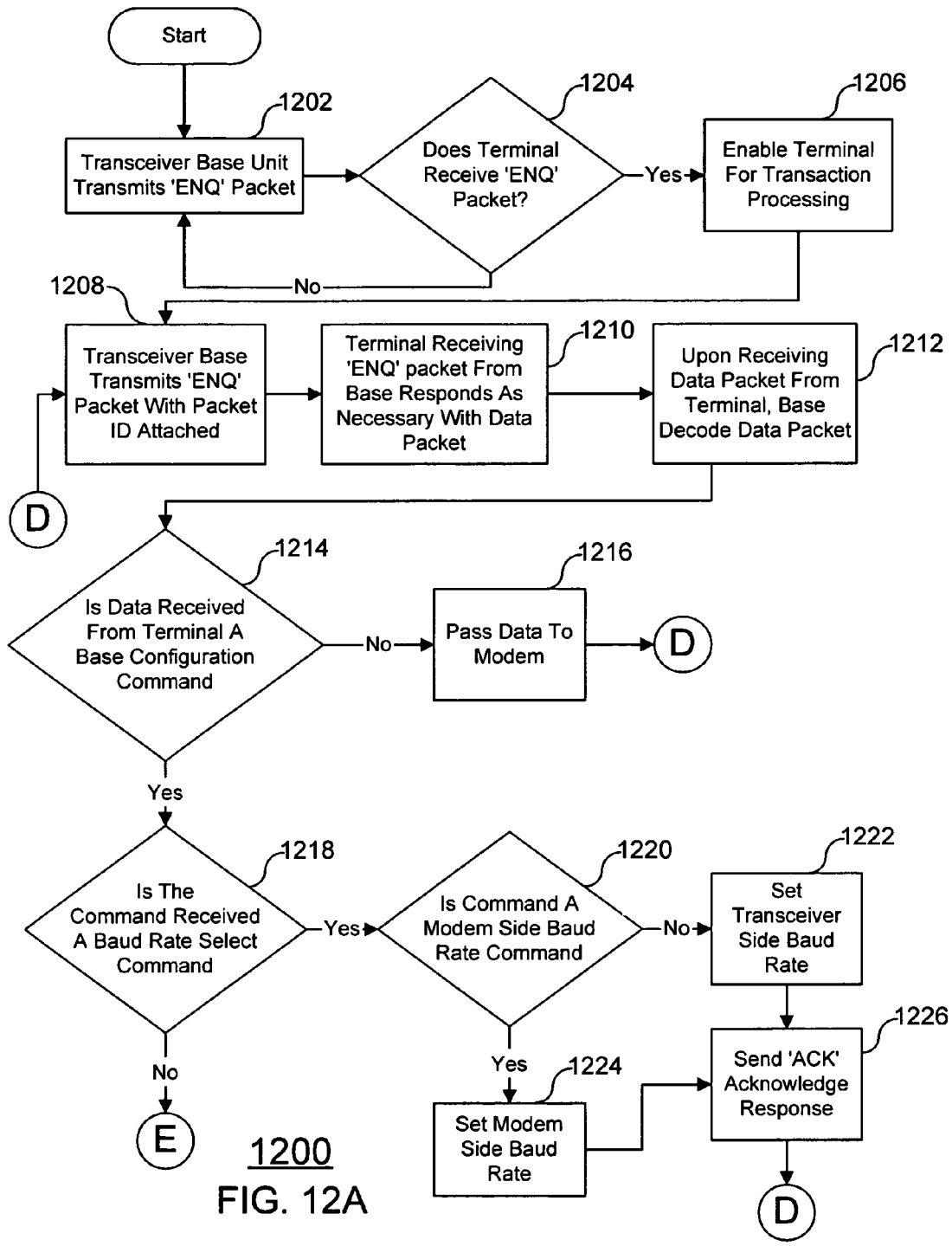
FIGS. 12A-12B there is shown a vending machine interface unit (VIU) 100 with system 500 and transceiver and modem base unit system 700 wireless protocol data communication routine 1200.
Figure 12B:
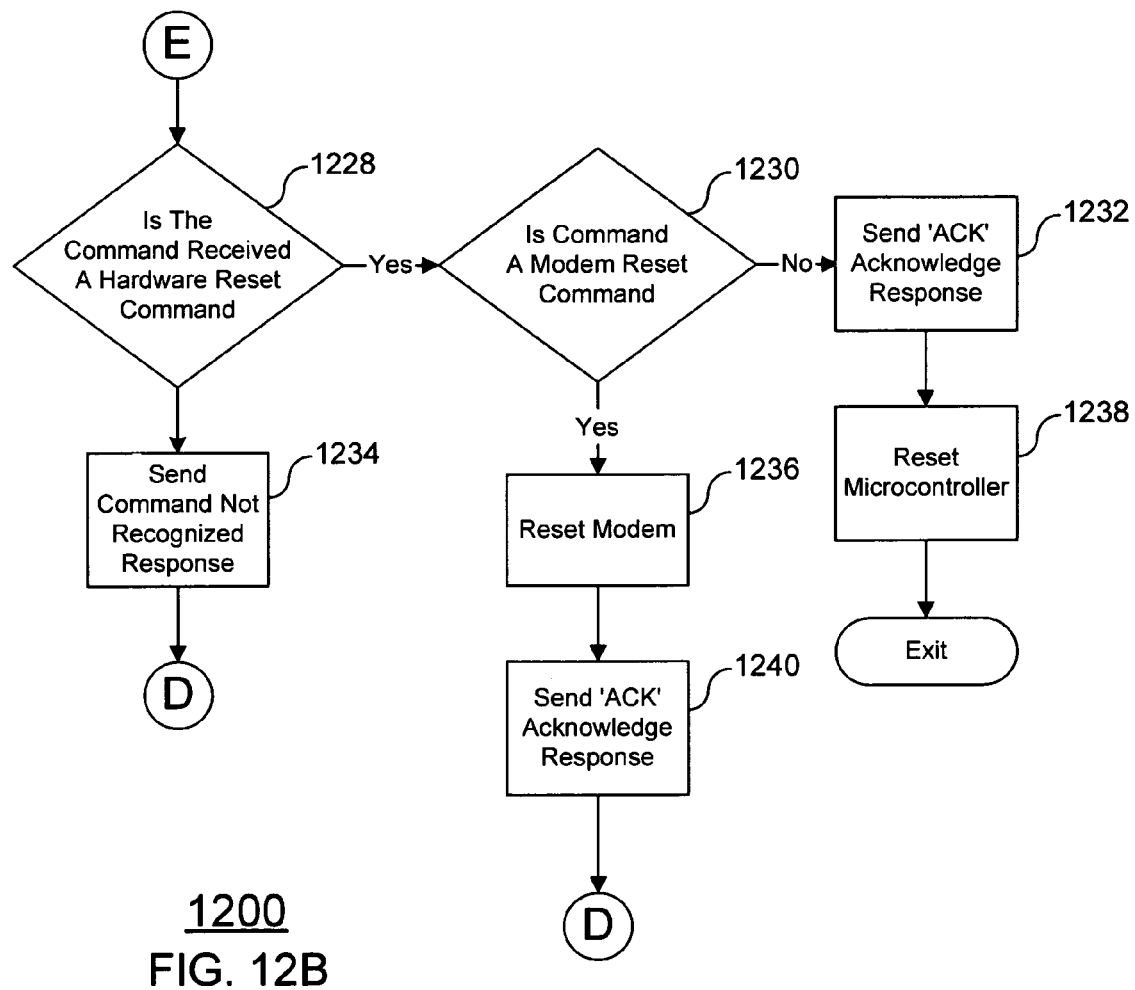

Referring to FIGS. 12A-12B there is shown a VIU 100 with system 500 and transceiver and modem base unit system 700 wireless protocol data communication routine 1200. In a typical application involving a VIU 100 comprising audit-credit-interactive system 500 the VIU 100 will be installed in vending equipment. In certain of those installations it may be desirable to data communicate wirelessly to a transceiver system 700 instead of trying to hardwire the system 500 to a communication line. A transceiver system 700 can be referred to as a base unit or base unit 700.

In installations where system 500 data communicates to a plurality of remote locations by way of a wireless data connection to transceiver system 700 a protocol can be implemented to insure data integrity, security, and transceiver system 700 correct configurations. Routine 1200 can implement such a protocol between system 500 and transceiver system 700. Processing begins in block 1202.

In block 1202 the transceiver system 700 data communicates wirelessly an ENQ packet. The 'ENQ' packet comprises control codes that indicate the state and or current condition of the base unit 700. Base unit 700 state or condition codes include an AVAILABLE condition, BUSY condition, and a POLLING condition.

The AVAILABLE state indicates to any VIU 100 system 500 listening in wireless proximity to the base unit 700 that the base unit and communication interface is AVAILABLE and ready for use by any VIU 100 (system 500). The communication interface includes modem 704, wireless interface 720, interactive interface 718, serial communication interface 724, and network connection 722. In an exemplary embodiment base unit 700 is configured to use one of the communication interface options (704, 718, 720, 722, or 724). The BUSY state indicates to any VIU 100/system 500 listening in wireless proximity to the base unit 700 that the base unit and communication interface is BUSY servicing a different VIU 100 and is unavailable for use. The POLLING state indicates to any VIU 100/system 500 listening in wireless proximity to the base unit 700 that a remote location has requested that the VIU 100 initiate a call host sequence. This in effect triggers each VIU based on individual VIU 100 programming to initiate a call to the requesting remote location. Processing then moves to decision block 1204.

In decision block 1204 a determination is made as to whether the system 500, referred to as the terminal, wirelessly receives the ENQ message sent by the transceiver system 700. If the result is in the affirmative that is the terminal receives the ENQ message then processing moves to block 1206. If the resultant is in the negative that is the terminal did not receive the ENQ message then processing moves back to block 1202.

In reply to block 1206 the terminal is enabled for transaction processing. Processing then moves to block 1208.

In block 1208 the transceiver system 700 referred to as the base unit transmits an ENQ packet with a packet ID attached. Processing then moves to block 1210.

In block 1210 the terminal receives the ENQ and packet ID from the transceiver system 700. In accordance with system 500 data requirements the system 500 then responds as necessary with a data packet. Processing then moves to block 1212.

In block 1212 the transceiver system 700 upon receiving the data packet from the system 500 decodes the data packet. Processing then moves to decision block 1214.

In decision block 1214 the transceiver system 700 makes a determination as to whether the data received from the system 500 is data intended for system 700 configurations. System 700 can be referred to as the base unit or base. If the resultant is in the affirmative that is the data is configuration data for the base unit processing moves to block 1218. If the resultant is in the negative that is the data is not configuration data for the base unit then processing moves to block 1216.

In block 1216 the data received from the system 500 is data communicated or passed to the system 700's modem 704. Processing then moves back to block 1208.

In decision block 1218 a determination is made as to whether the data command received from the system 500 is a baud rate configuration command intended for modem 704 or a baud rate configuration command intended for transceiver 708.

In an exemplary embodiment modem 704 data communicates with microcontroller 702 at a first baud rate to effectuate data communication with a plurality of remote locations. Transceiver 708 data communicates with microcontroller 502 by way of transceiver 524 at a second baud rate to effectuate data communications between system 500 and a plurality of remote locations by way of system 700. The first baud rate and the second baud rate can be the same or different baud rated.

If the resultant in decision block 1218 is in the affirmative that is the data command is a baud rate configuration command then processing moves to decision block 1220. If the resultant is in the negative that is the data command received is not a baud rate configuration command then processing moves to decision block 1228.

In decision block 1220 a determination is made as to whether the command is intended for modem 704. If the resultant is in the affirmative that is the command is intended for modem 704 then processing moves to block 1224. If the resultant is in the negative that is the command is not intended for modem 704 then processing moves to block 1222.

In block 1220 the transceiver 708 baud rate is configured. Processing moves to block 1226.

In block 1224 the baud rate of modem 704 is configured. Processing moves to block 1226.

In block 1226 the transceiver system 700 sends the acknowledge (ACK) message to the system 500 originating the data command. Processing then move backs to block 1208.

In decision block 1228 a determination is made as to whether the received data command is a hardware-reset command. If the resultant is in the affirmative that is the received data command is a hardware-reset command then processing moves to decision block 1230. If the resultant is in the negative that is the received data command is not a hardware-reset command then processing moves to block 1234.

In decision block 1230 a determination is made as to whether the received command is a modem hardware-reset command. If the resultant is in the affirmative that is the received data command is a modem hardware-reset command then processing moves to block 1232. If the resultant is in the negative that is the data command received is not a hardware-reset command then processing moves to block 1236.

In block 1232 the transceiver system 700 sends the ACK message to the system 500 originating the data command. Processing then move to block 1238.

In block 1238 the microcontroller 702 is reset. The routine is then exited.

In block 1236 the modem 704 is reset. Processing moves to block 1240.

In block 1240 the transceiver system 700 sends the ACK message to the system 500 originating the data command. Processing then move backs to block 1208.

In block 1234 the transceiver system 700 sends the COMMAND NOT RECOGNIZED message to the system 500 originating the data command. Processing then move back to block 1208.

Figure 20:
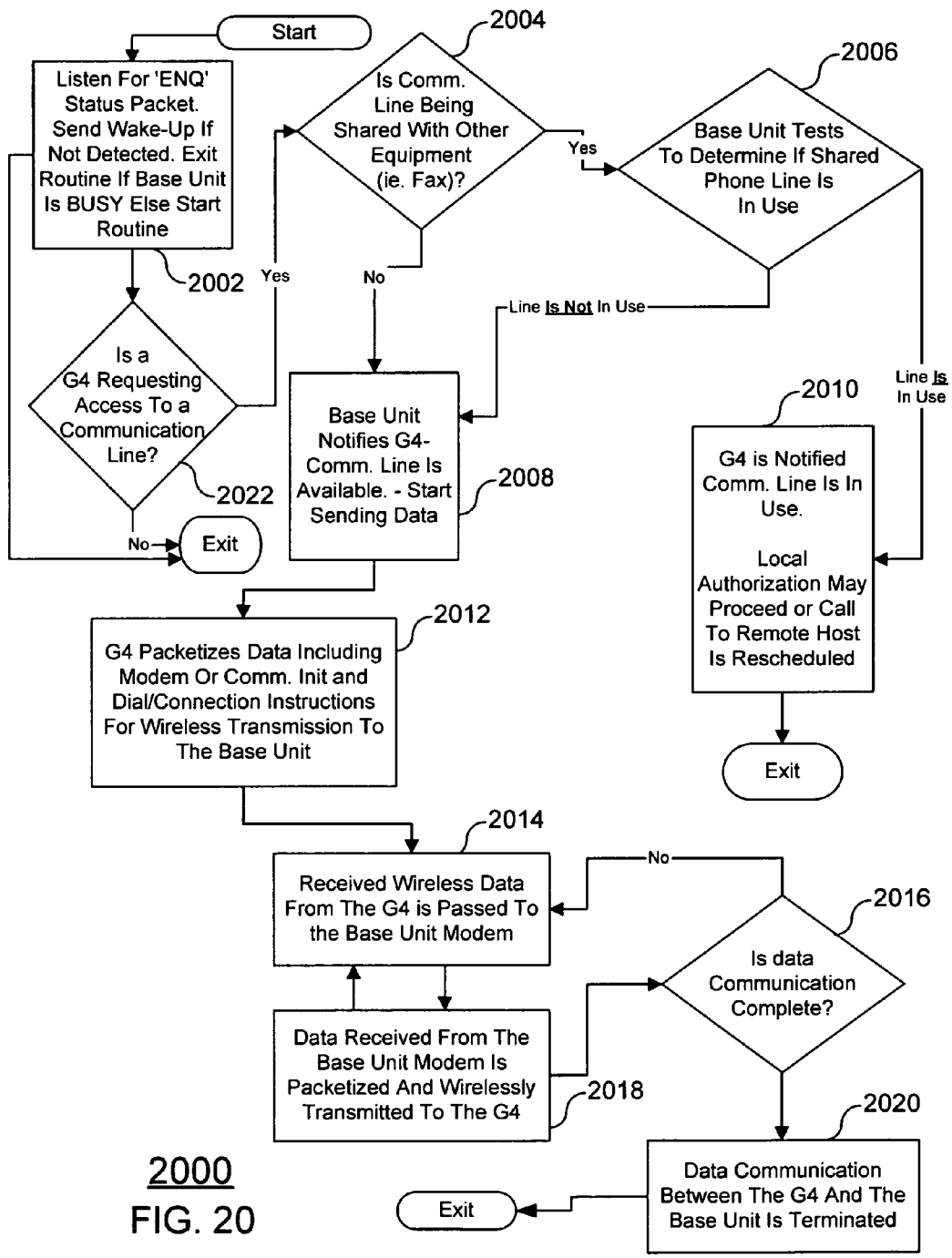
FIG. 20 there is shown a transceiver and modem base unit system 700 wireless protocol data communication routine 2000.

Referring to FIG. 20 there is shown a transceiver and modem base unit system 700 wireless protocol data communication routine 2000. In an exemplary embodiment the base unit 700 serves as a data gateway between the system 500 and a remote location. In operation the system 500 1) initially requests data access to the base unit 700, and if data access is granted by the base unit 700 then 2) begins utilizing the base unit 700 internal modem by transmitting and receiving data packets to and from the base unit 700. The base unit 700 manages 1) granting or denying data communication access between the system 500 terminal and the base unit 700, 2) the receiving of packetized wireless data from the system 500 for processing and data communication to the internal base unit 700 modem 704, and 3) the receiving of data from the internal base unit 700 modem, processing, packetizing, and wireless data communication via transceiver 708 to the system 500 terminal.

The data packets and wireless communication protocol can be encrypted, and error checked for data integrity. In addition, the remote hosts both credit bureau and the USALIVE network can perform their own data integrity checking. In essence the data packets can be error checked and the data received at the hosts can be error checked.

In an exemplary embodiment the packet by packet error checking can be turned off at the base unit 700 and system 500 and the data packets can be automatically sent multiple times. In this regard, error checking of each packet still occurs and only correct error free packets are passed to the remote location. Packets with errors are just discarded. If an error in a packet is detected it is the successive sending of the same packet that is relied upon to overcome the error. With no ACKing or NAKing on a packet by packet basis a half duplex transceiver system can send more data faster by not having to switch between send and receive modes. Since the remote location has calculated its own checksums and appended it to the data the remote location can determine if all data was received and received correctly. If the determination is made at the remote location that the data was not received correctly then the remote location can data communicate a NAK and the system will retransmit the data.

The wireless communication protocol comprises a successive try-retry algorithm to insure the wireless data transmission is received complete and error free. In the event wireless data can't be transmitted error free or packets are missing the system 500 has embedded programmable functionality to compensate for the dropped transmission.

In an exemplary embodiment, in the event the system 500 is trying to real time authorize a credit card with a remote credit bureau and the system is unable to wirelessly complete the task; instead of failing the process entirely the system 500 can terminate the wireless transmission and rely on its own internal local authorization routines 1300 or 1900 to validate the user's credit card.

In a second exemplary embodiment, if the system 500 is trying to data communicate wirelessly with a remote host location such as USALIVE and the wireless communication fails the communication can be automatically rescheduled by the system 500 terminal.

Routine 2000 details the process of wireless data communication between the system 500 terminal and a remote location and or a global network based data processing resource such as global network based data processing resources 810 by way of the base unit 700.

Processing begins in block 2002 where the VIU 100 listens for the 'ENQ' status packet communicated from the base unit 700. The 'ENQ' packet comprises control codes that indicate the state and or current condition of the base unit 700. Base unit 700 state or condition codes include an AVAILABLE condition, BUSY condition, and a POLLING condition.

The AVAILABLE state indicates to any VIU 100 system 500 listening in wireless proximity to the base unit 700 that the base unit and communication interface is AVAILABLE and ready for use by any VIU 100. The communication interface includes modem 704, wireless interface 720, interactive interface 718, and network connection 722. In an exemplary embodiment base unit 700 is configured to use one of the communication interface options (704, 718, 720, or 722).

The BUSY state indicates to any VIU 100 system 500 listening in wireless proximity to the base unit 700 that the base unit and communication interface is BUSY servicing a different VIU 100 and is unavailable for use.

The POLLING state indicates to any VIU 100 system 500 listening in wireless proximity to the base unit 700 that a remote location has requested that the VIU 100 initiate a call host sequence. This in effect triggers each VIU based on individual VIU 100 programming to initiate a call to the requesting remote location. If the current state or condition of the base unit 700 is BUSY or POLLING then the routine is exited, else processing moves to decision block 2022.

In decision block 2022 where a determination is made as to whether a system 500 terminal is requesting wireless data communication access to the base unit 700. If the resultant is in the affirmative, that is there is a system 500 requesting wireless data communication access to the base unit 700 then processing moves to decision block 2004. If the resultant is in the negative that is there is no system 500 requesting data communication access to the base unit 700 then the routine is exited.

In decision block 2004 a determination is made as to whether the base unit 700 is sharing a telephone line with additional equipment, such as a fax machine. If the resultant is in the affirmative that is the base unit 700 is sharing a telephone line then processing moves to decision block 2006. If the resultant is in the negative that is the base unit 700 is not sharing a telephone line with additional equipment then processing moves to block 2008.

In decision block 2006 a determination is made as to whether the shared telephone line is currently in use by the additional or shared equipment. If the resultant is in the affirmative, that is the telephone line is in use then processing moves to block 2010. If the resultant is in the negative that is the telephone line is available and not in use then processing moves to block 2008.

In block 2010 upon the determination that the telephone line is not available the base unit 700 wirelessly notifies the requesting system 500 that the telephone line is in use. The system 500 depending on feature programming then makes a determination as to whether to invoke the local authorization routines 1300 or 1900 or reschedule the data communication attempt to the remote host network. The routine is then exited.

In block 2008 the base unit 700 wirelessly notifies the requesting system 500 that the telephone line is available and data communication between the requesting system 500 and the base unit 700 can begin. In addition, the base unit 700 notifies any other system 500 in wireless proximity to the base unit that the base unit 700 is currently unavailable. Processing then moves to block 2012.

In block 2012 the system 500 begins packetizing the desired data and wirelessly data communicating with the base unit 700. Less the packetizing data and processing, the system 500 in large part data communicates the same data that would be required to initialize a modem and effectuate modem dialing if the modem were physically present on the system 500 circuit card. Processing moves to block 2014.

In block 2014 wireless data packets received at the base unit 700 from the system 500 are validated and acknowledged. The packet is then parsed and the desired data is passed to the base unit's internal modem 704. A system 500 time-out detection and or base unit 700 non-acknowledge facilitates a retransmission of the data from the system 500. Processing moves to block 2018.

In block 2018 data received at the base unit's microcontroller 702 from the base unit's internal modem 704 is packetized and wirelessly data communicated via transceiver 708 to the appropriate system 500. The data received at the system 500 is validated and optionally acknowledged. A base unit 700 time-out detection and or system 500 non-acknowledge facilitates a retransmission of the data from the base unit 700. Processing then moves to decision block 2016.

In an exemplary embodiment data is successively and continuously handled in block 2014 and 2016 as long as data communication between the system 500 and the base unit 700 is required. The base unit 700, system 500, or the remote host can terminate data communication. Where the remote host is typically the credit card bureau, or USALIVE network.

In decision block 2016 a determination is made as to whether the data communication between the system 500 and the remote host by way of the base unit 700 is complete. If the resultant is in the affirmative that is the data communication is complete then processing moves to block 2020. If the resultant is in the negative that is the data communication is not complete then processing moves back to block 2014.

In block 2016 data communication between the G4 system, the base unit 700, and the remote host is terminated. The base unit 700 notifies all system 500s in wireless proximity to the base unit 700 that the base unit 700 is available. The system 500 concludes data communication and resumes normal terminal functionality. The routine is then exited.

Figure 13:
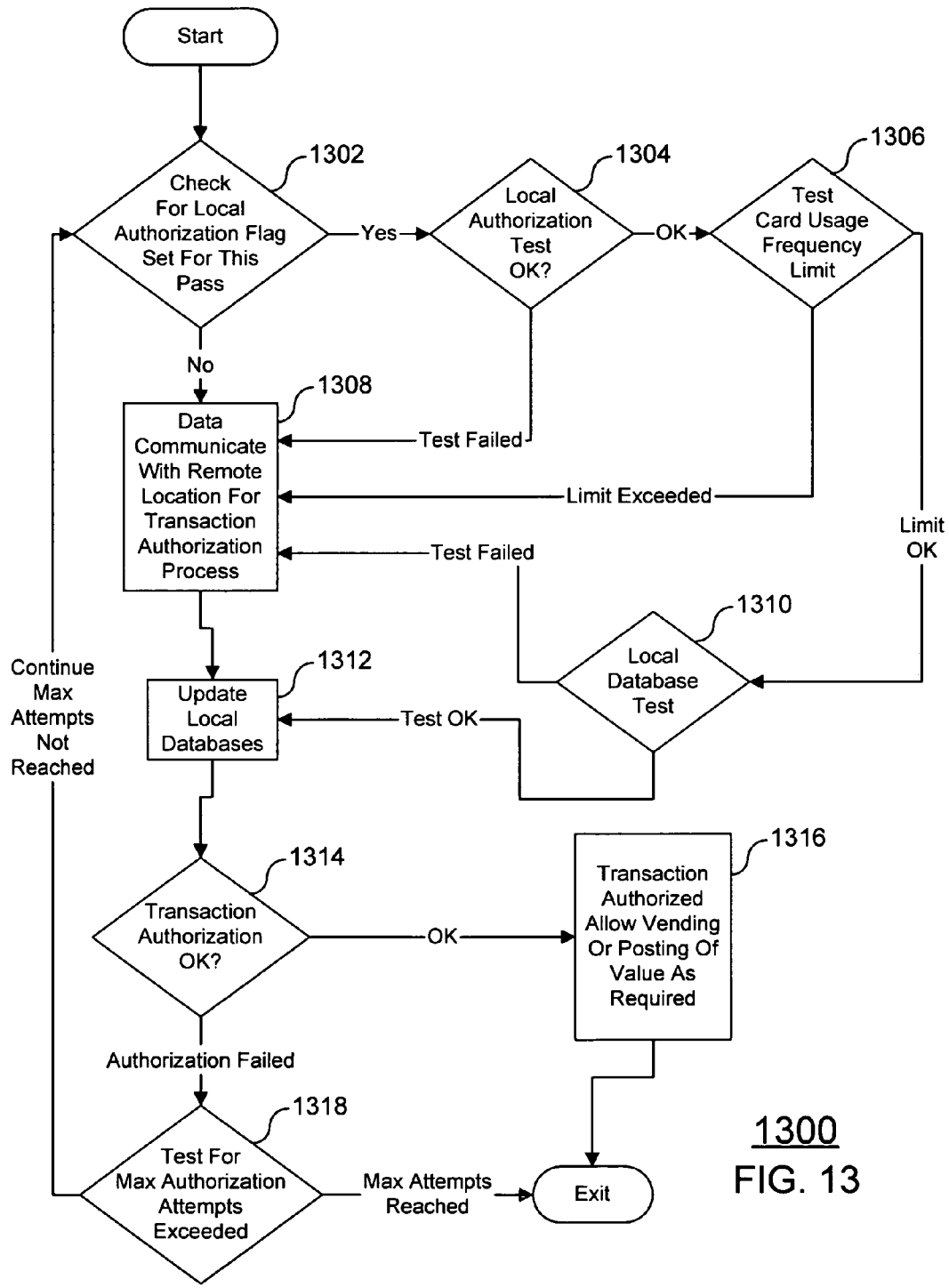
FIG. 13 there is shown a local transaction authorization routine 1300.

Referring to FIG. 13 there is shown a local transaction authorization routine 1300. A conventional card authorization through a remote processing bureau utilizing dial-up landline access to the remote processing bureau can take ten or more seconds to complete. In certain vending venues and or while vending certain types of products a ten or more second delay may be unacceptable. In these instances authorization routine 1300 can be implemented to reduce or eliminate the authorization delay while maintaining a high confidence that the card is valid. A card can be any form of ID including a credit card, magnetic card, wireless phone, a personal digital assistant PDA, private label card, smart card, hotel room card, radio frequency RFID identification, biometric, and or other similar or suitable form of ID. Processing begins in decision block 1302.

In decision block 1302 a determination is made as to whether the LOCAL AUTHORIZATION FLAG is set for this pass. In an exemplary embodiment system 500 can be programmed to locally authorize a card based in part on an iterative process, which allows for the local authorization routine to be invoked, at a minimum, on the first pass and subsequently at any successive pass up to the last pass. The current pass through the routine is referred to as the CURRENT AUTHORIZATION ATTEMPT. The last pass is predetermined and is referred to as the MAXIMUM AUTHORIZATION ATTEMPTS LIMIT. The LOCAL AUTHORIZATION FLAG determines on which iterative pass the local authorization routine will be invoked. The iterative pass in which the LOCAL AUTHORIZATION FLAG will be set and the local authorization routine invoked is referred to as the LOCAL AUTHORIZATION ROUTINE ENTRY COUNTER.

In a first example and not limitation the local authorization can be invoked on the first pass. In this case no remote location will be contacted unless the local authorization results in a declined card response. In a second example the local authorization flag may be set for the second pass. In this case the system 500 will first try to remotely authorize the card. If the remote processing bureau is unavailable or unable to authorize the card then on the second pass the local authorization routine will be invoked.

If the resultant in decision block 1302 is in the affirmative that is the LOCAL AUTHORIZATION flag is set then processing moves to decision block 1304. If the resultant is in the negative that is the LOCAL AUTHORIZATION flag is not set then processing moves to block 1308.

In decision block 1304 a determination is made as to whether the local authorization test was OK. If the resultant is in the affirmative that is the local authorization test was OK then processing moves to decision block 1306. If the resultant is in the negative that is the local authorization test failed then processing moves to block 1308.

In an exemplary embodiment the local authorization test can include a test of the card's expiration date and the card's modulo-10 check digit. The test of the expiration date will determine whether or whether not the card is expired based on the current date. The test for the modulo-10 check digit will determine if the card number sequence is a valid number sequence.

In decision block 1306 a determination is made as to whether the CARD USAGE FREQUENCY limit has been reached. The CARD USAGE FREQUENCY is the total amount of time in a predetermined time period the current card has previously been authorized. In an exemplary embodiment the CARD USAGE FREQUENCY can be used to limit the number of times a card will be locally authorized before the system 500 will attempt to authorize the card by way of a processing bureau 804.

If the resultant in decision block 1306 is in the affirmative that is the CARD USAGE FREQUENCY is within the limit then processing moves to decision block 1310. If the resultant is in the negative that is the CARD USAGE FREQUENCY has been reached the limit then processing moves to block 1308.

In block 1308 system 500 initiates a data communication for the purpose of authorizing the current card with the processing bureau 804. Processing moves to block 1312.

In block 1312 a local database within system 500 can be updated. This local data can include positive cards, which are cards that have previously been successfully approved. In addition, this local database can include negative cards, which are cards that have previously been declined. Processing then moves to decision block 1314.

In decision block 1310 the card is tested for its appearance in the system 500 local databases. If the resultant is in the affirmative that is the card does not appear in a negative database and or the card appears in the positive database then processing moves to block 1312. If the resultant is in the negative that is the card appears in the negative database and or does not appear in the positive database then processing moves to block 1308.

In decision block 1314 a determination is made as to whether the card has been approved. If the resultant is in the affirmative that is the card has been approved then processing moves to block 1316. If the resultant is in the negative that is the card has been declined then processing moves to decision block 1318.

In decision block 1318 a determination is made as to whether the MAXIMUM AUTHORIZATION ATTEMPTS LIMIT has been reached. The MAXIMUM AUTHORIZATION ATTEMPTS LIMIT is the count of the number of iterative authorization passes through routine 1300. If the resultant is in the affirmative that is the MAXIMUM AUTHORIZATION ATTEMPTS LIMIT has not been reached then processing moves back to decision block 1302.

If the resultant is in the negative that is the MAXIMUM AUTHORIZATION ATTEMPTS LIMIT has been reached then the routine is exits and the card is reported as declined.

In block 1316 the transaction is reported as authorized and the vending equipment is enabled for operation. The routine is then exited.

Figure 19A:
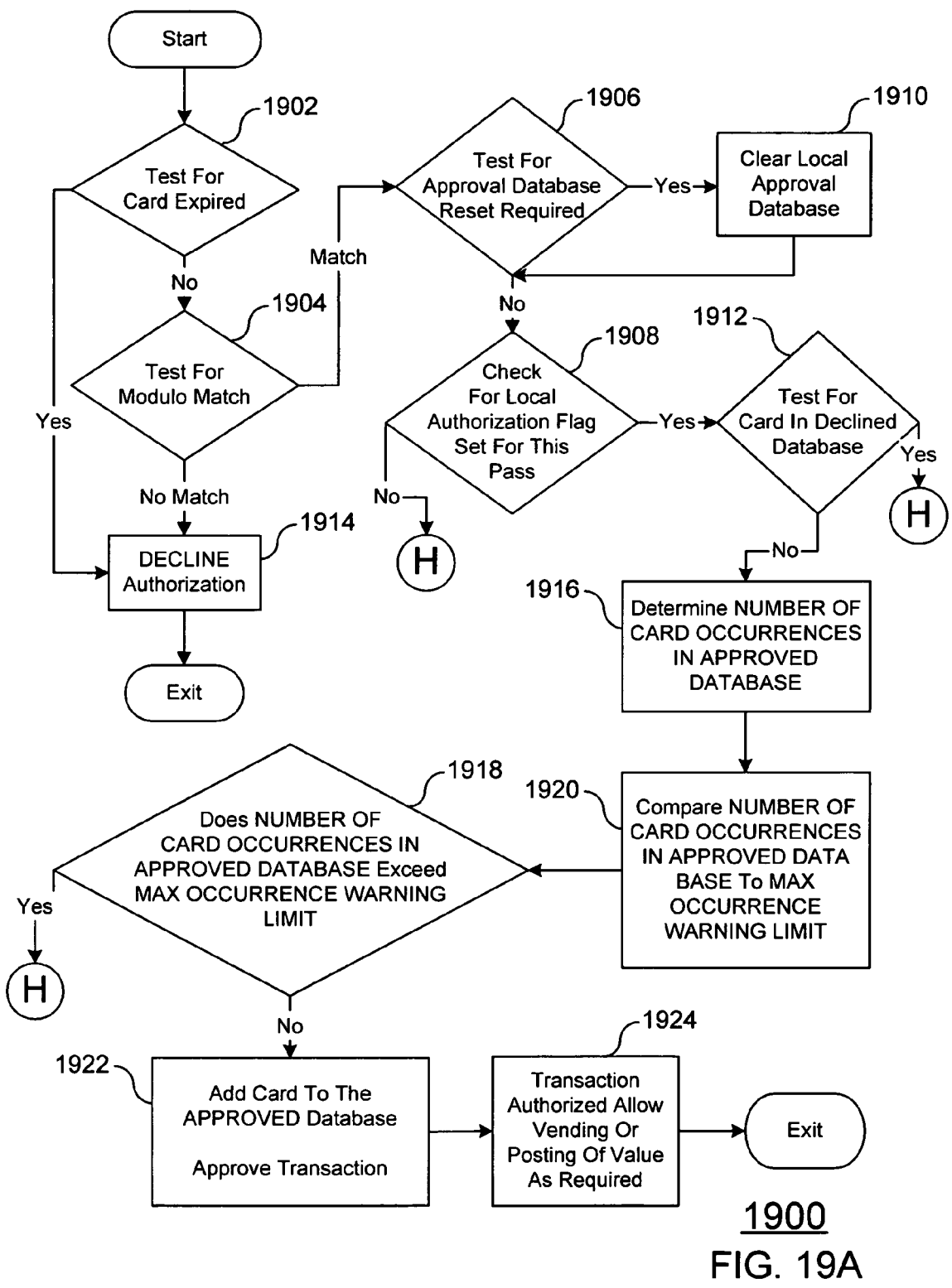
FIGS. 19A-19B there is shown a local authorization database management routine 1900.
Figure 19B:
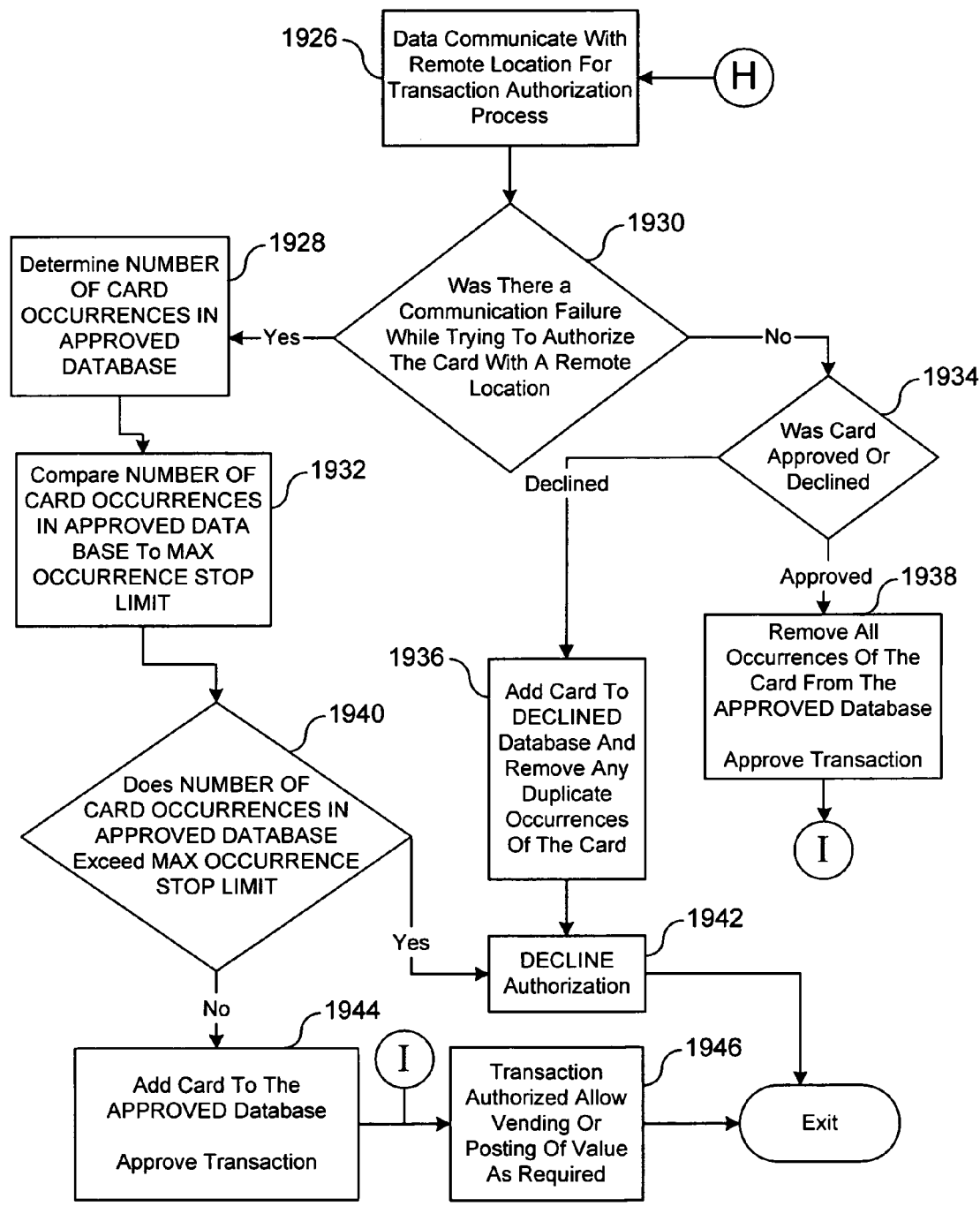

Referring to FIGS. 19A-19B there is shown a local authorization routine 1900. Routine 1900 is an exemplary embodiment of a local authorization routine. Routine 1900 utilizes locally stored databases to selectively approve and decline a card transaction. Similar to routine 1300, routine 1900 can be implemented to reduce or eliminate the authorization delay while maintaining a high confidence that the card is valid.

Payment identification data can be referred to as a card, and can be any form of ID including a credit card, magnetic card, wireless phone, a personal digital assistant (PDA), a pager, private label card, smart card, hotel room card, radio frequency RFID identification, touch or contact ID, biometric, and or other similar or suitable form of ID. In general, payment identification data (referred to as card) is a unique ID used by a user for identification and or payment from goods and or services vended from vending equipment. Processing begins in decision block 1902.

In decision block 1902 a test is performed to determine if the payment identification data (card) presented is expired. In an exemplary embodiment expiration information can be encoded in the payment identification data. If the resultant is in the affirmative that is the card is expired then processing moves to block 1914. If the resultant is in the negative that is the card is not expired then processing moves to decision block 1904.

In decision block 1904 a test is performed to determine if the modulo-10 of the card presented is correct. The modulo check can be a mathematical routine to determine the validity of payment identification data sequence. Such modulo checks typically utilize a mathematical routine that produces a specific check digit or character. The correct check digit can be encoded in the payment identification data and can be check against the calculated value to determine if the data sequence is valid.

If the resultant in decision block 1904 is in the affirmative that is the modulo-10 check digit matches then processing moves to decision block 1906. If the result in decision block 1904 is in the negative that is the modulo-10 check digit does not match then processing moves to block 1914.

In block 1914 the transaction authorization is declined and the routine is exited.

In decision block 1906 a test is made to determine in the MAXIMUM APPROVAL RESET HOUR has been reached. If the resultant is in the affirmative that is the MAXIMUM RESET HOUR has been reached then processing moves to block 1910. If the resultant is in the negative that is the MAXIMUM RESET HOUR has not been reached then processing moves to decision block 1908.

In block 1910 the APPROVAL database is erased and the MAXIMUM RESET HOUR timer is reset. The MAXIMUM RESET HOUR is a remotely programmable preset condition that indicates the time interval in hours between erasing of the APPROVAL DATABASE.

In an exemplary embodiment erasing the APPROVAL database at a periodic interval limits the amount of time a user can present the same payment identification data in a specific period of time without having the payment identification data declined or requiring the authorization of the payment identification data with a remote location. For example and not limitation if a certain payment identification data can be presented for payment only once a every 24 hours the local authorization upon seeing the same payment identification data a second time within the same 24 hour period will either decline the payment identification data or attempt to remotely authorize the payment identification data. If however the user waits more than 24 hours before presenting the same payment identification data the clearing of the APPROVAL database can occur and the user's payment identification data can be accepted as if presented for the first time. Processing then moves to decision block 1908.

In another exemplary embodiment, under normal system 500 terminal use payment identification data (card) can be added to the APPROVAL database each time a valid card is locally authorized. Over time the MAXIMUM OCCURRENCE WARNING LIMIT, and the MAXIMUM OCCURRENCE STOP LIMIT will be reached. Upon exceeding these limits, the system 500 terminal will attempt to authorize the card remotely. If it is the intention to allow a user to locally authorize a card, for example each day, without requiring an occasional remote authorization, but to limit the amount of local authorizations granted in a single day the MAXIMUM RESET HOUR can be set for example and not limitation at 24 hours. This will erase the APPROVAL database every 24 hours. As long as the repeat user does not exceed the MAXIMUM OCCURRENCE WARNING or STOP limits in a single 24-hour period no remote authorization will be required. The MAXIMUM RESET HOUR can be set to any amount of time including zero. In the case the MAXIMUM RESET HOUR is set to zero the APPROVAL database will not be cleared automatically based on time.

In decision block 1908 a determination is made as to whether the LOCAL AUTHORIZATION FLAG is set for this pass. In an exemplary embodiment system 500 can be programmed to locally authorize a card based in part on an iterative process, which allows for the local authorization routine to be invoked, at a minimum, on the first pass and subsequently at any successive pass up to the last pass. The current pass through the routine is referred to as the CURRENT AUTHORIZATION ATTEMPT. The last pass is predetermined and is referred to as the MAXIMUM AUTHORIZATION ATTEMPTS LIMIT. The LOCAL AUTHORIZATION FLAG determines on which iterative pass the local authorization routine will be invoked. The iterative pass in which the LOCAL AUTHORIZATION FLAG will be set and the local authorization routine invoked is referred to as the LOCAL AUTHORIZATION ROUTINE ENTRY COUNTER.

In a first example the local authorization can be invoked on the first pass. In this case no remote location will be contacted unless the local authorization results in a declined card response. In a second example the local authorization flag may be set for the second pass. In this case the system 500 will first try to remotely authorize the card. If the remote processing bureau is unavailable or unable to authorize the card then on the second pass the local authorization routine will be invoked.

If the resultant in decision block 1908 is in the affirmative that is the LOCAL AUTHORIZATION flag is set then processing moves to decision block 1912. If the resultant is in the negative that is the LOCAL AUTHORIZATION flag is not set then processing moves to block 1926.

In decision block 1912 a test is performed to determine if the card presented for authorization is currently in the local DECLINED database. If the resultant is in the affirmative that is the card is in the DECLINED database then processing moves to block 1926. If the resultant is in the negative that is the card is not in the DECLINED database then processing moves to block 1916.

In block 1916 the APPROVED database is queried to determine how many occurrences of the current card are already in the database (having previously been presented and locally authorized). This is referred to as the NUMBER OF CARD OCCURRENCES IN APPROVED DATABASE. Processing then moves to block 1920.

In block 1920 a comparison of the NUMBER OF CARD OCCURRENCES IN APPROVED DATABASE is made to the MAXIMUM OCCURRENCES WARNING LIMIT. Processing then moves to decision block 1918.

The MAXIMUM OCCURRENCES WARNING LIMIT is a remotely programmable preset variable that indicates the number of repeat occurrences the same card number can be presented for local authorization before a remote authorization is forced and or the payment identification data (card) declined. In an exemplary embodiment, it may be desirable to accept for local authorization a card no more the 2 time before that card will be authorized at a remote location. The presumption is that only the remote location has access to real time card data validity. In that case a card may be locally authorized that is in fact not a valid active card. To minimize the risk of approving a bad card the MAXIMUM OCCURRENCES WARNING LIMIT can be set as desired to limit exposure on a bad card. For example and not limitation the MAXIMUM OCCURRENCE WARNING LIMIT can be set to two. In this case the card will be accepted and locally authorized twice before a remote authorization step is forced.

In decision block 1918 a test is performed to determine if the NUMBER OF CARD OCCURRENCES IN APPROVED DATABASE exceed the MAXIMUM OCCURRENCE WARNING LIMIT. If the resultant is in the affirmative that is the NUMBER OF CARD OCCURRENCES IN APPROVED DATABASE exceed the MAXIMUM OCCURRENCE WARNING LIMIT then processing moves to block 1926. If the resultant is in the negative that is the NUMBER OF CARD OCCURRENCES IN APPROVED DATABASE does not exceed the MAXIMUM OCCURRENCE WARNING LIMIT then processing moves to block 1922.

In block 1922 the card data is added to the APPROVED database and the transaction is approved. Processing moves to block 1924.

In block 1924 the transaction is authorized and the user is allowed to utilize the vending equipment, referred to as a transaction, transaction data, and or completing a transaction. The routine is then exited.

In block 1926 system 500 initiates a remote data communication for the purpose of authorizing the current card with the processing bureau 804. Processing moves to decision block 1930.

In decision block 1930 a test is performed to determine if during the remote authorization process a communication line failure was detected. Such a failure could include for example and not limitation a phone line being busy or unavailable, or a server being unavailable. If the resultant is in the affirmative that is a communication line failure was detected then processing moves to block 1928. If the resultant is in the negative that is a communication line failure was not detected then processing moves to decision block 1934.

In block 1928 the APPROVED database is queried to determine how many occurrences of the current card are already in the database (having previously been presented and locally authorized). This is referred to as the NUMBER OF CARD OCCURRENCES IN APPROVED DATABASE. Processing then moves to block 1932.

In block 1932 a comparison of the NUMBER OF CARD OCCURRENCES IN APPROVED DATABASE is made to the MAXIMUM OCCURRENCES STOP LIMIT. Processing then moves to decision block 1918.

The MAXIMUM OCCURRENCES STOP LIMIT is a remotely programmable preset variable that indicates the number of times the same card number can be presented for local authorization before a remote authorization is forced. In an exemplary embodiment, it may be desirable to accept for local authorization a card no more then three times before that card will be authorized at a remote location.

The difference between the MAXIMUM OCCURRENCE WARNING LIMIT and the MAXIMUM OCCURRENCE STOP LIMIT is that when the WARNING limit is exceeded a remote authorization will be attempted. If the remote authorization attempt fails due to communication related issues then the MAXIMUM OCCURRENCE STOP LIMIT would serve as a determinant in approving or denying the current transaction. If the MAXIMUM OCCURRENCE STOP LIMIT is not exceeded the local authorization processing will continue. If the MAXIMUM OCCURRENCE STOP LIMIT is exceeded the card will be declined. This feature in effect minimizes the possibility of inadvertently declining a card based on a communication line failure.

In an exemplary embodiment it can be desirable not to decline a user's payment identification data because the system 500 was unable to establish a data communication connection with a remote location, wherein such a data communication with a remote location is being attempted for the purpose of authorizing the user's payment identification data (card). In this regard, in an attempt to limit the exposure of locally approving a user's payment identification data while accommodating the possibility of the system 500 being unable to remotely authorize, for communication failure reasons, the user's payment identification data with a remote location a MAXIMUM OCCURRENCES STOP LIMIT can be implemented.

The MAXIMUM OCCURRENCES STOP LIMIT can be a number higher than the MAXIMUM OCCURRENCE WARNING LIMIT for example and not limitation the MAXIMUM OCCURRENCE WARNING LIMIT can be set to 2 and the MAXIMUM OCCURRENCES STOP LIMIT can be set to 3. In this example when a user presents payment identification data for the third time the MAXIMUM OCCURRENCE WARNING LIMIT is exceeded forcing a remote authorization attempt. If for communication reasons (busy signal on the phone line, network is down, etc.) a remote authorization fails—since the MAXIMUM OCCURRENCES STOP LIMIT is set to 3 and is not exceeded by the user's third presentation of the payment identification data the transaction is locally authorized and approved.

If in another exemplary embodiment, the user now were to present the payment identification data for a fourth time and a remote authorization failed for communication reasons, that is a data connection with the remote location could not be established, then the transaction would be locally declined. This authorization decline occurring since now the NUMBER OF CARD OCCURRENCE IN APPROVED DATABASE exceeds the MAXIMUM OCCURRENCES STOP LIMIT.

In decision block 1940 a test is performed to determine if the NUMBER OF CARD OCCURRENCES IN APPROVED DATABASE exceed the MAXIMUM OCCURRENCE STOP LIMIT. If the resultant is in the affirmative that is the NUMBER OF CARD OCCURRENCES IN APPROVED DATABASE exceed the MAXIMUM OCCURRENCE STOP LIMIT then processing moves to block 1942. If the resultant is in the negative that is the NUMBER OF CARD OCCURRENCES IN APPROVED DATABASE does not exceed the MAXIMUM OCCURRENCE STOP LIMIT then processing moves to block 1944.

In block 1944 the card data is added to the APPROVED database and the transaction is approved. Processing moves to block 1946.

In block 1946 the transaction is authorized and the user is allowed to utilize the vending equipment. The routine is then exited.

In decision block 1934 a test is made to determine if the card was approved. If the resultant is in the affirmative that is the card was approved then processing moves to block 1938. If the resultant is in the negative that is the card was declined then processing moves to block 1936.

In block 1936 the card is entered into the DECLINED database. If multiple occurrences of the card appear in the DECLINED database the duplicate occurrences are removed. Processing then moves to block 1942.

In block 1938 all occurrences of the card data are removed from the APPROVED database. The transaction is approved and processing moves to block 1946.

In an exemplary embodiment locally authorized and remotely authorized payment identification data and cashless transaction data can be accumulated in the system 500 over time. At a periodic interval, for example and not limitation once a day, the authorized transactions can be data communicated to a remote data processing resource. A remote data processing resource can be a global network based data processing resource.

In an exemplary embodiment, the authorized transactions can be data communicated to a remote data processing resource by way of a first data communication to a data processing device, such as a PDA 372, a wireless phone 368, a pager 370, or other similar or suitable data processing device. The data processing device can then data communicate the authorized transactions including the payment identification data and transaction data to the remote data processing resource. Data communication between system 500 and the remote data processing resource by way of the data processing device can be by wired or wireless methods, and can include physically carrying the data processing device from the system 500 to a remote location where data communication with a remote data processing resource can be effectuated. This embodiment can allow a vending equipment service person to visit the vending equipment, download payment identification data and transaction data into a data processing device, return to for example a service vehicle or central office, and download the payment identification data and transaction data to a remote data processing device.

Alternatively the payment identification data and transaction data can be wired or wireless data communicated from the system 500 to the remote data processing resource.

The authorized transactions, both locally authorized and remotely authorized, can be processed by the remote data processing resource. The locally authorized transaction can be data communicated to a remote location, such as a processing bureau, for reauthorization first and then subsequent settlement with the remote location. The remotely authorized transaction, having previously received an approval code from the remote location, typically need only be data communicated to the remote location for settlement. Settlement is the process of causing charges to be billed to the user or owner of the payment identification data and payment being effectuated to the merchant for goods and services rendered or vended in the transaction.

The reauthorization processing can include obtaining a new approval code from a remote location. Such an approval code might have been obtained by way of the system 500 initially if the payment identification data was first authorized with the remote location in lieu of having locally authorizing the transaction. Remote authorization can refer to obtaining an approval code from a remote location.

Benefits of the local authorization process compared to the remote authorization process can be reduced authorization time. Typically a local authorization can be effectuated in real time virtually instantaneously, where as remote authorization can take several to many or more seconds to establish a connect and data communicate with a remote location.

In an exemplary embodiment the system 500 authorizes locally and or remotely the payment identification data for the cashless transaction. The authorized payment identification data and cashless transaction data (transaction data) can then be data communicated to a remote data processing resource for reauthorization and or settlement. The locally authorized payment identification data and transaction data requires reauthorization and settlement. The remotely authorized payment identification data and transaction data require only settlement.

In another exemplary embodiment the system 500 having a plurality of locally and or remotely authorized payment identification data and transaction data can first elect to reauthorize the locally authorized transactions and or elect to settle both the locally and remotely authorized transactions with the remote location prior to data communicating to the remote data processing resource. In this regard, the remote data processing resource can still implement a reauthorization process of certain transactions but this process will only confirm that such locally authorized transactions have been previously reauthorized and all transactions have been settled. One advantage to processing transactions in this manner can be to decentralize transaction processing. In this regard, reliance for reauthorization and settlement of transaction can be distributed across a plurality of system 500 in lieu of concentrating the reauthorization and settlement process on a remote data processing resource.

Figure 14:
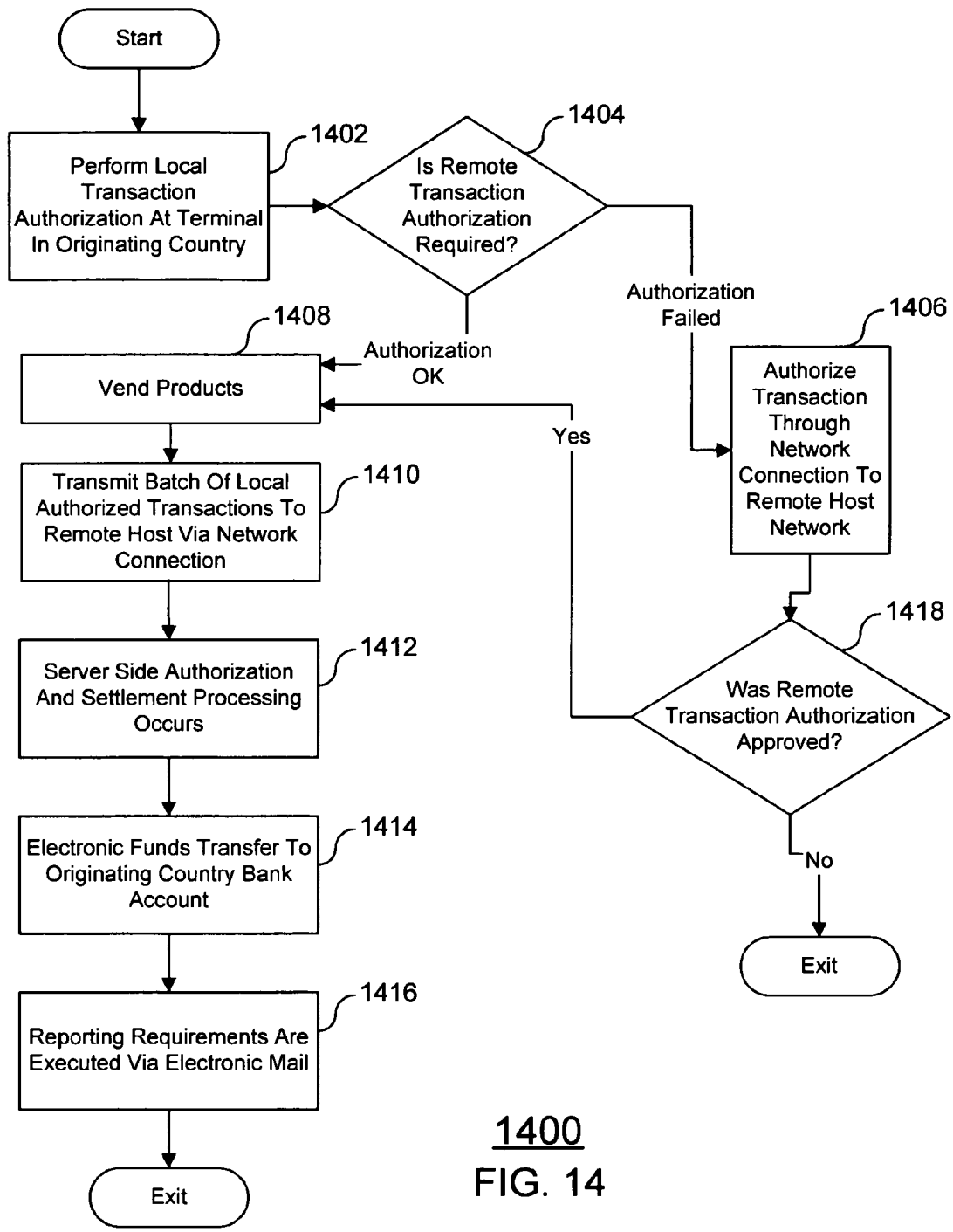
FIG. 14 there is shown an international transaction authorization and settlement routine 1400.

Referring to FIG. 14 there is shown an international transaction authorization and settlement routine 1400. Standard transaction processing fees for low cost sales can be significant. International card processing can incur even more transaction processing fees in the form of currency conversion fees. Currency conversion fees are fees incurred when currency is converted from one countries currency to another. To minimize the standard transaction processing fees and to minimize and or eliminate the currency conversion fees routine 1400 can be implemented. Processing begins in block 1402.

In block 1402 the local authorization routine 1300 is executed. Processing moves to decision block 1404.

In decision block 1404 a determination is made as to whether a remote data communication to a processing bureau 804 is required. If the resultant is in the affirmative that is the local authorization is approved and a remote authorization is not required then processing moves to block 1408. If the resultant is in the negative that is the local authorization was declined or failed and a remote data communication with processing bureau 804 is required then processing moves to block 1406.

In block 1406 authorization through a network connection to a remote host network 808 and or processing bureau 804 is executed. Processing then moves to decision block 1418.

In decision block 1418 a determination is made as to whether the remote authorization was approved. If the resultant is in the affirmative that is the remote authorization was approved then processing moves to block 1408. If the resultant is in the negative that is the remote authorization failed or was declined then the card is declined and the routine is exited.

In block 1408 the vending equipment is enabled and vending can occur. Processing then moves to block 1410.

In block 1410 a batch of locally authorized transactions is data communicated to a remote location (the remote location being another country) by way of a network connection. In this regard locally authorized transactions can be moved from the country in which the vending sale occurred to the country where the transactions will be processed with a processing center. Processing then moves to block 1412. The transfer of locally authorized transactions can occur at a predetermined time including hourly, daily, weekly, monthly, or other desirable time interval.

In block 1412 the server receiving the locally authorized transactions from a plurality of remotely located system 500 authorizes and settles each locally authorized transaction. The process of settlement effectuates the transfer of funds from the cardholder to the merchant. In this regard, the transaction is authorized and settled in the same country currency avoiding any currency conversion fees. Additionally, since transactions can be aggregated from a plurality of system 500 in a plurality of countries the transaction and currency volumes increase. These increases in transaction volumes coupled with efficient batching of transactions to the processing bureau can result in the lowest possible standard transaction processing fees. Processing then moves to block 1414.

In block 1414 the funds generated from the authorization and settlement of the locally authorized transaction can be electronically transferred back to a bank in the country in which the vending sale occurred, or the country of choice. Such a transfer can be accomplished by an electronic funds transfer (EFT), or other similar or desirable method for transfer funds. The transfer of funds can occur at a predetermined time including hourly, daily, weekly, monthly, or other desirable time interval. Processing then moves to block 1416.

In block 1416 reporting requirements can be effectuated as required and electronically transmitted to the appropriate parties. Such a reporting cycle can be referred to as a remittance cycle and can be utilized by all parties having involvement in the transactions to among other things verify fund transfers, and monitor vending equipment operational efficiencies. The remittance cycle can occur at a predetermined time including hourly, daily, weekly, monthly, or other desirable time interval. The routine is then exited.

Figure 15:
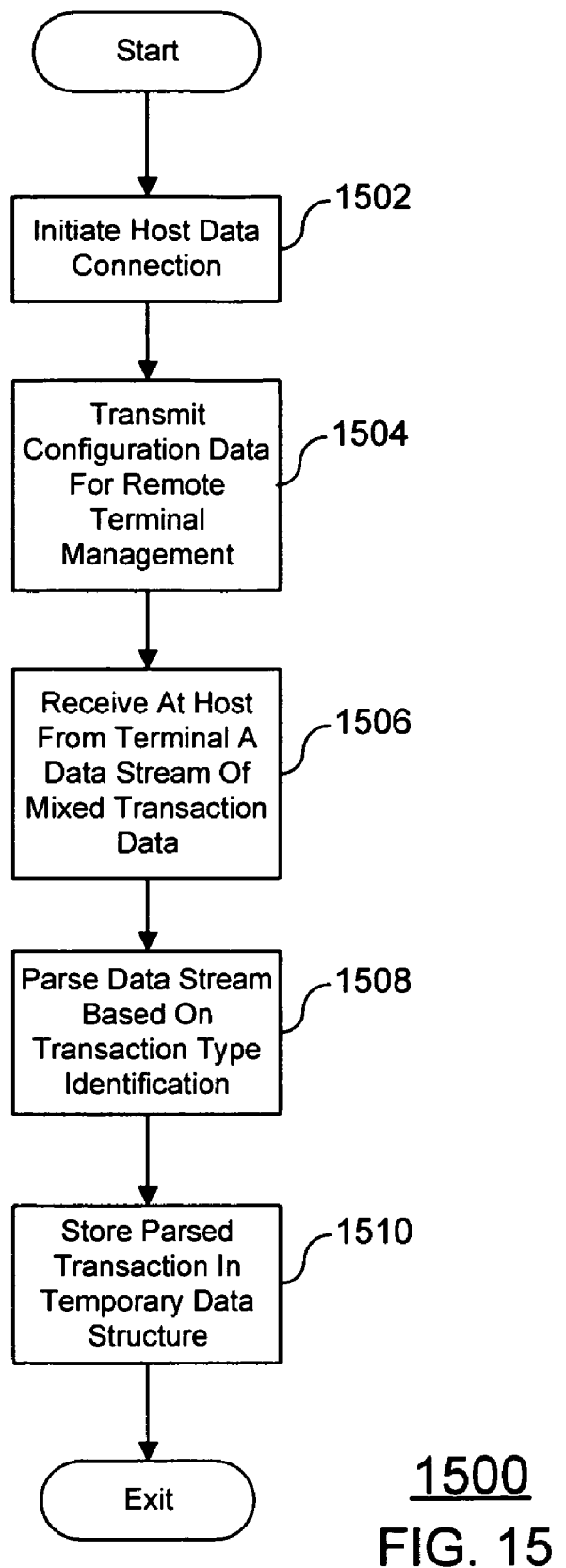
FIG. 15 there is shown a data communication transaction message parsing routine 1500.

Referring to FIG. 15 there is shown a data communication transaction message parsing routine 1500. In an exemplary embodiment system 500 can generate data and transactions relating to vending equipment DEX data, vending equipment MDB data, vend transaction data, financial transaction data, system 500 diagnostic data, and other types of data and transactions. While a system 500 has data communication access to a remote host network center 808 the system 500 can data communicate the mixed batch or varying types and kinds of data to the host network center 808 servers. It is at the host network centers 808 that the data and transaction must be parsed and handled in different methods. Such parsing method can include forwarding data to a subsequent server, storing data in a database, data processing to produce a new result and then acting on the resultant data, storing and forwarding transaction data including card transaction data for authorization and settlement, as well as implementing other methods for handle mixed batch data parsing. Processing begins in block 1502.

In block 1502 a host data connection is initiated and established between the system 500 and the host network center

808. Such a data connection can be a dial-up connection, and Internet based connection, or other suitable data connections. Processing then moves to block 1504.

In block 1504 the system 500 terminal configuration data is exchanged between the system 500 and the host network servers. This terminal configuration data effectuates the ability to remotely manage the terminal operational parameters including the terminals firmware version from a remote host network center 808. Processing then moves to block 1506.

In block 1506 the host network server receives a data stream from the system 500. The data stream can comprise a mixed batch of operational data, marketing data, transaction data, and other types of data. Processing then moves to block 1508.

In block 1508 the server implements a series of parsing methods to identify and separate the different kinds of data and transactional information. Processing then moves to block 1510.

In block 1510 the host network server stores the parsed data in a temporary data structure, wherein each type and kind of data is uniquely identifiable. The data connection is terminated with the system 500 and the routine is exited.

Figure 16A:
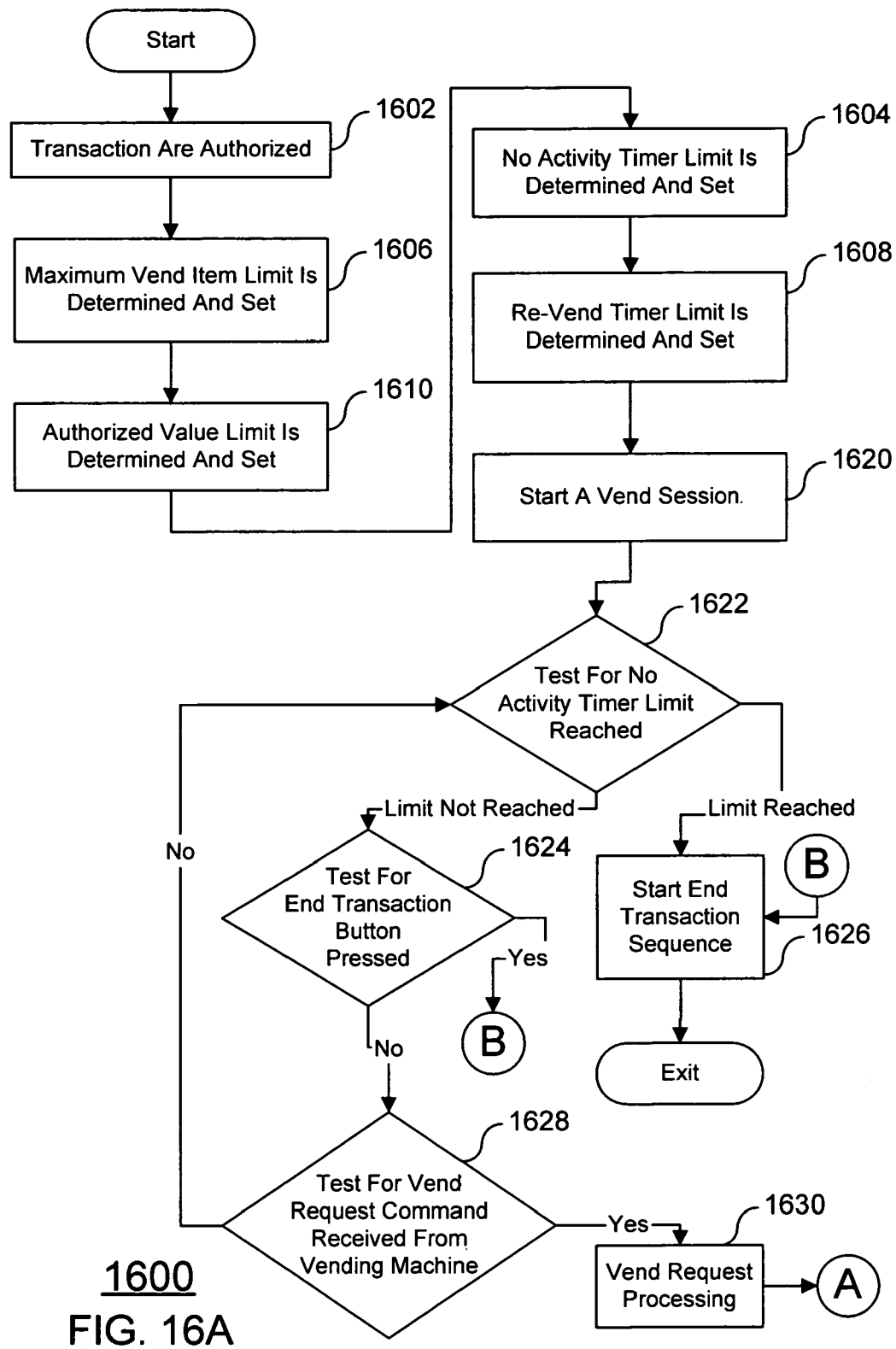
FIGS. 16A-16B there is shown a determination of transaction completion routine 1600.
Figure 16B:
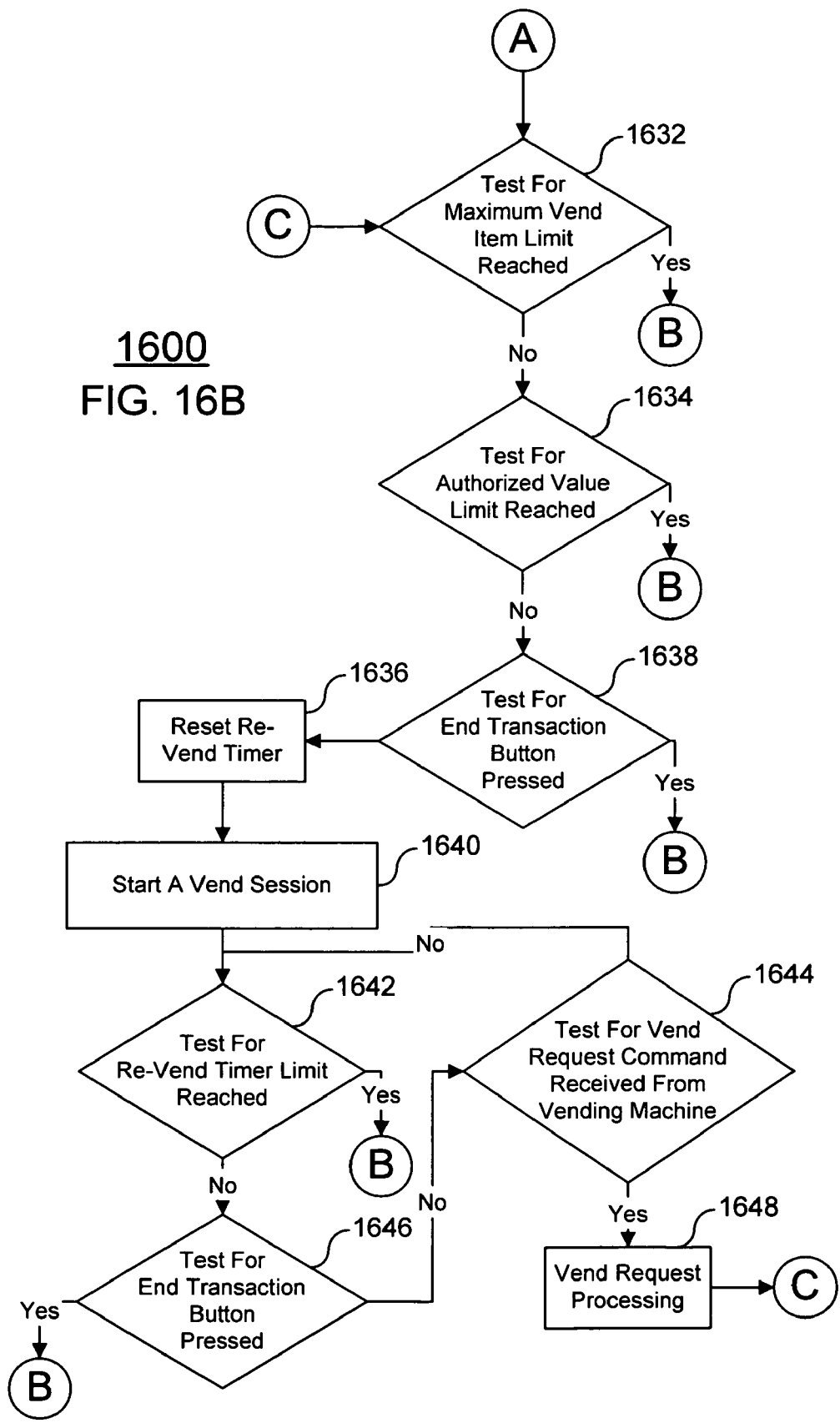

Referring to FIGS. 16A-16B there is shown a determination of transaction completion routine 1600. In an exemplary embodiment once a transaction has been authorized and approved vending begins. In many vending applications multi-vends per transaction may be desirable. Routine 1600 can implement a method of determining when to allow a user to make an additional purchase and when not to. Processing begins in block 1602.

In block 1602 the transaction is authorized. Transaction authorization can occur as disclosed in routines 1300 and 1400, or by other suitable methods. When a transaction has been approved and the vending equipment is being readied for vending, processing moves to block 1606.

In block 1606 a MAXIMUM VEND ITEM LIMIT is determined and set. The MAXIMUM VEND ITEM LIMIT is the maximum number of items that can be vended on a single authorization. The MAXIMUM VEND ITEM LIMIT can be stored as part of the system 500's terminal configuration file and remotely managed by way of the remote host network center 808. In an exemplary embodiment the MAXIMUM VEND ITEM LIMIT can range from one to ten items. Processing then moves to block 1610.

In block 1610 the AUTHORIZED VALUE LIMIT is determined and set. The AUTHORIZED VALUE LIMIT is the maximum total sale amount a user has been authorized to purchase. The AUTHORIZED VALUE LIMIT can be stored as part of the system 500's terminal configuration file and remotely managed by way of the remote host network center 808. Processing then moves to block 1604.

In block 1604 the NO ACTIVITY TIMER LIMIT is determined and set. The NO ACTIVITY TIMER LIMIT is the maximum amount of time a user has to make the first vend. The NO ACTIVITY TIMER LIMIT can be stored as part of the system 500's terminal configuration file and remotely managed by way of the remote host network center 808. In an exemplary embodiment the NO ACTIVITY TIMER LIMIT can range from less than one minute to several minutes. Processing then moves to block 1608.

In block 1608 the RE-VEND TIMER LIMIT is determined and set. The RE-VEND TIMER LIMIT is the maximum amount of time a user has to make additional vends beyond the first vend. The RE-VEND TIMER LIMIT can be stored as part of the system 500's terminal configuration file and remotely managed by way of the remote host network center 808. In an exemplary embodiment the RE-VEND TIMER LIMIT can range from less than one minute to several minutes. Processing then moves to block 1620.

In block 1620 a vending session is started. Processing moves to decision block 1622.

In decision block 1622 a determination is made as to whether the NO ACTIVITY TIMER LIMIT has been reached. If the resultant is in the affirmative that is the NO ACTIVITY TIMER LIMIT has not reached the limit then processing moves to decision block 1624. If the resultant is in the negative that is the NO ACTIVITY TIME LIMIT has been reached then processing moves to block 1626.

In block 1626 the end session sequence is started. The end session sequence includes waiting for the vending equipment to complete any last vends, ending the vending session, saving sales record data, optionally printing a receipt, and any other end sequence steps that may be required. The routine is then exited.

In decision block 1624 a determination is made as to whether the user has pressed the end transaction button. If the resultant is in the affirmative that is the user has pressed the end transaction button then processing moves to block 1626. If the resultant is in the negative that is the user has not pressed the end transaction button then processing moves to decision block 1628.

In decision block 1628 a determination is made as to whether a VEND REQUEST MDB command has been received from the vending equipment's VMC. If the resultant is in the affirmative that is the VEND REQUEST has been received then processing moves to block 1630. If the resultant is in the negative that is the VEND REQUEST command was not received then processing moves back to decision block 1622.

In block 1630 the VEND REQUEST command is processed and a VEND APPROVED or VEND DENIED response message is data communicated from the system 500 to the requesting VMC. Processing moves to decision block 1632.

In decision block 1632 a determination is made as to whether the MAXIMUM VEND ITEM LIMIT has been reached. If the resultant is in the affirmative that is the MAXIMUM VEND ITEM LIMIT has been reached then processing moves back to block 1626. If the resultant is in the negative that is the MAXIMUM VEND ITEM LIMIT has not been reached then processing moves to decision block 1634.

In decision block 1634 a determination is made as to whether the AUTHORIZED VALUE LIMIT has been reached. If the resultant is in the affirmative that is the AUTHORIZED VALUE LIMIT has been reached then processing moves back to block 1626. If the resultant is in the negative that is the AUTHORIZED VALUE LIMIT has not been reached then processing moves to decision block 1638.

In decision block 1638 a determination is made as to whether the user has pressed the end transaction button. If the resultant is in the affirmative that is the user has pressed the end transaction button then processing moves back to block 1626. If the resultant is in the negative that is the user has not pressed the end transaction button then processing moves to block 1636.

In block 1636 the RE-VEND TIMER is reset to zero. Processing moves to block 1640.

In block 1640 a vending session is started. A vending session is started by sending the BEGIN SESSION MDB command to the vending equipment's VMC. Processing moves to decision block 1642.

In decision block 1642 a determination is made as to whether the RE-VEND TIMER has reached the RE-VEND TIMER LIMIT. If the resultant is in the affirmative that is the RE-VEND TIMER has reached the RE-VEND TIMER LIMIT then processing moves back to block 1626. If the resultant is in the negative that is the RE-VEND TIMER has reached the RE-VEND TIMER LIMIT then processing moves to decision block 1646.

In decision block 1646 a determination is made as to whether the user has pressed the end transaction button. If the resultant is in the affirmative that is the user has pressed the end transaction button then processing moves back to block 1626. If the resultant is in the negative that is the user has not pressed the end transaction button then processing moves to block 1644.

In decision block 1644 a determination is made as to whether a VEND REQUEST MDB command has been received from the vending equipment's VMC. If the resultant is in the affirmative that is the VEND REQUEST has been received then processing moves to block 1648. If the resultant is in the negative that is the VEND REQUEST command was not received then processing moves back to decision block 1642.

In block 1648 the VEND REQUEST command is processed and a VEND APPROVED or VEND DENIED response message is data communicated from the system 500 to the requesting VMC. Processing moves back to decision block 1632.

Figure 17:
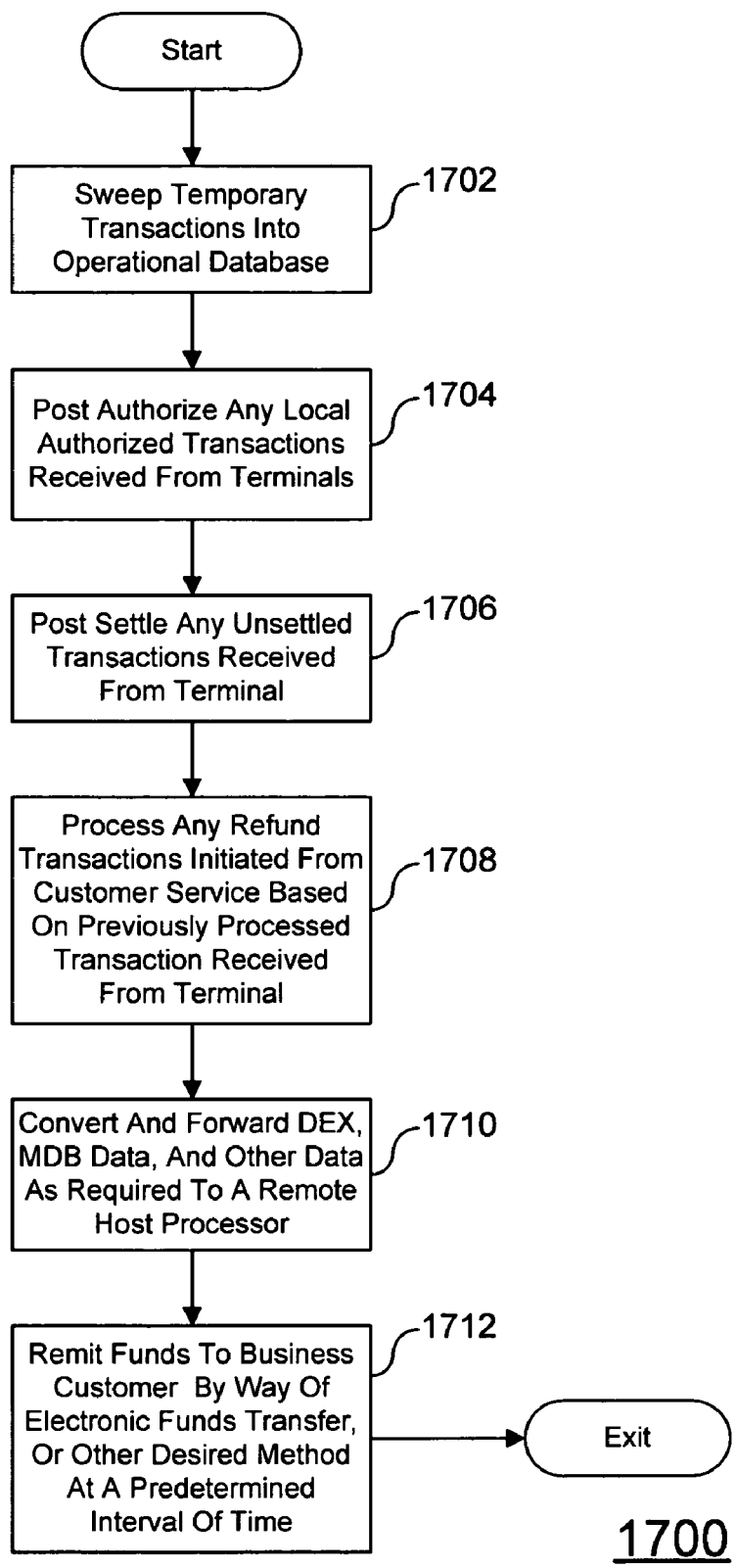
FIG. 17 there is shown a data communication sweeping, processing, and data forwarding routine 1700.

Referring to FIG. 17 there is shown a data communication sweeping, processing, and data forwarding routine 1700. In an exemplary embodiment the host network center 808 accumulates a plurality of different kinds of parsed data transactions in a temporary data structure. Such a parsing and temporary data structure can be implemented as disclosed in routine 1500. To move the data transactions from the temporary data structure to a more permanent data structure and or host network sever routine 1700 can be implemented. Processing begins in block 1702.

In block 1702 the transactions stored in the temporary data structure are swept into an operational database. Such an operational database can be implemented as a SQL database, ORACLE database, flat file database, DB2 database, and or a combination of different kinds and types of databases. Processing then moves to block 1704.

In block 1704 locally authorized transactions that have not been previously authorized are authorized with a processing bureau 804. This authorization after the vending sale has occurred can be referred to as post authorization. Processing then moves to block 1706.

In block 1706 any transactions including the previously post authorized transaction are settled with the processing bureau 804. The process of settlement effectuates the transfer of funds from the cardholder to the merchant. Settlement after the vending sale has occurred can be referred to as post settlement or post settle. Processing then moves to block 1708.

In block 1708 any refund transactions generated by the host network center customer service are processed. Refund transactions can occur when a previously settled transaction requires some portion of the sale amount be refunded to the cardholder. Customer service can generate a refund transaction by querying from an operational database the original transaction and then initiating a refund transaction based in part on the queried customer's original transaction. Processing then moves to block 1710.

In block 1710 data related to vending equipment DEX and MDB detail can be converted as required and data communicated to databases, and or other servers. The process of converting the DEX and MDB data can involve parsing and repackaging the data into a desired data warehousing interface format. Alternatively, the DEX and MDB data can be posted to a server where customers can by way of a network connection to the host network center 808 download the data.

In addition to the convert and forward functionality the data handled can be measured and counted as desired for the purpose of billing for the service of gathering data from a remote system 500 and delivering the data to a customer's desired location. Measurement and counting can include for example and not limitation measuring file and or data size, measuring the frequency the data is gathered, counting the number of times data is gathered and or forwarded, measuring access to the host network center 808, or by other suitable measurement and counting methods and or criteria. Processing moves to block 1712.

In block 1712 the funds collected from the processing of transactions can be remitted to the customer, as required, by EFT or other desirable method. The funds remitted can have service fees deducted from them such that their EFT amount is less than the total processed transaction amount. In this regard, customers will not have to be billed for services. The deducting of service fees from the flow of funds can eliminate the need to invoice a customer for service. The routine is then exited.

Figure 18A:
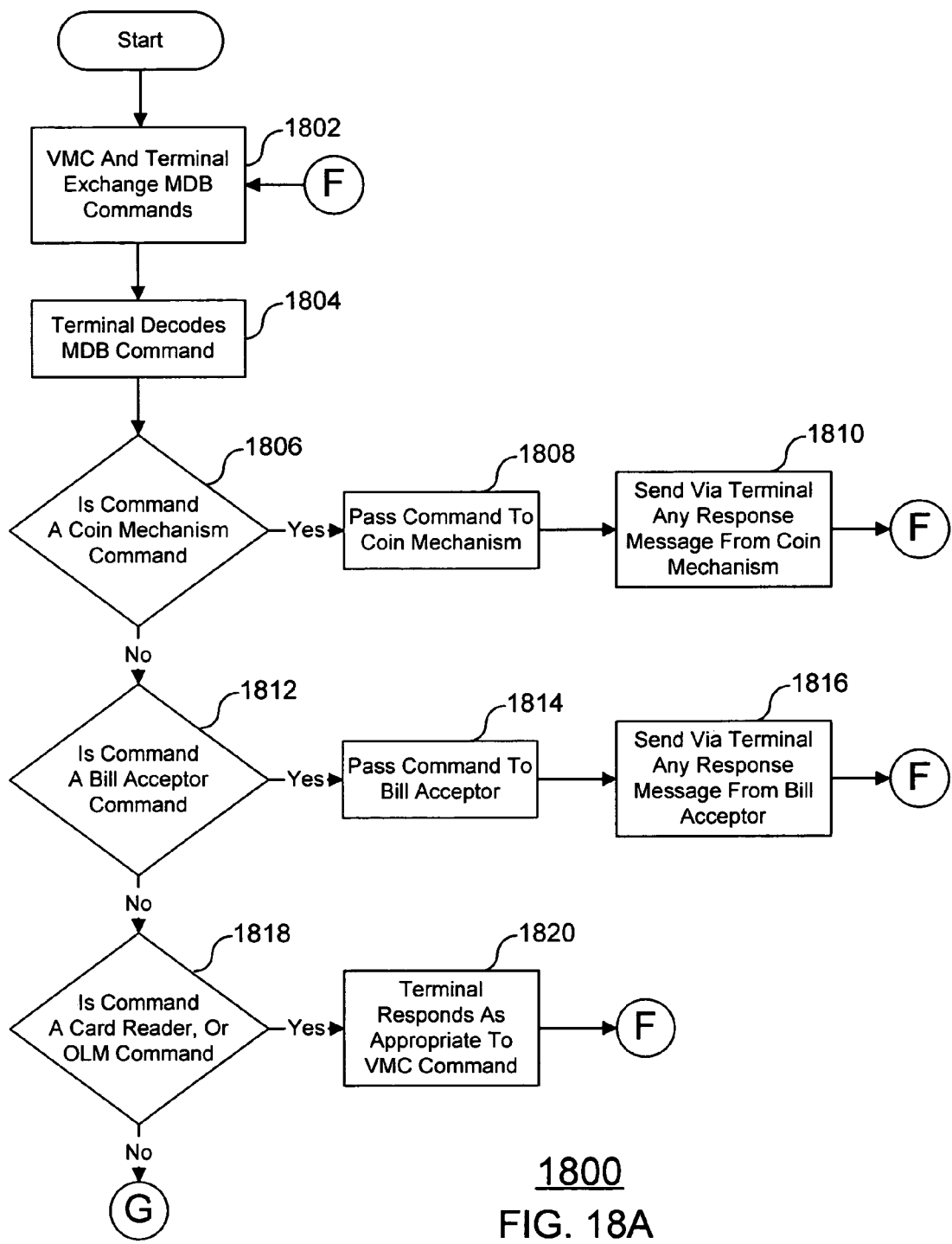
FIGS. 18A-18B there is shown a mimic MDB interface port routine 1800.
Figure 18B:
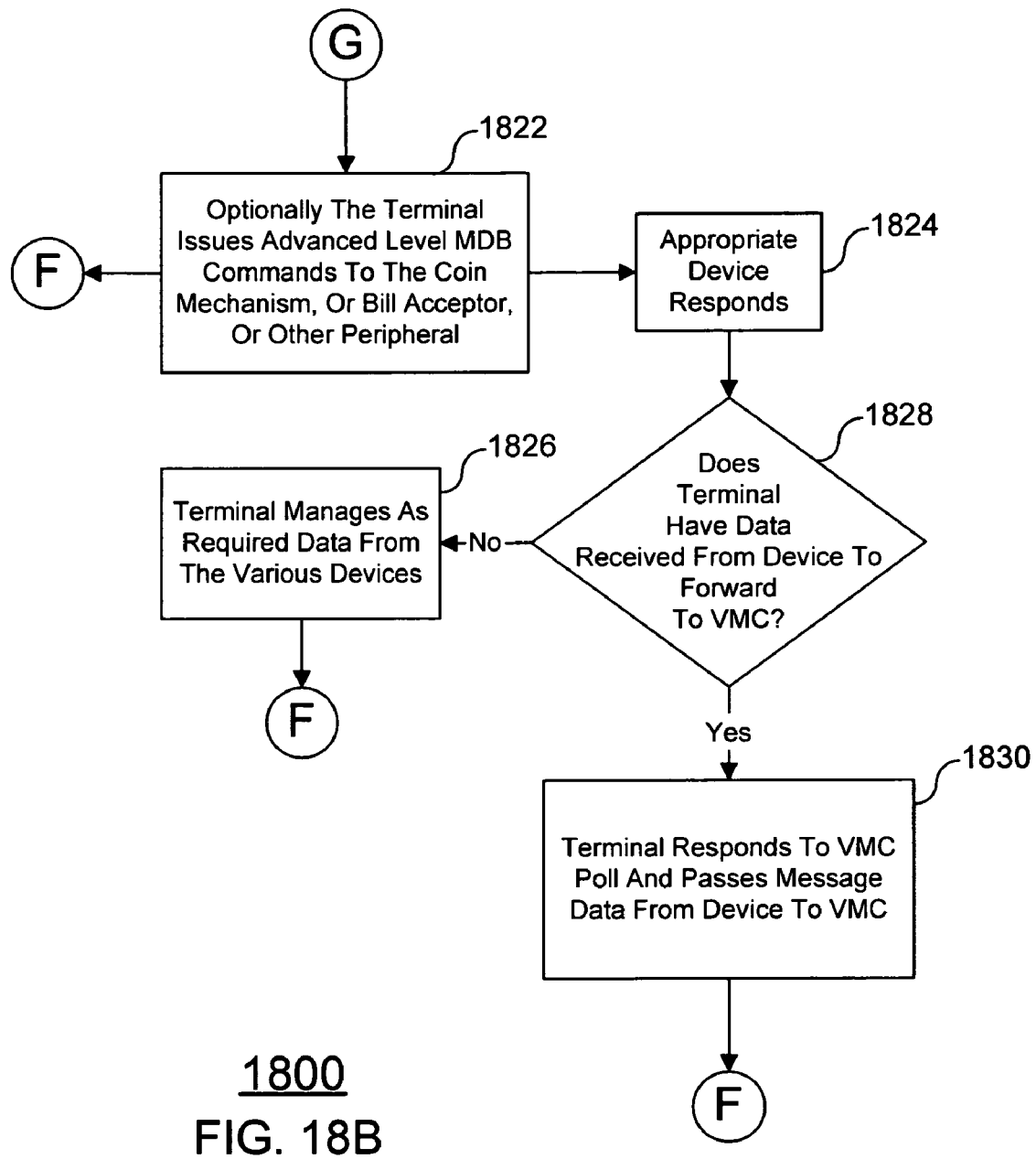

Referring to FIGS. 18A-18B there is shown a mimic MDB interface port routine 1800. In an exemplary embodiment the system 500 can serve as a MDB protocol conversion gateway. In this regard the system 500 can emulate and interpolate VMC MDB messages for a plurality of peripheral devices. In addition, the system 500 can act as a MDB master or MDB slave device allowing the system 500 to support peripheral devices the VMC cannot. Routine 1800 implements the system 500 functionality to support the MDB interface 518 and the mimic MDB interface 516. Processing begins in block 1802.

In block 1802 the VMC and system 500 exchange MDB message commands by way of the VMC vending equipment interface 902 and the system 500's MDB interface 518. The system 500 can be referred to as terminal 500 or as the terminal. Processing moves to block 1804.

In block 1804 the terminal 500 decodes the MDB command message. Processing moves to decision block 1806.

In decision block 1806 a determination is made as to whether the MDB command message is a coin mechanism command message. If the resultant is in the affirmative that is the MDB command message is a coin mechanism MDB command message then processing moves to block 1808. If the resultant is in the negative that is then MDB command message is not a coin mechanism MDB command message then processing moves to decision block 1812.

In block 1808 the MDB command message is encoded and forwarded or passed by way of the mimic MDB interface 516 to the coin mechanism. Processing then moves to block 1810.

In block 1810 the system 500 by way of the mimic MDB interface 516 receives any response MDB message from the coin mechanism. As required the system 500 decodes and determines if the response message from the coin mechanism requires encoding and forwarding or passing of the message to the VMC. As determined by the system 500 the message is selectively forwarded to the VMC upon processing returning to block 1802.

In decision block 1812 a determination is made as to whether the MDB command message is a bill acceptor command message. If the resultant is in the affirmative that is the MDB command message is a bill acceptor MDB command message then processing moves to block 1814. If the resultant is in the negative that is the MDB command message is not a bill acceptor MDB command message then processing moves to decision block 1818.

In block 1814 the MDB command message is encoded and forwarded or passed by way of the mimic MDB interface 516 to the bill acceptor. Processing then moves to block 1816.

In block 1816 the system 500 by way of the mimic MDB interface 516 receives any response MDB message from the bill acceptor. As required the system 500 decodes and determines if the response message from the bill acceptor requires encoding and forwarding or passing of the message to the VMC. As determined by the system 500 the message is selectively forwarded to the VMC upon processing returning to block 1802.

In decision block 1818 a determination is made as to whether the MDB command message is a card reader or online module (OLM) command message. If the resultant is in the affirmative that is the MDB command message is a card reader or OLM MDB command message then processing moves to block 1820. If the resultant is in the negative that is the MDB command message is not a card reader or OLM MDB command message then processing moves to block 1822.

In block 1820 the MDB command message is decoded and the appropriate response to the VMC is initiated by the system 500. Processing moves back to block 1802.

In block 1822 the system 500 optionally sends as a master device a MDB command message to the peripherals interconnected with the mimic MDB interface 516. Such peripherals can include coin mechanism, bill acceptor or validator, or other peripherals on the mimic MDB interface 516. If the system 500 does not have a MDB command message to send processing moves back to block 1802. If the system 500 has a command message to send the command message is sent to the desired peripheral device and processing moves to block 1824.

In block 1824 the system 500 receives any device response messages resultant from the sent MDB message. Processing then moves to decision block 1828.

In decision block 1828 a determination is made as to whether any received message or data on the mimic MDB bus needs to be forwarded or passed to the VMC by way of the MDB interface 518. If the resultant is in the affirmative that is the system has a command message or data to send to the VMC processing moves to block 1830. If the resultant is in the negative that is the system 500 does not has a command message or data to send to the VMC processing moves to block 1826.

In block 1826 the terminal system 500 can manage the data received from the peripheral device as required. Processing moves back block 1802.

In block 1830 the terminal system 500 responds to the VMC POLL command message by passing the command message and or data from the peripheral device to the VMC. Processing moves back to block 1802.

Figure 22B:
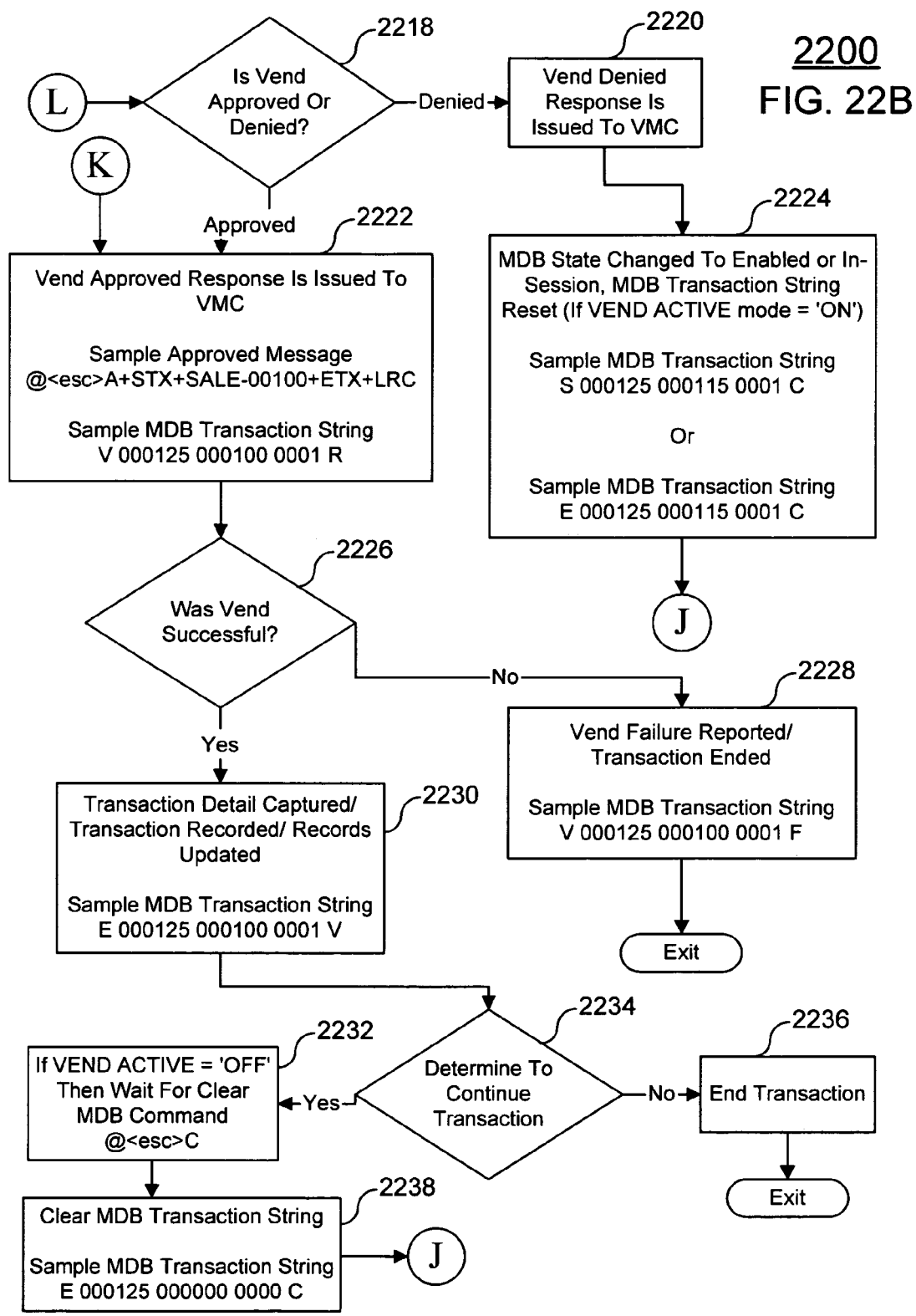

Referring to FIGS. 22A-B there is shown a system 500 initiated vending session routine 2200. Routine 2200 is shown as an example not a limitation, variations in the routine arise based on vending application, system 500 configuration, computing platform 802 configuration, vending equipment configuration, and or other setup operational, or configuration issues. In an exemplary embodiment, G4, EPORT, a system 500, a payment module, or audit-credit-interactive device, are all referred to as a system 500. The cooperation between system 500 and a computing platform 802 to transact a cashless transaction can be referred to as a cashless transaction processing system.

In an exemplary embodiment system 500 accepts user payment identification data, card data, or other user cashless vending data to initiate a cashless vending transaction. The system 500 authorizes the user's ID and upon determining that the ID is authorized transacts a cashless vending transaction between the user and vending equipment. Routine 2200 details how such a cashless vending transaction controlled by system 500 can be effectuated. For this example it is assumed that the VEND ACTIVE mode is 'ON', that is system 500 is in control of the transaction. This implies that if a computing platform 802 is interconnected with system 500 its purpose is to monitor the system 500 effectuated cashless transactions and in the VEND ASSIST mode 'ON' VEND APPROVE or VEND DENY the user select vend item at the appropriate time. Processing begins in block 2202.

In block 2202 system 500 operational parameters are set. These parameters can include for example and not limitation MDB INTERVAL and MDB RESPONSE TIME settings, local and remote authorization settings, system 500 operation settings, and other operational parameters. Processing then moves to decision block 2204.

In decision block 2204 a determination is made as to whether system 500 is ready for a transaction. If the resultant is in the affirmative that is system 500 is ready for a cashless transaction then processing moves to block 2206. If the resultant is in the negative that is the system 500 is not ready for a transaction the routine is exited.

In an exemplary embodiment, the determination as to whether system 500 is ready for a transaction can be based in part on whether system 500 and the vending equipment VMC have successfully negotiated and exchanged MDB messages to arrive at the ENABLED MDB STATE. An interconnected computing platform 802 can monitor the current system 500, as system 500 updates the MDB TRANSACTION STRING to reflect the operational state changes and pricing information. The MDB TRANSACTION STRING is available to an interconnected computing platform 802 through issuing of appropriate MDB TRANSACTION STRING send commands, such as @<esc>H, and @<esc>V. A sample MDB TRANSACTION STRING could be 'E00012500000000000C', wherein 'E' MDB STATE indicates the system 500 is enables and 'C' MDB flag state indicates CLEARED for use. In addition cashless card data and or payment identification data presented by the user can be obtained by way of the @<esc>V or @<esc>T commands.

In block 2206 a user can start a cashless vending transaction by presenting valid card data, ID, payment identification data, or other suitable user ID. The system 500 will in accordance with system settings locally and or remotely attempt to authorize the user's ID. If the user's ID is authorized the system will start a cashless vending session. Alternatively, computing platform 802 can start a cashless vending session by sending system 500 valid user ID, payment identification data, card data, or other valid user ID. The computing platform 802 can start a vending transaction by way of the @<esc>A commands, @<esc>B, or other available commands. Processing upon successful authorization of a user's ID moves to block 2208.

In block 2208 system 500 starts a cashless vending session by sending the VMC the MDB BEGIN SESSION command. System 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be 'S00012500000000000C', wherein 'S' MDB STATE indicates the system 500 is IN-SESSION. Processing then moves to decision block 2212.

In decision block 2212 a determination is made as to whether a time-out, end session, or vend request has been received. If the result is a time-out or end session has occurred then processing moves to block 2216. If the resultant is that a vend request has occurred then processing moves to block 2210.

In an exemplary embodiment a time-out can occur if a user in a predetermined amount of time does not make a vend item selection. For example and not limitation, the system 500 may be programmed to automatically end a vending session if a user has not made a vend item selection in 30 seconds. An end-session can occur if the user presses a button, such as push button 308. This button may be programmed to indicate that a press means end the session and or transaction. A vend request can occur if a user presses a selection button on the vending equipment and the vending equipment VMC issues to the system 500 a MDB VEND REQUEST message.

In block 2216 the vending session is ended. System 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be 'E0001250000000000C', wherein 'E' MDB STATE indicates the system 500 is ENABLED. The routine is then exited.

In decision block 2210 a determination is made as to whether the VEND ASSIST mode is 'ON'. If the resultant is in the affirmative that is the vend assist mode is 'ON' then processing moves to block 2214. If the resultant is in the negative that is the VEND ASSIST mode is 'OFF' then processing moves to block 2222.

In an exemplary embodiment, a system 500, a payment module, or audit-credit-interactive device, are all referred to as a system 500 can initiate a vending session by receiving certain commands from an interconnected computing platform 802 or by the system 500 initiating the vending session. An option is available for the system 500 or computing platform 802 to essentially approve the vend selection and sale price of a user selected vend item prior to dispensing the product. This mode is called the VEND ASSIST mode and can be utilized to approve the selection and control the charged price of a user selected vend item.

In this regard, forced product selection can be imposed on a user by declining (referred to as VEND DENY) a user's selections that are not correct or otherwise acceptable. In addition, promotional offers such as buy-one-get-one-free and other discounts or markups can be implemented, as well as other promotional combinations.

As an example and not limitation a user can select a product and the computing platform 802 and or system 500 can VEND APPROVE the selection and charge the user the posted price. The user can then be prompted to select a free item. To this objective the user can select an item and the computing platform 802 and or system 500 can while in the VEND ASSIST mode 'ON', VEND APPROVE the user's selected item this time charging the user zero—creating a buy-one-get-one-free offer. Other discount offers, markup offers and forced selection promotions can also be implemented without limitation.

In block 2214 system 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be 'V0001250000000000R', wherein 'V' MDB STATE indicates the vending equipment is in a vend cycle and the 'R' indicating that a REQUEST for VEND APPROVE is being made. Processing then moves to decision block 2218.

In decision block 2218 a determination is made as to whether a VEND APPROVE or VEND DENIED message is received from computing platform 802 and or system 500. If the resultant is in the affirmative that is the cashless vend has been approved then processing moves to block 2222. If the result is in the negative that is the cashless vend has been denied then processing moves to block 2220.

In block 2222 in an exemplary embodiment, a computing platform 802 interconnect with system 500 can determine from the MDB TRANSACTION string the item selected and item price. For example and not limitation, the MDB TRANSACTION STRING 'V 000125 000115 0001 R' indicates that the MAX VEND PRICE in the vending equipment is '000125' or $1.25, the price set in the vending equipment for the user item selected is '000115' or $1.15, and the user selected item or column id '0001' item or column number is one. The computing platform 802 and or system 500 can in part use this information to determine whether to issue the VEND APPROVE or VEND DENIED command to the VMC. For example and not limitation, a determination by the computing platform 802 to VEND APPROVE the vend request can be made. In this regard, the computing platform 802 data communicates to the system 500 the @<esc>A+STX+SALE-00100+ETX+LRC where '00100' is the desired sale amount in this case $1.00. System 500 receiving the VEND APPROVE command from computing platform 802 issues the MDB VEND APPROVED message to the vending equipment VMC. Processing then moves to decision block 2226.

In block 2220 in response to the VEND DENIED response from the computing platform 802 and or a determination by system 500 to deny the vend, system 500 sends the MDB VEND DENIED message to the vending equipment VMC. Processing then moves to block 2224.

In block 2224 the system 500 and VMC negotiate and exchange MDB messages to change or end the vending session and as a result set a new MDB STATE for system 500. System 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be 'S0001250001150001C' where 'S' MDB STATE indicates the vending equipment is IN-SESSION or 'E0001250001150001C' where 'E' MDB STATE indicates the vending equipment is ENABLED. Processing then moves back to block 2208.

In decision block 2226 a determination as to whether the vend cycle was successful is made. If the resultant is in the affirmative that is the vending cycle was successful then processing moves to block 2230. If the resultant is in the negative that is the vend cycle failed then processing moves to block 2228.

Vend cycle success and failure is typically determined by the vending equipment. If a product or service vend is attempted and, for example and not limitation, a vend column jams or is empty a vend cycle failure may be reported. If the product or service is successfully vended then the vending equipment may report a vend success.

System 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be 'V0001250001000001V' for vend successfully complete, or a failed vend cycle could be reflected in a MDB TRANSACTION STRING as 'V0001250001000001F'.

In block 2228 the vend failure is reported. A failed vend cycle could be reflected in a MDB TRANSACTION STRING as 'V0001250001000001F'. VEND FAILURES typically end a session and or transaction. The routine is then exited.

In block 2230 upon a vend success, system 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be 'E0001250001000001V' where 'E' indicates the MDB STATE as ENABLED and MDB flag state 'V' indicates a successful cashless vend has occurred. System 500 captures the transaction detail and creates or updates a transaction record. Processing then moves to decision block 2234.

In decision block 2234 a determination is made whether to continue the current cashless vending transaction. If the resultant is in the affirmative that is the current cashless vending transaction is to continue then processing moves to block 2232. If the resultant is in the negative that is the current cashless vending transaction is complete then processing moves to block 2236.

In block 2236 the transaction is ended. System 500 cancels any started vending sessions, a delay to wait for any last vend items is implemented, transaction records are updated and closed, and an optional transaction receipt can be printed. The routine is then exited.

In block 2232 if the VEND ACTIVE mode is 'OFF' system 500 waits for the computing platform 802 to clear the MDB TRANSACTION STRING with the @<esc>C command. If the VEND ACTIVE mode is 'ON' the system 500 clears the MDB TRANSACTION STRING. Processing then moves to block 2238.

In block 2238 the MDB TRANSACTION STRING is cleared. System 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be 'E0001250001000001C' where 'E' indicates the MDB STATE as ENABLED and the MDB flag state 'C' indicates the MDB TRANSACTION STRING is CLEARED. Processing returns to block 2208.

Figure 23A:
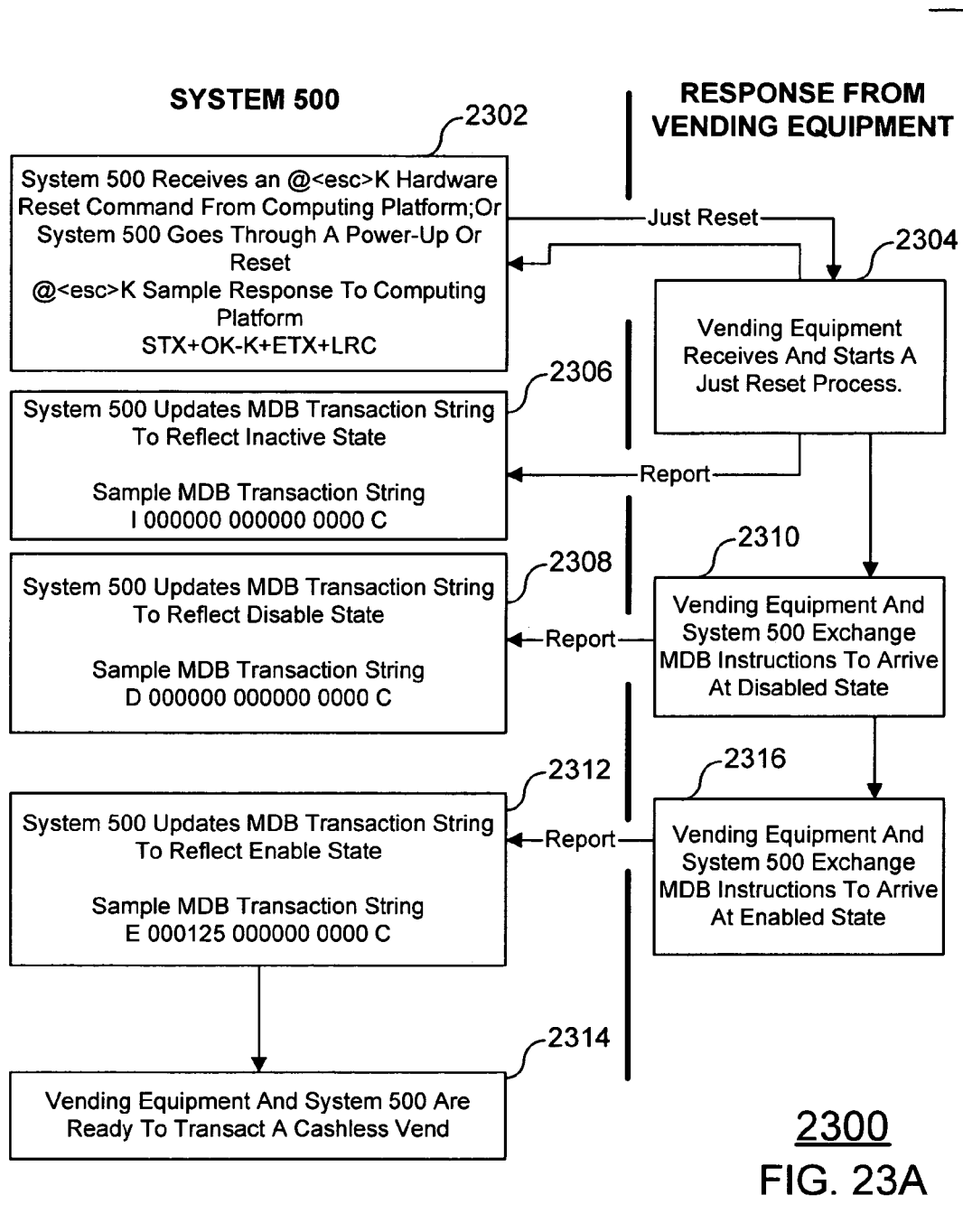
FIG. 23A there is shown MDB TRANSACTION STRING messaging when a system 500 initiates a hardware reset or is powered-up routine 2300.

Referring to FIG. 23A there is shown MDB TRANSACTION STRING messaging when a system 500 initiates a hardware reset or is powered-up routine 2300. Shown in the figure are messages being passed between a system 500 (SYSTEM 500) and vending equipment VMC (RESPONSE FROM VENDING EQUIPMENT).

Routine 2300 is shown as example not a limitation, variations in the routine arise based on vending application, system 500 configuration, computing platform 802 configuration, vending equipment configuration, and or other setup operational, or configuration issues. In an exemplary embodiment, G4, EPORT, a system 500, a payment module, or audit-credit-interactive device, are all referred to as a system 500. The cooperation between system 500 and a computing platform 802 to transact a cashless transaction can be referred to as a cashless transaction processing system.

System 500 receives the hardware reset command, for example @<esc>K, or is initially powered-up and initiates a JUST RESET INITIALIZATION procedure with the vending equipment VMC. In this regard, system 500 and the VMC can exchange a series of MDB bus messages to setup the system 500 and set the operational state of the system 500 at ENABLED. Processing begins in block 2302.

In block 2302 system 500 issues to the VMC a MDB JUST RESET message in response to system 500 receiving an @<esc>K hardware reset command from an interconnected computing platform 802 or when system 500 goes through a system reset or power-up. In the event the system 500 receives the @<esc>K command from a computing platform 802 the system 500 may respond, for example, with a response message such as STX+OK–K+ETX+LRC. Processing then moves to block 2304.

In block 2304 the vending equipment VMC having received the MDB JUST RESET message should acknowledge the message and begin a reset process taking the system to the INACTIVE STATE, negotiating setup and pricing parameters, and moving the operational state from INACTIVE, to DISABLED, then to ENABLED. Processing then moves to block 2310. A report can be issued to a monitoring system 500 in block 2306.

In block 2306 the system 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be I0000000000000000C, wherein 'I' indicates the MDB STATE of INACTIVE.

System 500 processing can also utilize the updated MDB TRANSACTION STRING to display message prompting and enable or disable system 500 operational features. Such operational features can include enabling or disabling card reader functionality based on the current MDB operational state. For example, when the MDB operational state is INACTIVE and or DISABLED the system 500 may disable certain card reader or payment identification data acceptance functionality. Conversely, when the MDB operational state is ENABLED the system 500 can enable certain card reader or payment identification data acceptance functionality.

In block 2310 the system 500 and the vending equipment VMC exchange setup and configuration MDB message data to arrive at the DISABLED state. Such MDB message data and requirements for the DISABLED state can be found in referring to the NAMA MDB/ICP INTERFACE PROTOCOL version 1.0 and version 2.0. Upon reaching the DISABLED state a report can be issues to a monitoring system 500 in block 2308. Processing then moves to block 2316.

In block 2308 the system 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be D0000000000000000C, wherein 'D' indicates the MDB STATE for DISABLED.

In block 2316 the system 500 and the vending equipment VMC exchange setup and configuration MDB message data to arrive at the ENABLED state. Such MDB message data and requirements for the ENABLED state can be found in referring to the NAMA MDB/ICP INTERFACE PROTOCOL version 1.0 and version 2.0. Upon reaching the ENABLED state a report can be issued to a monitoring system 500 in block 2312. Processing then moves to block 2312.

In block 2312 the system 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be 'E0001250000000000C', wherein 'E' indicates the MDB STATE of ENABLED. The following six characters '000125' indicate, for example, the maximum vend price is $1.25. Processing then moves to block 2314.

In block 2314 the hardware reset system setup is complete. When the MDB state is ENABLED the system 500 and VMC typically are ready to transact a cashless vending transaction.

Figure 23B:
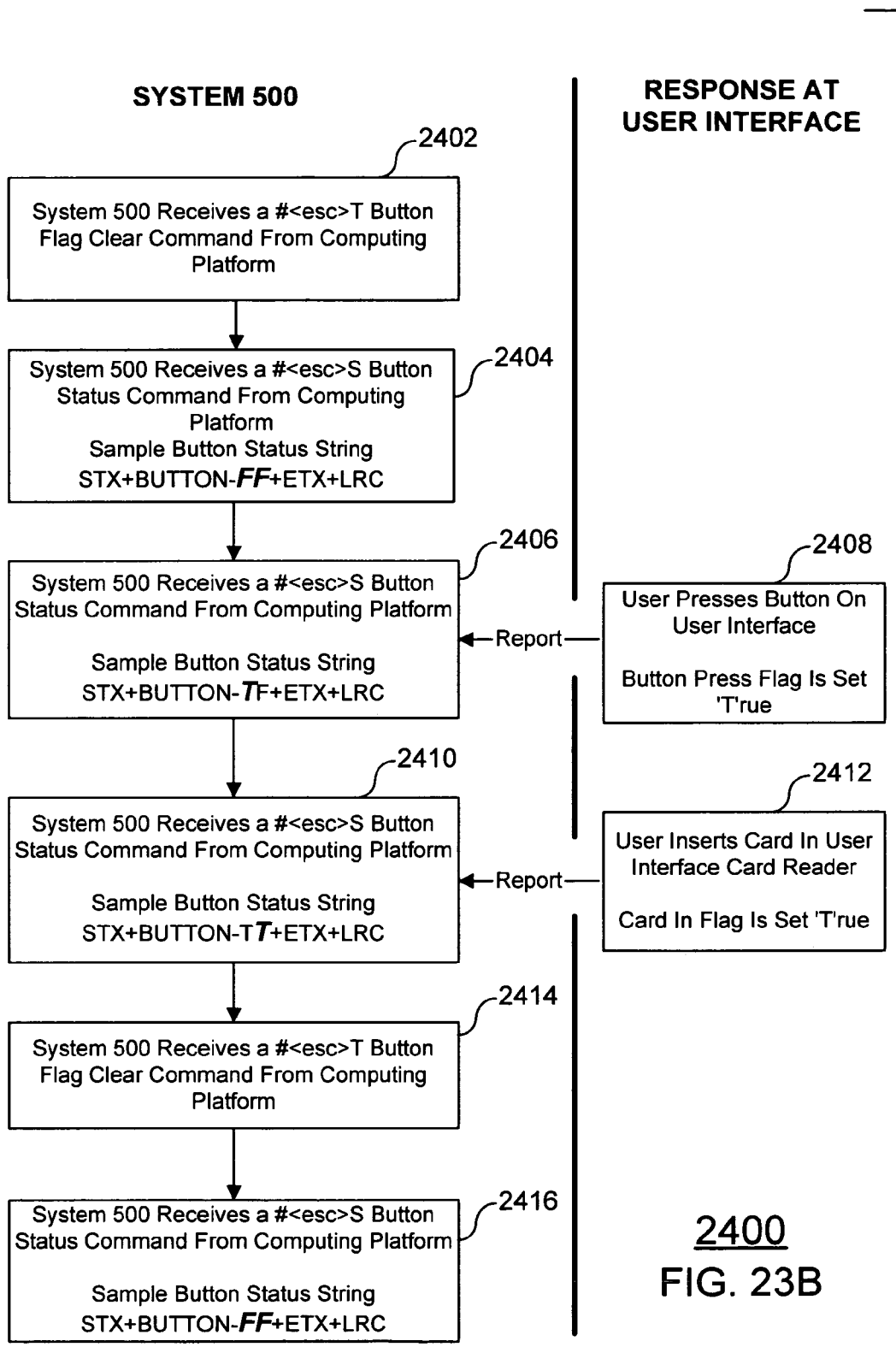
FIG. 23B there is shown button press string messaging when a system 500 clears button flags and initiates button status polling routine 2400.

Referring to FIG. 23B there is shown button press string messaging when a system 500 clears button flags and initiates button status polling routine 2400. Shown in the figure are messages being passed between a system 500 (SYSTEM 500) and a user interface for example a card reader assembly, and or payment module user interface (RESPONSE AT USER INTERFACE).

Routine 2400 is shown as example not a limitation, variations in the routine arise based on vending application, system 500 configuration, computing platform 802 configuration, vending equipment configuration, and or other setup operational, or configuration issues. In an exemplary embodiment, G4, EPORT, a system 500, a payment module, or audit-credit-interactive device, are all referred to as a system 500. The cooperation between system 500 and a computing platform 802 to transact a cashless transaction can be referred to as a cashless transaction processing system.

In an exemplary embodiment a computing platform 802 can monitor button press and card insertions in the card reader 310 by way of CLEAR BUTTON FLAGS and READ BUTTON FLAGS STATUS. The flags are set by the system 500 upon detection of a button press and or card insertion. The flags remain set until the system 500 receives a CLEAR BUTTON FLAGS command #<esc>T from an interconnected computing platform 802. Processing begins in block 2402.

In block 2402, in an exemplary embodiment when system 500 receives the CLEAR BUTTON FLAGS COMMAND #<esc>T from an interconnected computing platform 802, system 500 clears the button flags, setting them to 'F' for false. A response from system 500 to a computing platform 802 acknowledging the receipt and execution of the #<esc>T command may be STX+OK-T+ETX+LRC. Processing then moves to block 2404.

In block 2404 the computing platform 802 can optional test the current status of the button flags by issuing to the system 500 the #<esc>S READ BUTTON FLAGS STATUS request command. In this exemplary embodiment, upon clearing the flags in block 2402 an anticipated sample button status string may be STX+BUTTON-FF+ETX+LRC. The 'FF' located in the interior of the string can indicate that two buttons are being monitored for example a transaction button, such as push button switch 308, and card reader 310 card input sensor (card sense input). Processing then moves to block 2406.

In block 2408 a user of the system may press a button on the user interface. In this example the button may be the push button 308. In this regard, the button press would be first reported to the system 500. The system 500 would then update the button status string as appropriate.

In block 2406 the computing platform 802 can optional test the current status of the button flags by issuing to the system 500 the #<esc>S READ BUTTON FLAGS STATUS request command. In this exemplary embodiment, upon setting of the push button 308 flag in block 2408 an anticipated sample button status string may be STX+BUTTON-TF+ETX+LRC. The 'TF' located in the interior of the string can indicate that the push button 308 has been pressed—'T' in the first position indicating TRUE a button has been detected. Processing then moves to block 2410.

In block 2412 a user of the system may insert a card in card reader 310. In this regard, the card reader insertion would be first reported to the system 500. The system 500 would then update the button status string as appropriate.

In block 2410 the computing platform 802 can optionally test the current status of the button flags by issuing to the system 500 the #<esc>S READ BUTTON FLAGS STATUS request command. In this exemplary embodiment, upon setting of the card reader insertion flag in block 2412 an anticipated sample button status string may be STX+BUTTON-TT+ETX+LRC. The 'TT' located in the interior of the string can indicate that card reader insertion has been detected—the second 'T' indicating TRUE a card insertion has been detected. Processing then moves to block 2416.

Figure 23C:
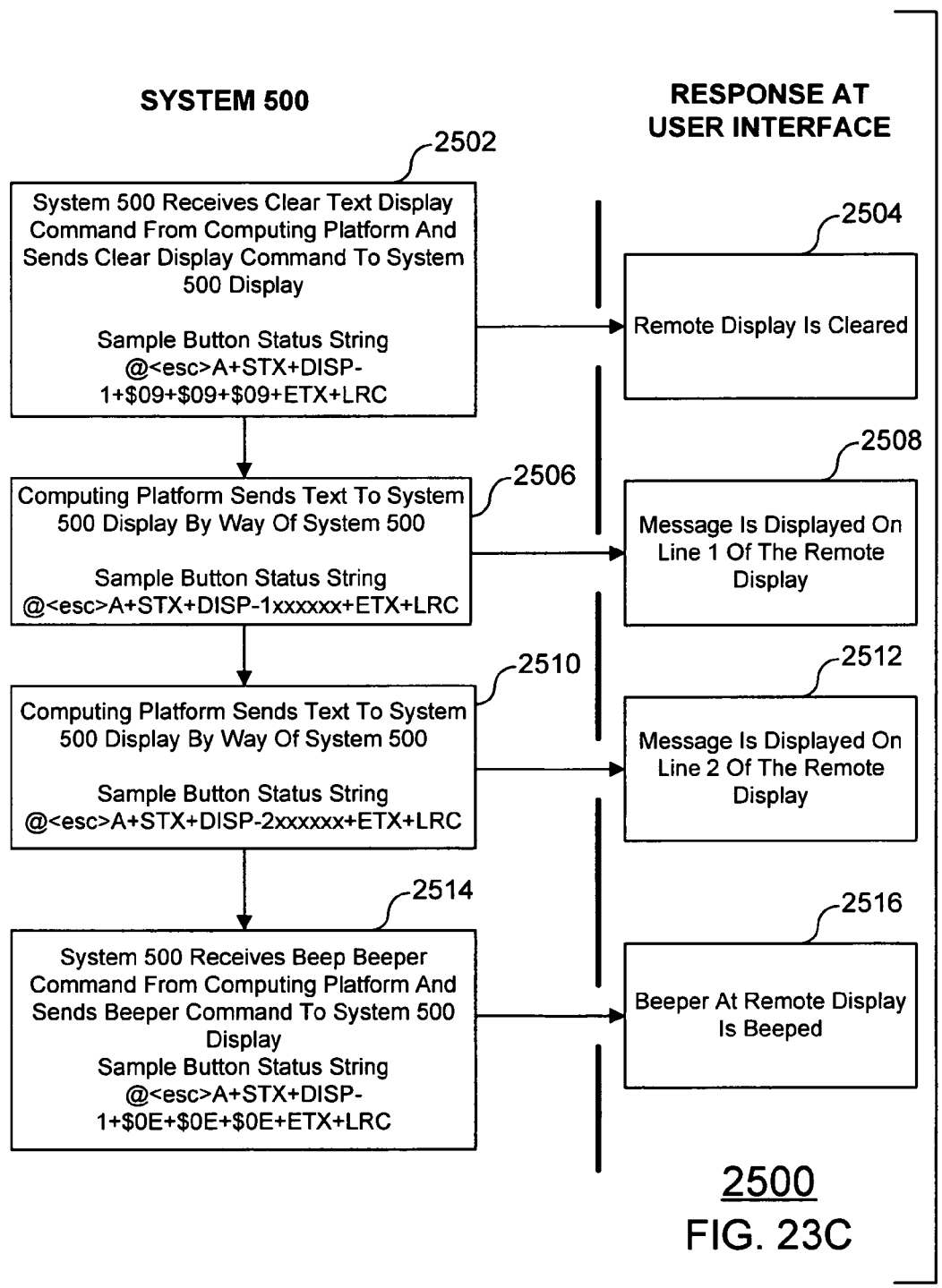
FIG. 23C there is shown system 500 remote display messaging routine 2500.

In block 2416, when the computing platform 802 desires to reset the flag for another button or card reader insertion test the computing platform 802 can resend the CLEAR BUTTON FLAGS COMMAND #<esc>T. In response the system 500 will clears the button flags setting them to 'F' for false no button press detected. A response from system 500 to a computing platform 802 acknowledging the receipt and execution of the #<esc>T command may be STX+OK-T+ETX+LRC. If the computing platform 802 were to request the button status string after the CLEAR BUTTON FLAGS COMMAND the anticipated sample button status string may be STX+BUTTON-FF+ETX+LRC Referring to FIG. 23C there is shown system 500 remote display messaging routine 2500. Shown in the figure are messages being passed between a system 500 (SYSTEM 500) and a user's interface for example a card reader assembly and or payment module user interface (RESPONSE AT USER INTERFACE). The remote display can refer to card reader interface processor board 312 where payment identification data including card reader data, print data, and display data can be communicated with the system 500 and read (card reader to system 500), printed, and or displayed at the user interface.

Routine 2500 is shown as example not a limitation, variations in the routine arise based on vending application, system 500 configuration, computing platform 802 configuration, vending equipment configuration, and or other setup operational, or configuration issues. In an exemplary embodiment, G4, EPORT, a system 500, a payment module, or audit-credit-interactive device, are all referred to as a system 500. The cooperation between system 500 and a computing platform 802 to transact a cashless transaction can be referred to as a cashless transaction processing system.

In an exemplary embodiment a computing platform 802 can issue display and or print commands to system 500. In response system 500 can format and or data communicate the display message and or print data to the system 500 display and or card reader interface processor board 312 (remote display to the computing platform 802, local display to the system 500). In this regard, the computing platform 802 can display messages, print data, and control general purpose I/O such as LEDs as desired on the system 500 display and or card reader interface processor board 312 (the user interface). In addition, a series of display commands allow the computing platform 802 to turn 'OFF' and 'ON' certain LEDs on the user interface, route print data to the system 500 printer, and beep the system 500 user interface beeper. Processing begins in block 2502.

In block 2502 the system 500 receives a clear text command from an interconnected computing platform 802. The system 500 having received the command from the computing platform 802 can reformat the data and pass it to the system 500 display, such as display interface 508. The display data is passed to block 2504. Processing then moves to block 2506.

In block 2504 the display associated with the user interface in cleared and or initialized.

In block 2506 the system 500 receives a text command from an interconnected computing platform 802. The system 500 having received the command from the computing platform 802 can reformat the data and pass it to the system 500 display, such as display interface 508. An example of such text command can be @<esc>A+STX+DISP-1xxxxxx+ETX+LRC. In this example the '1' in the DISP-1 portion of the command indicates display the following text data on line one of the system 500 display. The 'xxxxxx' represents the text data to be displayed. Such data can be as few as one character and as many, in this embodiment, as 16 characters. The display data is passed to block 2508. Processing then moves to block 2510.

In block 2508 the display data received from block 2506 is displayed on line one of the system 500 display.

In block 2510 the system 500 receives a text command from an interconnected computing platform 802. The system 500 having received the command from the computing platform 802 can reformat the data and pass it to the system 500 display, such as display interface 508. An example of such text command can be @<esc>A+STX+DISP-2xxxxxx+ETX+LRC. In this example the '2' in the DISP-2 portion of the command indicates display the following text data on line two of the system 500 display. The 'xxxxxx' represents the text data to be displayed. Such data can be as few as one character and as many, in this embodiment, as 16 characters. The display data is passed to block 2512. Processing then moves to block 2514.

In block 2512 the display data received from block 2506 is displayed on line two of the system 500 display.

In block 2514 the system 500 receives a beep-beeper command for an interconnected computing platform 802. The system 500 having received the command from the computing platform 802 can reformat the data and pass it to the system 500 card/print/display board, such as card reader interface processor board 312. The data is passed to block 2516.

In block 2516 the card reader interface processor board 312 associated with the user interface beeps the beeper.

Figure 23D:
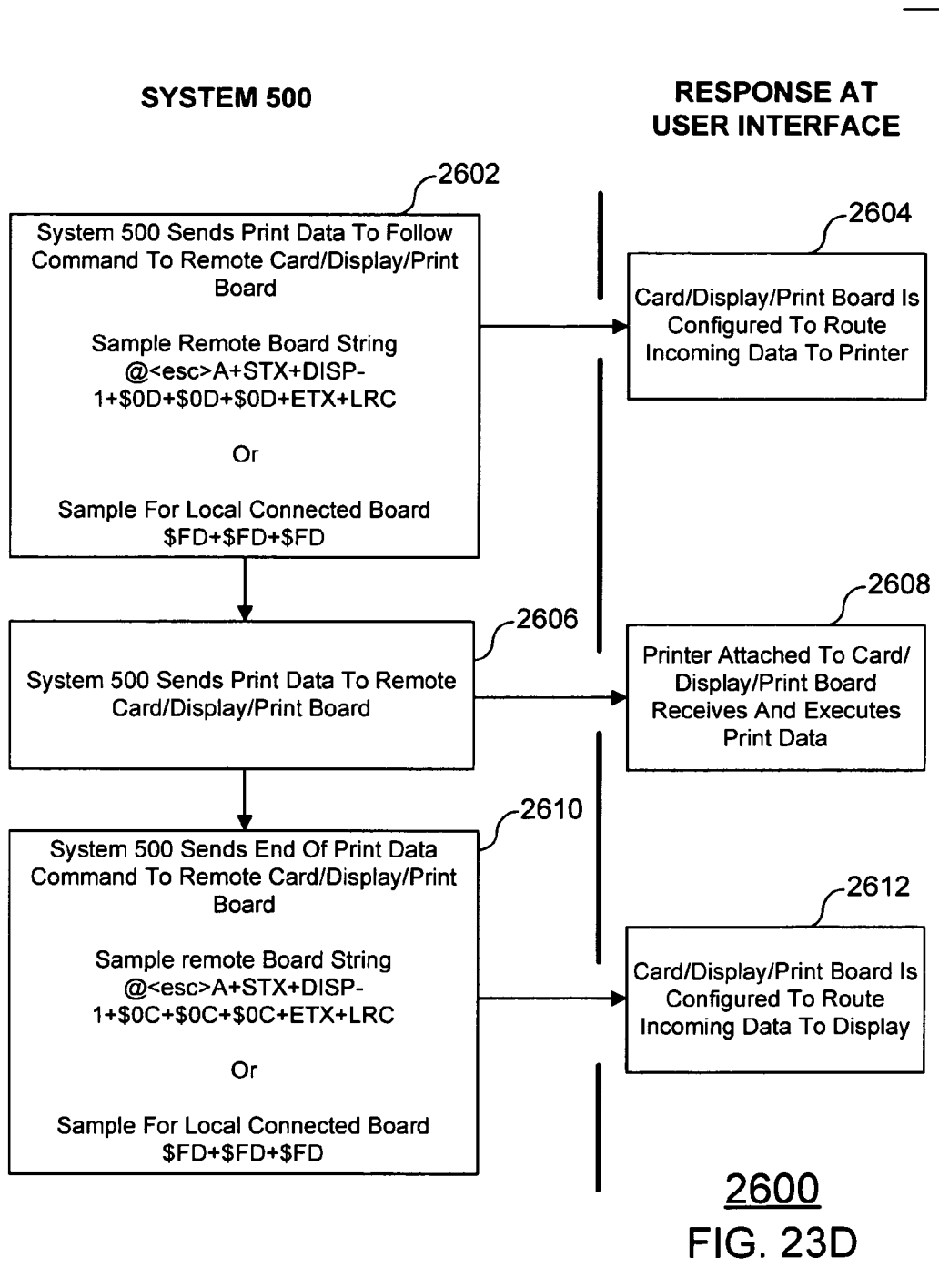
FIG. 23D there is shown system 500 remote printing routine 2600.

Referring to FIG. 23D there is shown system 500 remote printing routine 2600. Shown in the figure are messages being passed between a system 500 (SYSTEM 500) and a user's interface for example a card reader assembly and or payment module user interface (RESPONSE AT USER INTERFACE). The remote printer can be referred to as card reader interface processor board 312 where payment identification data including card reader data, print data, and display data can be communicated with the system 500 and read, printed, and or displayed.

Routine 2600 is shown as example not a limitation, variations in the routine arise based on vending application, system 500 configuration, computing platform 802 configuration, vending equipment configuration, and or other setup operational, or configuration issues. In an exemplary embodiment, G4, EPORT, a system 500, a payment module, or audit-credit-interactive device, are all referred to as a system 500. The cooperation between system 500 and a computing platform 802 to transact a cashless transaction can be referred to as a cashless transaction processing system.

In an exemplary embodiment a computing platform 802 can issue display and or print commands to system 500. In response system 500 can format and or data communicate the data message to the system 500 display and or card reader interface processor board 312 (remote printer to the computing platform 802, local printer to the system 500). In this regard, the computing platform 802 can display messages, print data, and control general purpose I/O such as LEDs as desired on the system 500 display and or card reader interface processor board 312. In addition, a series of display commands allow the computing platform 802 to turn 'OFF' and 'ON' certain LEDs on the user interface, route print data to the system 500 printer, and beep the system 500 user interface beeper. Processing begins in block 2602.

In block 2602 a computing platform 802 can issue to the system 500 a command to initiate the transfer of data from the computing platform 802 to the card reader interface processor board 312 such that the data is received by the printer and printed. In this regard, either the computing platform 802 by way of the system 500 and or the system 500 directly, can send print data to the printer interconnected with card reader interface processor board 312. As an example, the computing platform 802 can initiate the data switch to route data to the printer instead of the remote display by sending the @<esc>A+STX+DISP-1+$0D+$0D+$0D+ETX+LRC command, wherein the $0D+$0D+$0D is the command for initiating print data switching (see codes above). The system 500 can locally send a command to the card reader interface processor board 312 to initiate print data switching, such a command can be $FD+$FD+$FD (see codes above). The command message is sent to the card reader interface processor board 312 in block 2604. Processing then moves to block 2606.

In block 2604 the card reader interface processor board 312 receives the command data from the system 500 and data switches to the printer port. In this regard, data now received by the card reader interface processor board 312 will be directly routed to the printer mechanism.

In block 2606 the computing platform 802 by way of system 500, or system 500 directly can data communicate print data to the print mechanism interconnected with card reader interface processor board 312.

Block 2608 receives print data from block 2606, routes data to the printer and effectuates printing.

In block 2610 a computing platform 802 can issue to the system 500 a command to end the transfer of print data from the computing platform 802 to the card reader interface processor board 312. To end print data transfer the computing platform 802 can send the command @<esc>A+STX+DISP-1+$0C+$0C+$0C+ETX+LRC, wherein the $0C+$0C+$0C is the command for end print data transfer (see codes above).

The system 500 can locally send a command to the card reader interface processor board 312 to end print data switching, such a command can be $FC+$FC+$FC (see codes above).

Figure 23E:
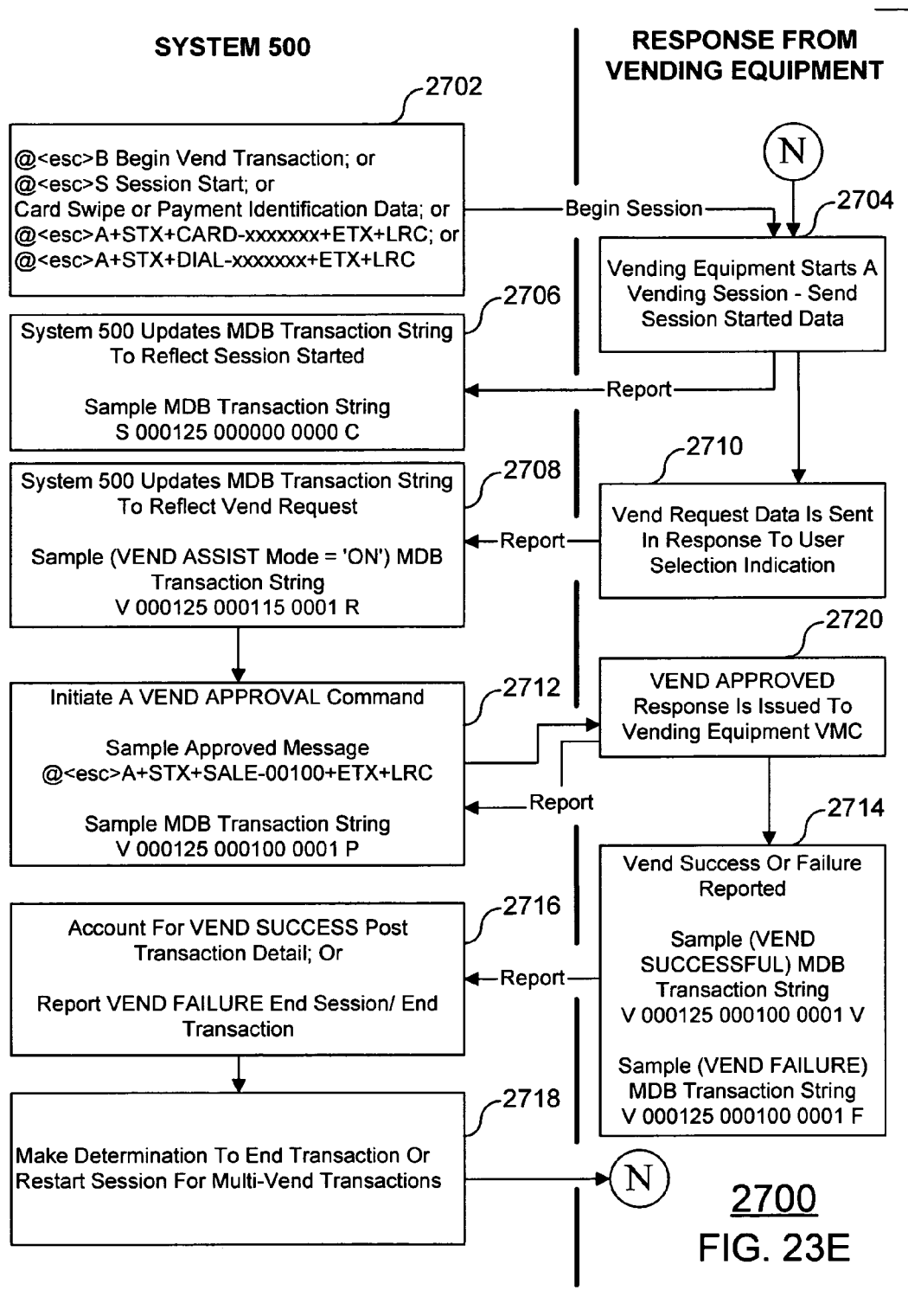
FIG. 23E there is shown MDB TRANSACTION STRING messaging when a system 500 initiates a cashless vend while in the VEND ASSIST mode 'ON' routine 2700.

Referring to FIG. 23E there is shown MDB TRANSACTION STRING messaging when a system 500 initiates a cashless vend while in the VEND ASSIST mode 'ON' routine 2700. Shown in the figure are messages being passed between a system 500 (SYSTEM 500) and the vending equipment VMC (RESPONSE FROM VENDING EQUIPMENT).

Routine 2700 is shown as example not a limitation, variations in the routine arise based on vending application, system 500 configuration, computing platform 802 configuration, vending equipment configuration, and or other setup operational, or configuration issues. In an exemplary embodiment, G4, EPORT, a system 500, a payment module, or audit-credit-interactive device, are all referred to as a system 500. The cooperation between system 500 and a computing platform 802 to transact a cashless transaction can be referred to as a cashless transaction processing system.

System 500 can initiate a vending session by receiving certain commands from an interconnected computing platform 802 or by the system 500 initiating the vending session. An option is available for the system 500 or computing platform 802 to essentially approve the vend selection and sale price of a user selected vend item prior to dispensing the product or service. This mode is called the VEND ASSIST mode and can be utilized to approve the user selection and control the charged price of a user selected vend item.

In this regard, forced product selection can be imposed on a user by declining (referred to as VEND DENY) a user's selections that are not correct or otherwise acceptable. In addition, promotional offers such as buy-one-get-one-free, or other discount or markup offers can be implemented, as well as other promotional combinations.

As an example and not limitation a user can select a product and the computing platform 802 and or system 500 can VEND APPROVE the selection and charge the user the posted price. The user can then be prompted to select a free item. To this objective the user can select an item and the computing platform 802 and or system 500 can, while in the VEND ASSIST MODE, VEND APPROVE the user's selected item this time charging the user zero—creating a buy-one-get-one-free offer. Other discount offers, markup offers, and forced selection promotions can also be implemented without limitation. Processing begins in block 2702.

In block 2702 a session is begun by the computing platform 802 interconnected with the system 500 and or by system 500. A session can be started in a number of ways including @<esc>B BEGIN A SESSION command, @<esc>S SESSION START, a valid card swipe or payment identification data presentation, an @<esc>A+STX+CARD−xxxxxx+ETX+LRC command where 'xxxxxx' is card or payment identification data, an @<esc>A+STX+DIAL-xxxxxx+ETX+LRC dial-a-vend command, or other suitable start session methods. In response the system 500 issues a MDB BEGIN SESSION message command to the vending equipment VMC. Processing then moves to block 2704.

In block 2704 the vending equipment starts a vending session. System 500 monitoring the MDB bus connection between the system 500 and VMC can determine and update the MDB TRANSACTION STRING accordingly. MDB bus data and MDB TRANSACTION STRING updating can be referred to as reporting or reporting data. Reporting data can be communicated to block 2706. Processing then moves to block 2710.

In block 2706 the system 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be 'S0001250000000000C', where in 'S' indicates a MDB STATE of IN-SESSION.

In block 2710 when a user makes a vending selection the VMC sends by way of the MDB bus connection between system 500 and the VMC a MDB VEND REQUEST message. This message typically contains the column or button select by the user and the vending equipment price set for this item. The VEND REQUEST is reported to the system 500 and processing then moves to block 2708.

In block 2708 the system 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be 'V00012500011500001R'.

In this case the MDB STATE FLAG is set to 'V' to indicate a vend is occurring, and the MDB FLAG state is set to 'R' for REQUEST VEND APPROVE. This is the indication to computing platform 802 and or system 500 that in order to effectuate vending or delivery of the item, or deny vending of the item a VEND APPROVE or VEND DENIED command respectively must be issued to the VMC from the system 500.

In an exemplary embodiment, a computing platform 802 interconnect with system 500 can determine from the MDB TRANSACTION string the item selected and item price. For example and not limitation, the MDB TRANSACTION STRING 'V 000125 000115 0001 R' indicates that the MAX VEND PRICE in the vending equipment is '000125' or $1.25, the price set in the vending equipment for the user item selected is '000115' or $1.15, and the user selected item or column id '0001' item or column number is one. The computing platform 802 and or system 500 can in part use this information to determine whether to issue the VEND APPROVE or VEND DENIED command to the VMC. Processing then moves to block 2712.

In block 2712, for example and not limitation, a determination by the computing platform 802 to VEND APPROVE the vend request can be made. In this regard, the computing platform 802 data communicates to the system 500 the @<esc>A+STX+SALE−00100+ETX+LRC where '00100' is the desired sale amount in this case $1.00. System 500 receiving the VEND APPROVE command from computing platform 802 issues the MDB VEND APPROVED message to the vending equipments VMC. Processing then moves to block 2720.

In block 2720 the VEND APPROVED response is received at the VMC from the system 500. The vending equipment in accordance with VMC programming initiates the vend product cycle. By the VMC acknowledging the VEND APPROVED message from the system 500, the system 500 can now indicate a cashless vend is pending. A report is passed back to block 2712 such that system 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be 'V0001250001000001P'. Processing then moves to block 2714.

In block 2714 the vending equipment either completes or fails to complete a vending cycle. A report is passed to block 2716 such that system 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be 'V0001250001000001V' for vend complete, a failed vend cycle could be reflected in a MDB TRANSACTION STRING as 'V0001250001000001F'. Processing then moves to block 2716.

In block 2716 the computing platform 802 and or system 500 accounts for the VEND SUCCESS and or VEND FAILURE. VEND FAILURES typically end a session and or transaction. Processing then moves to block 2718.

In block 2718 a determination is made as to whether the transaction should be ended or a multi-vend session should continue. If a multi-vend session is to continue then processing moves back to block 2704 by the computing platform 802 and or system 500 issuing a MDB BEGIN SESSION message to the vending equipment VMC.

Figure 23F:
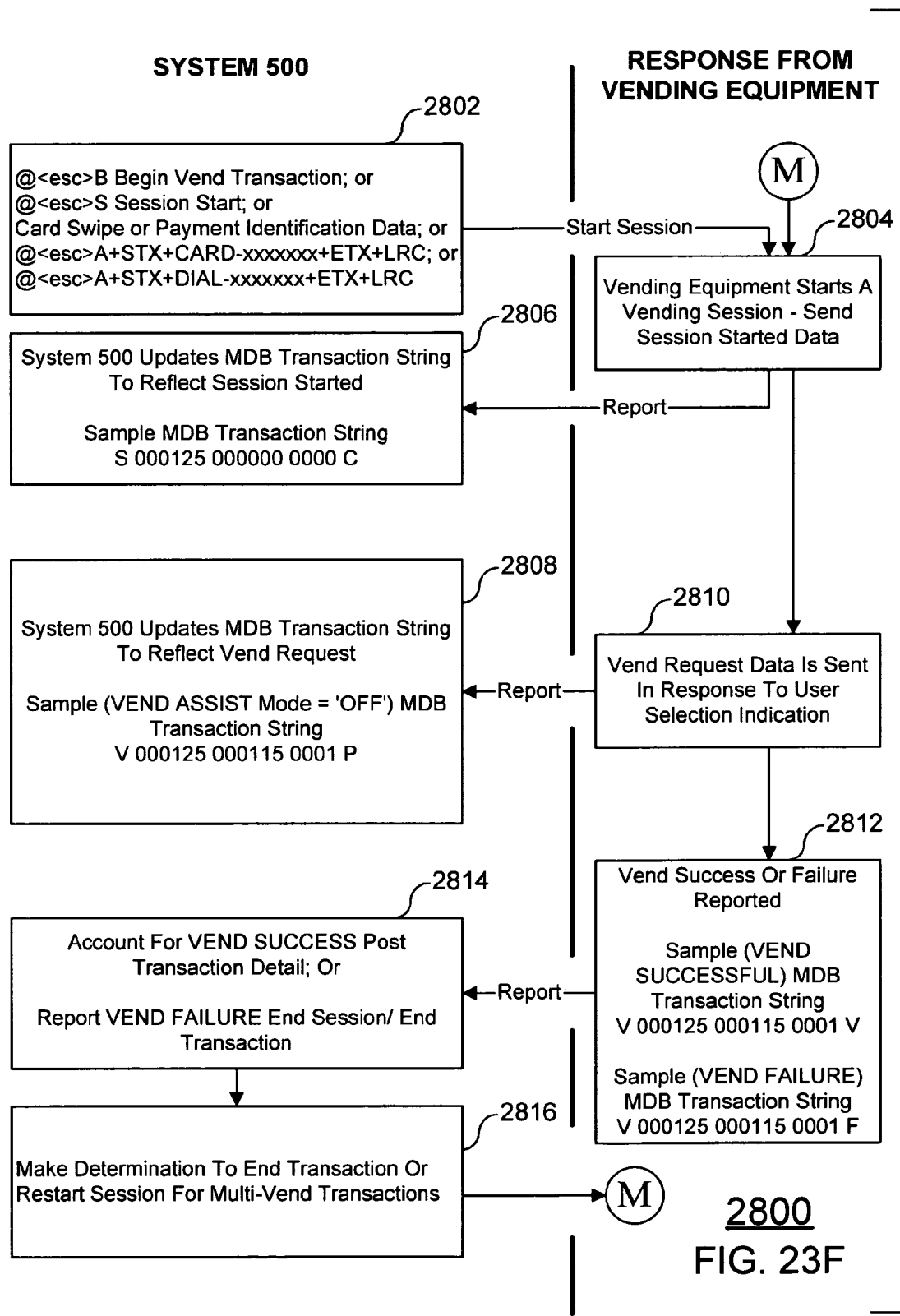
FIG. 23F there is shown MDB TRANSACTION STRING messaging when a system 500 initiates a cashless vend while in the VEND ASSIST mode 'OFF' routine 2800.

Referring to FIG. 23F there is shown MDB TRANSACTION STRING messaging when a system 500 initiates a cashless vend while in the VEND ASSIST mode 'OFF' routine 2800. Shown in the figure are messages being passed between a system 500 (SYSTEM 500) and the vending equipment VMC (RESPONSE FROM VENDING EQUIPMENT).

Routine 2800 is shown as example not a limitation, variations in the routine arise based on vending application, system 500 configuration, computing platform 802 configuration, vending equipment configuration, and or other setup operational, or configuration issues. In an exemplary embodiment, G4, EPORT, a system 500, a payment module, or audit-credit-interactive device, are all referred to as a system 500. The cooperation between system 500 and a computing platform 802 to transact a cashless transaction can be referred to as a cashless transaction processing system.

System 500 can initiate a vending session by receiving certain commands from an interconnected computing platform 802 or by the system 500 initiating the vending session. When the VEND ASSIST mode is turned 'OFF' the system 500 will make the determination whether or not to APPROVE or DENY the MDB VEND REQUEST that is generated when a user selects an item from the vending equipment. In this regard, a VEND APPROVE response from the system 500 will effectuate the vending of the user selected item from the vending equipment and the subsequent charging for the vended item. Processing begins in block 2802.

In block 2802 a session is begun by the computing platform 802 interconnected with the system 500 and or by system 500. A session can be started in a number of ways including @<esc>B BEGIN A SESSION command, @<esc>S SESSION START, a valid card swipe or payment identification data presentation, an @<esc>A+STX+CARD–xxxxxx+ ETX+LRC command where 'xxxxxx' is card or payment identification data, an @<esc>A+STX+DIAL-xxxxxx+ ETX+LRC dial-a-vend command, or other suitable start session methods. In response the system 500 issues a MDB BEGIN SESSION message command to the vending equipments VMC. Processing then moves to block 2804.

In block 2804 the vending equipment starts a vending session. System 500 monitoring the MDB bus connection between the system 500 and VMC can determine and update the MDB TRANSACTION STRING accordingly. MDB bus data and MDB TRANSACTION STRING updating can be referred to as reporting or reporting data. Reporting data can be communicated to block 2806. Processing then moves to block 2810.

In block 2806 the system 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be 'S0001250000000000C'.

In block 2810 when a user makes a vending selection the VMC sends by way of the MDB bus connection between system 500 and the VMC a MDB VEND REQUEST message. This message typically contains the column or button selected by the user and the vending equipment price set for this item. The VEND REQUEST is reported to the system 500 and processing moves to block 2808.

In block 2808 the system 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be 'V0001250001150001P'.

In this case the MDB STATE FLAG is set to 'V' to indicate a cashless vend is occurring, and the MDB flag state is set to 'P' for VEND PENDING. This is the indication to computing platform 802 and or system 500 that the vending equipment is in vend cycle to vend an item.

In an exemplary embodiment, a computing platform 802 interconnect with system 500 can determine from the MDB TRANSACTION string the item selected and item price. For example and not limitation, the MDB TRANSACTION STRING 'V 000125 000115 0001 P' indicates that the MAX VEND PRICE in the vending equipment is '000125' or $1.25, the price set in the vending equipment for the user item selected is '000115' or $1.15, and the user selected item or column id '0001' item or column number one. The computing platform 802 and or system 500 can in part use this information to account for or otherwise process/record the cashless vending transaction data. Processing then moves to block 2812.

In block 2812 having received the MDB VEND APPROVE response from system 500 the vending equipment either completes or fails to complete a vending cycle. A report is passed to block 2814 such that system 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be 'V0001250001150001V' for vend complete a failed vend cycle could be reflected in a MDB TRANSACTION STRING as 'V0001250001150001F'. Processing then moves to block 2814.

In block 2814 the computing platform 802 and or system 500 accounts for the VEND SUCCESS and or VEND FAILURE. VEND FAILURES typically end a session and or transaction. Processing then moves to block 2816.

In block 2816 a determination is made as to whether the transaction should be ended or a multi-vend session should continue. If a multi-vend session is to continue then system 500 issues a MDB BEGIN SESSION message to the vending equipment VMC. Processing then moves back to block 2804

Figure 23G:
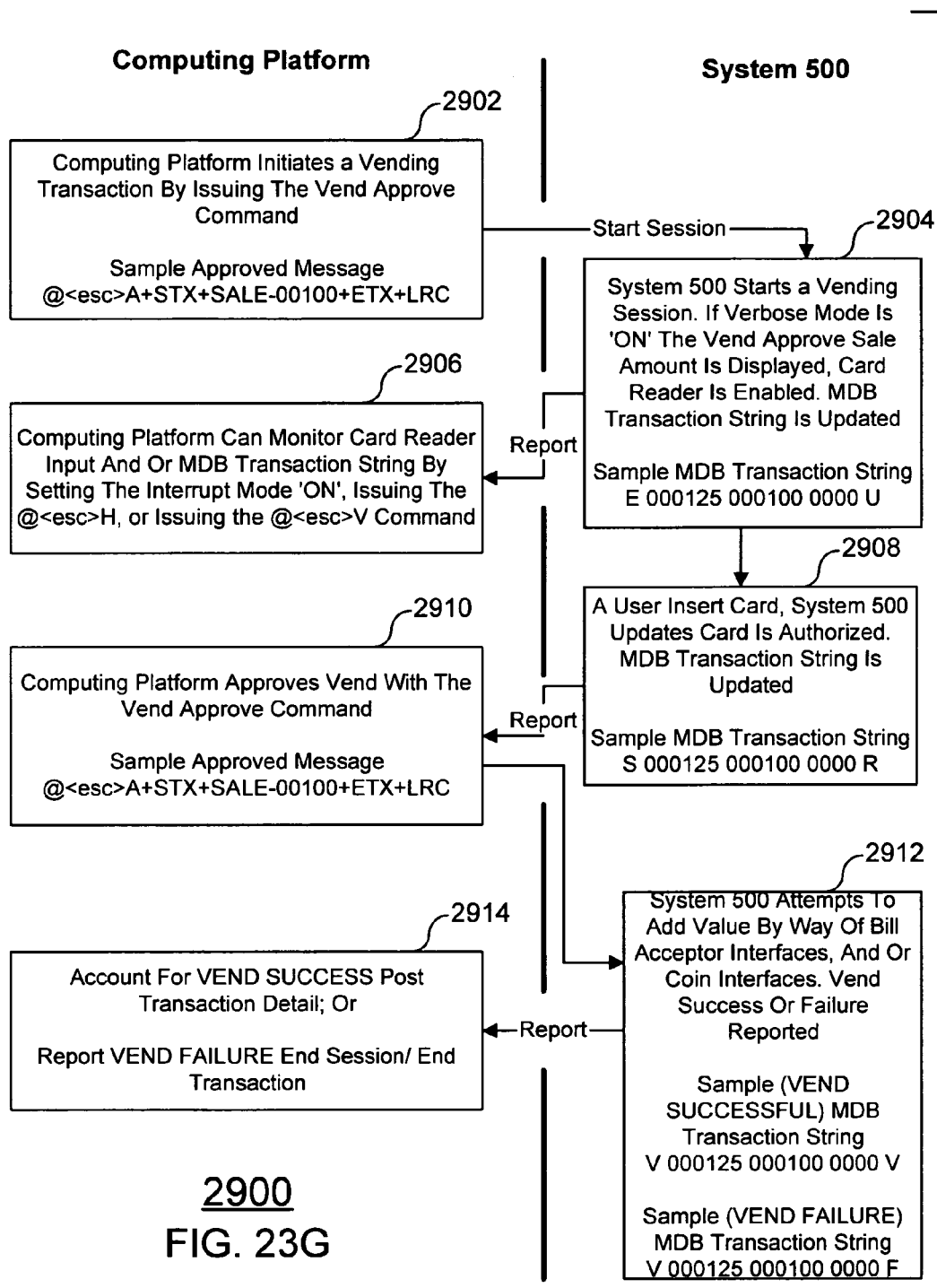
FIG. 23G there is shown a computing platform and system 500 exchange to effectuate a VEND ASSIST transaction when system 500 is selectively interconnected with vending equipment or interconnected with a bill acceptor interface routine 2900.

Referring to FIG. 23G there is shown a computing platform and system 500 exchange to effectuate a VEND ASSIST transaction when system 500 is selectively interconnected with vending equipment or interconnected with a bill acceptor interface routine 2900. Shown in the figure are messages being passed between a computing platform 802 (COMPUTING PLATFORM) and a system 500 (SYSTEM 500).

Routine 2900 is shown as example not a limitation, variations in the routine arise based on vending application, system 500 configuration, computing platform 802 configuration, vending equipment configuration, and or other setup operational, or configuration issues. In an exemplary embodiment, G4, EPORT, a system 500, a payment module, or audit-credit-interactive device, are all referred to as a system 500. The cooperation between system 500 and a computing platform 802 to transact a cashless transaction can be referred to as a cashless transaction processing system.

System 500 can be interconnected with computing platform 802. The system 500 may or may not be interconnected with vending equipment. In an embodiment where a system 500 is not interconnected with vending equipment the computing platform 802 may be interconnected with the vending equipment. In an embodiment where the system 500 is interconnected with vending equipment the interconnection can be of a type referred to as BILL PULSE INTERFACE or BILL SERIAL INTERFACE. The BILL SERIAL INTERFACE or the BILL PULSE INTERFACE can be, and or be referred to as bill and coin interface 506, or other similar or suitable bill or coin interface. In this regard, the system 500 would look to transfer value to vending equipment by way of the vending equipment's bill acceptor and or coin acceptor interfaces.

In an exemplary embodiment computing platform 802 communicates with system 500 to first indicate to start a vending session by communicating to the system 500 a VEND APPROVE command for example @<esc>A+STX+SALE−00100+ETX+LRC to indicate a '000100' or $1.00 sale is to take place. The determination to initiate a vending session and the value to set for a sale is determined by the computing platform 802, in this example, and is based on the system 500 being in the VEND ASSIST mode 'ON'.

Alternatively, in a VEND ASSIST mode 'OFF' a user pushing a button, such as push button 308 on a user interface can effectuate system 500 starting a vending session. For example and not limitation, routine 2900 details a VEND ASSIST mode 'ON' vending session. Processing begins in block 2902.

In block 2902 a session is begun by the computing platform 802 interconnected with the system 500, and or by system 500. A session can be started by way of computing platform 802 sending system 500 a VEND APPROVE command, for example @<esc>A+STX+SALE−00100+ETX+LRC to indicate a '000100' or $1.00 sale. In response system 500 starts a cashless vending session. Processing then moves to block 2904.

In block 2904 a cashless vending session is started. In this regard, if the VERBOSE mode is 'ON' the system 500 will display the sale amount received from the computing platform 802. In addition, the MDB TRANSACTION STRING is updated accordingly. MDB TRANSACTION STRING updating can be referred to as reporting or reporting data. Reporting data can be communicated to block 2906. Processing then moves to block 2908.

In block 2906 the system 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be 'E00012500000000000U', wherein 'E' MDB STATE indicates the system 500 is enables and 'U' MDB flag state indicates that a USER SELECTED AMOUNT has been received. In addition, cashless card data and or payment identification data presented by the user can be obtained by way of the @<esc>V or @<esc>T commands.

In block 2908 when a user presents cashless identification data, a card, and or payment identification data to system 500 for authorization the user data is first authorized. If the resultant is in the affirmative, that is the user data is authorized a REQUEST VEND APPROVE MDB TRANSACTION STRING message is reported to the computing platform 802.

In an exemplary embodiment, in block 2908 the system 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be 'S00012500011500001R', wherein 'S' indicated MDB STATE of in-session, and 'R' indicates REQUEST VEND APPROVE. This is the indication to computing platform 802 and or system 500 that in order to effectuate vending of the item or deny vending of the item a VEND APPROVE or VEND DENIED command respectively must be issued to the VMC from the system 500.

In an exemplary embodiment, a computing platform 802 interconnect with system 500 can determine from the MDB TRANSACTION string the item selected and item price. For example and not limitation, the MDB TRANSACTION STRING 'S 000125 000115 0001 R' indicates that the MAX VEND PRICE in the vending equipment is '000125' or $1.25, the price set in the vending equipment for the user item selected is '000100' or $1.00, and the user selected item or column id '0001' item or column number is one. The computing platform 802 can in part use this information to determine whether to issue the VEND APPROVE, or VEND DENIED command to the system 500. Processing then moves to block 2910.

In block 2910, for example and not limitation, a determination by the computing platform 802 to VEND APPROVE the vend request is made. In this regard the computing platform 802 data communicates to the system 500 the @<esc>A+STX+SALE−00100+ETX+LRC where '00100' is the desired sale amount in this case $1.00. System 500 receiving the VEND APPROVE command from computing platform 802 attempts to complete a vend cycle. In the BILL SERIAL, BILL PULSE, and COIN INTERFACE options the vend cycle can include transferring to the vending equipment.

If the system 500 is not interconnected with vending equipment the vend cycle can be limited to completing the sale. Furthermore, when the system 500 is not interconnected with the vending equipment the computing platform 802 can be responsible for effectuating the vending cycle, which can include interfacing with the vending equipment, delivery of value transfer, product, or service to the user. Processing moves to block 2912.

In block 2912 in an exemplary embodiment, the VEND APPROVE response is received at the system 500. System 500 either completes or fails to complete a vending cycle. A report is passed to block 2914 such that system 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be 'V0001250001000001V' for vend complete a failed vend cycle could be reflected in a MDB TRANSACTION STRING as 'V0001250001000001F'. A report is passed back to block 2914. Processing then moves to block 2914.

In block 2914 the computing platform 802 and or system 500 accounts for the VEND SUCCESS and or VEND FAILURE. VEND FAILURES typically end a session and or transaction.

Figure 23H:
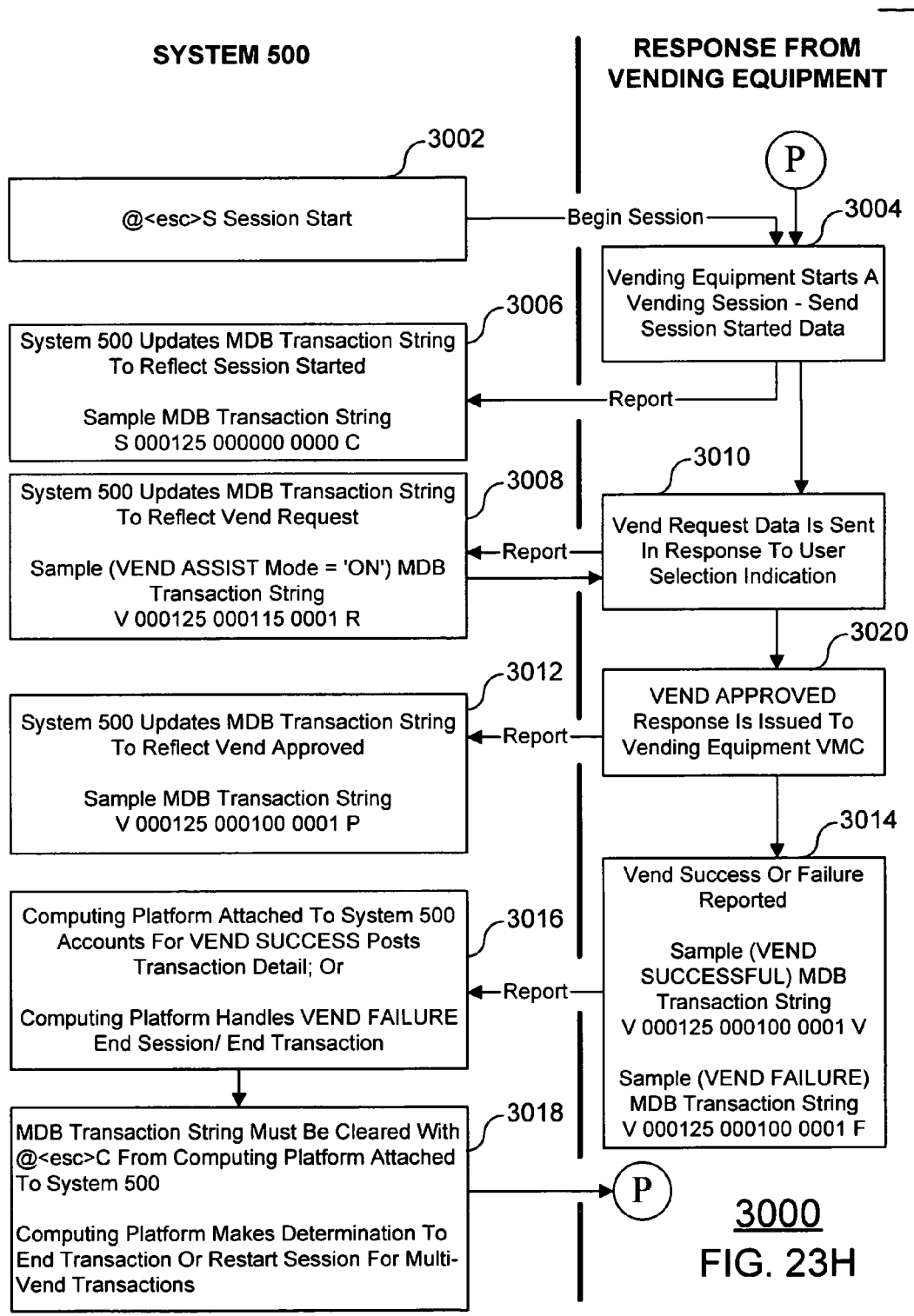
FIG. 23H there is shown MDB TRANSACTION STRING messaging when a system 500 initiates a cashless vend while in the VEND ACTIVE mode 'OFF' routine 3000.
Figure 231:
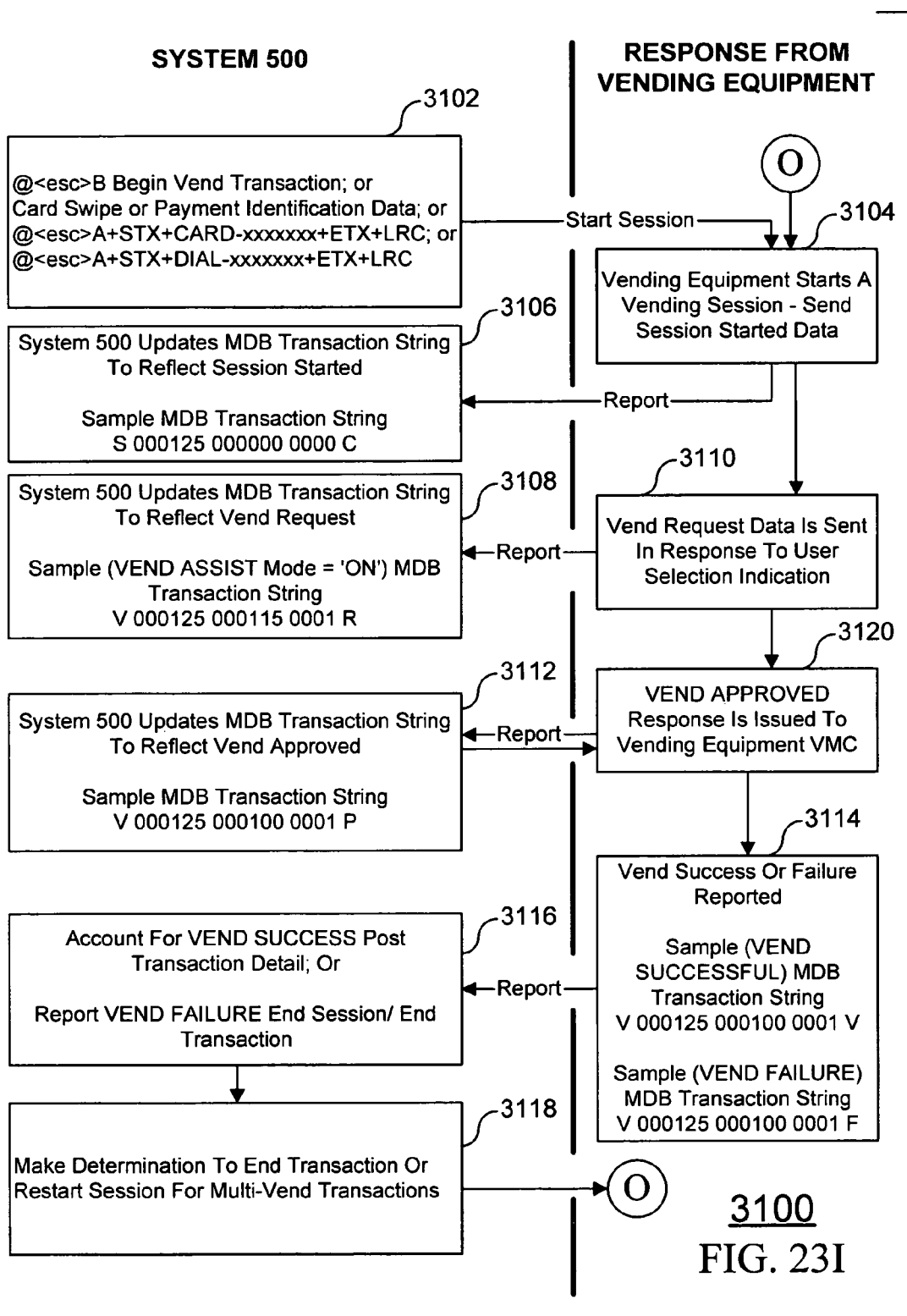

Referring to FIG. 23H there is shown MDB TRANSACTION STRING messaging when a system 500 initiates a cashless vend while in the VEND ACTIVE mode 'OFF' routine 3000. Shown in the figure are messages being passed between a system 500 (SYSTEM 500) and the vending equipment VMC (RESPONSE FROM VENDING EQUIPMENT).

Routine 3000 is shown as example not a limitation, variations in the routine arise based on vending application, system 500 configuration, computing platform 802 configuration, vending equipment configuration, and or other setup operational, or configuration issues. In an exemplary embodiment, G4, EPORT, a system 500, a payment module, or audit-credit-interactive device, are all referred to as a system 500. The cooperation between system 500 and a computing platform 802 to transact a cashless transaction can be referred to as a cashless transaction processing system.

System 500 can initiate a vending session by receiving certain commands from an interconnected computing platform 802 or by the system 500 initiating the vending session. An option is available for the system 500 or computing platform 802 to essentially setup the system 500 in a slave mode, wherein the system 500 essentially receives data communication from computing platform 802 to effectuate control of the vending equipment VMC. In addition, the system 500 data communicates with the vending equipment VMC on behalf of the computing platform 802 to effectuate a cashless vending transaction. In this regard, the system 500 effectuates the ability of the computing platform to transact a cashless vending transaction by the system 500 essentially acting as a data communication and translation conduit between the computing platform 802 and the VMC.

In an exemplary embodiment the computing platform 802 is typically responsible for starting and stopping the vend sessions and accounting for cashless vending transactions. The system 500 configuration that turns the system 500 into a data conduit for the computing platform 802 and VMC can be referred to as the VEND ACTIVE mode 'OFF', wherein VEND ACTIVE mode 'OFF' indicates the system 500 is a data conduit and not running the transactions. Conversely, the VEND ACTIVE mode 'ON' indicates the system 500 is running the transaction. This example reflects a VEND ACTIVE mode 'OFF' cashless transaction vending cycle. Processing begins in block 3002.

In block 3002 a session is begun by the computing platform 802 interconnected with the system 500 and or by system 500. A session can be started by the computing platform issuing the @<esc>S SESSION START command to the system 500. In response the system 500 issues a MDB BEGIN SESSION message command to the vending equipment VMC. Processing then moves to block 3004.

In block 3004 the vending equipment starts a vending session. System 500 monitoring the MDB bus connection between the system 500 and VMC can determine and update the MDB TRANSACTION STRING accordingly. MDB bus data and MDB TRANSACTION STRING updating can be referred to as reporting or reporting data. Reporting data can be communicated to block 3006. Processing then moves to block 3010.

In block 3006 the system 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be 'S0001250000000000C'.

In block 3010 when a user makes a vending selection the VMC sends by way of the MDB bus connection between system 500 and the VMC a MDB VEND REQUEST message. This message typically contains the column or button select by the user and the vending equipment price set for this item. The VEND REQUEST is reported to the system 500 and processing moves to block 3020.

In block 3008 the system 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be 'V0001250001150001R' (VEND ASSIST mode 'ON'). In a VEND ASSIST mode 'OFF' configuration the system 500 would typically respond to the VMC MDB VEND REQUEST with a MDB VEND APPROVED response without the computing platform 802 having an opportunity to APPROVE or DENY the vend.

In this example the VEND ASSIST mode is 'ON'. In this case the MDB STATE FLAG is set to 'V' to indicate a cashless vend is occurring, and the MDB flag state is set to 'R' for REQUEST VEND APPROVE. This is the indication to computing platform 802 and or system 500 that in order to effectuate vending of the item or deny vending of the item a VEND APPROVE or VEND DENIED command respectively must be issued to the VMC from the system 500.

In an exemplary embodiment, a computing platform 802 interconnect with system 500 can determine from the MDB TRANSACTION string the item selected and item price. For example and not limitation, the MDB TRANSACTION STRING 'V 000125 000115 0001 R' indicates that the MAX VEND PRICE in the vending equipment is '000125' or $1.25, the price set in the vending equipment for the user item selected is '000115' or $1.15, and the user selected item or column id '0001' item or column number is one. The computing platform 802 and or system 500 can in part use this information to determine whether to issue the VEND APPROVE or VEND DENIED command to the VMC.

For example and not limitation, a determination by the computing platform 802 to VEND APPROVE the vend request is made. In this regard, the computing platform 802 data communicates to the system 500 the @<esc>A+STX+SALE–00100+ETX+LRC where '00100' is the desired sale amount in this case $1.00. System 500 receiving the VEND APPROVE command from computing platform 802 issues the MDB VEND APPROVED message to the vending equipment VMC.

In block 3020 the VEND APPROVED response is received at the VMC from the system 500. The vending equipment in accordance with VMC programming initiates the vend product cycle. By the VMC acknowledging the VEND APPROVED message from the system 500, the system 500 can now indicate a cashless vend is pending. A report is passed back to block 3012 such that system 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be 'V0001250001000001P'. Processing then moves to block 3014.

In block 3014 the vending equipment either completes or fails to complete a vending cycle. A report is passed to block 3016 such that system 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be 'V0001250001000001V' for vend complete a failed vend cycle could be reflected in a MDB TRANSACTION STRING as 'V0001250001000001F'. Processing then moves to block 3016.

In block 3016 the computing platform 802 accounts for the VEND SUCCESS and or VEND FAILURE. VEND FAILURES typically end a session and or transaction. The MDB TRANSACTION STRING must be cleared by the computing platform before another cashless vend can be transacted. Clearing the MDB TRANSACTION STRING can be effectuated by way of the @<esc>C command. Processing then moves to block 3018.

In block 3018 a determination is made as to whether the transaction should be ended or a multi-vend session should continue. If a multi-vend session is to continue then processing moves back to block 3004 initiated by the computing platform 802 issuing to the system 500 a begin session command @<esc>S and system 500 issuing a MDB BEGIN SESSION message to the vending equipment VMC.

Referring to FIG. 23I there is shown MDB TRANSACTION STRING messaging when a system 500 initiates a cashless vend while in the VEND ACTIVE mode 'ON' routine 3100. Shown in the figure are messages being passed between a system 500 (SYSTEM 500) and the vending equipment VMC (RESPONSE FROM VENDING EQUIPMENT).

Routine 3100 is shown as example not a limitation, variations in the routine arise based on vending application, system 500 configuration, computing platform 802 configuration, vending equipment configuration, and or other setup operational, or configuration issues. In an exemplary embodiment, G4, EPORT, a system 500, a payment module, or audit-credit-interactive device, are all referred to as a system 500. The cooperation between system 500 and a computing platform 802 to transact a cashless transaction can be referred to as a cashless transaction processing system.

System 500 can initiate a vending session by receiving certain commands from an interconnected computing platform 802 or by the system 500 initiating the vending session. An option is available for the system 500 or computing platform 802 to essentially setup the system 500 in a master mode, wherein the system 500 essentially runs the cashless transaction and the computing platform 802 merely monitors the cashless transaction and vend cycle by way of data communication with the system 500. In this regard, the system 500 effectuates the ability of the computing platform 802 to monitor a cashless vending transaction.

If the VEND ASSIST mode is 'ON' the computing platform 802 can still play a role in APPROVING and DENYING a cashless vend and setting the vend price as previously detailed. In the VEND ASSIST mode 'OFF' the system 500 will determine whether of not to APPROVE or DENY a vend request made by the vending equipment VMC.

The system 500 configuration that turns the system 500 into the master device for transacting cashless vending transactions can be referred to as the VEND ACTIVE mode 'ON', wherein VEND ACTIVE mode 'OFF' indicates the system 500 is a data conduit and not running the transactions and VEND ACTIVE mode 'ON' indicates the system 500 is running the transaction. This example reflects a VEND ACTIVE mode 'ON' cashless transaction vending cycle. Processing begins in block 3102.

In block 3102 a session is begun by the computing platform 802 interconnected with the system 500 and or by system 500. A session can be started in a number of ways including @<esc>B BEGIN A SESSION command, a valid card swipe or payment identification data presentation, an @<esc>A+STX+CARD-xxxxxx+ETX+LRC command where 'xxxxxx' is card or payment identification data, an @<esc>A+STX+DIAL-xxxxxx+ETX+LRC dial-a-vend command, or other suitable start session methods. In response the system 500 issues a MDB BEGIN SESSION message command to the vending equipment VMC. Processing then moves to block 3104.

In block 3104 the vending equipment starts a vending session. System 500 monitoring the MDB bus connection between the system 500 and VMC can determine and update the MDB TRANSACTION STRING accordingly. MDB bus data and MDB TRANSACTION STRING updating can be referred to as reporting or reporting data. Reporting data can be communicated to block 3006. Processing then moves to block 3110.

In block 3106 the system 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be 'S0001250000000000C'.

In block 3110 when a user makes a vending selection the VMC sends by way of the MDB bus connection between system 500 and the VMC a MDB VEND REQUEST message. This message typically contains the column or button selected by the user and the vending equipment price set for this item. The VEND REQUEST is reported to the system 500 and processing moves to block 3120.

In block 3108 the system 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be 'V0001250001150001R' (VEND ASSIST mode 'ON'). In a VEND ASSIST mode 'OFF' configuration the system 500 would typically respond to the VMC MDB VEND REQUEST with a MDB VEND APPROVED response without the computing platform 802 having an opportunity to APPROVE or DENY the vend request made by the vending equipment VMC.

In this example the VEND ASSIST mode is 'ON' the MDB STATE flag is set to 'V' to indicate a vend is occurring, and the MDB flag state is set to 'R' for REQUEST VEND APPROVE. This is the indication for computing platform 802 and or system 500 that in order to effectuate vending of the item or deny vending of the item a VEND APPROVE or VEND DENIED command respectively must be issued to the VMC from the system 500.

In an exemplary embodiment, a computing platform 802 interconnect with system 500 can determine from the MDB TRANSACTION string the item selected and item price. For example and not limitation, the MDB TRANSACTION STRING 'V 000125 000115 0001 R' indicates that the MAX VEND PRICE in the vending equipment is '000125' or $1.25, the price set in the vending equipment for the user item selected is '000115' or $1.15, and the user selected item or column id '0001' item or column number one. The computing platform 802 and or system 500 can in part use this information to determine whether to issue the VEND APPROVE or VEND DENIED command to the VMC.

For example and not limitation, a determination by the computing platform 802 to VEND APPROVE the vend request is made. In this regard, the computing platform 802 data communicates to the system 500 the @<esc>A+STX+SALE–00100+ETX+LRC where '00100' is the desired sale amount in this case $1.00. System 500 receiving the VEND APPROVE command from computing platform 802 issues the MDB VEND APPROVED message to the vending equipments VMC.

In block 3120 the VEND APPROVED response is received at the VMC from the system 500. The vending equipment in accordance with VMC programming initiates the vend product cycle. By the VMC acknowledging the VEND APPROVED message from the system 500, the system 500 can now indicate a cashless vend is pending. A report is passed back to block 3112 such that system 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be 'V0001250001000001P'. Processing moves to block 3114.

In block 3114 the vending equipment either completes or fails to complete a vending cycle. A report is passed to block 3116 such that system 500 updates the MDB TRANSACTION STRING to reflect the operational state changes and pricing information. The MDB TRANSACTION STRING is available to an interconnected computing platform 802 through issue of appropriate MDB TRANSACTION STRING send commands, such as @<esc>H, and @<esc>V. A sample MDB TRANSACTION STRING could be 'V0001250001000001V' for vend complete a failed vend cycle could be reflected in a MDB TRANSACTION STRING as 'V0001250001000001F'. Processing then moves to block 3116.

In block 3116 the system 500 accounts for the VEND SUCCESS and or VEND FAILURE. VEND FAILURES typically end a session and or transaction. Processing then moves to block 3118.

In block 3118 a determination is made as to whether the transaction should be ended or a multi-vend session should continue. If a multi-vend session is to continue then processing moves back to block 3104 by the system 500 issuing a MDB BEGIN SESSION message to the vending equipment VMC.

Figure 23J:
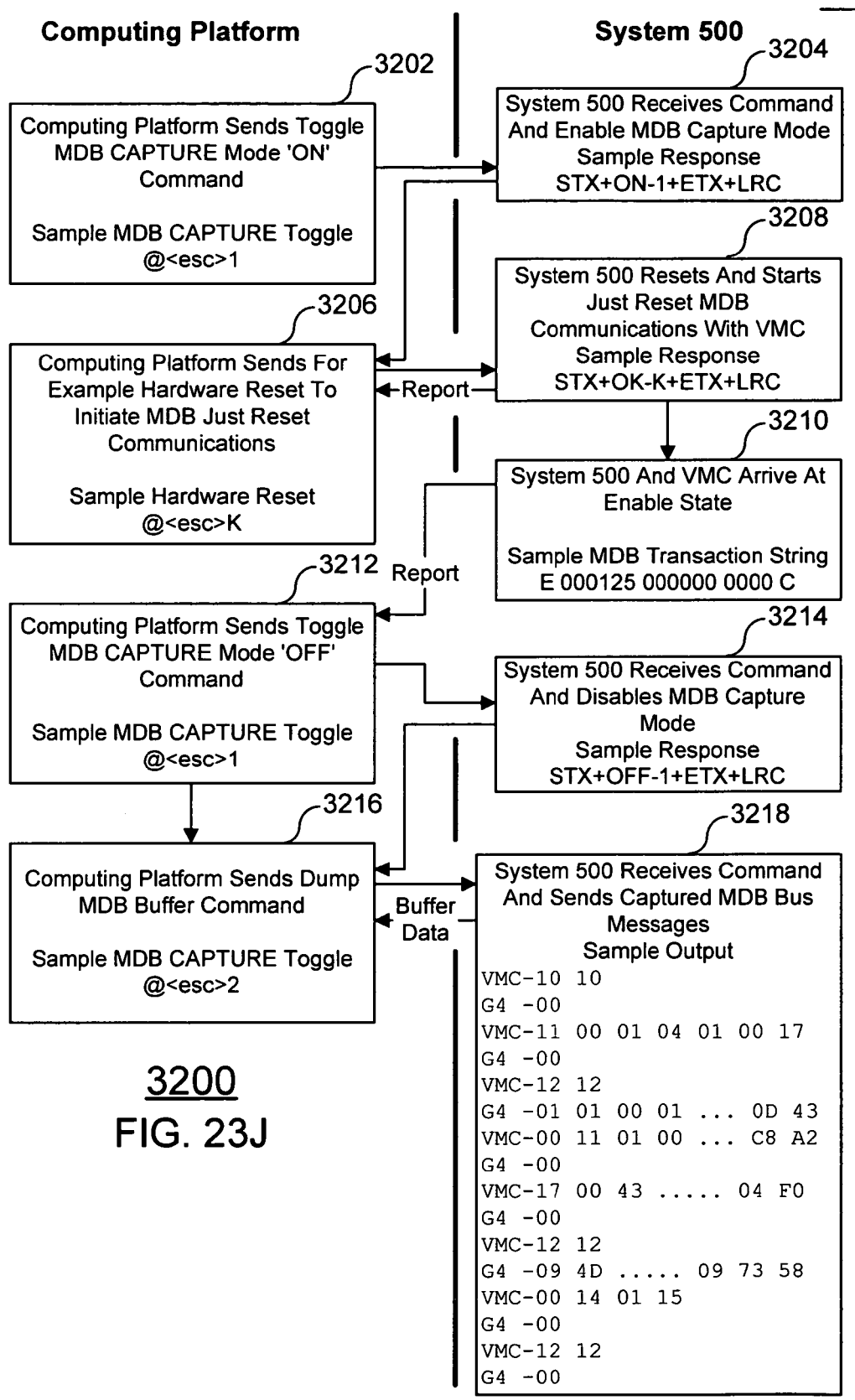
FIG. 23J there is shown a computing platform and system 500 exchange to capture MDB bus messages routine 3200.

Referring to FIG. 23J there is shown a computing platform and system 500 exchange to capture MDB bus messages routine 3200. Shown in the figure are messages being passed between a computing platform 802 (COMPUTING PLATFORM) and a system 500 (SYSTEM 500).

Routine 3200 is shown as example not a limitation, variations in the routine arise based on vending application, system 500 configuration, computing platform 802 configuration, vending equipment configuration, and or other setup operational, or configuration issues. In an exemplary embodiment, G4, EPORT, a system 500, a payment module, or audit-credit-interactive device, are all referred to as a system 500. The cooperation between system 500 and a computing platform 802 to transact a cashless transaction can be referred to as a cashless transaction processing system.

System 500 can initiate a MDB CAPTURE mode diagnostic routine. In this regard, MDB message data passed between the system 500 (denoted by 'G4' in the sample output block 3218) and the vending equipment VMC (VMC) can be captured and dumped to computing platform 802 for analysis. In an exemplary embodiment, a computing platform 802 can be a laptop computer, or other similar type of device.

The MDB CAPTURE mode can be useful in determining the correct MDB RESPONSE and MDB INTERVAL settings. In addition, the MDB message bytes passed between the system 500 and the VMC can be monitored and viewed during processes such as initialization, setup, and vending sessions.

Routine 3200 is an exemplary embodiment of the use of the MDB CAPTURE to capture initialization, and setup data as a system 500 and VMC exchange data after a system 500 hardware reset (@<esc>K command execution). Processing begins in block 3202.

In block 3202 the computing platform sends the Toggle MDB CAPTURE command @<esc>1 to the system 500. Processing then moves to block 3204.

In block 3204 the system 500 toggles 'ON' the MDB CAPTURE mode and begins recording the data bytes exchanged between the system 500 and VMC by way of the system 500 MDB interface 518. In response, to receiving the MDB CAPTURE command @<esc>1 from the computing platform 802 the system 500 may respond by sending the response message STX+ON–1+ETX+LRC. Processing then moves to block 3206.

In block 3206 the computing platform 802 for example and not limitation, can send the system 500 the hardware reset command @<esc>K. This causes the system 500 to go through a hardware reset and attempt to reestablish data communication with the interconnected vending equipment VMC—this is the MDB data desired to be captured. Processing then moves to block 3208.

In block 3208 the system 500 first responds to the receipt of the @<esc>K command by sending the computing platform 802 the response message STX+OK–K+ETX+LRC. The system 500 then initiates a system 500 hardware reset. Processing then moves block 3210.

In block 3210 the system 500 and VMC negotiate and exchange MDB messages to arrive at the system 500 being ENABLED. The data exchanged in the negotiation and exchange of MDB messages is captured in a system 500 MDB data buffer. In this example when the MDB TRANSACTION STRING reflects that the system 500 is enabled the MDB CAPTURE is stopped. System 500 updates the MDB TRANSACTION STRING to reflect the operational state changes and pricing information. The MDB TRANSACTION STRING is available to an interconnected computing platform 802 through issue of appropriate MDB TRANSAC- TION STRING send commands, such as @<esc>H, and @<esc>V. A sample MDB TRANSACTION STRING could be 'E 000125 000000 0000 C'. MDB bus data and MDB TRANSACTION STRING updating can be referred to as reporting or reporting data. A report is sent to the computing platform and processing moves to block 3212.

In block 3212 having determined that the system 500 is ENABLED the computing platform 802 can send the system 500 the Toggle MDB CAPTURE mode 'OFF' command @<esc>1. Processing then moves to block 3214.

In block 3214 the system 500 toggles 'OFF' the MDB CAPTURE mode and ends recording the data bytes exchanged between the system 500 and VMC by way of the system 500 MDB interface 518. In response to receiving the MDB CAPTURE command @<esc>1 from the computing platform 802 the system 500 may respond by sending the response message STX+OFF–1+ETX+LRC. Processing then moves to block 3216.

In block 3216 the computing platform can now request the system 500 to dump the captured MDB bus data by sending the system 500 the MDB BUFFER DUMP command @<esc>2. Processing then moves to block 3218.

In block 3218 in response to receiving the MDB BUFFER DUMP @<esc>2 command the system 500 sends the content of the MDB buffer. Block 3218 shows a sample of such data, wherein the 'G4-' denoted data bytes sent by the system 500 and the 'VMC-' denotes data bytes sent by the VMC.

Figure 23K:
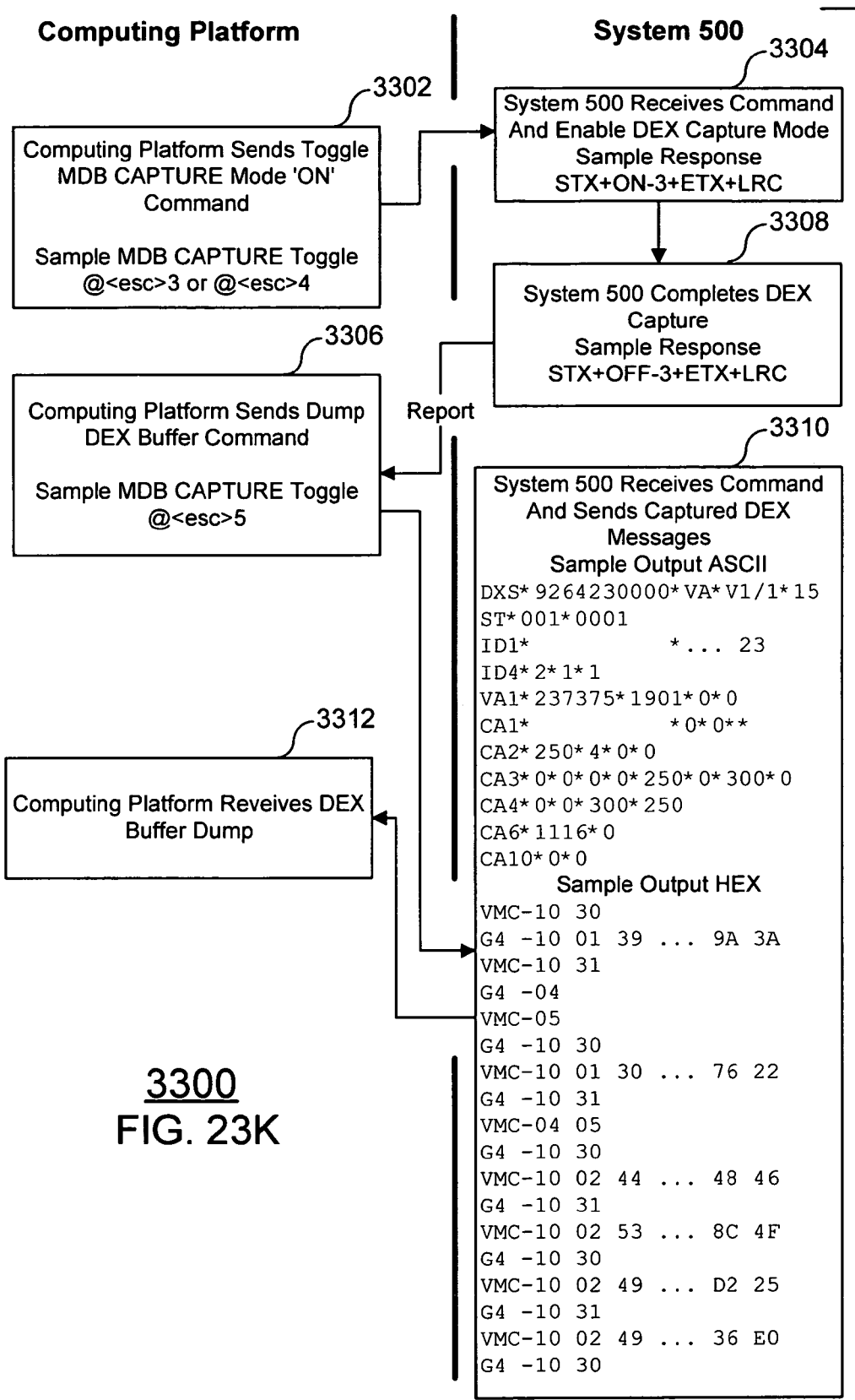
FIG. 23K there is shown a computing platform and system 500 exchange to capture DEX bus messages routine 3300.

Referring to FIG. 23K there is shown a computing platform and system 500 exchange to capture DEX bus messages routine 3300. Shown in the figure are messages being passed between a computing platform 802 (COMPUTING PLATFORM) and a system 500 (SYSTEM 500).

Routine 3300 is shown as example not a limitation, variations in the routine arise based on vending application, system 500 configuration, computing platform 802 configuration, vending equipment configuration, and or other setup operational, or configuration issues. In an exemplary embodiment, G4, EPORT, a system 500, a payment module, or audit-credit-interactive device, are all referred to as a system 500. The cooperation between system 500 and a computing platform 802 to transact a cashless transaction can be referred to as a cashless transaction processing system.

System 500 can initiate a DEX CAPTURE mode diagnostic routine. In this regard, DEX message data passed between the system 500 (denoted by 'G4' in the sample output block 3310) and the vending equipment VMC (VMC) can be captured and dumped to computing platform 802 for analysis. In an exemplary embodiment a computing platform 802 can be a laptop computer, or other similar type of device.

The DEX CAPTURE mode can be useful in determining the inventory, price settings, vend information, vending equipment service status including errors, failures, and alarms, and other vending equipment related information. In addition, the DEX message bytes passed between the system 500 and the VMC can be monitored and viewed during processes such as initialization, setup, and other vending activities.

Routine 3300 is an exemplary embodiment of the use of the DEX CAPTURE to capture vending machine related information. Processing begins in block 3302.

In block 3302 the computing platform 802 sends the Toggle DEX CAPTURE command @<esc>3 or @<esc>4 to the system 500. The @<esc>3 command captures full mode hexadecimal format. This format shows the handshaking data exchanges as well as the data itself expressed in hexadecimal byte code. The @<esc>4 command captures the parsed or ASCII format version. This format is first parsed to exclude the handshaking parameters and then the hexadecimal is converted to the ASCII equivalent. Processing then moves to block 3304.

In block 3304 the system 500 toggles 'ON' the DEX CAPTURE mode and begins recording the data bytes exchanged between the system 500 and VMC by way of the system 500 DEX interface 520. In response to receiving the DEX CAPTURE command @<esc>3 or @<esc>4 from the computing platform 802 the system 500 may respond by sending the response message STX+ON–3+ETX+LRC or STX+ON–4+ETX+LRC. Processing then moves to block 3308.

In block 3308 the system 500 first responds to the VMC ending a DEX transfer with the system 500 by sending the computing platform 802 the response message STX+OFF–3+ETX+LRC or STX+OFF–4+ETX+LRC. Processing then moves block 3306.

In block 3306 the computing platform can now request the system 500 to dump the captured DEX data by sending the system 500 the DEX BUFFER DUMP command @<esc>5. Processing then moves to block 3310.

In block 3310 in response to receiving the DEX BUFFER DUMP @<esc>5 command the system 500 sends the content of the DEX buffer. Block 3310 shows a sample of such data, wherein the 'G4-' denoted data bytes sent by the system 500 and the 'VMC-' denotes data bytes sent by the VMC. In addition, a sample of data for the @<esc>3 output hexadecimal and the @<esc>4 output ASCII. Processing then moves to block 3312.

In block 3312 the computing platform 802 receives the DEX data dump.

Figure 24:
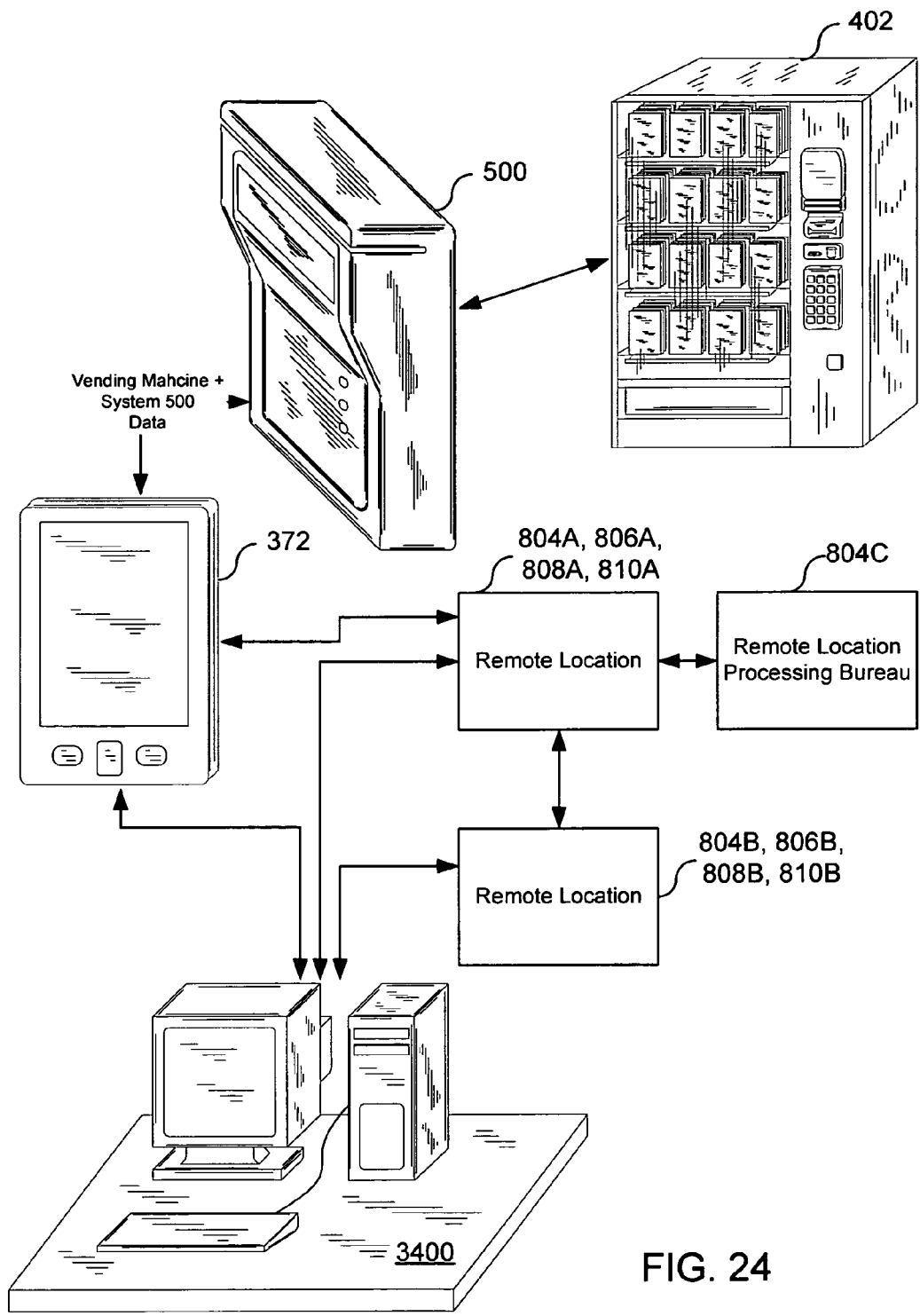
FIG. 24 there is shown a data device used as a data transport network architecture.

Referring to FIG. 24 there is shown a data device used as a data transport network architecture. The data device shown can be referred to as PDA 372. A data device can be a PDA 372, a wireless phone 368, a pager 370, computing platform 802, or other similar or suitable data device, preferably a handheld or portable computing device in nature. For disclosure purposes, data device can be referred to as PDA 372. A computing platform 802 can be referred to as a data device.

In certain embodiments vending machine 402 may have direct data communications to a remote location by way of system 500. Where a remote location can be remote locations 804, 806, 808, or 810, or other remote locations. Remote locations 804A/B, 806A/B, 808A/B, and 810A/B can be referred to as and are the same as remote locations 804, 806, 808, and 810. In this regard, vending machine 402 having a system 500 interconnected with it can utilize the system 500 communication means to move vending machine data and system 500 data to the remote locations. In a similar regard, system 500 can use communication means to process cashless transactions and communicate such transaction detail with the remote locations. When direct communications with remote locations is not possible practical, practical, feasible, or desirable the network embodiment shown in FIG. 24, which utilizes the data device as a data transport between the system 500, vending machine 402, and remote locations 804A, 804A, 806A, and 810A. System 500 can be referred to as a payment module.

In an exemplary embodiment when direct communications between system 500, vending machine 402 and the remote locations has not been implemented then the data device can be used to extract vending machine data from vending machine 402 by way of system 500, and extract system 500 data including system 500 cashless transactions data, currency data, and system 500 data. Furthermore, the data collected by the data device from the system 500 can be in a unique proprietary format, packetized for wireless or wired transmission, or more preferably transmitted in common DEX format. The DEX format being a vending industry standard can allow common data devices already on the market to access data from the vending machines as well as data from the system 500 without implementing additional programming or requiring additional software. To maintain system 500 data integrity, the system 500 data can be encrypted within the DEX formatted record. Encryption can be by way of 2fish, tiny encryption algorithm (TEA), or other similar or suitable encryption techniques or algorithms. In addition the data can be normalized for transport with encoding such as uuencoding or other similar or suitable methods of normalizing data for transport.

As an example and not a limitation, a route service person could carry the data device (shown as PDA 372) to the vending machine 402 that has system 500 interconnected with it. In this regard, the route service person could request the system 500 extract the DEX data from the vending machine (by way of DEX interface 520 or other suitable means) and communicate the DEX data to the data device PDA 372. In addition, the system 500 can insert in a standard format, nonstandard format or preferably in a DEX format system 500 data, which can be encrypted, partially encrypted, or as unencrypted data. The system 500 data can include cashless transaction data, system 500 data (payment module data), remote location data, and or other data.

Since DEX data is typically transmitted as ASCII characters the data is very unsecured in that the data can be readily viewable by many devices. Since system 500 data can include sensitive data including marketing data, cashless transaction data, and other data it can be preferable to encrypt such system 500 data prior to communication to the data device and/or the remote location. Since DEX data relies on a series of control characters to negotiate both the handshake for the exchange of data and the formatting of the data in the records certain characters must be excluded from the communication as such characters might inadvertently indicate handshake or data formatting characters. To avoid this problem system 500 data can be subjected to and encryption algorithm as a first step. Such encryption algorithms that work well in embedded devices include 2fish and TEA, though other similar or suitable algorithms may be implemented. As a second step the system 500 data can then be subjected to uuencoding. Uuencoding shifts the data to an ASCII set of avoiding the DEX control characters. The encryption key having previously been established server side can be referenced by the system 500 serial number are terminal ID number or other suitable reference ID. Uudecoding would then return the data to its original state.

System 500 can be interconnected with vending machine 402 by way of DEX interface 520, MDB interface 518, mimic MDB interface 516, and or other suitable system 500 interface. The data device (referred to as PDA 372) can be interfaced to system 500 by way of interactive interface 532, IRDA interface 550, a wireless connection, a wired connection, curb-side polling (wireless to a central point typically a vehicle parked curb-side), TTL level serial communication interface, a serial communication interface, or a plurality of input and output control lines. Wireless connectivity can be effectuated by way of transceiver 524, data modem 514, IRDA interface 550, and/or other similar or suitable wireless connections. Wireless communication technologies can include point-to-point device effectuated data connections, second generation (2G, 2.5G) compliant wireless technologies, third generation (3G) compliant wireless technologies, CDPD compliant data communications, CDMA compliant data communications, TDMA compliant data communications, wireless TCP/IP based data communication, radio protocol based data communication, SMS message based data communication, 802.11 802.11B type or compliant data communication, analog wireless type or compliant data communication, and or other suitable type of wireless communications.

The data device (PDA 372) after data communication and data exchange with system 500 can be physically carried to a data connection to gain access to the remote locations, wirelessly effectuate the data connection to gain access to the remote locations, be physically wired to the data connection to effectuate communication with the remote locations, connect the data device to a personal computer or other data processing device to effectuate data connection to gain access to the remote locations, or perform other suitable connectivity to effectuate a data connection for the purpose of data communicating between the data device (PDA 372) and remote locations 804A/B, 806A/B, 808A/B, or 810A/B.

FIG. 24 further illustrates how the data device (PDA 372) can data communicate wired or wirelessly with remote locations directly or indirectly and how remote locations can be interconnected together to create a network of functionality and data processing resources. The figure shows how the data device can be interconnected with a computer station 3400 in this regard software running on the computer station 3400 can extract the data from the data device or establish data communication access via the computer station 3400 with the remote locations directly shown as a remote locations 804A, 806A, 808A, 810A or indirectly first through remote locations 804B, 806B, 808B, 810B and then onto remote locations 804A, 806A, 808A, 810A. Such indirect communications between remote locations may occur when one server passes data communications received from a plurality of devices onto a second server for further processing. In this regard, a third remote location shown is 804C illustrates the how such remote locations may be interconnected to extend functionality between servers and locations and networks to implement the desired processing, hosting, data processing, reporting, transaction processing, electronic funds transfers, and other data services as may be required or desired.

FIG. 24 also illustrates computer station 3400. Computer station 3400 can be a personal computer (PC), or other similar or suitable computing platform. Computer station 3400 is shown with a monitor, a keyboard, and a central processing unit. Not shown by may be included in a computer station 3400 can be a mouse, modem, printer, computer peripherals, and scanner. Computer station 3400 can be other forms of computers and include other types of peripherals as may be required for data communication access to the data device, associates networks, remote locations, and other data processing resources.

Figure 25A:
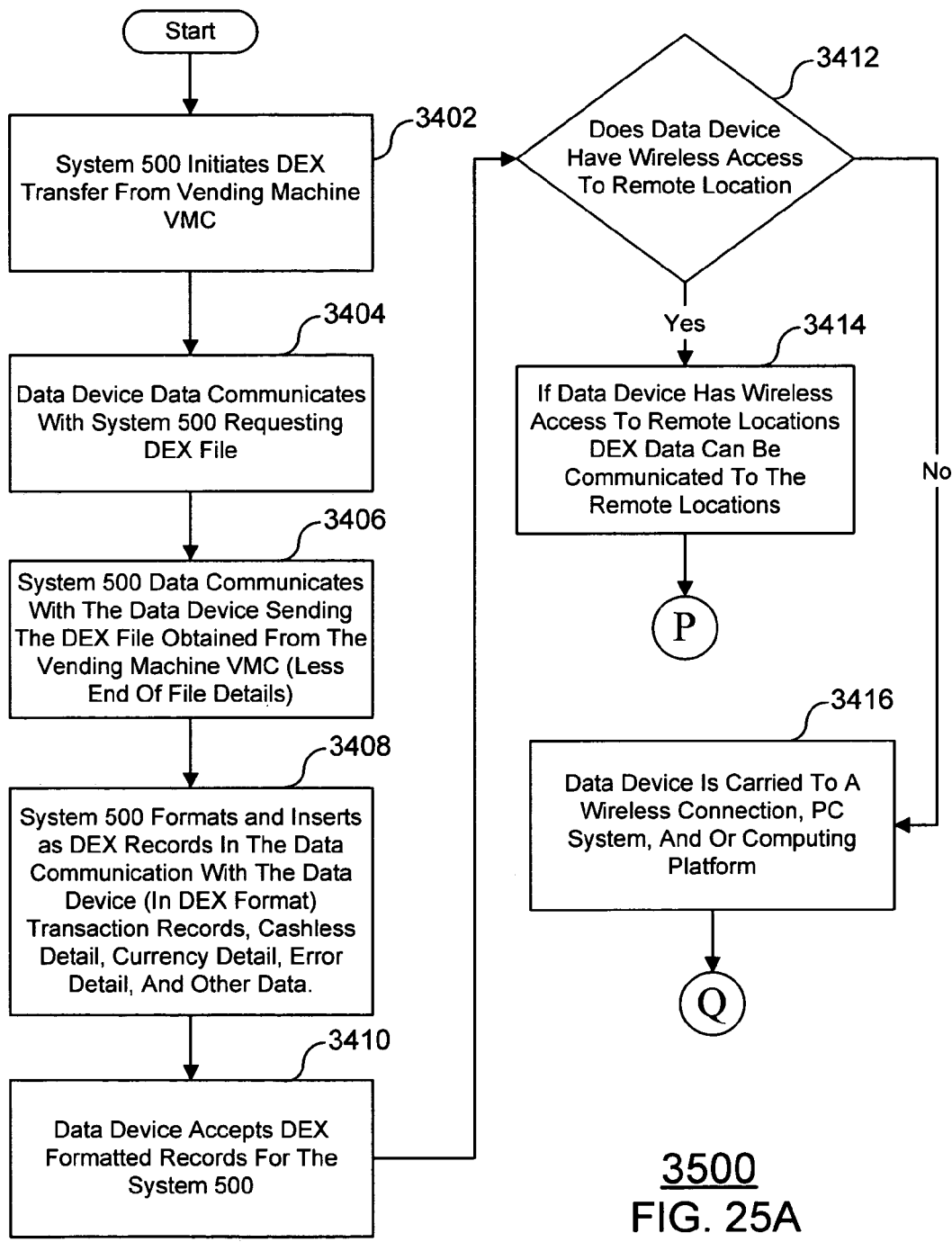
FIGS. 25A-B there is shown a data network transport routine 3500.
Figure 25B:
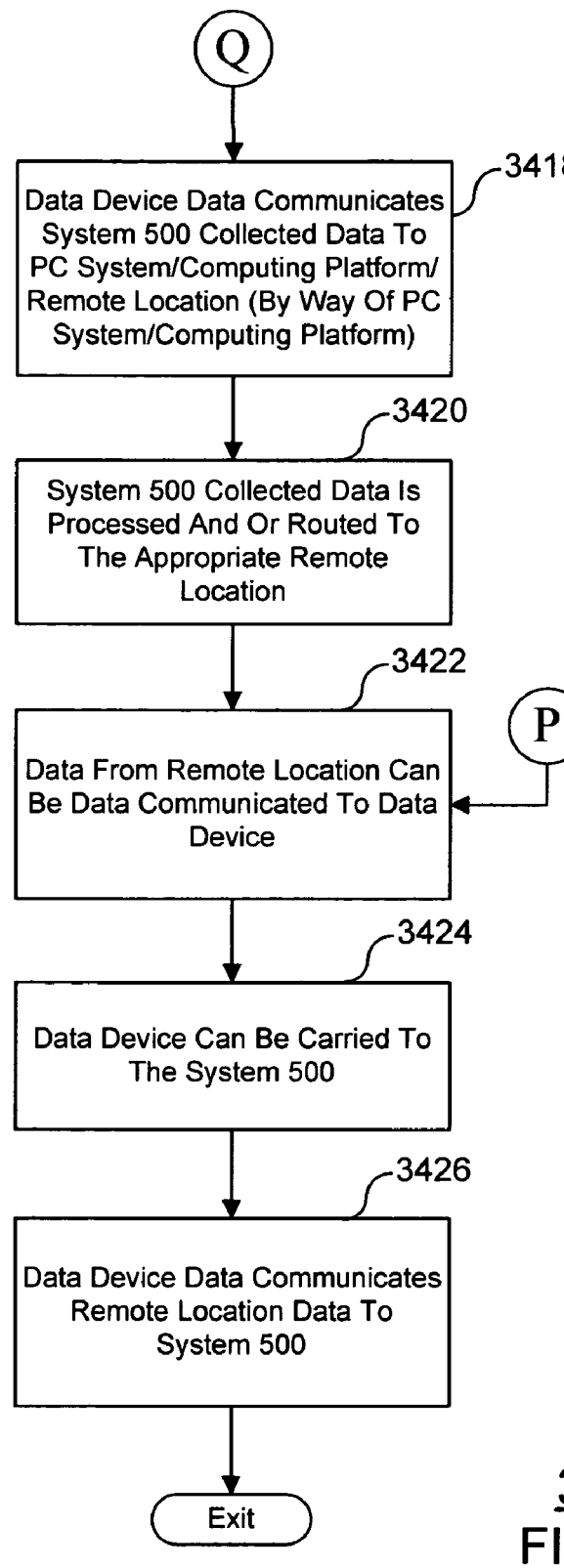

Referring to FIGS. 25A-25B there is shown a data network transport routine 3500. In an exemplary embodiment the data device, which can be a PDA 372 or other similar or suitable data device (preferably a portable or hand-held data device) is used to acquire system 500 data and vending machine data locally or curb-side (wireless proximity) to the vending machine. Such data acquisition can be effectuated through a variety of means. Such means can include the interactive interface 532, IRDA interface 550, a wireless connection, a wired connection, curb-side polling, TTL level serial communication interface, a serial communication interface, or a plurality of input and output control lines. Wireless connectivity can be effectuated by way of transceiver 524, data modem 514, IRDA interface 550, and/or other similar or suitable wireless connection. Wireless communication technologies can include point-to-point device effectuated data connections, second generation (2G, 2.5G) compliant wireless technologies, third generation (3G) compliant wireless technologies, CDPD compliant data communications, CDMA compliant data communications, TDMA compliant data communications, wireless TCP/IP based data communication, radio protocol based data communication, SMS message based data communication, 802.11 802.11B type or compliant data communication, analog wireless type or compliant data communication, and or other suitable type of wireless communications.

After acquiring data from the system 500 and or the vending machine, the data device can then initiate a data connection with at least one remote location either directly in a wired or wireless manner, or indirectly through connectivity to another data processing device such as computer station 3400, or other similar or suitable means. The data device can then transfer system 500 data and vending machine data to the remote location. The remote location can route return data to the data device, wherein the return data can be intended for the data device, the system 500, the vending machine controller, or the vending machine. The vending machine controller can include the vending machine controller interconnected with a single specific system 500 or the vending machine controllers interconnected with a plurality of system 500s as might be encountered on a route of vending machines. The vending machine can include the six vending machine interconnected with a specific system 500 or the vending machine interconnected with a plurality of system 500 as might be encountered on a route of vending machines. In this regard, the remote location by using the data device as a network transport can deliver return data to a single system 500 or a plurality of system 500, a single vending machine controller or a plurality of vending machine controllers, a single vending machine or in a plurality of vending machines. Processing begins in block 3402.

In block 3402 the system 500 initiates a DEX type transfer from the vending machine VMC. In this regard, the system 500 can utilize its DEX and or MDB interfaces to extract the DEX data from the vending machine's VMC controller. Initiation of the DEX transfer can occur based on system 500 programming, and or initiated externally by the data device. Processing then moves to block a 3404.

In block 3404 the data device data communicates with the system 500 requesting the text file be transferred from the system 500 to the data device. Such transfer can be wired or wireless. Such wireless transfers can include infrared (IRDA), RF, curb-side polling, or other similar or suitable wireless methods, protocols, or techniques. In general, curb-side polling is a wireless technique of acquiring data typically from a central location. Such central location can be from a vehicle parked in front of the building, as such the name curb-side polling refers to obtaining data from a central location typically a vehicle parked in front of a building and or near the vending machines (wireless proximity to the vending machines). Once the data device has communicated with the system 500 requesting that the DEX file be communicated from the system 500 to the data device, processing then moves to block the 3406.

In block 3406 the system 500 communicates with the data device sending the DEX file obtained from the vending machine controller (VMC). However, the system 500 does not include in the data transfer the end of file detail. In this regard, the system 500 can append, insert, or otherwise add additional system 500 formatted records (preferable in DEX formatting), which the data device will receive and treat as DEX data. An advantage in this approach can be that a data device that has been previously programmed to download DEX data is now capable of recording DEX data and system 500 data without requiring changes or reprogramming of the data device. Once the data has been transferred to the data device both the DEX data and the system 500 data can be carried from the vending machine to a data connection where the data can, by way of the data device, be communicated to the desired remote location (s). Processing then moves to block has 3408.

In block 3408 the system 500 formats and inserts system 500 records (preferably as DEX records) into the flow of data to the data device. The system 500 can encrypte and encode or otherwise alter and format the data records if required or desired. The system 500 formatted records are then data communicated to the data device. Such system 500 data records can include without limitation transaction records, a cashless transaction detail, currency detail, error detail, and other data. Processing then moves to block 3410.

In block 3410 the data device except the system 500 formatted records from the system 500. When the system 500 has completed the DEX data transfer the system 500 can calculate the end of file checksums and terminate the DEX transfer. Processing then moves to decision block 3412.

In decision block 3412 a decision is made as to whether the data device has wireless access to the remote location. If the resultant is in the affirmative, that is the data device has wireless access to the remote location then processing moves to block 3414. If the resultant is in the negative, that is the data device does not have wireless access to the remote location then processing moves to block 3416.

In block 3414 if the data device has wireless access to the remote location the data captured by the data device from the system 500 can be data communicated to the remote location. Processing then moves to block 3422.

In block 3416 the data device is carried to a data connection having access to the necessary remote locations. A data connection can be a wireless connection or a wired connection. In addition, a data connection can be a PC system such as computer station 3400, computing platform 802 and or other similar or suitable data connections. Processing then moves to block 3418.

In block 3418 the data device data communicates system 500 collected data and vending machine collected data to the PC system such as computer station 3400, computing platform 802, remote locations, remote locations by way of a PC system or a computing platform, and/or remote locations by other wired or wireless means. Furthermore, data collected from the system 500 can be data communicated from the data device to the PC system—computer station 3400. In this regard, computer station 3400 can be referred to as a remote location. Processing then moves to block 3420.

In block 3420 system 500 collected data is processed and routed to the appropriate remote locations. Such remote locations can include but not be limited to global network based data processing resources 810, processing bureaus 804, host network centers 808, or USALive servers 806. Processing then moves to block 3422.

In block 3422 return data from the remote location can be data communicated to the data device. In this regard, the remote location can destine the return data for a particular system 500 or a plurality of system 500, a particular vending machine controller or a plurality of vending machine controller, or a particular vending machine or a plurality of vending machines. In an exemplary embodiment this allows the remote location to program and maintain the configuration, functionality, and operational parameters of the system 500s, vending machine controllers, and vending machines accessible by the data device. Such configuration, functionality, and operational parameters include vending machine price setting, machine adjustments (such as temperature), system 500 configurations, and VMC configurations.

In addition, this provides for a positive feedback check-and-balance system between the system 500 and the remote location regarding transaction handling. In this regard, return data from the remote location can confirm to the sending system 500 the receipt of the system 500 data prior to the system 500 deleting the data, which may be transaction records and other transaction data in nature. In this regard, the check-and-balance system between the system 500 and the remote location can be implemented as follows: 1) system 500 transfers data/transactional records to the data device, 2) the data device sends the data/transactional records to the remote location, 3) the remote location transfers return data to the data device acknowledging receipt of the system 500 data/transactional data, 4) the data device communicates to the system 500 the remote location return data at a later time and date, 5) the system 500 receiving the remote location return data (processing block 3426) receives confirmation from the remote location the data/transactional records were received and deletes the appropriate data/transactional records to prevent inadvertent duplicate transaction processing. Alternatively, the system 500 can resend any lost transaction records insuring that in the event a data device and or a remote location fail to successful data communicate the system 500 data to the remote location, the system 500 has the ability to detect the error by not receiving return data confirmation from the remote location and recover by resending the data to the remote location. Processing then moves to block 3424.

In block 3424 the data device can be carried to the system 500. As such the data device becomes the network transport. As mentioned above, during subsequent data communications between the data device and the system 500 remote location data (return data) can be delivered to the system 500 and by way of the system 500 to the vending machine controller interconnected with the system 500 and to the vending machine interconnected with the vending machine controller. Processing then moves to block 3426.

In block 3426 the remote location data (return data) stored in the data device is communicated by way of the data device to system 500. The routine is then exited.

While this invention has been described with reference to specific embodiments, it is not necessarily limited thereto. Accordingly, the appended claims should be construed to encompass not only those forms and embodiments of the invention specifically described above, but to such other forms and embodiments, as may be devised by those skilled in the art without departing from its true spirit and scope.

What is claimed is:

1. An audit-credit-interactive system for facilitating cashless vending, said system comprising:
    a tethered payment interface, said tethered payment interface is accessible by a user and mounts on an external surface of a vending machine, said tethered payment interface further comprising:
        a magnetic card payment interface;
        an RFID payment interface;
        a display;
        a first interactive interface; and
        an enclosure, said magnetic card payment interface, said RFID payment interface, said display, and said first interactive interface are packaged in said enclosure; and;
    a payment module, said payment module is not accessible to a user and is secured inside of said vending machine, said payment module further comprising:
        a microcontroller;
        a vending equipment interface interconnected with said microcontroller, said payment module, by way of said vending equipment interface, interconnects to and data communicates with a vending machine controller, said vending machine controller is interconnected with and controls said vending machine; and
        a second interactive interface interconnected with said microcontroller, said second interactive interface interconnects said payment module to said tethered payment interface by way of said first interactive interface,
        data communicated between said first interactive interface and said second interactive interface includes said magnetic card payment interface data, said RFID payment interface data, and said display data, based in part on data communicated between said tethered payment interface and said payment module and data communicated between said payment module and said vending machine controller, said audit-credit-interactive system monitors said vending machine activity, and selectively controls said vending machine vending cycles effectuating cashless vending.

2. The audit-credit-interactive system in accordance with claim 1, wherein said enclosure mounts on an adapter plate, said adapter plate mounts in a vending industry standard size bill validator slot opening.

3. The audit-credit-interactive system in accordance with claim 1, wherein additional data bytes are added to data received from said magnetic card payment interface, and or data received from said RFID payment interface to distinguish between magnetic card data and RFID data.

4. The audit-credit-interactive system in accordance with claim 3, wherein said additional data bytes added to data received from said magnetic card payment interface includes the characters CARD.

5. The audit-credit-interactive system in accordance with claim 3, wherein said additional data bytes added to data received from said RFID payment interface does not include the characters CARD.

6. The audit-credit-interactive system in accordance with claim 1, wherein said tethered payment interface and said payment module are powered from a power source that is mutually exclusive from said vending machine power source.

7. The audit-credit-interactive system in accordance with claim 1, wherein said vending equipment interface is a multi-drop-bus (MDB) interface.

8. The audit-credit-interactive system in accordance with claim 1, wherein said tethered payment interface formats data obtained from said RFID payment interface to look like magnetic card data causing said payment module to process said RFID payment interface data as if it were magnetic card data.

9. The audit-credit-interactive system in accordance with claim 1, wherein said tethered payment interface adds data bytes to data obtained from said magnetic card payment interface enabling said payment module and a remote transaction processing system to distinguish between magnetic card data and other types of payment data.

10. The audit-credit-interactive system in accordance with claim 1, further comprising a plurality of light emitting diodes (LED).

11. The audit-credit-interactive system in accordance with claim 10, wherein said plurality of light emitting diodes are illuminated in a predetermined sequence when said RFID payment interface receives data from an RFID device.

12. The audit-credit-interactive system in accordance with claim 10, wherein said plurality of light emitting diodes are illuminated in a predetermined sequence to indicate certain said audit-credit-interactive system states.

13. The audit-credit-interactive system in accordance with claim 1, wherein said tethered payment interface further comprising a plurality of buttons.

14. The audit-credit-interactive system in accordance with claim 1, wherein said vending equipment interface is at least one of the following:
   i) a multi-drop-bus (MDB);
   ii) a DEX interface; or
   iii) a serial communication interface.

15. The audit-credit-interactive system in accordance with claim 1, wherein said payment module is at least one of the following:
   i) an audit-credit-interactive device;
   ii) a G4;
   iii) a cashless payment device;
   iv) a card reader assembly;
   v) a vending interface unit;
   vi) a combination bill validator and card reader;
   vii) embodied with a bill acceptor;
   viii) embodied with a coin mechanism;
   ix) an audit device;
   x) an E-PORT;
   xi) a module;
   xii) an MDB controller; or
   xiii) a semiconductor.

16. An audit-credit-interactive system for facilitating cashless vending, said system comprising:
   a tethered payment interface, said tethered payment interface is accessible by a user and mounts on an external surface of a vending machine, said tethered payment interface further comprising:
      a magnetic card payment interface;
      an RFID payment interface;
      a first interactive interface; and
      an enclosure, said magnetic card payment interface, said RFID payment interface, and said first interactive interface are packaged in said enclosure;
   and;
   a payment module, said payment module is not accessible to a user and is secured inside of said vending machine, said payment module further comprising:
      a microcontroller;
      a vending equipment interface interconnected with said microcontroller, said payment module, by way of said vending equipment interface, interconnects to and data communicates with a vending machine controller, said vending machine controller is interconnected with and controls said vending machine; and
      a second interactive interface interconnected with said microcontroller, said second interactive interface interconnects said payment module to said tethered payment interface by way of said first interactive interface,
   data communicated between said first interactive interface and said second interactive interface includes said magnetic card payment interface data, and said RFID payment interface data, based in part on data communicated between said tethered payment interface and said payment module and data communicated between said payment module and said vending machine controller, said audit-credit-interactive system monitors said vending machine activity, and selectively controls said vending machine vending cycles effectuating cashless vending.

17. An audit-credit-interactive system for facilitating cashless vending, said system comprising:
   a tethered payment interface, said tethered payment interface is accessible by a user and mounts on an external surface of a vending machine, said tethered payment interface further comprising:
      a magnetic card payment interface;
      a display;
      a first interactive interface; and
      an enclosure, said magnetic card payment interface, said display, and said first interactive interface are packaged in said enclosure;
   and;
   a payment module, said payment module is not accessible to a user and is secured inside of said vending machine, said payment module further comprising:
      a microcontroller;
      a vending equipment interface interconnected with said microcontroller, said payment module, by way of said vending equipment interface, interconnects to and data communicates with a vending machine controller, said vending machine controller is interconnected with and controls said vending machine; and
      a second interactive interface interconnected with said microcontroller, said second interactive interface interconnects said payment module to said tethered payment interface by way of said first interactive interface,
   data communicated between said first interactive interface and said second interactive interface includes said magnetic card payment interface data, and said display data, based in part on data communicated between said tethered payment interface and said payment module and data communicated between said payment module and said vending machine controller, said audit-credit-interactive system monitors said vending machine activity, and selectively controls said vending machine vending cycles effectuating cashless vending.

* * * * *